United States Patent
Tsurumi

(10) Patent No.: US 8,368,815 B2
(45) Date of Patent: Feb. 5, 2013

(54) IMAGE PROCESSING APPARATUS, IMAGE PROCESSING METHOD, AND PROGRAM

(75) Inventor: Shingo Tsurumi, Saitama (JP)

(73) Assignee: Sony Corporation, Tokyo (JP)

( * ) Notice: Subject to any disclaimer, the term of this patent is extended or adjusted under 35 U.S.C. 154(b) by 659 days.

(21) Appl. No.: 12/565,230

(22) Filed: Sep. 23, 2009

(65) Prior Publication Data

US 2010/0104256 A1  Apr. 29, 2010

(30) Foreign Application Priority Data

Oct. 27, 2008  (JP) ................. 2008-275141

(51) Int. Cl.
  *H04N 5/14* (2006.01)
(52) U.S. Cl. ...................................... 348/699
(58) Field of Classification Search .............. 348/699
  See application file for complete search history.

(56) References Cited

U.S. PATENT DOCUMENTS

| 5,886,742 | A * | 3/1999 | Hibi et al. .......... 375/240.16 |
| 6,229,570 | B1 * | 5/2001 | Bugwadia et al. ......... 348/441 |
| 6,307,550 | B1 | 10/2001 | Chen |
| 2005/0232356 | A1 * | 10/2005 | Gomi et al. .......... 375/240.16 |

FOREIGN PATENT DOCUMENTS

| JP | 11-168685 A | 6/1999 |
| JP | 2006-277731 A | 10/2006 |
| JP | 2007-36359 A | 2/2007 |
| JP | 2007-235642 A | 9/2007 |
| JP | 2008-84287 A | 4/2008 |
| JP | 2008-167155 | 7/2008 |
| WO | WO 00/79800 A1 | 12/2000 |
| WO | WO 01/41451 A1 | 6/2001 |
| WO | WO 2005/046221 A1 | 5/2005 |

OTHER PUBLICATIONS

Yukinobu Taniguchi, et al., "PanoramaExcerpts: Video Cataloging by Automatic Synthesis and Layout of Panoramic Images", IEICE Transactions on Information and Systems, XP009093074, vol. E83-D, No. 12, Dec. 1, 2000, pp. 2039-2046.
U.S. Appl. No. 13/486,209, filed Jun. 1, 2012, Tsurumi.

* cited by examiner

*Primary Examiner* — David Czekaj
*Assistant Examiner* — Tracy Li
(74) *Attorney, Agent, or Firm* — Oblon, Spivak, McClelland, Maier & Neustadt, L.L.P.

(57) ABSTRACT

An image processing apparatus includes: a calculating unit configured to calculate motion information relating to between two images that make up an imaged moving picture; and a selecting unit configured to select compositing target images serving as compositing targets from a plurality of images that make up the imaged moving picture based on reliability that indicates the likelihood of the calculated motion information.

11 Claims, 80 Drawing Sheets

FIG. 4

| MOVING IMAGE ID | SECTION NO. | FRAME NO. | AFFINE TRANSFORMATION PARAMETERS | FRONT-MOST FRAME | FACE DATA |
|---|---|---|---|---|---|
| #1 | #101 | 1 | a1, b1, c1, d1, e1, f1 | 0 | (x1, y1), (H1, W1) |
| | | 6 | a6, b6, c6, d6, e6, f6 | 0 | (x6, y6), (H6, W6) |
| | | 9 | a9, b9, c9, d9, e9, f9 | 1 | (x9, y9), (H9, W9) |
| | | 17 | a17, b17, c17, d17, e17, f17 | 0 | (x17, y17), (H17, W17) |
| | | ... | ... | ... | ... |
| | #102 | ... | ... | ... | ... |
| | #103 | ... | ... | ... | ... |
| ... | ... | ... | ... | ... | ... |

271  272  273  274  275  276
270

FIG. 8
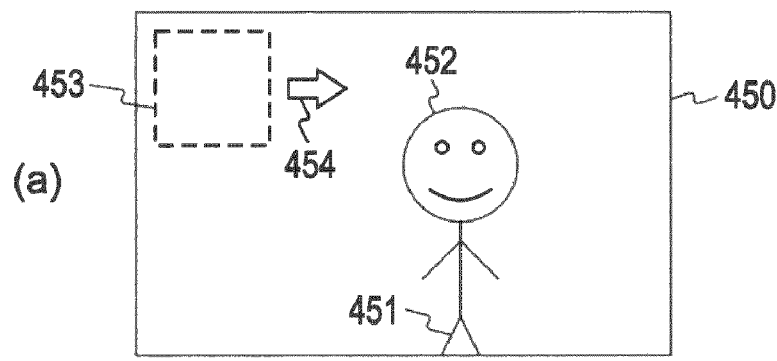
(a)
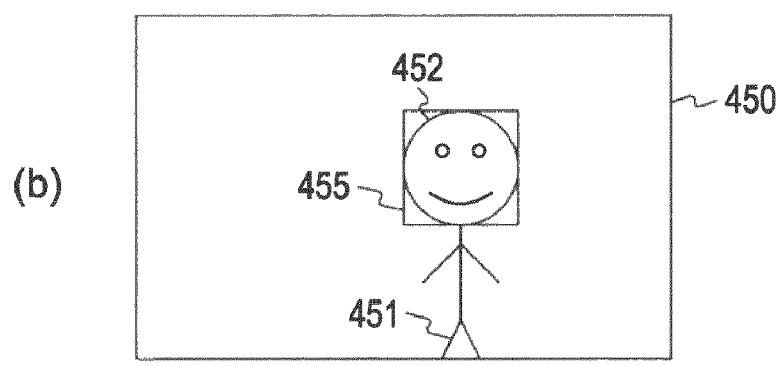
(b)
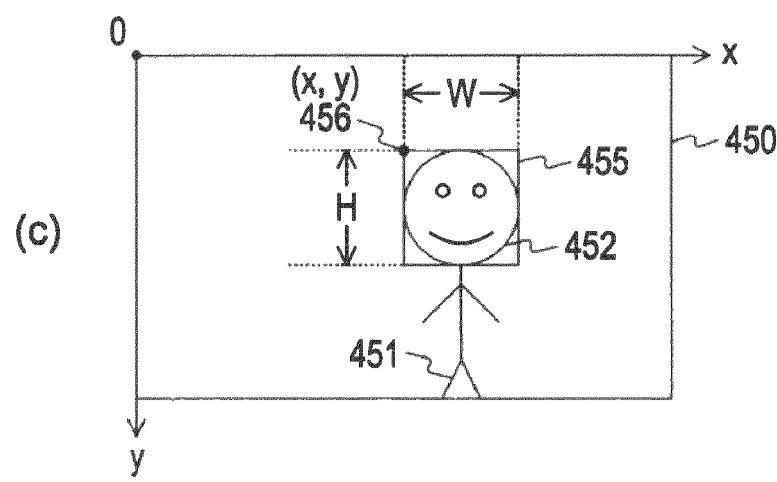
(c)

FIG. 10
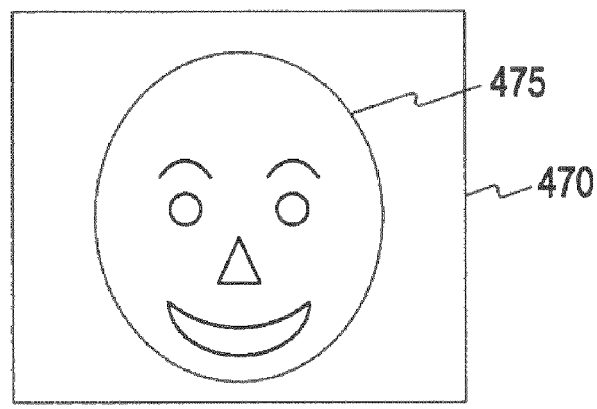
(a)
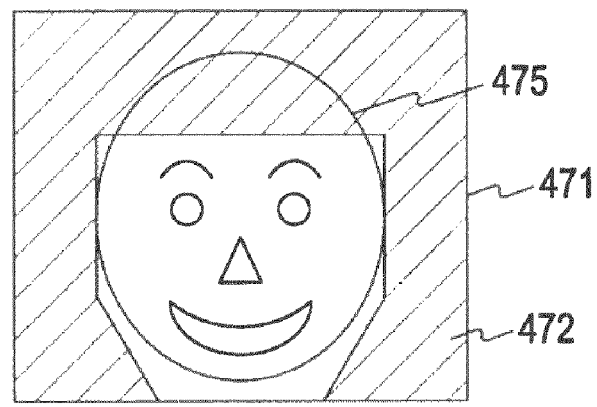
(b)
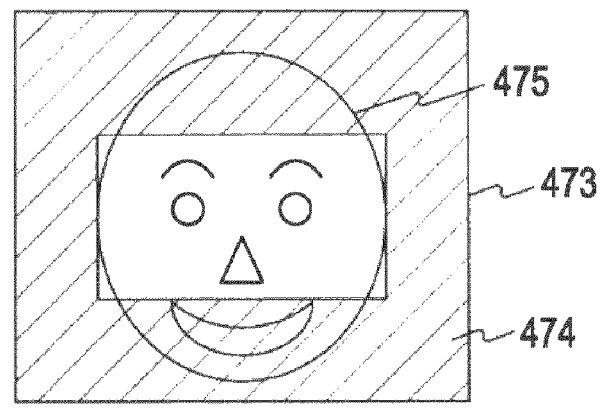
(c)

FIG. 23
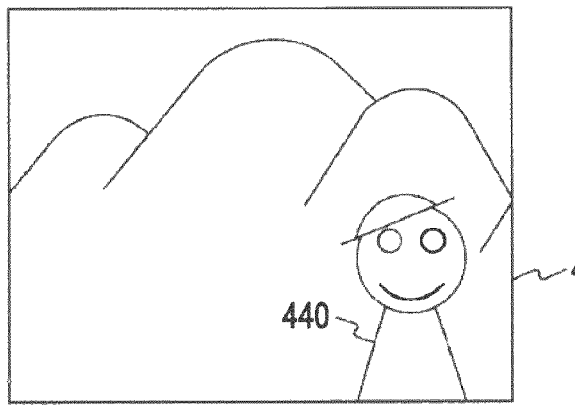
(a)
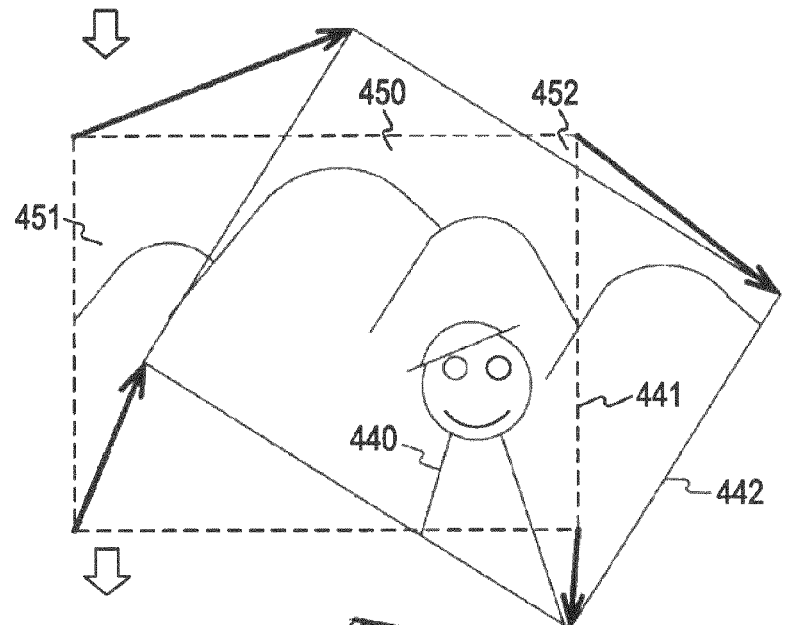
(b)
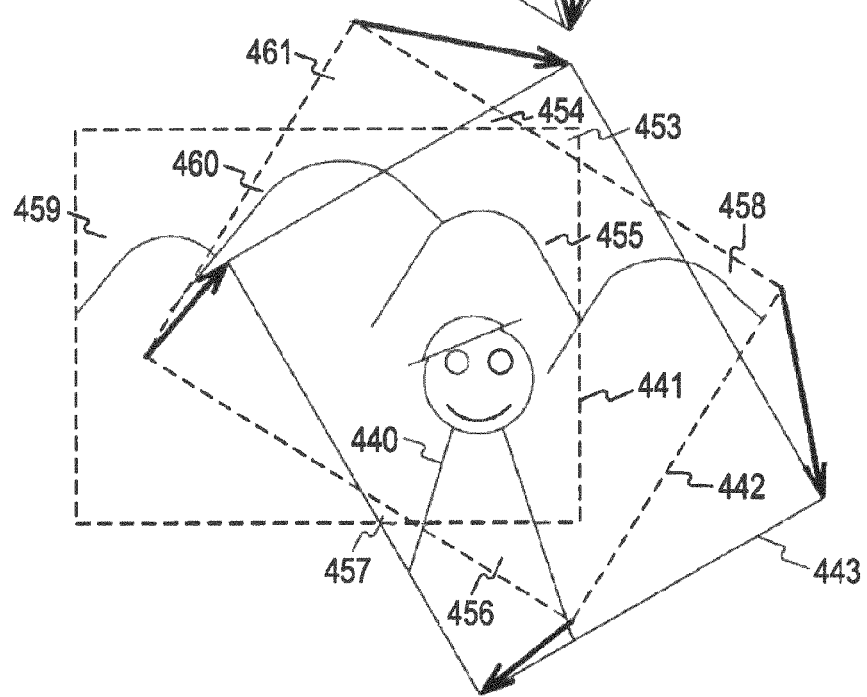
(c)

FIG. 31
(a)
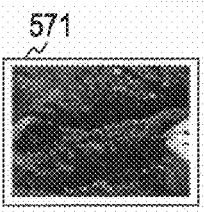
571
230
(b)
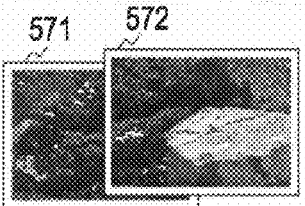
571  572
230
(c)
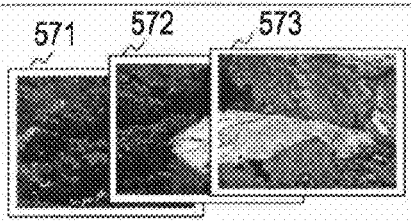
571  572  573
230
(d)
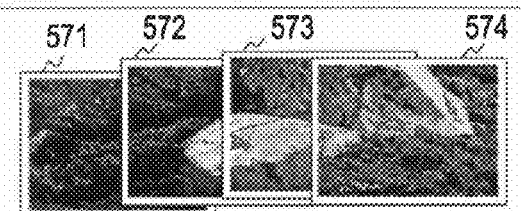
571  572  573  574
230

FIG. 32
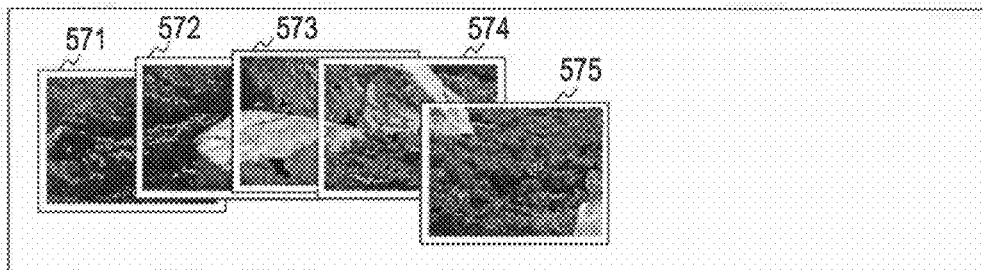
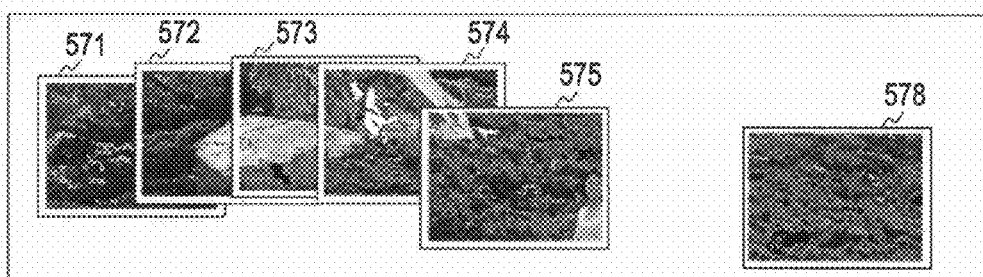
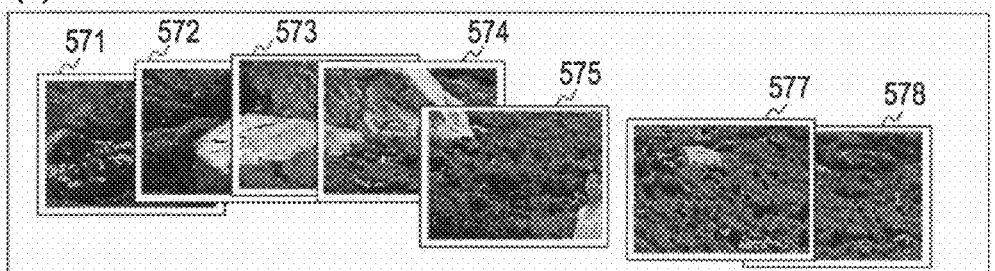
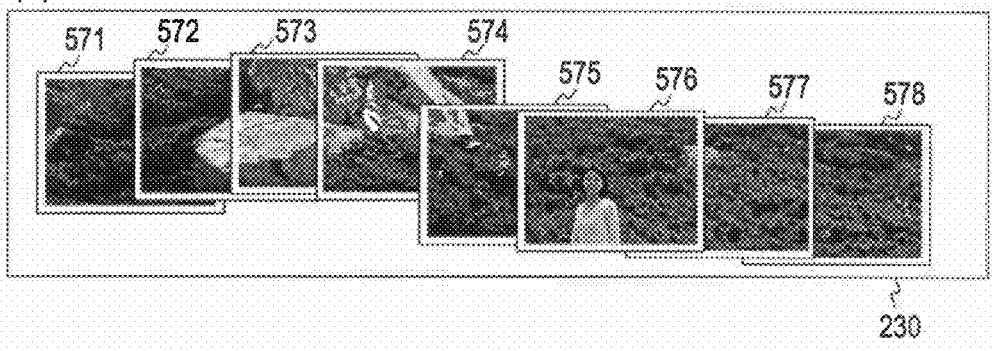

FIG. 33
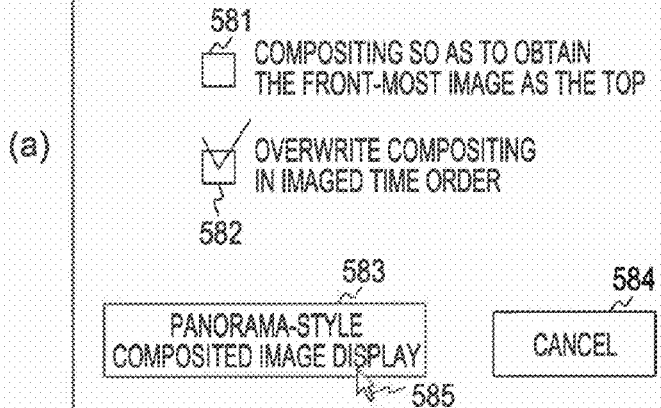
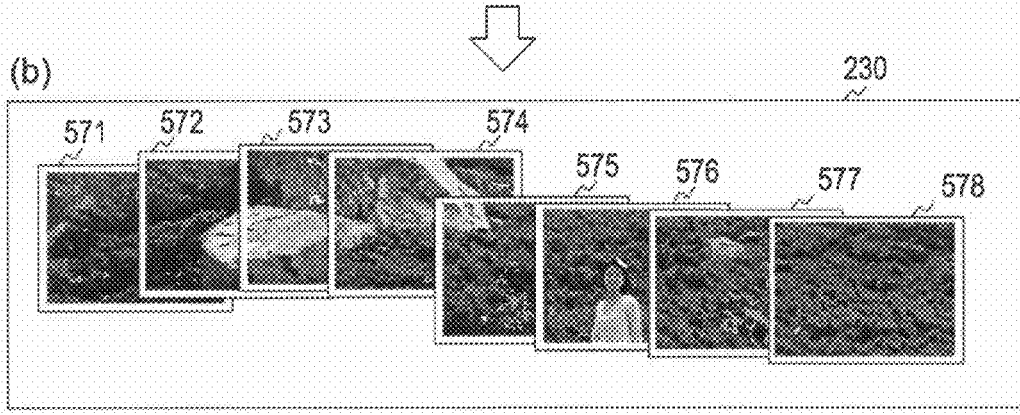
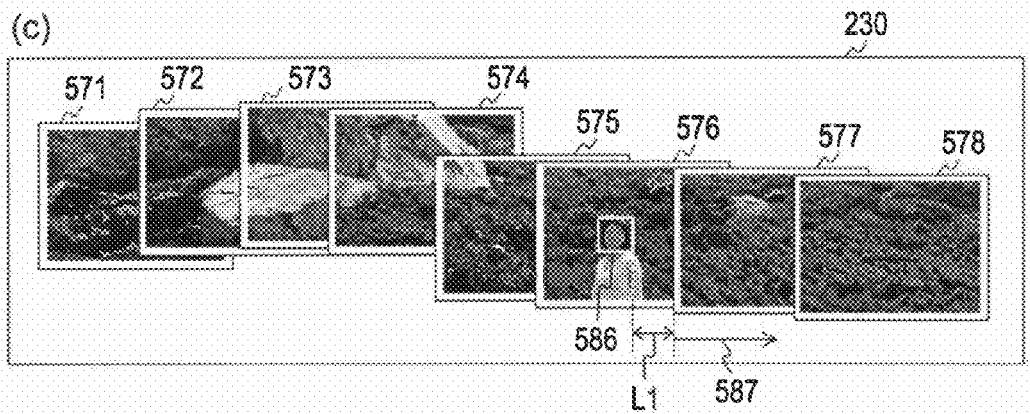

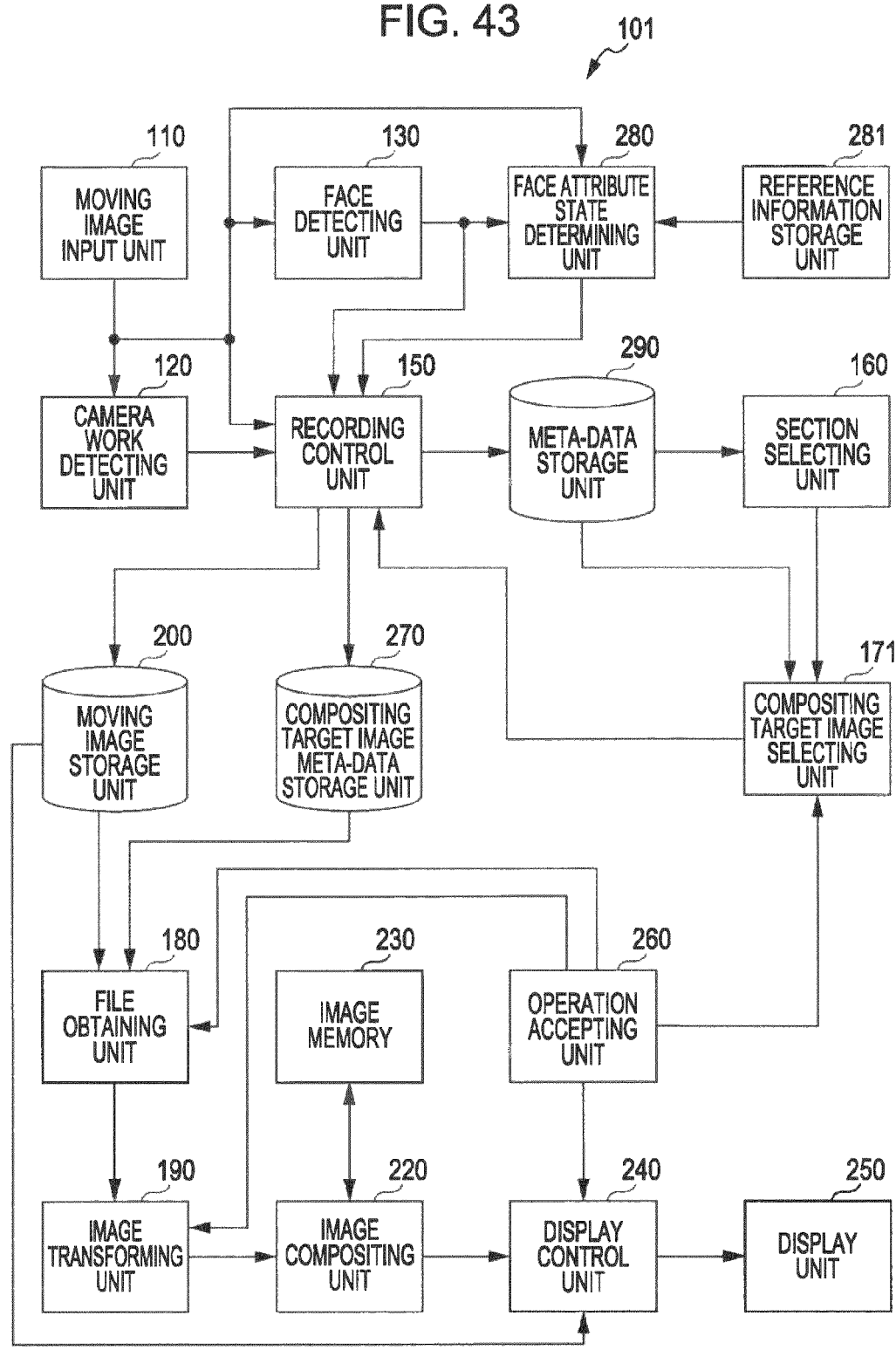

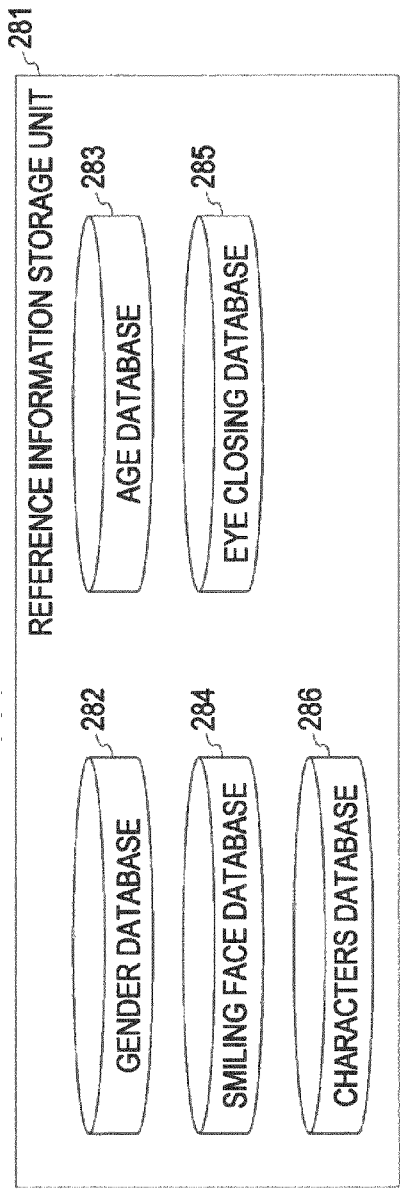

FIG. 45

PLEASE SELECT A TARGET TO BE EMPHASIZED AT THE TIME OF DISPLAYING A PANORAMA-STYLE COMPOSITED IMAGE FOR EACH ITEM, AND SELECT A LEVEL OF THE OVERLAYING RATE OF EACH IMAGE TO BE DISPLAYED.

- 611 ● GENDER ☐ MALE ☑ FEMALE
- 612 ● AGE ☑ ADULT ☐ CHILD
- 613 ● CHARACTERS ☑ CHARACTERS ☐ ETC.
  ( MR. A ☐  MR. B ☑  MR. C ☐ )
- 614 ● FACIAL EXPRESSION ☑ SMILING FACE ☐ NON-SMILING FACE
- 615 ● COMPOSITING SEQUENCE ☑ ASCENDING ☐ DESCENDING
- 616 ● OVERLAYING RATE

| HIGH |
| MIDDLE |
| LOW |

617, 618

619 PANORAMA-STYLE COMPOSITED IMAGE DISPLAY

620 CANCEL

FIG. 46

| 621 GENDER | | 622 AGE | | 623 CHARACTERS | |
|---|---|---|---|---|---|
| MALE | FEMALE | ADULT | CHILD | CHARACTERS | OTHER THAN CHARACTERS |
| 1 | 1 | 1 | 1 | 3 | 0 |

| 624 SMILING FACE | | 625 EYE CLOSING | | 626 DISTANCE FROM IMAGE CENTER | | 627 FACE SIZE WITHIN IMAGE | |
|---|---|---|---|---|---|---|---|
| INCLUDED | NONE | INCLUDED | NONE | NEAR | FAR | LARGE | SMALL |
| 5 | 0 | 0 | 1 | 3 | 0 | 3 | 0 |

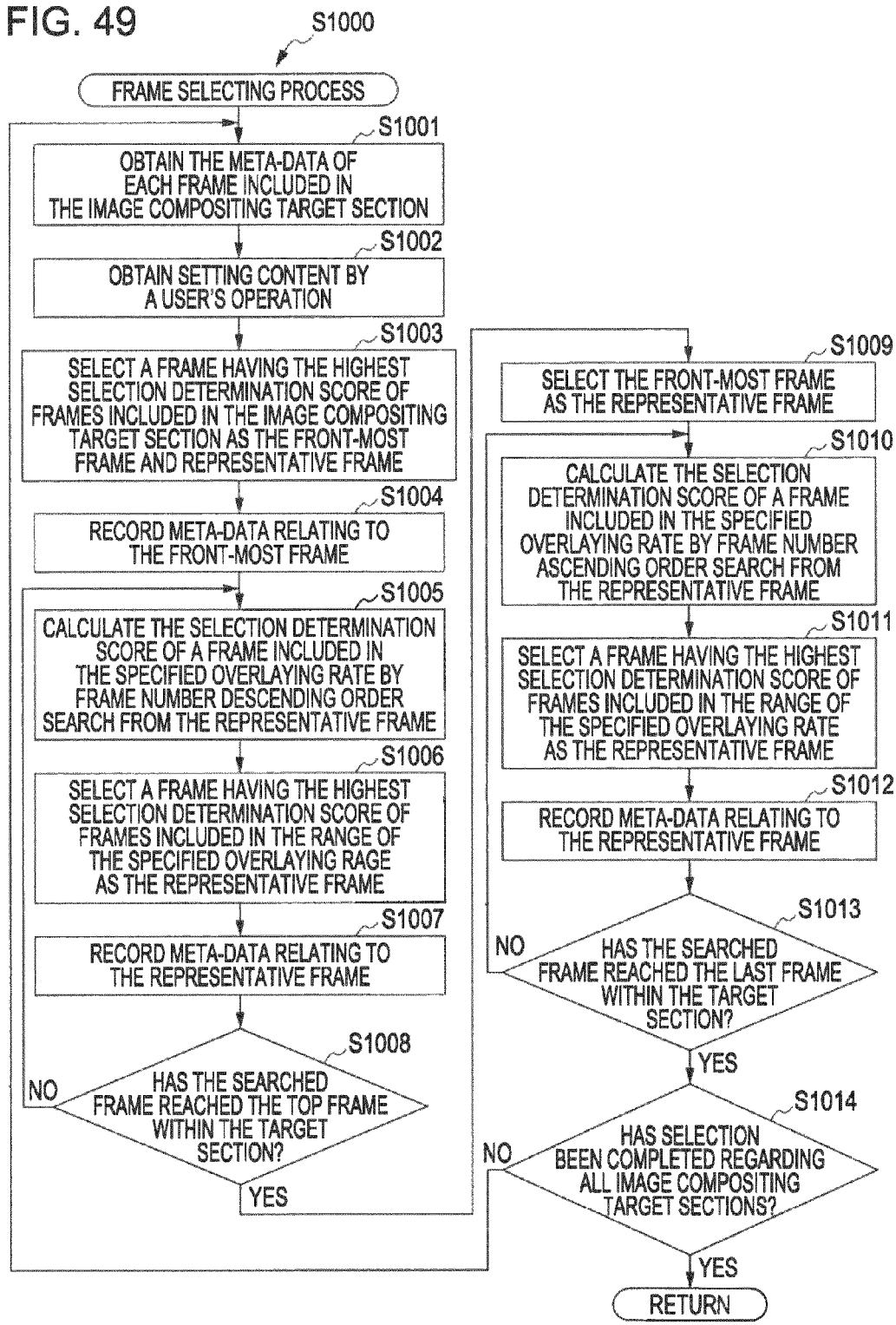

FIG. 51

| MOVING IMAGE ID 271 | SECTION NO. 272 | FRAME NO. 273 | AFFINE TRANSFORMATION PARAMETERS 274 | FRONT-MOST FRAME 275 | FACE DATA 276 | DECORATION IMAGE DATA 278 |
|---|---|---|---|---|---|---|
| #1 | #101 | 1 | ... | 0 | (x1, y1), (H1, W1) | ... |
| | | 6 | ... | 0 | (x6, y6), (H6, W6) | ... |
| | | 9 | ... | 1 | (x9, y9), (H9, W9) | ... |
| | | 17 | ... | 0 | (x17, y17), (H17, W17) | ... |
| | #102 | ... | ... | ... | ... | ... |
| | #103 | ... | ... | ... | ... | ... |
| ... | ... | ... | ... | ... | ... | ... |

⇩ SIMD OPERATION (b)

827: [A1, A2, A3, A4] + 828: [B1, B2, B3, B4] = 829: [C1, C2, C3, C4]

FIG. 75
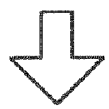
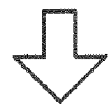
RESULT OUTPUT

FIG. 78

$$\text{VECTOR A} = \left( \boxed{-1} \times \underset{841}{\begin{array}{|c|}\hline 0 \\\hline 1 \\\hline 2 \\\hline 3 \\\hline\end{array}} + \boxed{0} \times \underset{842}{\begin{array}{|c|}\hline 1 \\\hline 2 \\\hline 3 \\\hline 4 \\\hline\end{array}} + \boxed{1} \times \underset{843}{\begin{array}{|c|}\hline 2 \\\hline 3 \\\hline 4 \\\hline 5 \\\hline\end{array}} \right)$$

$$\text{VECTOR B} = \left( \boxed{-2} \times \underset{844}{\begin{array}{|c|}\hline 32 \\\hline 33 \\\hline 34 \\\hline 35 \\\hline\end{array}} + \boxed{0} \times \underset{845}{\begin{array}{|c|}\hline 33 \\\hline 34 \\\hline 35 \\\hline 36 \\\hline\end{array}} + \boxed{2} \times \underset{846}{\begin{array}{|c|}\hline 34 \\\hline 35 \\\hline 36 \\\hline 37 \\\hline\end{array}} \right)$$

$$\text{VECTOR C} = \left( \boxed{-1} \times \underset{847}{\begin{array}{|c|}\hline 64 \\\hline 65 \\\hline 66 \\\hline 67 \\\hline\end{array}} + \boxed{0} \times \underset{848}{\begin{array}{|c|}\hline 65 \\\hline 66 \\\hline 67 \\\hline 68 \\\hline\end{array}} + \boxed{1} \times \underset{849}{\begin{array}{|c|}\hline 66 \\\hline 67 \\\hline 68 \\\hline 69 \\\hline\end{array}} \right)$$

VECTOR D = ( VECTOR A + VECTOR B ) + VECTOR C

IMAGE PROCESSING APPARATUS, IMAGE PROCESSING METHOD, AND PROGRAM

BACKGROUND OF THE INVENTION

1. Field of the Invention

The present invention relates to an image processing apparatus, and specifically, relates to an image processing apparatus and an image processing method which analyze an image to execute image processing, and a program that causes a computer to execute the method thereof.

2. Description of the Related Art

In recent years, imaging apparatuses such as digital video cameras (e.g., integrated camera/recorders) have come into widespread use. For example, a tourist traveling various tourist locations will often take moving pictures of a person or persons using an imaging apparatus, with a famous building or scenery or the like in the background.

The moving picture thus taken can be played, for example, using a player within the home. However, in the case of using a player to play the moving picture, playing the whole moving picture from the beginning can mean that the play time is prolonged, and there is a possibility that interest in the moving picture may decrease. Also, playing multiple moving pictures taken at multiple tourist sites can mean that the play time is further prolonged, and interest in viewing all the moving pictures may decrease. Also, the time used for viewing of a moving picture is relatively long, and accordingly, a viewer is often satisfied with viewing a moving picture that has been played and viewed once, and consequently, there is little call for viewing such a moving picture repeatedly.

Therefore, for example, there has been proposed a player which displays a film roll image on a display unit (e.g., see Japanese Unexamined Patent Application Publication No. 2008-167155). This film roll image is, for example, an image wherein the thumbnail images of still images that represent scenes making up a moving picture are disposed in the playback point-in-time order of scenes corresponding to each thereof.

SUMMARY OF THE INVENTION

According to the above related art, in the case of viewing multiple moving pictures taken at multiple tourist locations, for example, a user can readily understand the overall content of these moving pictures.

However, in the case of displaying a thumbnail image that represents each scene making up a moving picture, the imaging range corresponding to the thumbnail image thereof is displayed, but other imaging spaces at the scene corresponding to the thumbnail image thereof are not displayed. For example, in the case that a person is included in the imaging range of the scene thereof, and the place where the scene thereof has been taken, the surrounding atmosphere, and so forth, can be readily comprehended, it can be conceived that interest in the scene thereof can be furthered. In this case, it is important to select an image that is attractive to the user, for example, thereby furthering interest in the moving picture thereof.

It has been found to be desirable to increase interest in a moving picture.

According to an embodiment of the present invention, there are provided an image processing apparatus and an image processing method, and a program causing a computer to execute the method thereof, the image processing apparatus including: a calculating unit configured to calculate motion information relating to between two images that make up an imaged moving picture; and a selecting unit configured to select compositing target images serving as compositing targets from a plurality of images that make up the imaged moving picture based on reliability that indicates the likelihood of the calculated motion information. Thus, there is provided an effect that compositing target images are selected from the multiple images making up the moving picture based on the reliability of the motion information relating to two images making up the imaged moving picture.

Also, the selecting unit may include: a section selecting unit configured to select a section used for selecting the compositing target images from a plurality of images that make up the imaged moving picture based on the reliability; and an image selecting unit configured to select the compositing target images from a plurality of images included in the selected section based on relative position relationship of images included in the selected section. Thus, there is provided an effect that a section used for selecting the compositing target images is selected based on the reliability, and the compositing target images are selected based on relative position relationship of images included in this section.

In the case that the selected compositing target images are taken as reference images, and a target image that is another image included in the selected section, and the reference images have been each converted with the motion information, the image selecting unit may select a new compositing target image based on the overlaying rate between the target image and the reference images. Thus, there is provided an effect that a new compositing target images is selected based on the overlaying rate in the case that a target image included in the selected section, and the reference images are each converted with the motion information.

The image processing apparatus may further include a determining unit configured to determine the attributes of a target included in the image, with the image selecting unit selecting the compositing target images based on the determined attributes. Thus, there is provided an effect that the compositing target images are selected based on the determined attributes.

An arrangement may be made wherein the image selecting unit calculates an evaluated value based on the determined attributes for each of targets included in the image, and selects the compositing target images based on the evaluated value calculated for each of the targets. Thus, there is provided an effect that an evaluated value is calculated for each of targets included in the image, and the compositing target images are selected based on the evaluated value calculated for each of the targets.

An arrangement may be made wherein the image selecting unit takes the selected compositing target images as reference images, and selects a new compositing target image based on the evaluated value calculated for each of targets included in a target image that is another image included in the selected section, and the evaluated value calculated for each of targets included in the reference images. Thus, there is provided an effect that a new compositing target image is selected based on the evaluated value calculated for each of targets included in a target image included in the selected section, and the evaluated value calculated for each of targets included in the reference images.

The section selecting unit may select a section including an image of a certain range as the section. Thus, there is provided an effect that a section including an image of a certain range is selected.

The image processing apparatus may further include a reliability determination score calculating unit configured to calculate a reliability determination score that indicates a score used for determining the reliability based on the calculated motion information, with the motion information including components relating to enlargement/reduction, translational movement, and rotation, and with the section selecting unit selecting the section based on the calculated reliability determination score, the translational component, the rotational component, and the enlargement/reduction component that relate to the motion information. Thus, there is provided an effect that a reliability determination score is calculated based on the motion information, and the section is selected based on the reliability determination score, translational component, rotational component, and enlargement/reduction component that relate to the motion information.

The calculating unit may include: a feature point extracting unit configured to extract, based on pixels included in a first image that makes up the imaged moving picture, a feature point of the first image; a motion amount calculating unit configured to calculate the motion amount of a second image that is an image following the first image that makes up the imaged moving picture as to the first image based on each of the extracted feature points; and a motion information calculating unit configured to calculate the motion information based on the calculated motion amount, with the reliability determination score calculating unit calculating a value that indicates the rate of a feature point that exhibits dominant motion at the time of calculating the motion information by the motion information calculating unit, of the extracted feature points, as the reliability determination score. Thus, there is provided an effect that a feature point of the first image is extracted, the motion amount of the second image as to the first image is calculated, the motion information is calculated, a value that indicates the rate of a feature point that exhibits dominant motion at the time of calculating the motion information of the feature points of the first image is calculated as the reliability determination score.

An arrangement may be made wherein with a first image that makes up the imaged moving picture as a reference, in the case that a second image that is an image following the first image that makes up the imaged moving picture is converted based on the motion information, the reliability determination score calculating unit calculates the luminance difference value of pixels at an overlaid region of the first image and the second image, and calculates the reliability determination score based on the difference value thereof. Thus, there is provided an effect that, with the first image as a reference, the luminance difference value of pixels at an overlaid region of the first and second images in the case of the second image being converted based on the motion information is calculated, and the reliability determination score is calculated based on this difference value.

The calculating unit may include: a feature point extracting unit configured to extract a feature point of the first image based on each of pixels included in the first image; a motion amount calculating unit configured to calculate the motion amount of the second image as to the first image based on each of the extracted feature points; and a motion information calculating unit configured to calculate the motion information based on the calculated motion amount, with the reliability determination score calculating unit calculating, of the feature points extracted in the overlaid region, the luminance difference value of pixels around a feature point that exhibits dominant motion at the time of calculating the motion information by the motion information calculating unit, and calculating the reliability determination score based on the difference value thereof. Thus, there is provided an effect that feature points within the first image are extracted, the motion amount of the second image as to the first image is calculated to calculate motion information, and with the overlaid region between the first and second images after conversion, of the feature points within the first image, the luminance difference value of pixels around a feature point that exhibits dominant motion at the time of calculating the motion information is calculated, and the reliability determination score is calculated based on this difference value.

According to the above configurations, an excellent effect is provided in that interest in a moving picture can be increased.

BRIEF DESCRIPTION OF THE DRAWINGS

FIG. 4 is a diagram schematically illustrating the storage content of a compositing target image metadata storage unit according to the first embodiment of the present invention;

FIG. 8 is a diagram schematically illustrating a face detecting method by a face detecting unit according to the first embodiment of the present invention;

FIG. 10 is a diagram schematically illustrating the masking process for a sample image to be input at the time of the PCA process according to the first embodiment of the present invention;

FIG. 23 is a diagram illustrating an image compositing example in the case that images are composited by the image compositing unit according to the first embodiment of the present invention;

FIG. 31 is a diagram illustrating the transition of a composited image created by the image compositing unit according to the first embodiment of the present invention;

FIG. 32 is a diagram illustrating the transition of a composited image created by the image compositing unit according to the first embodiment of the present invention;

FIG. 33 is another compositing example of a composited image created by the image compositing unit according to the first embodiment of the present invention;

FIG. 43 is a block diagram illustrating a functional configuration example of an image processing apparatus according to a third embodiment of the present invention;

FIGS. 44A and 44B are diagrams schematically illustrating content stored in a reference information storage unit and a metadata storage unit, according to the third embodiment of the present invention;

FIG. 45 is a diagram illustrating an example of a selection screen displayed on a display unit according to the third embodiment of the present invention;

FIG. 46 is a diagram illustrating an example of scores used for calculation of a selection determination score by a compositing target image selecting unit according to the third embodiment of the present invention;

FIG. 49 is a flowchart illustrating the procedure of a frame selecting process by the image processing apparatus according to the third embodiment of the present invention;

FIG. 51 is a diagram schematically illustrating the storage content of a compositing target image metadata storage unit according to a fourth embodiment of the present invention;

FIG. 73 is a diagram schematically illustrating an overview of a computation method arranged to execute a process as to a plurality of data by each corresponding command, and an overview of an SIMD computation that is a computation method arranged to execute a process as to a plurality of data by a single command;

FIG. 75 is a diagram schematically illustrating a data structure and a processing flow in the case that image data stored in main memory according to the fifth embodiment of the present invention is subjected to a filtering process using a Sobel filter;

FIG. 78 is a diagram schematically illustrating a vector computing method arranged to use SIMD computation to execute a vector computation regarding vector data in the case that the filtering process is executed using the Sobel filter according to the fifth embodiment of the present invention;

DESCRIPTION OF THE PREFERRED EMBODIMENTS

Figure 1:
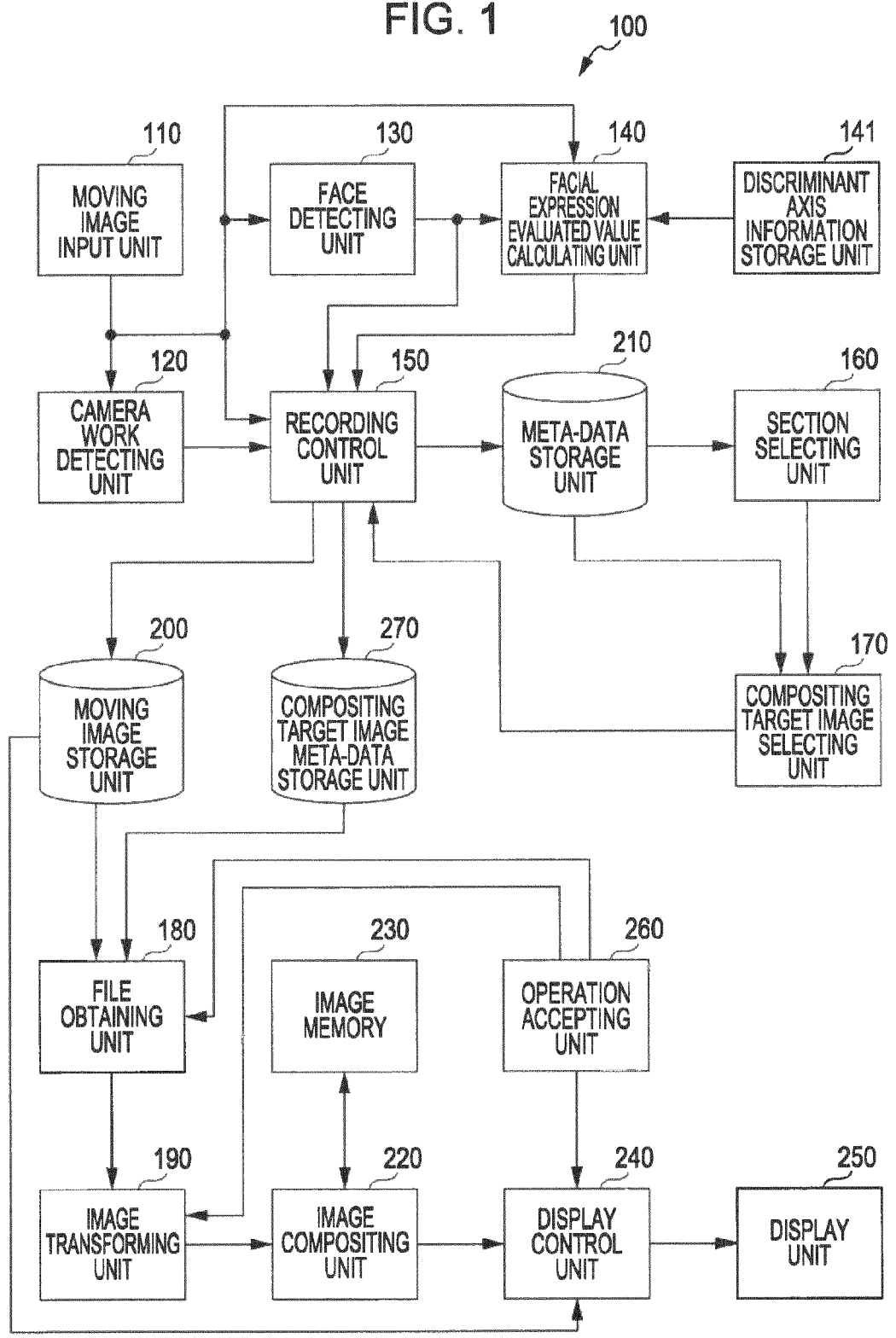
FIG. 1 is a block diagram illustrating a functional configuration example of an image processing apparatus according to a first embodiment of the present invention.

Description will be made below regarding preferred embodiments to carry out the present invention (hereafter, referred to simply as "embodiments") in the following order.
1. First Embodiment (composited image creating control: an example in which compositing target images are selected from a moving picture, and these are used to create a composited image)
2. Second Embodiment (image compositing target section selecting control: a modification wherein an image compositing target section to select compositing target images is selected from a moving picture)
3. Third Embodiment (compositing target image selecting control: a modification wherein compositing target images are selected from an image compositing target section)
4. Fourth Embodiment (decoration image determining control: an example in which a decoration image to be added to a compositing target image is determined)
5. Fifth Embodiment (feature point extracting process and optical flow calculating process: an example executed by a multi-core processor)
1. First Embodiment
Configuration Example of Image Processing Apparatus FIG. 1 is a block diagram illustrating a functional configuration example of an image processing apparatus 100 according to a first embodiment of the present invention. The image processing apparatus 100 includes a moving picture input unit 110, a camera work detecting unit 120, a face detecting unit 130, a facial expression evaluated value calculating unit 140, a discriminant axis information storage unit 141, a recording control unit 150, a section selecting unit 160, and a compositing target image selecting unit 170. Also, the image processing apparatus 100 includes a file obtaining unit 180, an image transforming unit 190, a moving picture storage unit 200, a metadata storage unit 210, an image compositing unit 220, and image memory 230. Also, the image processing apparatus 100 includes a display control unit 240, a display unit 250, an operation accepting unit 260, and a compositing target image metadata storage unit 270. The image processing apparatus 100 can be realized by a personal computer which can subject a moving picture imaged by an imaging apparatus, for example, such as a digital video camera or the like, to video analysis for extracting feature quantity, and to various types of image process using this extracted feature quantity.

The moving picture input unit 110 is a moving picture input unit configured to input a moving picture imaged by an imaging apparatus such as a digital video camera or the like (hereafter, simply referred to as "camera"). The moving picture input unit 110 outputs the input moving picture to the camera work detecting unit 120, face detecting unit 130, facial expression evaluated value calculating unit 140, and recording control unit 150.

The camera work detecting unit 120 analyzes the moving picture output from the moving picture input unit 110 to detect information of motion at the time of imaging (also referred to as "camera work"), and calculates camera work parameters based on the motion information of the camera. Also, when calculating camera work parameters, the camera work detecting unit 120 calculates a reliability determination score that indicates the likelihood of the camera work parameters, and outputs the calculated camera work parameters and the reliability determination score to the recording control unit 150. Specifically, the camera work detecting unit 120 extracts a feature point from each image making up the moving picture, and calculates an optical flow (movement vector) as to this feature point. The camera work detecting unit 120 analyzes the calculated optical flow as to the feature point to select a feature point that exhibits dominant motion, and estimates the motion of the camera based on the optical flow as to the feature point that exhibits dominant motion. Here, "dominant motion" means regular motion that a relatively great number of optical flows exhibit out of multiple optical flows regarding multiple feature points. Also, of feature points within an image, a reliability determination score is calculated based on a rate between the feature point that exhibits dominant motion, and feature points other than that feature point. Note that the internal configuration of the camera work detecting unit 120 will be described in detail with reference to FIG. 2. Note that the camera work detecting unit 120 is an example of the calculating unit referred to in the Summary of the Invention.

The face detecting unit 130 detects the face of a person included in an image making up a moving picture output from the moving picture input unit 110, and outputs face detection information relating to the detected face to the facial expression evaluated value calculating unit 140, and recording control unit 150. Examples of this face detecting method include a face detecting method by matching between a template in which facial luminance distribution information is recorded, and an actual image (e.g., see Japanese Unexamined Patent Application Publication No. 2004-133637), and a face detecting method based on a skin-colored portion, and the feature quantity of the face of a person, included in an image. Also, a face detecting method may be employed wherein, with regard to a face image that is an image including a face, luminance difference between two pixels on the face image is learned, the feature quantity obtained from this learning is stored as face detection reference data beforehand, and face detection is executed using this face detection reference data. The face detection method using this face detection reference data will be described in detail with reference to FIG. 8. Also, the face detection information includes the position and size of the detected face image. Examples of the face position included in the face detection information include the position of a rectangular face detection window surrounding the detected face (e.g., the coordinates of the upper left corner of the face detection window, hereafter, referred to as "face position information"). Also, examples of the size of a face included in the face detection information include the size of the face detection window thereof (e.g., the number of pixels in the horizontal direction and vertical direction of the face detection window). Note that the face detection information may include roll, pitch, and yaw that indicate the orientation of the detected face.

The facial expression evaluated value calculating unit 140 uses the discriminant axis information stored in the discriminant axis information storage unit 141 to calculate a facial expression evaluated value relating to the facial expression of the face detected by the face detecting unit 130, and outputs the calculated facial expression evaluated value to the recording control unit 150. For example, based on the face detection information (the position and size of a face) output from the face detecting unit 130, a face image that is a rectangular region including at least a portion of the face detected by the face detecting unit 130 is extracted from an image making up the moving picture output from the moving picture input unit 110. This extracted face image is normalized, and a facial expression evaluated value regarding the normalized face image is calculated. Based on this calculated facial expression evaluated value, determination can be made whether or not the facial expression of the face to be calculated is a specific facial expression. Note that, with the first embodiment of the present invention, an example will be described wherein a smiling face is determined to be a specific facial expression. Also, the facial expression evaluated value calculation will be described in detail with reference to FIGS. 9 through 12. Also, the facial expression evaluated value calculating unit 140 is an example of the determining unit referred to in the Summary of the Invention.

The discriminant axis information storage unit 141 stores discriminant axis information used for calculation of a facial expression evaluated value by the facial expression evaluated value calculating unit 140, and supplies the stored discriminant axis information to the facial expression evaluated value calculating unit 140. Note that the discriminant axis information will be described in detail with reference to FIG. 9 and so forth.

The recording control unit 150 executes recording control as to the moving picture storage unit 200, metadata storage unit 210, and the compositing target image metadata storage unit 270. That is to say, the recording control unit 150 records the moving picture output from the moving picture input unit 110 in the moving picture storage unit 200 as a moving picture file. Also, the recording control unit 150 records the affine transformation parameter and the reliability determination score output from the camera work detecting unit 120, the face detection information output from the face detecting unit 130, and the facial expression evaluated value output from the facial expression evaluated value calculating unit 140 in the metadata storage unit 210. Such each piece of information is recorded in the metadata storage unit 210 in a manner correlated with a moving picture and a frame (image) as a metadata file. Also, the recording control unit 150 records the compositing target image information (frame selection information) output from the compositing target image selecting unit 170 in the compositing target image metadata storage unit 270 as compositing target image metadata.

The section selecting unit 160 uses the metadata stored in the metadata storage unit 210 to select an image compositing target section that is a section serving as a target for creating a composited image regarding the moving picture stored in the moving picture storage unit 200, and outputs information relating to the selected image compositing target section to the compositing target image selecting unit 170. Note that selection of an image compositing target section will be described in detail with reference to FIGS. 24 through 26.

The compositing target image selecting unit 170 uses the metadata stored in the metadata storage unit 210 to select a frame for creating a composited image from frames included in the image compositing target section output from the section selecting unit 160, and outputs compositing target image information (frame selection information) relating to the selected frame to the recording control unit 150. Specifically, the compositing target image selecting unit 170 first selects a front-most image (front-most frame) to be overlaid and composited on the top side of the composited image, and with the selected front-most image as a reference image, selects another compositing target image in order. Affine transformation parameters used for subjecting the selected compositing target image to affine transformation are calculated at the time of this selection with the front-most image as a reference image. Note that compositing target image selection will be described in detail with reference to FIGS. 27A through 29. Also, the section selecting unit 160 and the compositing target image selecting unit 170 are examples of the selecting unit referred to in the Summary of the Invention. Also, the compositing target image selecting unit 170 is an example of the image selecting unit referred to in the Summary of the Invention.

The moving picture storage unit 200 stores the moving picture output from the moving picture input unit 110 as a moving picture file based on the control of the recording control unit 150. Also, the moving picture storage unit 200 supplies the moving picture file to the file obtaining unit 180 in response to a request from the file obtaining unit 180, and supplies the moving picture file to the display control unit 240 in response to a request from the display control unit 240. Note that the moving picture file to be stored in the moving picture storage unit 200 will be described in detail with reference to FIGS. 3A and 3B.

The metadata storage unit 210 stores each piece of information output from the camera work detecting unit 120, face detecting unit 130, and facial expression evaluated value calculating unit 140 in a manner correlated with a moving picture and frame as a metadata file based on the control of the recording control unit 150. Also, the metadata storage unit 210 supplies the metadata file to the section selecting unit 160 and the compositing target image selecting unit 170. Note that the metadata file to be stored in the metadata storage unit 210 will be described in detail with reference to FIGS. 3A and 3B.

The compositing target image metadata storage unit 270 stores the compositing target image information output from the compositing target image selecting unit 170 as a compositing target image metadata file based on the control of the recording control unit 150. Also, the compositing target image metadata storage unit 270 supplies the compositing target image metadata file to the file obtaining unit 180 in response to a request from the file obtaining unit 180. Note that the metadata file to be stored in the compositing target image metadata storage unit 270 will be described in detail with reference to FIG. 4.

The file obtaining unit 180 obtains each file stored in the moving picture storage unit 200 and the metadata storage unit 210 in response to operation input accepted by the operation accepting unit 260, and supplies the information of the obtained each file to the image transforming unit 190. Specifically, in the case that an instruction operation used for displaying a composited image has been accepted by the operation accepting unit 260, the file obtaining unit 180 obtains the moving picture file from the moving picture storage unit 200. Also, the file obtaining unit 180 obtains the compositing target image metadata file corresponding to this moving picture file from the compositing target image metadata storage unit 270. Subsequently, the file obtaining unit 180 uses the compositing target image metadata file to extract an image to be composited from each image making up the obtained moving picture file, and outputs this extracted image, and the compositing target image metadata corresponding to this image to the image transforming unit 190.

The image transforming unit 190 subjects the image output from the file obtaining unit 180 to affine transformation using the compositing target image metadata corresponding to this image, and outputs the image subjected to affine transformation to the image compositing unit 220. Specifically, the image transforming unit 190 subjects another image to affine transformation in order with the position of a single image (e.g., front-most image) as a reference. Also, in the case that an instruction operation used for displaying a composited image has been accepted by the operation accepting unit 260, the image transforming unit 190 subjects an image to affine transformation in order in accordance with the display order according to the instruction operation thereof. Note that such image transformation will be described in detail with reference to FIGS. 15 through 23, 31, 32, and so forth.

The image compositing unit 220 composites the image subjected to affine transformation by the image transforming unit 190 to create a composited image using the image memory 230, and outputs the created composited image to the display control unit 240 sequentially. Also, when compositing the image subjected to affine transformation by the image transforming unit 190, the image compositing unit 220 composites the image by adding a white frame to the periphery of the image. Such image compositing will be described in detail with reference to FIGS. 31 and 32, and other drawings.

The image memory 230 is a work buffer used at the creating a composited image by the image compositing unit 220, holds history images including the image subjected to affine transformation by the image transforming unit 190, and supplies the held history images to the image compositing unit 220. The image memory 230 is also called a "canvas", equivalent to one image worth of memory, where image data is stored.

The display control unit 240 displays the composited image output from the image compositing unit 220 on the display unit 250 in accordance with the content of the operation input accepted by the operation accepting unit 260. Also, in the case that an instruction operation used for playing a moving picture has been accepted by the operation accepting unit 260, the display control unit 240 obtains the moving picture file according to this instruction operation from the moving picture storage unit 200, and controls the display unit 250 to display an image making up this moving picture file.

The display unit 250 displays each image based on the control of the display control unit 240. The display unit 250 can be realized with, for example, the display of a personal computer, or a television set. Note that a display example of a composited image will be described in detail with reference to FIGS. 31 through 33 and so forth.

The operation accepting unit 260 accepts operation input from a keyboard made up of various types of keys, a mouse (pointing device), or the like, and outputs the content of accepted operation input to the file obtaining unit 180, image transforming unit 190, or display control unit 240.

Figure 2:
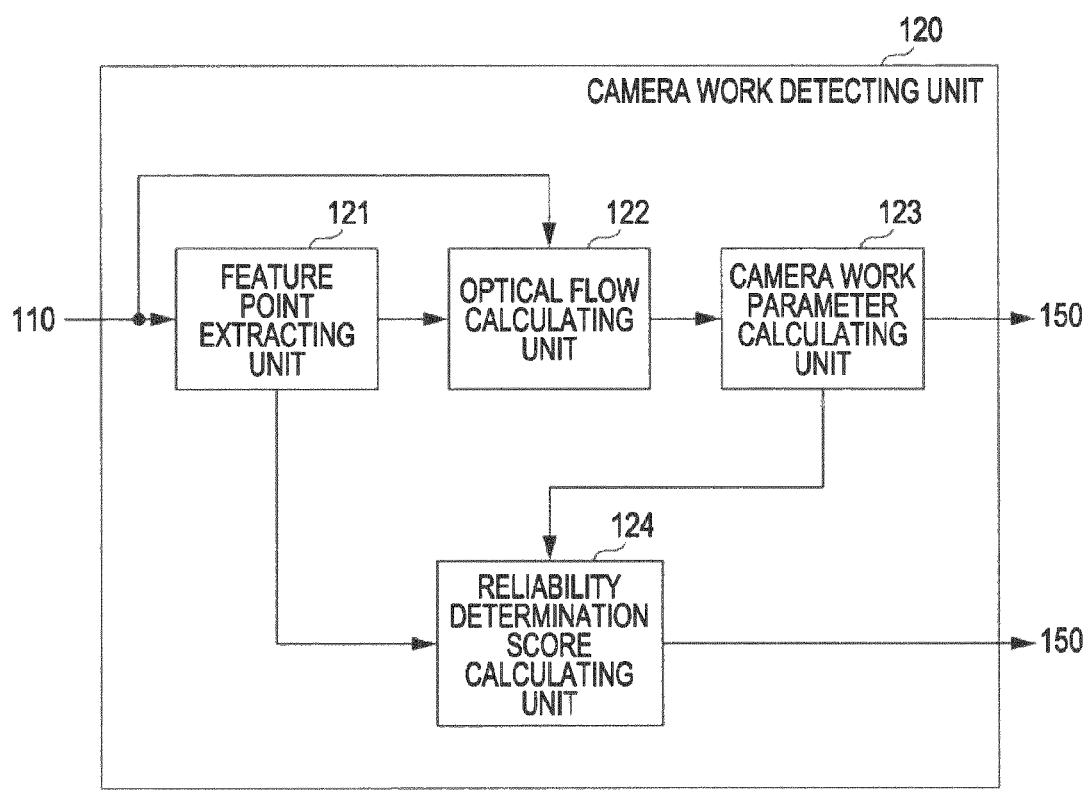
FIG. 2 is a block diagram illustrating a functional configuration example of a camera work detecting unit according to the first embodiment of the present invention.

FIG. 2 is a block diagram illustrating a functional configuration example of the camera work detecting unit 120 according to the first embodiment of the present invention. The camera work detecting unit 120 includes a feature point extracting unit 121, an optical flow calculating unit 122, a camera work parameter calculating unit 123, and a reliability determination score calculating unit 124.

The feature point extracting unit 121 extracts feature points from the whole image corresponding to a frame making up the moving picture output from the moving picture input unit 110, and outputs the extracted feature points to the optical flow calculating unit 122 and the reliability determination score calculating unit 124. Here, the feature point extracting unit 121 extracts feature points from the whole image regarding the top frame of frames making up the moving picture output from the moving picture input unit 110. Also, the feature point extracting unit 121 compares to the image corresponding to the previous frame to extract feature points from a new imaged region portion regarding a frame other than the top frame. Note that, for example, a point can be extracted as a feature point where the gradient of the edge is strong in the vertical direction and in the horizontal direction (in general, referred to as "corner point", hereinafter, referred to as "corner point"). This corner point is a feature point that is strong against optical flow calculation, and can be obtained with edge detection. Note that extraction of a corner point will be described in detail with reference to FIGS. 5A through 6C. Note that, with this example, the feature point extracting unit 121 extracts feature points from the whole image regarding the top frame, and compares to the image corresponding to the previous frame to extract feature points from a new imaged region portion regarding a frame other than the top frame. However, feature points may also be extracted from the whole image regarding each frame other than the top frame in accordance with processing capability.

The optical flow calculating unit 122 calculates an optical flow as to each feature point output from the feature point extracting unit 121, and outputs the calculated optical flow to the camera work parameter calculating unit 123. Specifically, the optical flow calculating unit 122 compares each image corresponding to consecutive two frames (the current frame and the immediately previous frame) making up the moving picture output from the moving picture input unit 110, thereby calculating the optical flow of the current frame. That is to say, the optical flow calculating unit 122 calculates an optical flow as to the image corresponding to the current frame regarding each feature point of the image corresponding to the immediately previous frame. This optical flow is calculated for each frame making up the moving picture. Note that a detection method such as a gradient method, block matching method, or the like may be employed as a detection method used for detecting an optical flow. Note that this optical flow computation will be described in detail with reference to FIGS. 5A through 6C. Also, the optical flow calculating unit 122 is an example of the motion amount calculating unit referred to in the Summary of the Invention.

The camera work parameter calculating unit 123 executes a camera work parameter calculating process wherein the optical flow corresponding to each feature point output from the optical flow calculating unit 122 is used to calculate camera work parameters. Subsequently, the camera work parameter calculating unit 123 outputs the calculated camera work parameters to the recording control unit 150, and outputs information relating to the feature point used for calculation of the camera work parameters to the reliability determination score calculating unit 124. The camera work parameters are transformation information (the motion information of the camera) relating to the consecutive two frames (the current frame and the immediately previous frame).

Now, with the first embodiment of the present invention, each compositing target image selected regarding the moving picture to be played is transformed and composited in accordance with the motion of the camera. In order to execute this image transformation, the motion of the camera is extracted using the optical flow calculated by the optical flow calculating unit 122, and camera work parameters (transformation parameters) are calculated based on the extracted motion.

Also, with the first embodiment of the present invention, description will be made regarding an example using affine transformation as an image transforming method used for transforming a compositing target image. Also, description will be made regarding an example using affine transformation parameters calculated based on an optical flow as camera work parameters. Note that another image transforming method may be employed using projective-transformation parameters or the like as camera work parameters. Note that an affine transformation parameter may be obtained by a computation using a vector between three points. Also, projective-transformation parameters may be obtained by a computation using a vector between four points. Now, camera work parameters are transformation information to transform another imaged image with at least one imaged image of imaged images making up an imaged moving picture as a reference, and include at least position information and attitude information described in the coordinates system of the camera. That is to say, camera work parameters include information relating to the position and attitude of the camera in the case of being imaged by a user. Also, the motion of the camera according to the operation by a user, for example, such as zoom in, zoom out, pan, tilt, rotation, or the like can be estimated based on the affine transformation parameters calculated by the camera work parameter calculating unit 123. Note that calculation of affine transformation parameters will be described in detail with reference to FIGS. 5A through 6C. That is to say, with the first embodiment, in the case that a single image of consecutive images is taken as a reference image, definition is made as affine transformation parameters corresponding to an affine matrix that indicates where the next image of this reference image moves. Note that the camera work parameter calculating unit 123 is an example of the motion information calculating unit referred to in the Summary of the Invention.

The reliability determination score calculating unit 124 calculates a reliability determination score based on information relating to the feature point output from the feature point extracting unit 121, and the feature point output from the camera work parameter calculating unit 123, and outputs the calculated reliability determination score to the recording control unit 150. This reliability determination score is calculated based on a rate between the number of feature points in the whole screen of an image to be subjected to calculation of affine transformation parameters, and the number of feature points that exhibit dominant motion in the whole screen. Calculation of this reliability determination score will be described in detail with reference to FIGS. 5A through 6C.

Figure 3A:
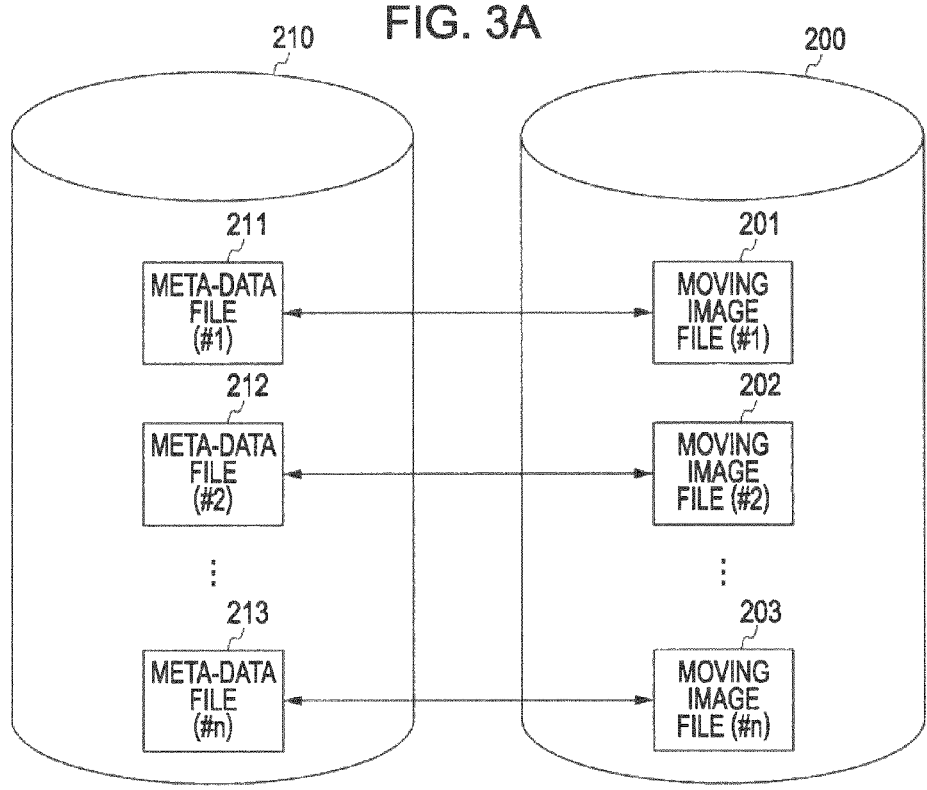
FIGS. 3A and 3B are diagrams schematically illustrating files stored in a moving picture storage unit and a metadata storage unit, according to the first embodiment of the present invention.
Figure 3B:
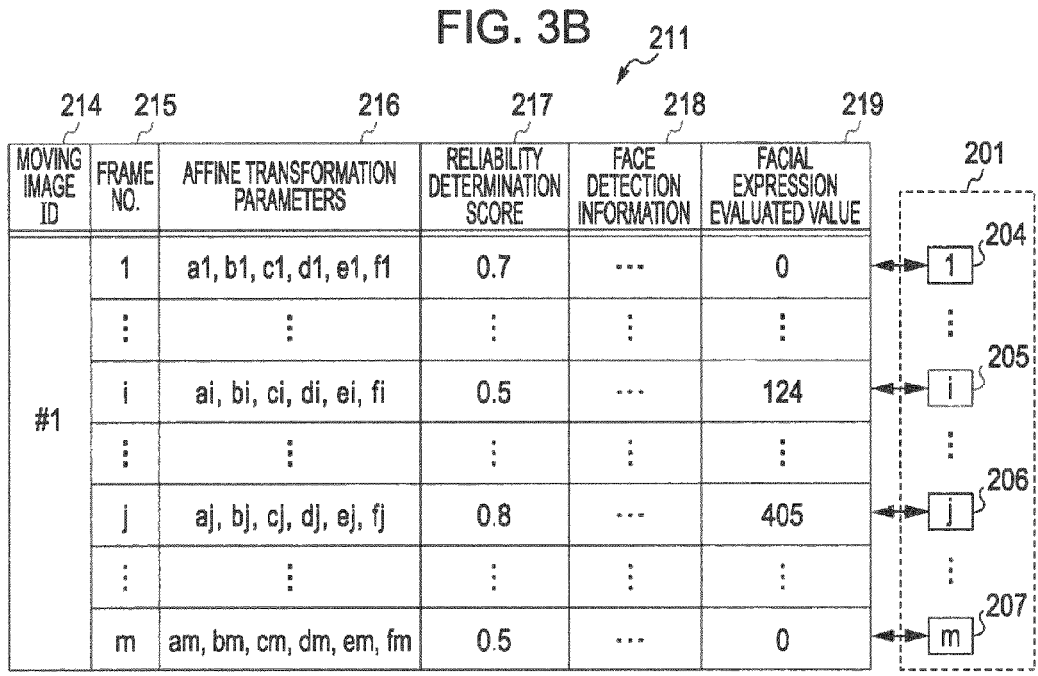

FIGS. 3A and 3B are diagrams schematically illustrating files stored in the moving picture storage unit 200 and the metadata storage unit 210, according to the first embodiment of the present invention. FIG. 3A illustrates moving picture files 201 through 203 stored in the moving picture storage unit 200, metadata files 211 through 213 stored in the metadata storage unit 210 in a manner correlated with the moving picture files 201 through 203. Now, let us say that a moving picture ID that is identification information used for identifying each moving picture file stored in the moving picture storage unit 200 is appended to each moving picture file. For example, "#1" is appended to the moving picture file 201, "#2" is appended to the moving picture file 202, and "#n" is appended to the moving picture file 203.

FIG. 3B schematically illustrates the moving picture file 201 stored in the moving picture storage unit 200, the metadata file 211 stored in the metadata storage unit 210 in a manner correlated with the moving picture file 201. Now, the moving picture file 201 is a moving picture file made up of m frames, and these m frames are shown as frames "1" 204 through "m" 207. Also, with the metadata file 211, a moving picture ID 214, a frame number 215, affine transformation parameters 216, a reliability determination score 217, face detection information 218, and a facial expression evaluated value 219 are stored in a correlated manner.

The moving picture ID 214 is a moving picture ID appended to the corresponding moving picture file, and for example, stores "#1" appended to the moving picture file 201.

The frame number 215 is a serial number of each frame making up the corresponding moving picture file, and for example, stores "1" through "m" corresponding to the frames "1" 204 through "m" 207 making up the moving picture of the moving picture file 201.

The affine transformation parameters 216 are affine transformation parameters calculated regarding each frame of the moving picture corresponding to the frame number 215. Note that the affine transformation parameters 216 "a1, b1, c1, d1, e1, f1" corresponding to the "1" of the frame number 215 are the affine transformation parameters of a unit matrix. Also, for example, the affine transformation parameters 216 of "ai, bi, ci, di, ei, fi" corresponding to the "i(i is an integer of 2 or more)" of the frame number 215 are the affine transformation parameters of the frame "i" as to the immediately previous frame "i−1".

The reliability determination score 217 is a reliability determination score calculated regarding each frame of the moving picture corresponding to the frame number 215, and for example, stores a value of 0 through 1.

The face detection information 218 is face detection information detected regarding each frame of the moving picture corresponding to the frame number 215, and stores the face detection information output from the face detecting unit 130. Note that FIG. 3B illustrates the face detection information of which the specific content is omitted. In the case that multiple faces have been detected from one frame, such a plurality of face detection information is stored in a manner correlated with the frame thereof.

The facial expression evaluated value 219 is a facial expression evaluated value calculated regarding a face included in each frame of the moving picture corresponding to the frame number 215, and stores the facial expression evaluated value output from the facial expression evaluated value calculating unit 140. Note that, in the case that no face is included in the corresponding frame, the facial expression evaluated value 219 stores "0". For example, in the case that no face has been detected from the frames corresponding to the "1" and "m" of the frame number 215, no facial expression evaluated value is calculated by the facial expression evaluated value calculating unit 140, and accordingly, the facial expression evaluated value 219 stores "0". On the other hand, in the case that no face has been detected from the frames corresponding to the "i" and "j" of the frame number 215, the facial expression evaluated value 219 stores the facial expression evaluated value calculated by the facial expression evaluated value calculating unit 140. For example, the facial expression evaluated value 219 corresponding to the "i" of the frame number 215 stores "124", and the facial expression evaluated value 219 corresponding to the "j" of the frame number 215 stores "405". In this case, for example, determination can be made that there is a high possibility that the face detected regarding the frame "j" resembles a smiling face more than the face detected regarding the frame "i". Note that the i and j are integers that satisfy $1<i<j<m$. Also, in the case that multiple faces have been detected from one frame, the facial expression evaluated values calculated regarding these multiple faces are stored in a manner correlated with the frame thereof.

FIG. 4 is a diagram schematically illustrating the storage content of the compositing target image metadata storage unit 270 according to the first embodiment of the present invention. A moving picture ID 271, a section number 272, a frame number 273, affine transformation parameters 274, a frontmost frame 275, and face data 276 are stored in the compositing target image metadata storage unit 270 in a correlated manner.

The moving picture ID 271 is a moving picture ID appended to the corresponding moving picture file, and for example, stores "#1", "#2", and so forth appended to each moving picture file stored in the moving picture storage unit 200.

The section number 272 is a serial number used for identifying an image compositing target section selected by the section selecting unit 160, and for example, stores "#101", "#102", "#103", and so forth in the selected order regarding the moving picture file 201. For example, in the case that a composited image is created regarding the moving picture file 201, a composited image is created for each section of the section number 272 (e.g., "#101", "#102", "#103").

The frame number 273 is the frame number of the frame selected by the compositing target image selecting unit 170 with the image compositing target section selected by the section selecting unit 160. This frame number corresponds to the frame number 215 shown in FIG. 3B. For example, with the "#101" of the section number 272, in the case that frames "1", "6", "9", and "17" have been selected by the compositing target image selecting unit 170, the frame numbers "1", "6", "9", and "17" of these frames are stored.

The affine transformation parameters 274 are affine transformation parameters used for subjecting each frame selected by the compositing target image selecting unit 170 to affine transformation. Here, affine transformation parameters to be stored in the affine transformation parameters 274 are affine transformation parameters used for subjecting another frame to affine transformation with one frame within the same image compositing target section as a reference frame. This reference frame may be set to, for example, the front-most frame. Also, affine transformation parameters to be stored in the affine transformation parameters 274 in a manner correlated with this reference frame are the affine transformation parameters of a unit matrix.

The front-most frame 275 is information that indicates the front-most frame selected by the compositing target image selecting unit 170. For example, in the case that the corresponding frame has been selected as the front-most frame, the front-most frame 275 stores "1", and in the case that the corresponding frame has not been selected as the front-most frame, the front-most frame 275 stores "0". For example, of each frame of section number 272 "#101" of the moving picture ID 271 "#1", in the case that the frame "9" has been selected as the front-most frame, the front-most frame 275 of the frame "9" stores "1". In this case, of each frame of the section number 272 "#101", with regard to a frame other than the frame "9", the front-most frame 275 stores "0".

The face data 276 is information relating to a face included in each frame selected by the compositing target image selecting unit 170. As this information, of face detection information included in the face detection information 218, for example, the position information and size information of a face are stored. With the example shown in FIG. 4, the position information of a face is shown with (xn, yn), and the size information of the face is shown with (Hn, Wn). Here, n is a numeric value corresponding to the frame number 273. Note that in the case that multiple faces have been detected from one frame, such a plurality of face data is stored in a manner correlated with the frame thereof.

Calculation Examples of Camera Work Parameters and Reliability Determination Scores Next, description will be made in detail regarding a calculating method used for calculating camera work parameters (affine transformation parameters) and reliability determination scores to be used for image transformation, with reference to the drawings.

Figure 5A:
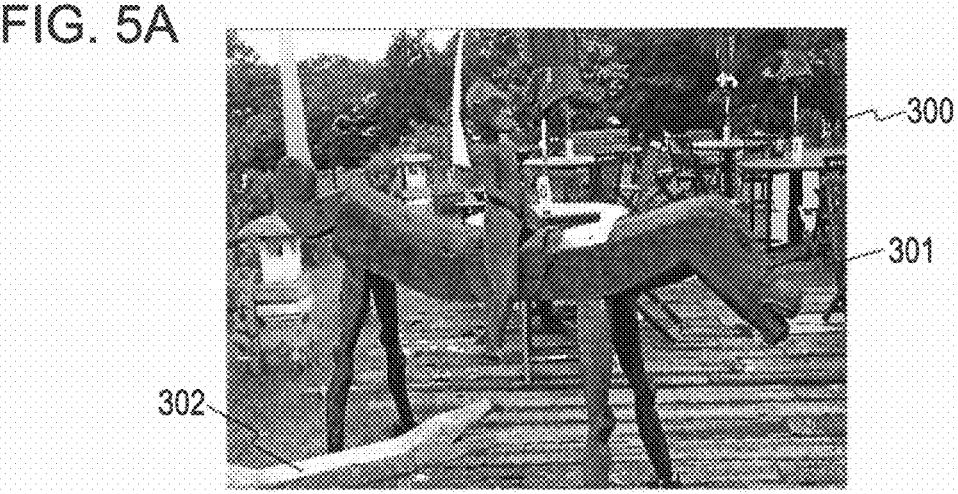
FIGS. 5A through 5C are diagrams illustrating an example of an image making up a moving picture.
Figure 5B:
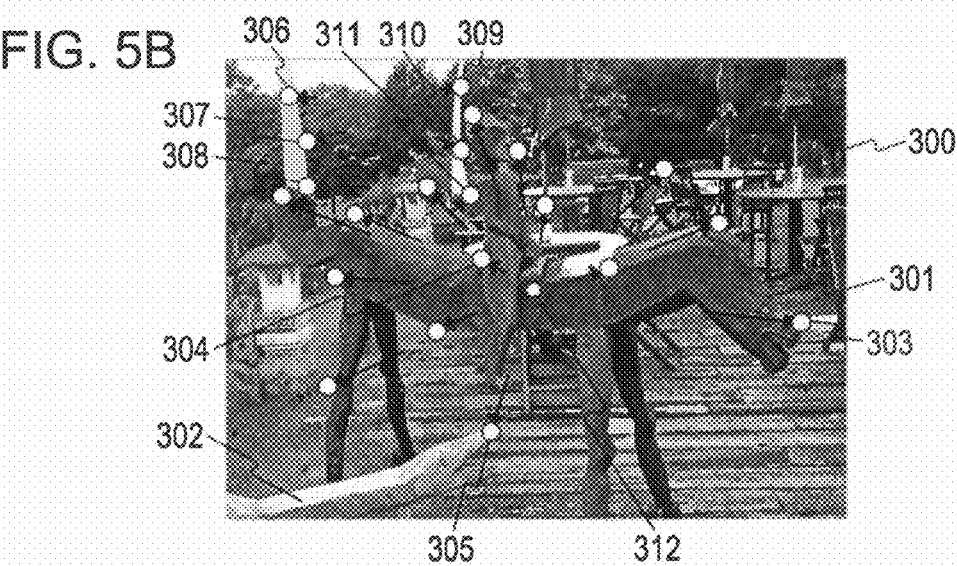
Figure 5C:
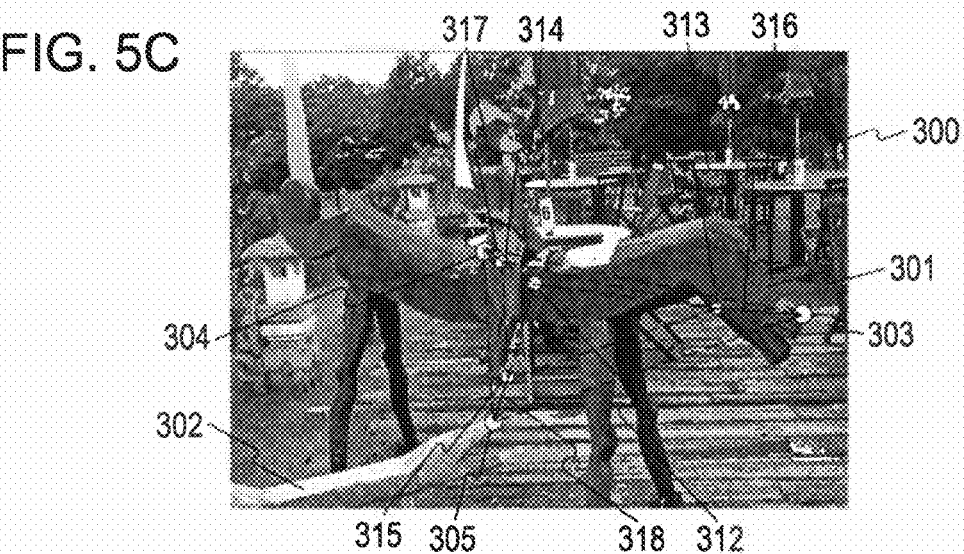
Figure 6A:
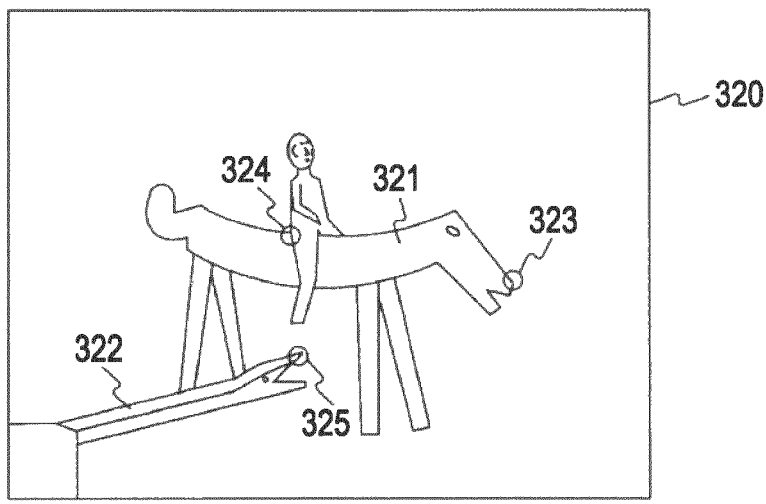
FIGS. 6A through 6C are diagrams illustrating an image simplified by omitting the background or the like is omitted regarding an image making up a moving picture.
Figure 6B:
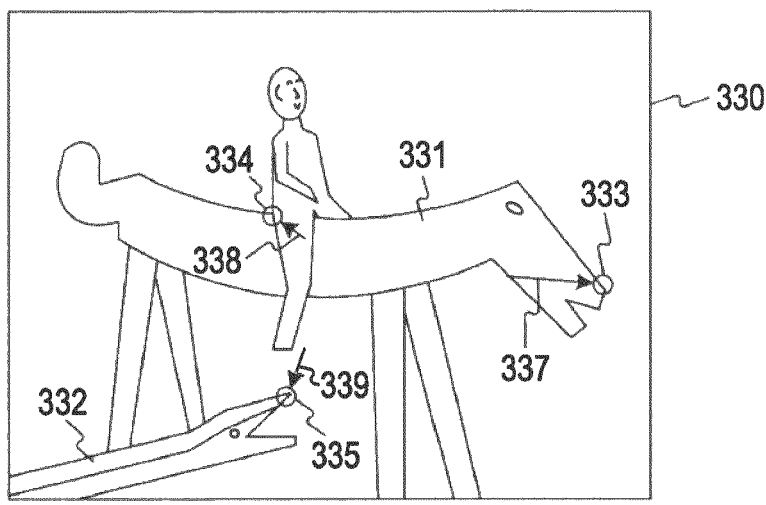
Figure 6C:
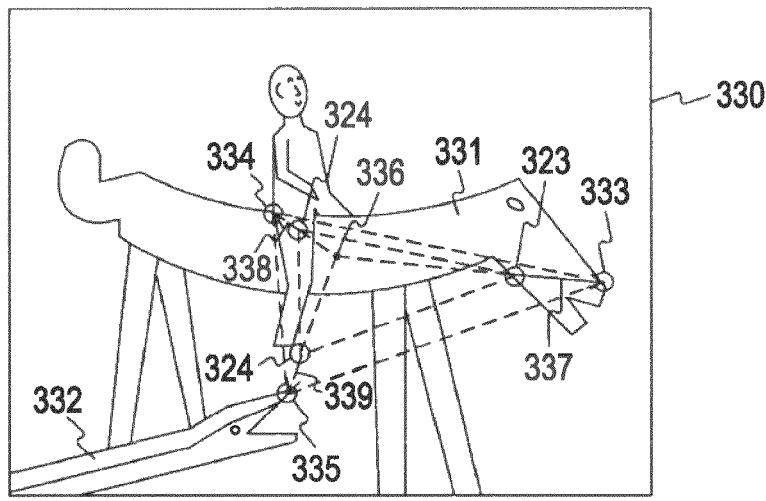

FIGS. 5A through 5C are diagrams illustrating an example of an image making up a moving picture. FIGS. 6A through 6C are diagrams illustrating an image simplified by omitting the background or the like regarding an image making up a moving picture. FIGS. 5A through 5C illustrate an image 300 as an example of an image making up a moving picture. Also, FIG. 6A illustrates an image 320 simplified by omitting the background or the like regarding the image corresponding to the immediately previous frame of the image 300. Also, FIGS. 6B and 6C illustrate an image 330 simplified by omitting the background or the like regarding the image 300.

The images 300, 320, and 330 shown in FIG. 5A through 6C include images 301, 321, and 331 of a horse on which a person is straddling, and images 302, 322, and 332 of a snake disposed in front of the horse images 301, 321, and 331. Also, as shown in FIGS. 5A through 5C, there are provided a flag, a chair, and so forth on the background of these images, and this flag is fluttering in the wind.

The image 320 shown in FIG. 6A is an image simplified regarding the image corresponding to the immediately previous frame of the frame corresponding to the images 300 and 330 shown in FIGS. 5A through 5C, 6B, and 6C. Also, the images 320 and 330 corresponding to two consecutive frames are images that indicate transition in the case that the size of a subject within the screen increases gradually. That is to say, at the time of this imaging a zoom-in operation is performed wherein an operation used for increasing the size of a subject within the screen is increased gradually.

With the first embodiment of the present invention, description will be made regarding a method as an example wherein a feature point is detected from an image making up a moving picture, and affine transformation parameters are calculated using the optical flow corresponding to this feature point. Also, with this example, description will be made regarding a case where a corner point is used as a feature point.

Now, with FIGS. 6A through 6C, description will be made regarding a method as an example wherein affine transformation parameters are calculated using the optical flows corresponding to three corner points detected from the images 320 and 330.

For example, with the image 320 shown in FIG. 6A, let us say that a corner point 323 around the mouth of the horse image 321, a corner point 324 around the person's hip of the horse image 321, and a corner point 325 around the mouth of the snake image 322 have been detected as feature points. In this case, with the image 330 shown in FIG. 6B, according to the gradient method, block matching method, or the like, optical flows 337, 338, and 339 as to the corner points 323, 324, and 325 of the image 320 are detected. Subsequently, based on the detected optical flows 337, 338, and 339, corner points 333, 334, and 335 corresponding to the corner points 323, 324, and 325 of the image 320 are detected.

Now, for example, the horse images 321 and 331 and snake images 322 and 332 include in the images 320 and 330 shown in FIGS. 6A and 6B are installed on the ground, and accordingly, do not move regardless of the motion of the camera. Therefore, the motion of the camera can be estimated accurately based on the optical flows obtained as to the corner points detected regarding the horse images 321 and 331, and the snake images 322 and 332. For example, as shown in FIG. 6C, based on the three optical flows 337 through 339 detected in the image 330, it can be estimated that the image 330 is an image enlarged from the image 320 with the point 336 as the center. Thus, determination can be made that the motion of the camera at the time of imaging the image 330 is a zoom-in operation with the point 336 as the center. Thus, a corner point is detected regarding an object that does not move regardless of the motion of the camera, and based on an optical flow obtained as to this corner point, the motion of the camera having a particular regularity can be detected accurately. Therefore, affine transformation parameters can be obtained by calculation using the optical flows obtained as to these corner points.

However, a case can be conceived wherein an object that moves regardless of the motion of the camera is included in an image, such as a flag fluttering in the wind or the like. For example, the image 300 shown in FIGS. 5A through 5C includes a flag fluttering in the wind. In the case that a corner point is detected regarding an object that moves regardless of the motion of the camera, and the motion of the camera is estimated using the optical flow obtained as to this corner point, it is difficult to estimate the motion of the camera accurately.

For example, the optical flows detected in the image 300 shown in FIG. 5B are indicated with an arrow, and the corner points detected by the optical flows are indicated with a white circle of the tip of an arrow. Here, corner points 303 through 305 are corner points corresponding to the corner points 333 through 335 shown in FIGS. 6B and 6C. Also, corner points 306 through 311 are corner points detected regarding the flags disposed on the background of the horse image 301. These flags are fluttering in the wind, and accordingly, the motion of each of the flags due to influence of the wind has been detected as an optical flow. That is to say, optical flows corresponding to the corner points 306 through 311 are optical flows detected regarding the flags that move regardless of the motion of the camera. Therefore, in the case that the three optical flows used in the case of calculating affine transformation parameters include an optical flow corresponding to at least one corner point of the corner points 306 through 311, it is difficult to detect the motion of the camera accurately. In this case, it is difficult to calculate accurate affine transformation parameters.

As shown above, for example, an optical flow as to an object that moves regardless of the motion of the camera (optical flows corresponding to the corner points 306 through 311 shown in FIG. 5B) is detected from an imaged image in some cases. Also, an optical flow having a particular regularity in relationship with the motion of the camera (an optical flow other than the optical flows corresponding to the corner points 306 through 311 shown in FIG. 5B) is detected from an imaged image in some cases.

Therefore, with the first embodiment of the present invention, an affine transformation parameter calculating process is executed multiple times wherein affine transformation parameters are calculated based on the three optical flows, thereby obtaining multiple affine transformation parameters. Description will be made regarding an example wherein the optimal affine transformation parameters are selected from these multiple affine transformation parameters. Note that, with this example, we will say that the size of a moving object included in each image making up a moving picture is relatively small as to the area of the image.

Now, description will be made regarding affine transformation. In the case that the position of a moving source is set to (x, y), and the position of a moving destination after affine transformation is set to (x', y') on the two-dimensional coordinates, the matrix expression of affine transformation can be represented with Expression 1. Note that the matrix of 3×3 of the right side of Expression 1 is an affine matrix.

$$(x' \quad y' \quad 1) = (x \quad y \quad 1)\begin{pmatrix} a & d & 0 \\ b & e & 0 \\ c & f & 1 \end{pmatrix} \quad \text{Expression 1}$$

Here, a through f are affine transformation parameters. Also, the affine transformation parameters can be represented with the following expression with the affine transformation parameters as a matrix AM. Note that a zoom component XZ in the X direction, a zoom component YZ in the Y direction, a translational component XT in the X direction, a translational component YT in the Y direction, a rotational component θx in the X direction, and a rotational component θy in the Y direction can be obtained, respectively. Note that, in the case of a unit matrix, a=e=1, and b=c=d=f=0 hold.

$$AM = \begin{pmatrix} a & b & c \\ d & e & f \end{pmatrix}$$

$$XZ = \sqrt{a^2 + d^2}$$

-continued $$YZ = \sqrt{b^2 + e^2}$$

$$XT = c$$

$$YT = f$$

$$\theta_x = \tan^{-1}\left(\frac{d}{a}\right)$$

$$\theta_y = \tan^{-1}\left(\frac{b}{e}\right)$$

Thus, each component of camera work (zoom components in the X and Y directions, translational components, rotational components) can be obtained from the affine transformation parameters. Note that the rotational components will be described with reference to FIG. 7.

Figure 7:
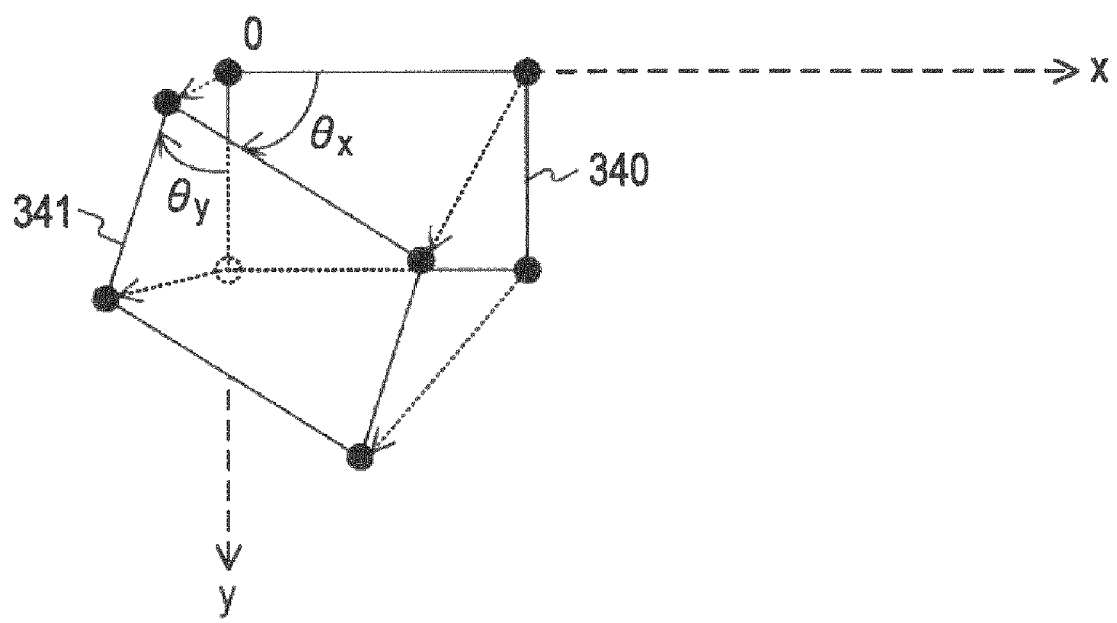
FIG. 7 is a diagram illustrating a case where a rectangle is transformed using affine transformation parameters.

FIG. 7 is a diagram illustrating a case where a rectangle 340 is transformed using affine transformation parameters. As shown in FIG. 7, let us say that one peak of the rectangle 340 is the origin, and with the x-y coordinates wherein the two sides of the rectangle 340 adjacent to the peak corresponding to the origin are taken as the x axis and the y axis, a rectangle after the rectangle 340 is transformed using predetermined affine transformation parameters is taken as a rectangle 341. In this case, let us say that an angle formed by the sides on the x axis side of the rectangles 340 and 341 is a rotational component θx, and an angle formed by the sides on the y axis side of the rectangles 340 and 341 is a rotational component θy.

Next, a method for calculating the addition value of camera work components will be described. The addition value of camera work components is a value obtained by adding each component of the camera work corresponding to each frame from the top frame of the image compositing target section serving as a calculation target to the current frame serving as a calculation target. For example, let us say that the frames from the top frame to the current frame are taken as frames 1 through 5, and the translational components in the X direction of the camera work components of the frames 1 through 5 are taken as XT1 through XT5. In this case, the addition value of the translational components in the X direction of the camera work components can be calculated by "XT1+XT2+XT3+XT4+XT5". Also, the addition value of each component of another camera work can be calculated in the same way.

Next, a method for calculating affine transformation parameters will be described. First, with the image corresponding to the current frame that is one frame of frames making up a moving picture, three feature points are selected from feature points of which the optical flows have been detected. For example, three corner points are selected from the corner points detected in the image 300 (indicated with a white circle) shown in FIG. 5B at random. Note that, in the case that projective-transformation parameters are used as camera work parameters, four feature points are selected at random.

Subsequently, affine transformation parameters are calculated using the three optical flows corresponding to the selected three feature points. For example, affine transformation parameters are calculated using the optical flows (indicated with an arrow connected to a white circle) corresponding to the three corner points selected from the corner points (indicated with a white circle) in the image 300 shown in FIG. 5B. The affine transformation parameters can be obtained using Expression 1.

Subsequently, based on the obtained affine transformation parameters, the scores of the affine transformation parameters are calculated. Specifically, the positions of the movement destinations of all the feature points in the image corresponding to the immediately previous frame of the current frame are obtained using the obtained affine transformation parameters. Subsequently, the position of the feature point obtained using the affine transformation parameters, and the position of the feature point detected at the current frame are compared, and the difference value of the positions of the two feature points corresponding to each other is calculated for each feature point. For example, absolute difference between the positions of the two feature points corresponding to each other is calculated as a difference value. Subsequently, the calculated difference value, and a predetermined threshold are compared for each feature point, and the number of feature points of which the difference value is smaller than the threshold is obtained as the scores of the affine transformation parameters. Thus, three feature points are selected at random from the feature points of which the optical flows have been detected. Subsequently, a process is repeated a predetermined number of times wherein the scores of the affine transformation parameters are calculated based on the optical flows corresponding to these feature points, thereby calculating the multiple scores of the affine transformation parameters. This predetermined number of times may be set as appropriate according to the types of image to be compared, the processing capability of the image processing apparatus 100, or the like, or a fixed value may be used. For example, twenty times or so may be set as this predetermined number of times, taking the processing capability of the image processing apparatus 100 into consideration.

For example, let us consider a case where three corner points other than the corner points 306 through 311 have been selected from the corner points detected from the image 300 shown in FIG. 5B. In the case that affine transformation parameters are calculated using the three optical flows corresponding to the selected three corner points, as described above, these three optical flows have a particular regularity. Therefore, affine transformation parameters used for transforming the image corresponding to the immediately previous frame in accordance with a certain rule are obtained. Also, a relatively small value is calculated as the difference value between the position of the corner point obtained using the affine transformation parameters, and the position of the corner point detected at the current frame, obtained regarding a corner point other than the corner points 306 through 311. Therefore, the scores of the affine transformation parameters become great in value.

On the other hand, let us consider a case where three corner points including at least one of the corner points 306 through 311 have been selected from the corner points detected from the image 300 shown in FIG. 5B. In the case that affine transformation parameters are calculated using the three optical flows corresponding to the three corner points thus selected, as described above, these three optical flows include an optical flow having no particular regularity. Therefore, affine transformation parameters not used for transforming the image corresponding to the immediately previous frame in accordance with a certain rule are obtained. Also, a relatively great value is calculated at an arbitrary corner point as the difference value obtained regarding the position of the corner point obtained using the affine transformation parameters, and the position of the corner point detected at the current frame. Therefore, the scores of the affine transformation parameters become small in value.

Subsequently, of the obtained scores of the multiple affine transformation parameters, the affine transformation parameter having the highest score value is selected as a representative affine transformation parameter. Subsequently, the selected representative affine transformation parameter is used to calculate affine transformation parameters used for subjecting the current frame to affine transformation with the immediately previous frame as a reference frame, and the affine transformation parameters are recorded in the metadata storage unit 210 in a manner correlated with the current frame. Thus, in the case that an image making up a moving picture is subjected to affine transformation, the image can be subjected to affine transformation using the optimal affine transformation parameters.

Also, with the first embodiment of the present invention, a reliability determination score is calculated using the score of the representative affine transformation parameter thus selected. For example, in the case that the number of feature points detected at the whole screen of an image serving as a representative affine transformation parameter calculation target is taken as N, and the score of the representative affine transformation parameter is taken as Nm1, a reliability determination score SHS can be calculated with the following expression.

$$SHS = Nm1/N$$

Here, the score of the representative affine transformation parameter Nm1 is the number of feature points that exhibit dominant motion at the whole screen of an image to be detected. Also, the number of feature points N becomes a total value of the number of feature points Nm1 that exhibit dominant motion, and the number of other feature points (feature points that exhibit noise-like motion) Nm2 (i.e., N=Nm1+Nm2). Also, the value of 0 through 1 is calculated as the reliability determination score SHS.

The reliability determination score thus calculated is recorded in the metadata storage unit 210 in a manner correlated with the current frame. An image compositing target section is selected from a moving picture using this reliability determination score.

As shown above, even in the case that an object (moving object) that is moving, such as a person or car or the like, is included in each image making up a moving picture, in the case that the size of the moving object thereof is relatively small as to the area of the image, the motion of the camera can be extracted without influence of the moving object.

Also, the motion of the camera is extracted, whereby motion regarded as a user intentionally moving, such as zoom-in, zoom-out, pan, tilt, rotation, or the like can be estimated. Note that, with Expression 1, affine transformation parameters can be calculated based on two optical flows with a=e, and d=−b. For example, in the case that an image is subjected to affine transformation using affine transformation parameters calculated based on three optical flows, a rectangular image is transformed into a parallelogram in some cases. On the other hand, in the case that an image is subjected to affine transformation using affine transformation parameters calculated based on two optical flows, at least one transformation of translation movement, rotation, and zoom (the zoom ratios in the x and y directions are the same) can be executed in a rectangular image state. With the first embodiment of the present invention, description will be made regarding an example wherein an image is transformed using affine transformation parameters calculated based on three optical flows. However, the first embodiment of the present invention can be applied similarly to a case where an image is transformed using affine transformation parameters calculated based on two optical flows.

Calculation Example of Facial Expression Evaluated Values

Next, a facial expression evaluated value calculating method will be described in detail with reference to the drawings, wherein a facial expression evaluated value relating to a face detected from an image is calculated.

FIG. 8 is a diagram schematically illustrating a face detecting method by the face detecting unit 130 according to the first embodiment of the present invention. In FIG. 8, (a) and (b) illustrate an image 450 making up a moving picture output from the moving picture input unit 110. Also, let us say that the face 452 of a person 451 is included in the image 450. Thus, in the case that the face 452 is included in the image 450, the face 452 is detected from the image 450 by the face detecting unit 130. Note that, in FIG. 8, description will be made as an example regarding a case where face detection is executed using the face detection reference data.

For example, as shown in (a) in FIG. 8, a face detection window 453 having a certain size is disposed at the left upper corner of the image 450, and an estimate used for determining whether or not a face is included in the image within the face detection window 453 is calculated based on the face detection reference data. Subsequently, the face detection window is shifted in the right-sided direction (direction indicated with an arrow 454) by one pixel, and similarly, an estimate is calculated. Hereinafter, in the same way, the face detection window is shifted sequentially in the right-sided direction by one pixel at a time, thereby calculating an estimate sequentially. Subsequently, upon the face detection window being shifted to the position of the right edge of the image 450, and an estimate being calculated, the face detection window is shifted to one-pixel lower side, and is moved to the left edge of the image 450. Subsequently, after an estimate immediately after movement to the left edge of the image 450 is calculated, the face detection window is shifted sequentially in the right-sided direction by one pixel at a time, thereby calculating an estimate sequentially. Hereinafter, in the same way, an estimate is calculated sequentially. Upon the face detection window being shifted to the right edge and lower edge positions of the image 450, and an estimate being calculated, the face detection window is reduced by a predetermined scale factor, and the same process is executed sequentially. Thus, the face detection window having a certain size is used to execute calculation of an estimate sequentially regarding the image 450 to be reduced sequentially. Subsequently, a face is detected based on calculated each estimate, and a face region that is a rectangular region including at least a portion of this face is obtained. For example, as shown in (b) in FIG. 8, the face 452 of the person 451 included in the image 450 is detected, and a face region 455 including the face 452 is obtained. Also, face detection information relating to the detected face (the position, size, and so forth of the face) is obtained. For example, as shown in (c) in FIG. 8, let us set an x-y coordinates wherein the left upper corner of the image 450 is taken as the origin, the horizontal direction is taken as the x axis, and the vertical direction is taken as the y axis. With the x-y coordinates, the coordinates (x, y) of a peak 456 with the left upper corner of the face region 455 as the origin is calculated as the position of the face. Similarly, with the x-y coordinates, length W in the horizontal direction of the face region 455, and length H in the vertical direction of the face region 455 are calculated as the size of the face. The face detecting unit 130 outputs such face detection information to the facial expression evaluated value calculating unit 140 and the recording control unit 150.

Subsequently, the facial expression evaluated value calculating unit 140 extracts the image (image data) of the face region 455 from the image 450 based on the face detection information output from the face detecting unit 130. That is to say, the facial expression evaluated value calculating unit 140 accesses the memory (RAM) in which the image data serving as a face detection target is temporally stored, and reads out only the image data within the face region corresponding to the face detection information output from the face detecting unit 130.

Subsequently, the facial expression evaluated value calculating unit 140 transforms the extracted image into an image of a certain size, and normalizes this to generate a normalized face image. That is to say, the extracted image is subjected to resolution conversion as an image of a certain size (certain resolution), thereby generating a normalized face image. Let us say that the image size after normalization is a size serving as a processing unit when the facial expression evaluated value calculating unit 140 calculates a facial expression evaluated value relating to a face. With the first embodiment of the present invention, for example, let us say that a certain size for normalization is a size of 48 pixels×48 pixels.

Subsequently, the facial expression evaluated value calculating unit 140 calculates a facial expression evaluated value that indicates the degree of facial expression included in a normalized face image based on the normalized face image, and the discriminant axis information stored in the discriminant axis information storage unit 141. This calculated facial expression evaluated value is output to the recording control unit 150. This facial expression evaluated value is a value that indicates a degree whether or not the facial expression to be determined is similar to which of two different facial expressions. With the first embodiment of the present invention, description will be made regarding an example wherein the two different facial expressions are "smiling face" and "normal facial expression", and evaluation is made that a degree that the facial expression to be determined is "smiling face" is strong as the calculated facial expression evaluated value increases. On the other hand, evaluation is made that a degree that the facial expression to be determined is "normal facial expression" is strong as the calculated facial expression evaluated value decreases. Note that this facial expression evaluated value calculating method will be described in detail with reference to FIGS. 9 through 12.

Figure 9:
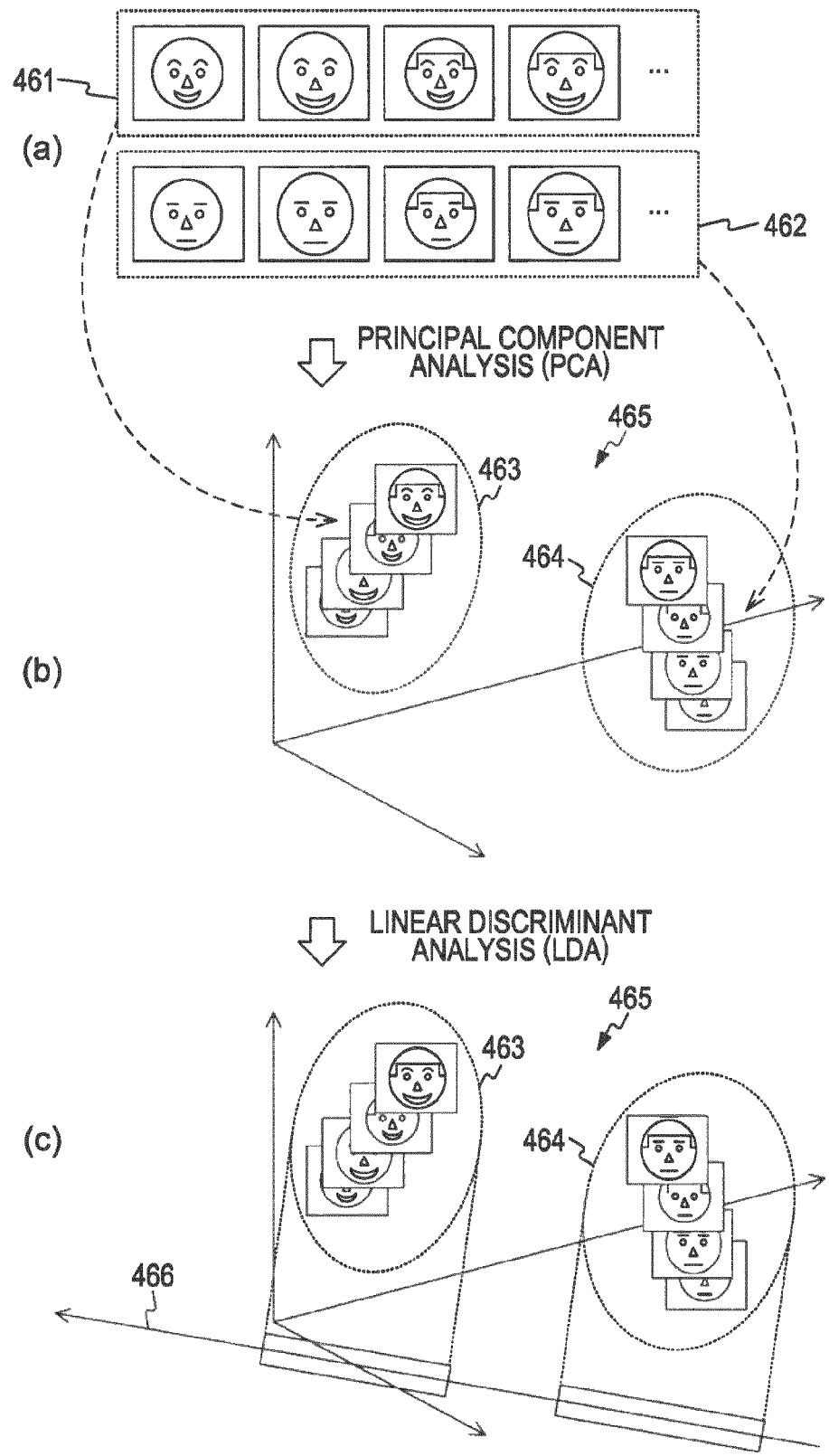
FIG. 9 is a diagram conceptually illustrating discriminant axis information used for calculation of a facial expression evaluated value, and a flow at the time of generating this discriminant axis information.

FIG. 9 is a diagram conceptually illustrating discriminant axis information used for calculation of a facial expression evaluated value, and a flow at the time of generating this discriminant axis information.

With the first embodiment of the present invention, description will be made as an example regarding a facial expression evaluated value calculating method using Fisher's linear discriminant analysis. With this facial expression evaluated value calculating method, first, a great number of sample images including one of the two different facial expressions are prepared beforehand. Subsequently, let us consider as a two-class problem between two different facial expressions, linear discriminant analysis (LDA) is executed based on the data of these sample images. Thus, a discriminant axis 466 (shown in (c) in FIG. 9) is formed wherein these two different facial expressions are discriminated well. Subsequently, this discriminant axis 466 is stored in the discriminant axis information storage unit 141. Also, at the time of facial expression evaluation, a facial expression evaluated value is calculated by obtaining an inner product between the data of a face image to be evaluated and the discriminant axis 466. Description will be made below specifically with reference to the drawings.

With the first embodiment of the present invention, in order to use "smiling face" as a specific facial expression, description will be made as an example regarding a case where smiling face sample images and normal facial expression sample images are used as sample images relating to two different facial expressions. In FIG. 9, (a) illustrates a group of smiling face sample images as a smiling face sample image group 461, and illustrates a group of normal facial expression sample images as a normal facial expression sample image group 462. Let us say that each sample image included in the sample image groups 461 and 462 is an image normalized such that a face becomes a certain size within a rectangular image of a certain size, for example, of 48 pixels×48 pixels. The data of each sample image included in the sample image groups 461 and 462 is handled as 48×48 dimensional vector data, thereby executing the LDA process.

Here, vector space in which the 48×48 dimensional vector data is handled is an extremely high dimensional space including 48×48 coordinate axes. Therefore, before the LDA process is executed, principal component analysis (PCA is executed regarding the 48×48 dimensional vector data. Subsequently, the 48×48 dimensional vector data is converted (dimensionally compressed) into low dimensional space data that represents only the features of a face effectively.

With this PCA process, let us consider obtaining M axes such that the irregularities (dispersion) between M (e.g., M=300) N-dimensional (N=48×48) input sample image groups become maximal. Such axes can be obtained as the solution (eigenvector) of an eigenvalue problem regarding the covariance matrix of the sample image groups. Subsequently, only vector components having a relatively great coefficient are extracted as principal components, whereby the 48×48 dimensional vector data can be dimensionally compressed to N'-dimensional (N>N') data including only the vector components suitable for representing the features of a face. For example, it has been understood to maintain sufficient precision regarding facial expression discrimination by setting N'=40 or so. Note that, of the principal components obtained at the PCA process, several principal components are eliminated in coefficient descending sequence, whereby the number of dimensions is further reduced while maintaining facial expression discriminant precision, and accordingly, the load of the next PCA process can be reduced.

Now, a masking process for a sample image to be input at the time of the PCA process will be described in detail with reference to FIG. 10.

FIG. 10 is a diagram schematically illustrating the masking process for a sample image to be input at the time of the PCA process according to the first embodiment of the present invention. In FIG. 10, (a) illustrates a sample image 470 that belongs to the smiling face sample image group 461. A smiling face 475 is included in the sample image 470. Note that, as described above, the sample image 470 is an image normalized in a rectangular shape such that the face 475 becomes a certain size.

Now, as shown in (a) in FIG. 10, in the case that the sample image 470 is used as is to execute the PCA process, selection of a suitable principal component is prevented due to influence such as the background, and hair and the like of the face 475, in some cases. Therefore, as shown in (b) in FIG. 10, a region other than the skin portion of the face 475 is covered with a mask 472, whereby the sample image 470 is converted such that only the face region of the skin portion is remained. Note that, with (b) and (c) in FIG. 10, the regions of the masks 472 and 474 are indicated with a shaded region. The sample image 471 after conversion shown in (b) in FIG. 10 is subjected to the PCA process in a state in which the information density of the face is enhanced, whereby further high-precision dimensional compression can be executed. Note that, of the face region, the mouth is changed greatly according to facial expression, and accordingly, the mouth frequently becomes a disturbance factor. Therefore, as shown in (c) in FIG. 10, the surrounding region of the mouth of the face 475 is also covered with a mask 474, whereby the sample image 470 is converted such that only the face region of the skin portion excluding the surrounding region of the mouth is remained. The sample image 473 after conversion shown in (c) in FIG. 10 is used to execute the PCA process, whereby the precision of the dimensional compression can be enhanced. Therefore, with the first embodiment of the present invention, description will be made as an example regarding a case where a sample image to be input at the time of the PCA process is subjected to a masking process shown in (c) in FIG. 10.

Now, let us say that the PCA space 465 shown in (b) and (c) in FIG. 9 is partial space including only a coordinate axis that effectively represents the features of a face included in a sample image.

Each sample image that belongs to the smiling face sample image group 461 or the normal facial expression sample image group 462 that have been dimensionally compressed by the above PCA process is converted into vector data on the PCA space 465, such as shown in (b) in FIG. 9, which schematically illustrates a state in which each sample image that belongs to the smiling sample image group 461 or the normal facial expression sample image group 462 is projected on the PCA space 465. As shown in (b) in FIG. 9, in the case that sample images that belong to the same sample image group are projected on the PCA space 465, the distance between the sample images is relatively near distance. Therefore, after the sample images that belong to the smiling face sample image group 461 are projected on the PCA space 465, a cluster formed by the sample images thereof is taken as a cluster 463. Also, after the sample images that belong to the normal facial expression sample image group 462 are projected on the PCA space 465, a cluster formed by the sample images thereof is taken as a cluster 464. A projective axis (discriminant axis 466) which separates the clusters 463 and 464 appropriately is formed by the LDA process. Such a discriminant axis 466 is referred to as "Fisher's projective axis".

In general, according to the LDA process, a discriminant axis is obtained such that dispersion within a cluster and between clusters projected on an N'-dimensional eigenvector becomes the maximum. That is to say, an eigenvector corresponding to the maximum eigenvalue of each covariance matrix within a cluster and between clusters is obtained, and this is taken as a vector (Fisher vector) on the discriminant axis 466. Relationship between each covariance matrix and an eigenvalue/eigenvector is shown in Expressions 11 and 12.

$$R_B \vec{\mu} = \lambda R_W \vec{\mu} \qquad \text{Expression 11}$$

$$\Leftrightarrow R_W^{-1} R_B \vec{\mu} = \lambda \vec{\mu} \qquad \text{Expression 12}$$

Fisher vector $\vec{A}_d \Rightarrow$ eigenvector $\vec{\mu}_{max}$ as to the maximum eigenvalue $\lambda_{max}$ Here, $R_W$ represents an intra-cluster covariance matrix, $R_B$ represents an inter-cluster covariance matrix, and $\lambda$ represents an eigenvalue. Also, with regard to calculation of the inverse matrix, eigenvalue, and eigenvector of Expression 12, lower-upper (LU) decomposition method, QR decomposition method (Q: orthogonal matrix, R: upper triangular matrix), and Gaussian elimination may be employed, respectively. Information such as the coefficient of each component of Fisher vector, and so forth is stored in the discriminant axis information storage unit 141 as the information of the discriminant axis 466 thus calculated. That is to say, the information of the discriminant axis 466 is information including the coefficient of a vector that indicates the discriminant axis of a facial expression obtained by executing linear discriminant analysis based on a signal component obtained by principal component analysis from the image data of a great number of face sample images relating to two different facial expressions, and so forth.

Figure 11:
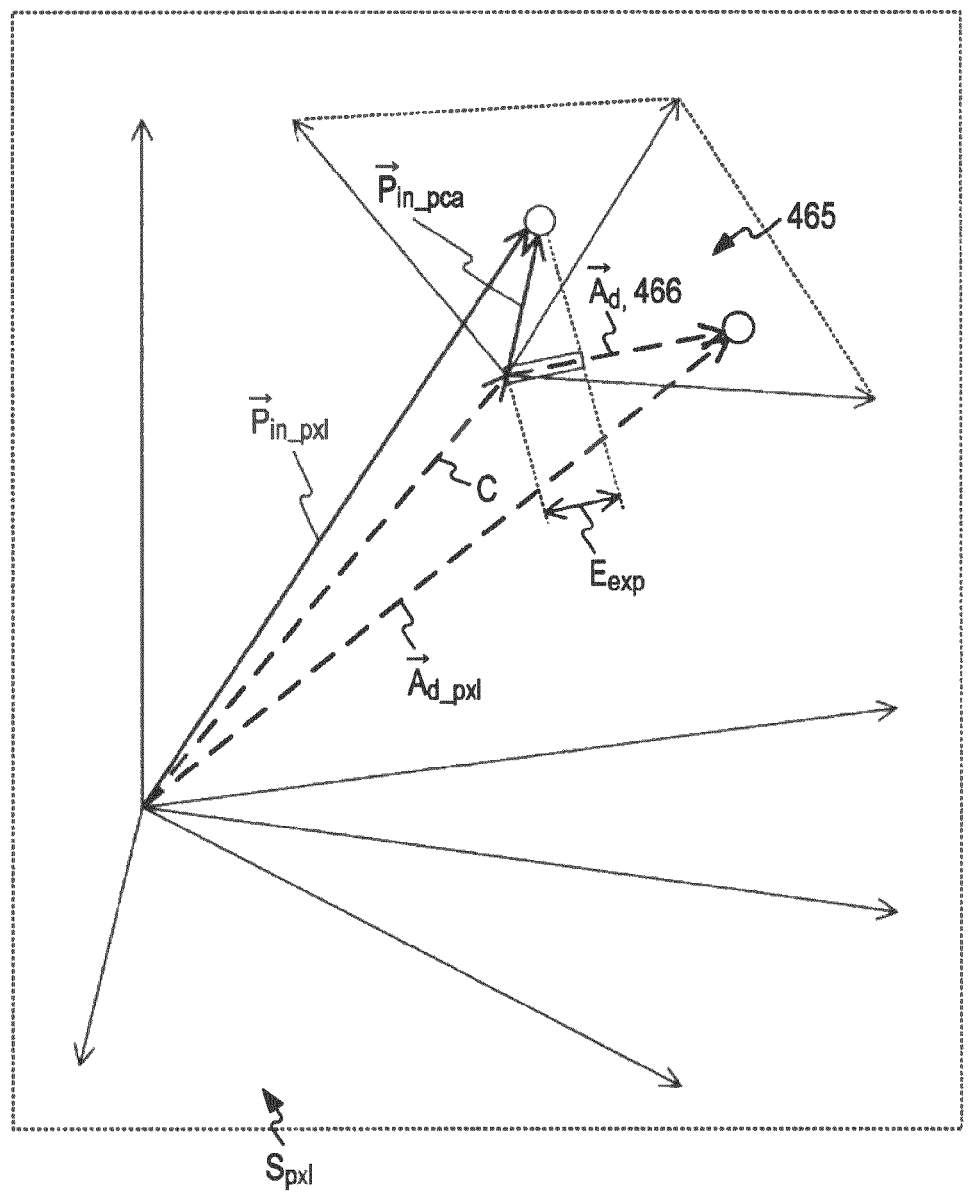
FIG. 11 is a diagram schematically illustrating relationship between a determinant axis in the pixel space and the PCA space, and a face image to be evaluated.

FIG. 11 is a diagram schematically illustrating relationship between a determinant axis in the pixel space and the PCA space, and a face image to be evaluated.

In the case of calculating a facial expression evaluated value using the discriminant axis 466 shown in (c) in FIG. 9, first, the image data of a face (face image) detected from an imaged image is subjected to the PCA process to extract a principal component. The facial expression of the face image corresponding to the image data thereof is evaluated as a projective component as to the discriminant axis 466 (vector $A_d$) of the face image vector subjected to the PCA process (input face image vector), such as shown in the PCA space 465 in FIG. 11. That is to say, as shown in Expression 15, a facial expression evaluated value $E_{exp}$ can be calculated by inner product between the input face image vector and the Fisher vector.

$$\vec{P}_{in\_pxl} \approx 1.45\vec{\mu}_1 + 0.86\vec{\mu}_2 + 0.64\vec{\mu}_3 \ldots + 0.05\vec{\mu}_{N'} + C \quad \text{Expression 13}$$

$$\vec{A}_{d\_pxl} \approx 0.98\vec{\mu}_1 + 0.45\vec{\mu}_2 + 0.38\vec{\mu}_3 \ldots + 0.09\vec{\mu}_{N'} + C \quad \text{Expression 14}$$

$$E_{exp} = \vec{P}_{in\_pca} \cdot \vec{A}_d = \begin{pmatrix} 1.45 \\ 0.86 \\ 0.64 \\ \vdots \\ 0.05 \end{pmatrix} \cdot \begin{pmatrix} 0.98 \\ 0.45 \\ 0.38 \\ \vdots \\ 0.09 \end{pmatrix} \quad \text{Expression 15}$$

$$= (\vec{P}_{in\_pxl} - C) \cdot (\vec{A}_{d\_pxl} - C) \quad \text{Expression 16}$$

$\begin{cases} \vec{P}_{in\_pxl}: \text{Face image vector on the pixel space} \\ \vec{A}_{d\_pxl}: \text{Fisher vector on the pixel space} \\ \vec{\mu}_1, \ldots, \vec{\mu}_{N'}: \text{Vector of a principal component} \\ \vec{E}_{exp}: \text{Facial expression evaluated value} \\ \vec{P}_{in\_pca}: \text{Face image vector after PCA process} \end{cases}$ The information of the Fisher vector may be converted into information on pixel space $S_{pxl}$ (the dimensional space that the original image data before the PCA process has). Expressions 13 and 14 are expressions that represent the input face image vector and Fisher vector as a vector on the pixel space $S_{pxl}$. FIG. 11 conceptually illustrates relationship represented with Expressions 13 and 14. As shown in Expressions 13, 14, and 11, a vector component other than principal components $\mu_1$ through $\mu_{N'}$ obtained by the PCA process can be approximated with a constant C as the average value of all the input images. Therefore, an inner product computation such as shown in Expression 15 can be represented equivalently as a vector inner product computation on the pixel space $S_{pxl}$, as shown in Expression 16.

As shown in Expression 16, a subtraction result between a Fisher vector component and the constant C on the pixel space $S_{pxl}$ can be calculated beforehand. Therefore, this subtraction result and the constant C are stored in the discriminant axis information storage unit 141 as discriminant axis information. Subsequently, the facial expression evaluated value calculating unit 140 calculates the vector of the face image detected from the imaged image, following which executes the inner product computation of Expression 16 without subjecting this vector to the PCA process. Here, with regard to computations of facial expression evaluated values as to one face by Expression 16, subtraction, multiplication, and addition are executed 48×48 times at the maximum, and actually, only computations of coefficients corresponding to around 40 principal components $\mu_1$ through $\mu_{N'}$ are executed. Therefore, computation amount can be reduced extremely without degrading the precision of facial expression evaluation as compared to the case of executing a vector inner product computation on the PCA space 465, and a facial expression evaluated value $E_{exp}$ can be readily calculated in a field angle matching state before the imaged image is recorded.

Such a facial expression evaluated value calculating method is employed, whereby facial expression evaluation can be executed with high precision while reducing processing load, for example, as compared to a facial expression evaluating method wherein a facial expression is evaluated by matching between a great number of face image templates and the detected face image. For example, in the case of executing matching using a template, usually, parts such as the eyes, mouth, and so forth have to be extracted from the detected face image to execute a matching process for each part. On the other hand, with the facial expression evaluated value calculating method used for the first embodiment of the present invention, after the detected face is normalized to a certain size, the face image thereof is replaced with vector information, whereby this can be applied to an inner product computation as is (or partially masked). The inner product computation thereof can be simplified as a simple computation made up of around 40-dimensional subtraction, multiplication, and addition.

Figure 12:
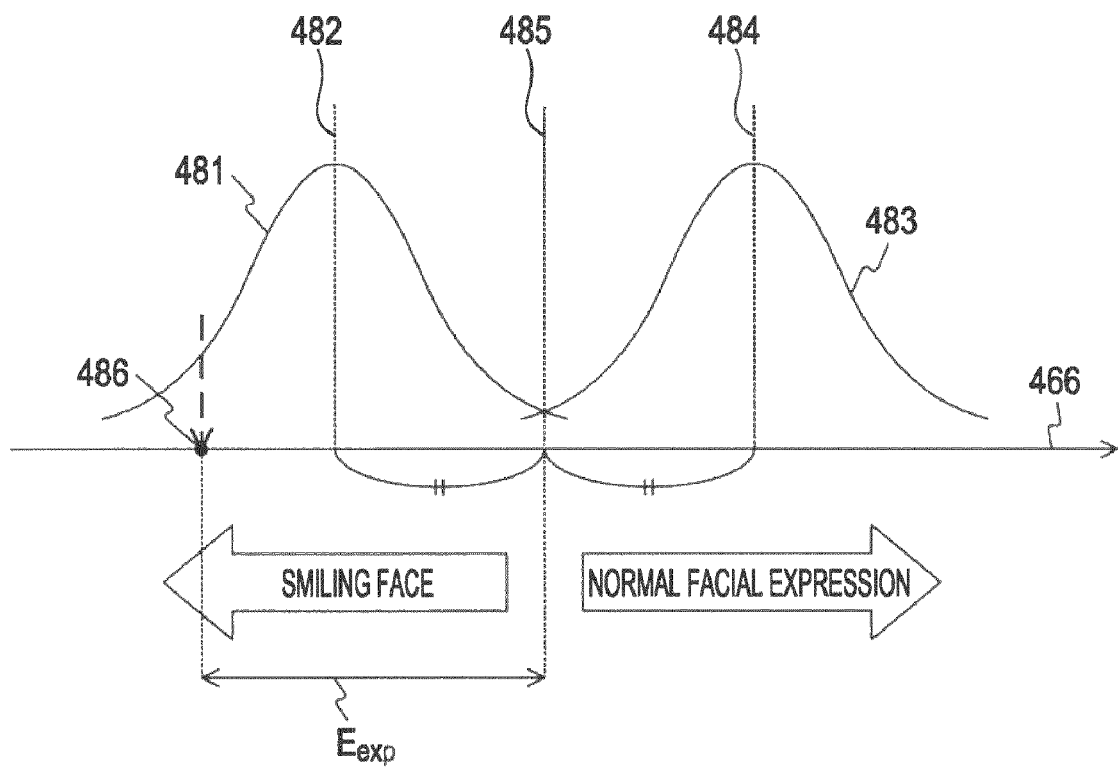
FIG. 12 is a diagram illustrating a calculation example in the case that the facial expression evaluated value according to the first embodiment of the present invention is output as a numeric value.

FIG. 12 is a diagram illustrating a calculation example in the case that the facial expression evaluated value according to the first embodiment of the present invention is output as a numeric value.

With the first embodiment of the present invention, for example, based on the PCA process results of a sample image, the average 482 of the distribution 481 of a smiling face image on the PCA space, and the average 484 of the distribution 483 of a normal facial expression face image on the PCA space are obtained. Subsequently, a projective point as to the discriminant axis 466 of the averages 482 and 484 is determined. Subsequently, the facial expression evaluated value $E_{exp}$ is converted into a numeric value with a middle point 485 of the projective points of the averages 482 and 484 as a reference. That is to say, as shown in FIG. 12, distance between a projective point 486 as to the discriminant axis 466 of the face image, and the middle point 485 of the projective points of the averages 482 and 484 is taken as the facial expression evaluated value $E_{exp}$, and a side where the smiling face sample image is distributed is taken as a positive numeric value. Thus, whether the detected face image is similar to either a smiling face or a normal facial expression can be output as a consecutive numeric value. In this case, the degree of a smiling face is evaluated as high in accordance with increase in the facial expression evaluated value $E_{exp}$. Also, in the case that multiple faces have been detected from one image by the face detecting unit 130, calculation of a facial expression evaluated value is executed regarding each face of these by the facial expression evaluated value calculating unit 140. Subsequently, the facial expression evaluated value calculated regarding each face of these is stored in the metadata storage unit 210.

Operation Example of Image Processing Apparatus

Figure 13:
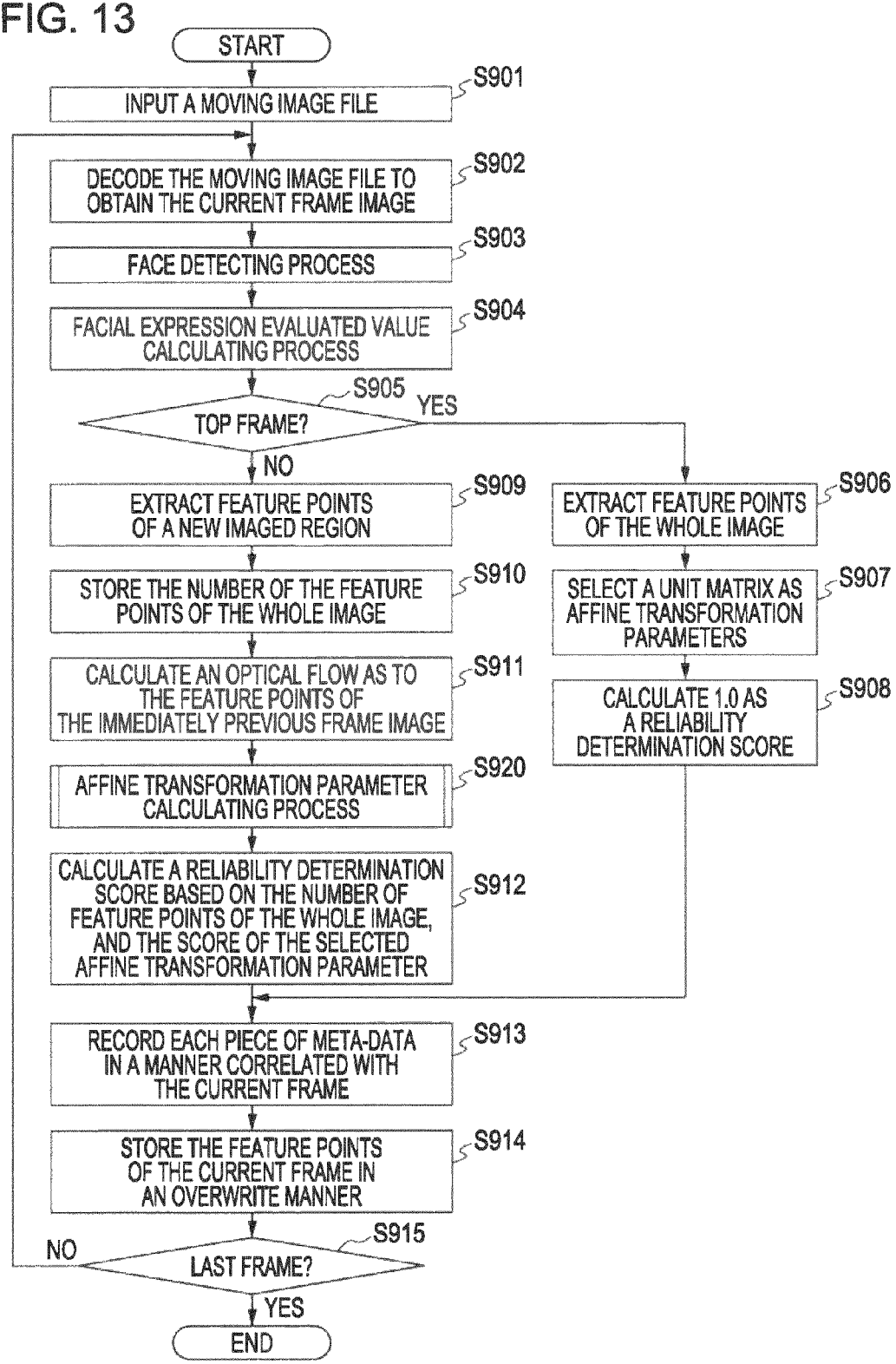
FIG. 13 is a flowchart illustrating the procedure of a metadata recording process by the image processing apparatus according to the first embodiment of the present invention.

Next, the operation of the image processing apparatus 100 according to the first embodiment of the present invention will be described with reference to the drawings. FIG. 13 is a flowchart illustrating the procedure of a metadata recording process by the image processing apparatus 100 according to the first embodiment of the present invention.

First, a moving picture file is input to the moving picture input unit 110 (step S901). Subsequently, the moving picture file input to the moving picture input unit 110 is decoded, the image of one frame in the time-series sequence is obtained (step S902). The face detecting unit 130 executes a face detecting process regarding the obtained one frame (step S903). The facial expression evaluated value calculating unit 140 executes a facial expression evaluated value calculating process regarding the face detected by the face detecting process (step S904).

Subsequently, determination is made whether or not the obtained one frame is the top frame of the moving picture file input to the moving picture input unit 110 (step S905). In the case that the obtained one frame is the top frame (step S905), feature points are extracted from the whole of the image corresponding to this top frame (step S906). Subsequently, the affine transformation parameters of a unit matrix are selected as affine transformation parameters (step S907), "1.0" is calculated as a reliability determination score, and the flow proceeds to step S913.

On the other hand, in the case that the obtained one frame is the top frame (step S905), feature points are extracted from a new imaged region with the image corresponding to the immediately previous frame as a reference (step S905). That is to say, a feature point that has already been extracted with the image corresponding to the immediately previous frame can be obtained by the optical flow corresponding to this feature point, and accordingly, this feature point is not extracted with the image corresponding to the current frame. Subsequently, the number of feature points with the whole image corresponding to the immediately previous frame is held (step S910).

Subsequently, the optical flow as to each feature point extracted from the image corresponding to the immediately previous frame is calculated (step S911). The camera work parameter calculating unit 123 executes an affine transformation parameter calculating process (step S920). This affine transformation parameter calculating process will be described in detail with reference to FIG. 14. Note that step S920 is an example of the calculating procedure referred to in the Summary of the Invention.

Subsequently, a reliability determination score is calculated based on the number of feature points in the held whole image, and the score of the selected representative affine transformation parameter (step S912). Each piece of metadata obtained regarding the current frame is recorded in the metadata storage unit 210 in a manner correlated with the current frame (step S913). Note that in the case that the current frame is the top frame, the affine transformation parameters of the selected unit matrix are recorded in the metadata storage unit 210 in a manner correlated with the top frame. Subsequently, the image corresponding to the current frame, and the feature points of this image are stored in an overwrite manner (step S914).

Subsequently, determination is made whether or not the current frame is the last frame of the moving picture file input to the moving picture input unit 110 (step S915). In the case that the current frame is not the last frame (step S915), the flow returns to step S902, where the metadata recording process is repeated (steps S902 through S914, and S920). On the other hand, in the case that the current frame is the last frame (step S915), the metadata recording process is ended.

Figure 14:
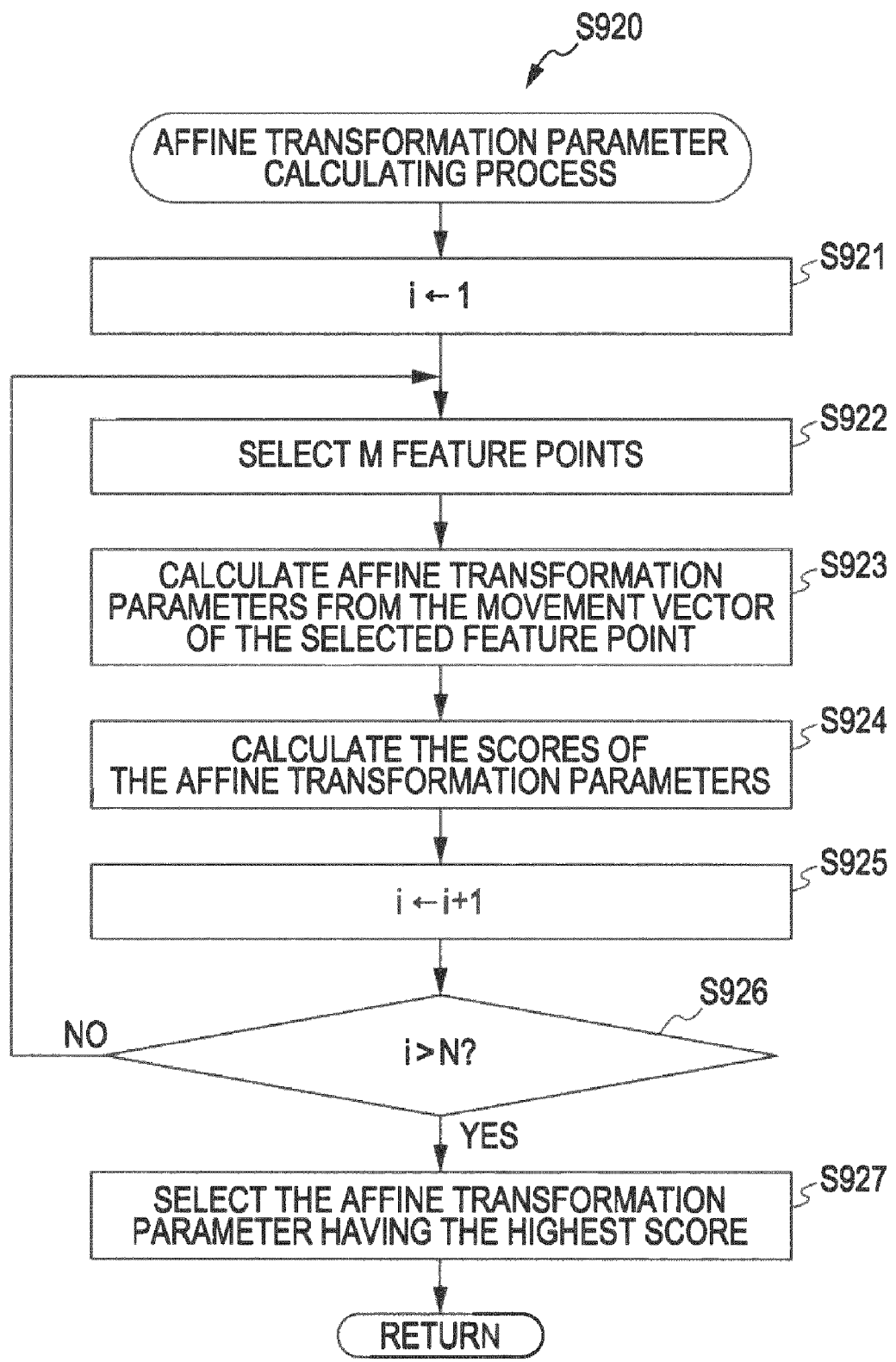
FIG. 14 is a flowchart illustrating an affine transformation parameter calculating procedure included in the procedure of the metadata recording process by the image processing apparatus according to the first embodiment of the present invention.

FIG. 14 is a flowchart illustrating an affine transformation parameter calculating procedure (the procedure in step S920 shown in FIG. 13) included in the procedure of the metadata recording process by the image processing apparatus 100 according to the first embodiment of the present invention.

First, a variable i is initialized to "1" (step S921). Subsequently, M feature points are selected from the feature points of which the optical flows have been detected (step S922). For example, in the case that affine transformation parameters are employed as camera work parameters, three feature points are selected randomly. Also, in the case that projective-transformation parameters are employed as camera work parameters, four feature points are selected randomly. Subsequently, affine transformation parameters are calculated based on M optical flows calculated corresponding to the selected M feature points (step S923).

Subsequently, based on the calculated affine transformation parameters, the scores of the affine transformation parameters are calculated (step S924). Specifically, the calculated affine transformation parameters are used to obtain the positions of the movement destinations of all the feature points of the image corresponding to the immediately previous frame. Subsequently, the positions of the feature points obtained with the affine transformation parameters thereof, and the positions of the feature points of the image corresponding to the current frame obtained at the time of calculating an optical flow in step S911 are compared. A difference value between the positions of two feature points corresponding to each other is calculated for each feature point. For example, absolute distance between two positions corresponding to each other is calculated as a difference value. Subsequently, the calculated difference value and a predetermined threshold are compared for each feature point, and the number of feature points of which the difference value is smaller than the threshold is obtained as the scores of the affine transformation parameters.

Subsequently, "1" is added to the variable i (step S925), and determination is made whether or not the variable i is greater than a constant N (step S926). In the case that the variable i is equal to or smaller than the constant N (step S926), the flow returns to step S922, where the score calculating process for affine transformation parameters is repeated (steps S922 through S925). For example, 20 may be employed as the constant N.

On the other hand, in the case that the variable i is greater than the constant N (step S926), of the obtained scores for affine transformation parameters, the affine transformation parameter having the highest score value is selected as the representative affine transformation parameter (step S927).

With the first embodiment of the present invention, description has been made regarding an example wherein affine transformation parameters are detected as camera work parameters based on the optical flow detected from an image making up a moving picture. However, for example, a sensor such as an acceleration sensor or gyro sensor or the like, a zoom button used at the time of performing a zoom operation are provided to the camera, and the movement amount of the camera at the time of imaging is detected by this sensor and zoom button. Subsequently, camera work parameters may be obtained based on the movement amount of the camera. Alternatively, an arrangement may be made wherein multiple camera work parameters are detected by the camera work parameter calculating unit 123 beforehand, and based on the movement amount of the camera detected at the time of imaging, one camera work parameter is selected from the multiple camera work parameters.

Affine Transformation Example of Image

Next, description will be made in detail regarding a case where the affine transformation parameters calculated by the camera work detecting unit 120 are used to subject an image making up an moving picture to affine transformation, with reference to the drawings. Now, let us say that each image shown in FIGS. 15 through 23 is simplified for the sake of explanatory convenience, and of images making up a moving picture, images of which the movement amount between images is comparatively small are illustrated. Also, let us say that each image shown in FIGS. 15 through 23 is an image selected by the compositing target image selecting unit 170. Also, a case where a subsequent frame is overwritten on a previous frame on the temporal axis is shown as an example.

First, description will be made regarding a case where at the time of imaging by the camera, the direction of the lens of the camera is moved in one of the four directions with the position of the camera as the center, though the zoom is not changed.

Figure 15:
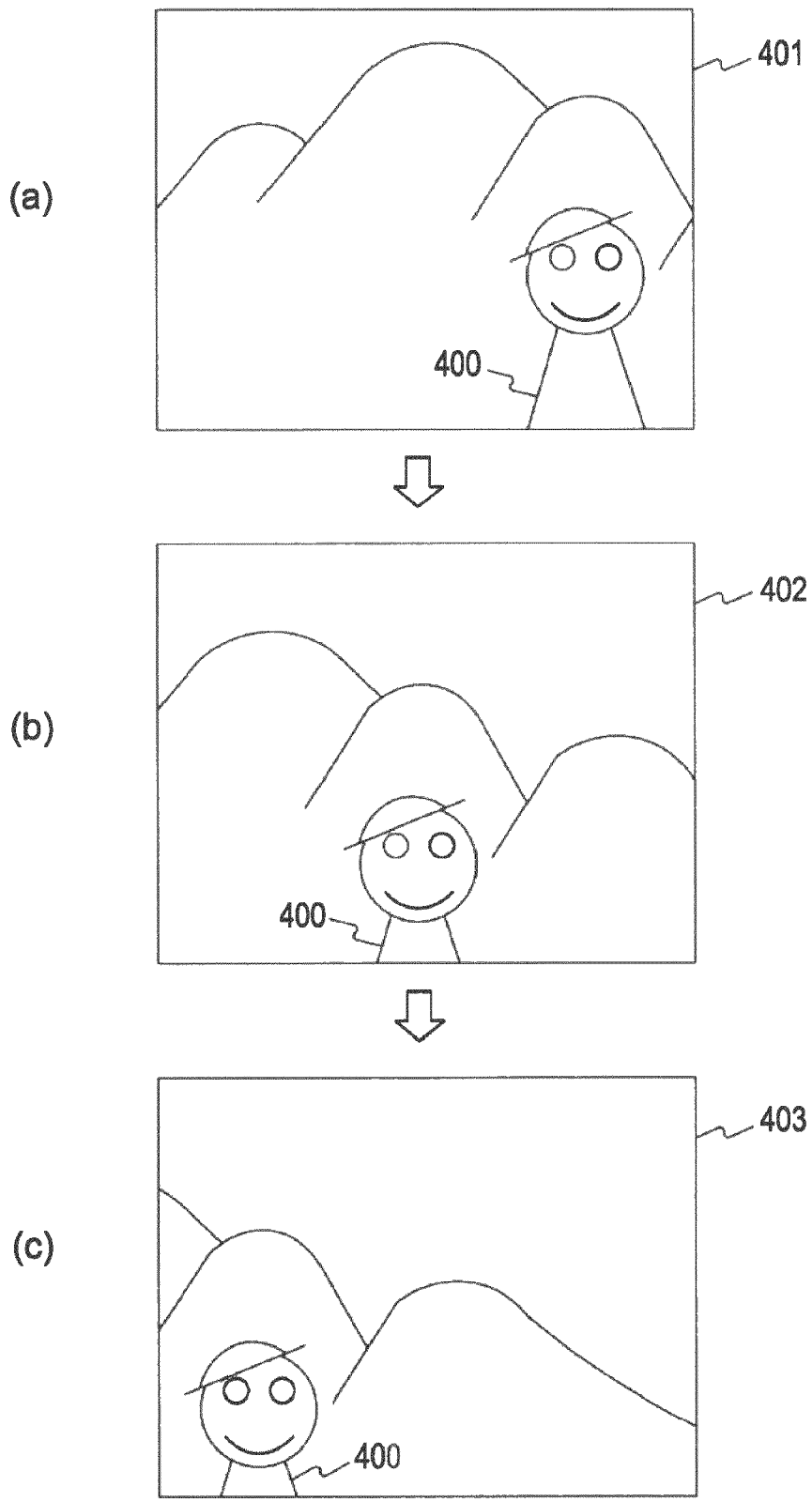
FIG. 15 is a diagram illustrating an example of the transition of a moving picture imaged by a camera.

FIG. 15 is a diagram illustrating an example of the transition of a moving picture imaged by the camera. FIG. 15 illustrates images 401 through 403 making up a moving picture in the case of imaging a person 400 with a mountain as the background. Also, this example illustrates a case where a user is shooting images while moving the direction of the lens of the camera to the right and upper side user. In this example, the person 400 included in the moving picture to be imaged by the camera moves from the right side to the left side and moves to the lower side in the image making up the moving picture thereof.

Figure 16:
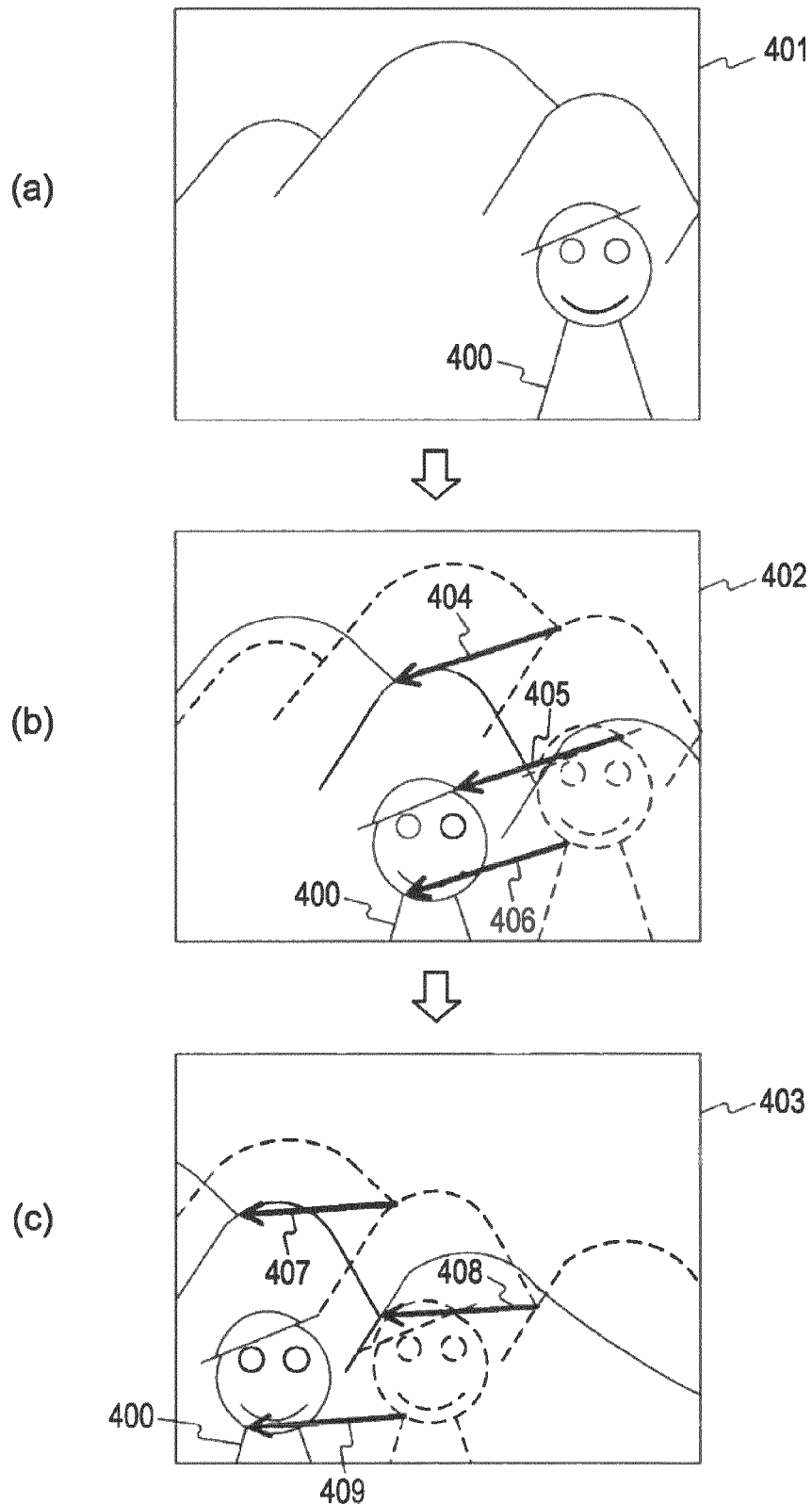
FIG. 16 is a diagram schematically illustrating the locus of a subject included in images selected by a compositing target image selecting unit according to an embodiment of the present invention.

FIG. 16 is a diagram schematically illustrating the locus of a subject included in the images 401 through 403 selected by the compositing target image selecting unit 170 according to an embodiment of the present invention. Note that, with the images 402 and 403 shown in (b) and (c) in FIG. 16, the image corresponding to the previous frame is shown with a dashed line. The image 401 shown in (a) in FIG. 16 is the same as the image 401 shown in (a) in FIG. 15. Also, a solid-line portion of the image 402 shown in (b) in FIG. 16 is the same as the image 402 shown in (b) in FIG. 15, and a dashed-line portion of the image 402 shown in (b) in FIG. 16 is the same as the solid-line portion of the image 401 shown in (a) in FIG. 16. Also, arrows 404 through 406 of the image 402 shown in (b) in FIG. 16 are arrows that indicate the locus of a subject included in the images 401 and 402. Also, a solid-line portion of the image 403 shown in (c) in FIG. 16 is the same as the image 403 shown in (c) in FIG. 15, and a dashed-line portion of the image 403 shown in (c) in FIG. 16 is the same as the solid-line portion of the image 402 shown in (b) in FIG. 16. Also, arrows 407 through 409 of the image 403 shown in (c) in FIG. 16 are arrows that indicate the locus of a subject included in the images 402 and 403.

As shown in (b) and (c) in FIG. 16, the person 400 and the mountain of the background included in the image are moved along with movement of the camera. Based on each optical flow detected by this movement, affine transformation parameters between images can be obtained. For example, in the case that the image 401 is taken as a reference image, the affine matrix of the affine transformation parameters calculated regarding each image of the images 401 and 402 is multiplied, whereby affine transformation parameters used for subjecting the image 402 to affine transformation can be obtained. Also, the affine matrix of the affine transformation parameters calculated regarding each image of the images 401 through 403 is multiplied, whereby affine transformation parameters used for subjecting the image 403 to affine transformation can be obtained. Now, let us say that the affine transformation parameters of the reference image are the affine transformation parameters of a unit matrix.

Figure 17:
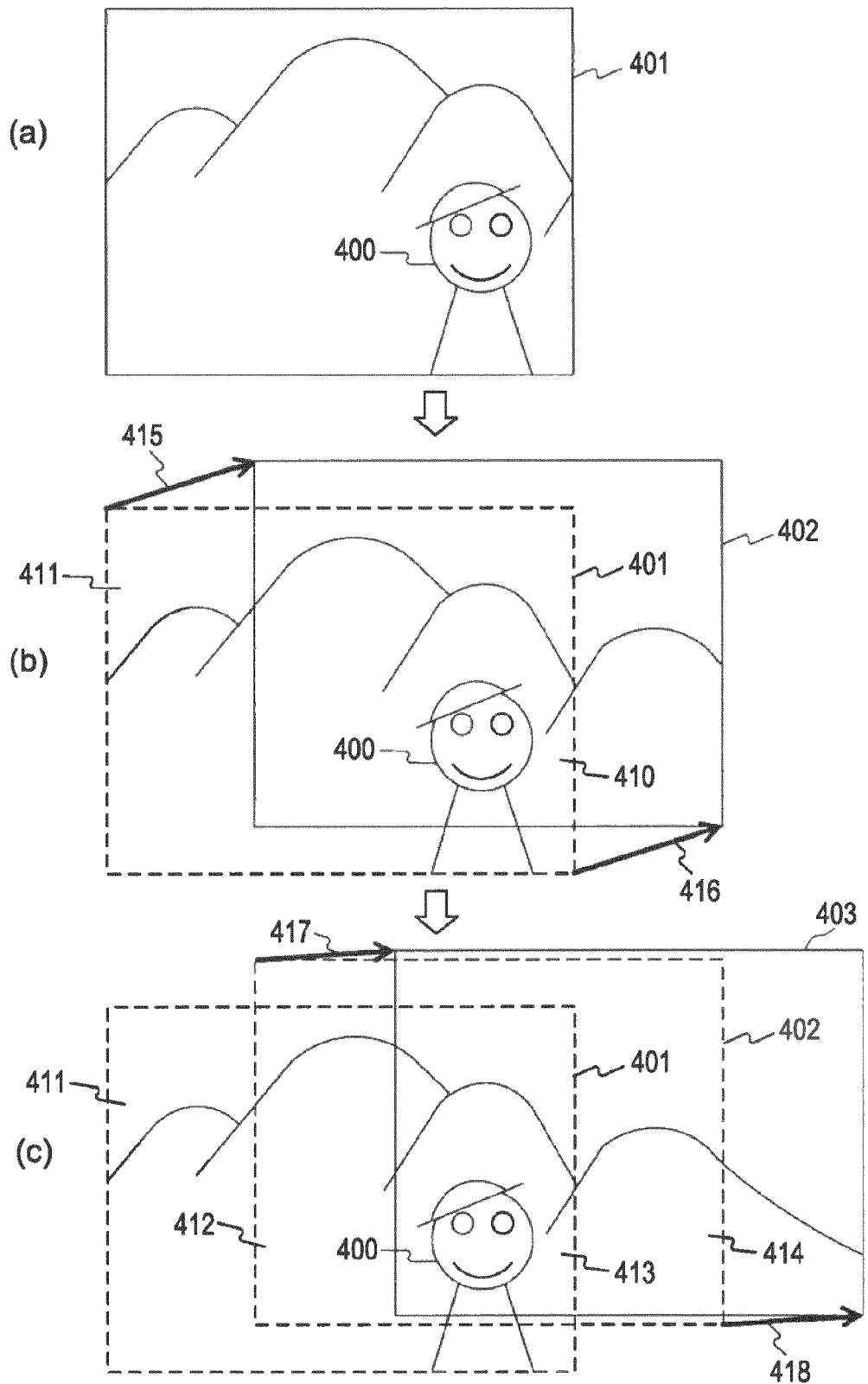
FIG. 17 is a diagram illustrating an image compositing example in the case that images are composited by an image compositing unit according to the first embodiment of the present invention.

FIG. 17 is a diagram illustrating an image compositing example in the case that images are composited by the image compositing unit 220 according to the first embodiment of the present invention. With this example, description will be made regarding a case where the images 402 and 403 are subjected to affine transformation using the affine transformation parameters stored in the compositing target image metadata storage unit 270 with the image 401 as a reference image.

For example, in the case that the affine matrix of the affine transformation parameters correlated with the image 401 is taken as A1, the image transforming unit 190 subjects the image 401 to affine transformation by the matrix of A1 with the position and size of the image 401 of the top frame as a reference. Here, the image 401 is a reference image, and accordingly, A1 is a unit matrix. Therefore, the position and size of the image 401 are not transformed.

Subsequently, in the case that the image 402 corresponding to the next frame is composited, the image transforming unit 190 subjects the image 402 to affine transformation using the affine transformation parameters correlated with the image 402. For example, let us say that the matrix of the affine transformation parameters correlated with the image 402 is A2. In this case, the image transforming unit 190 subjects the image 402 to affine transformation by the matrix of A2 with the position and size of the image 401 of the top frame as a reference. Note that, with the example shown in (b) in FIG. 17, as shown in arrows 415 and 416, the position alone of the image 402 is transformed. Subsequently, the image compositing unit 220 overwrites the image 402 subjected to affine transformation by the image transforming unit 190 on the image 401 corresponding to the previous frame so as to be overlaid thereupon and both be composited. Specifically, of the region of the image 401, a region 410 overlaid with the image 402 is overwritten by the image of the image 402. Also, of the region of the image 401, a region 411 not overlaid with the image 402 is not overwritten by the image of the image 402. That is to say, in the case that the image 402 corresponding to the second frame is composited, as shown in (b) in FIG. 17, an image is created wherein the whole portion of the image 402, and the portion corresponding to the region 411 of the image 401 are composited.

Subsequently, in the case that the image 403 corresponding to the second frame is displayed, the image transforming unit 190 subjects the image 403 to affine transformation using the affine transformation parameters correlated with the image 403. For example, let us say that the matrix of the affine transformation parameters corresponding to the image 403 is A3. In this case, the image transforming unit 190 subjects the image 403 to affine transformation by the matrix A3 with the position and size of the image 401 as a reference. Note that, with the image shown in (c) in FIG. 17, as shown in arrows 417 and 418, the position alone of the image 403 is transformed. Subsequently, the image compositing unit 220 overwrites the image 403 subjected to affine transformation by the image transforming unit 190 on the composited image of the images 401 and 402 corresponding to the previous frame so as to be overlaid thereupon and both be composited. Specifically, of the region of the composited image of the images 401 and 402, regions 413 and 414 overlaid with the image 403 are overwritten by the image of the image 403. Also, of the region of the composited image of the images 401 and 402, regions 411 and 412 not overlaid with the image 403 are composited with the composited image of the images 401 and 402. That is to say, in the case that the image 403 corresponding to the third frame is composited, as shown in (c) in FIG. 17, an image is created wherein the whole portion of the image 403, the portion corresponding to the region 411 of the image 401, and the portion corresponding to the region 412 of the image 402 are composited.

Next, description will be made regarding a case where at the time of imaging by the camera, the zoom has been changed though the direction of the lens of the camera has not been changed.

Figure 18:
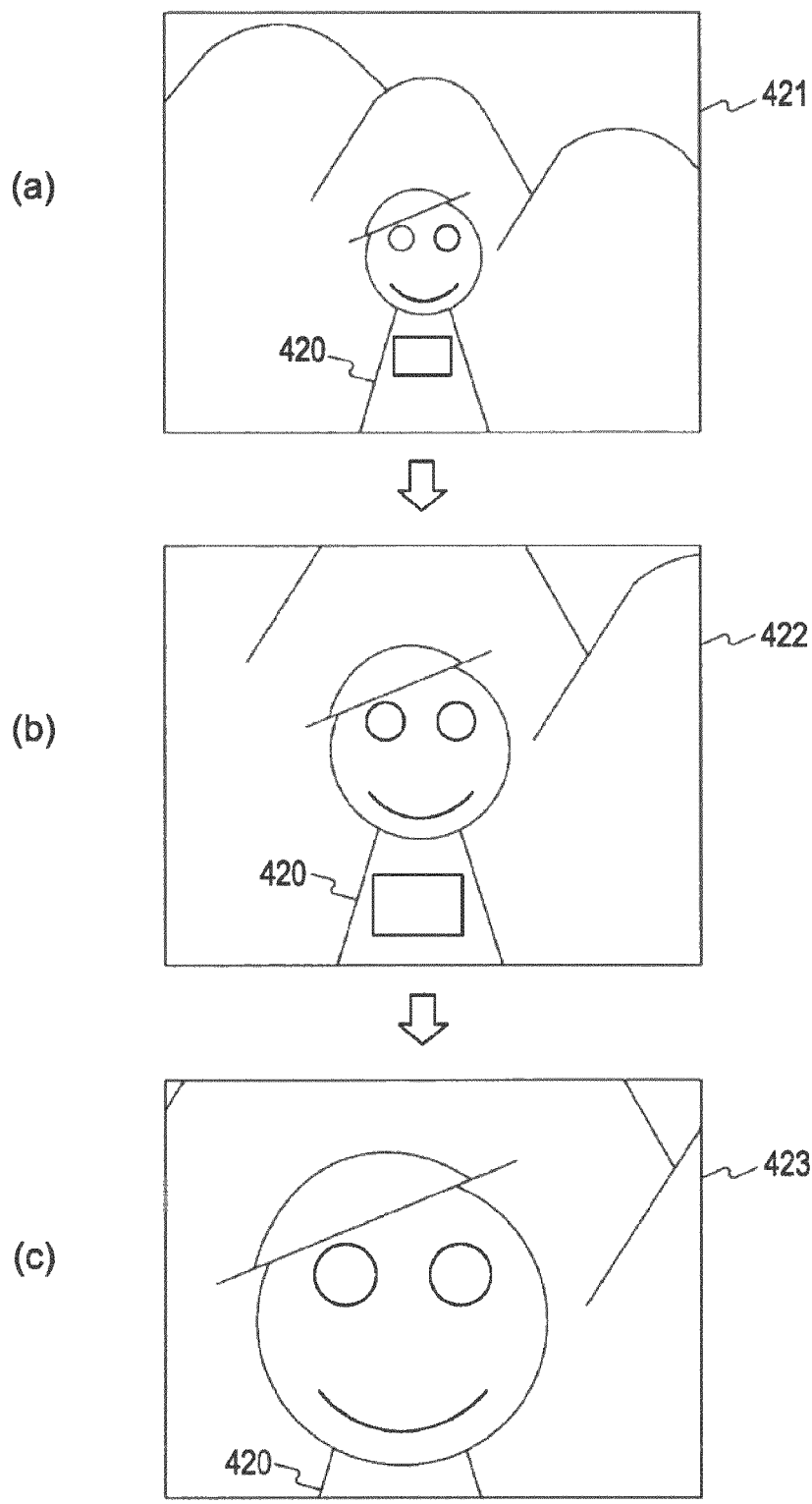
FIG. 18 is a diagram illustrating an example of the transition of a moving picture imaged by the camera.

FIG. 18 is a diagram illustrating an example of the transition of a moving picture imaged by the camera. FIG. 18 illustrates images 421 through 423 corresponding to consecutive frames included in a moving picture in the case of imaging a person 420 with a mountain as the background. This example illustrates a case where a user is shooting images while zooming in. In this case, the size of the person 420 included in the moving picture imaged by the camera is increasing gradually on an image making up the moving picture thereof. Note that, though the position of the camera is somewhat moved at the time of zooming in some cases, with this example, description will be made without taking movement of the position of the camera into consideration.

Figure 19:
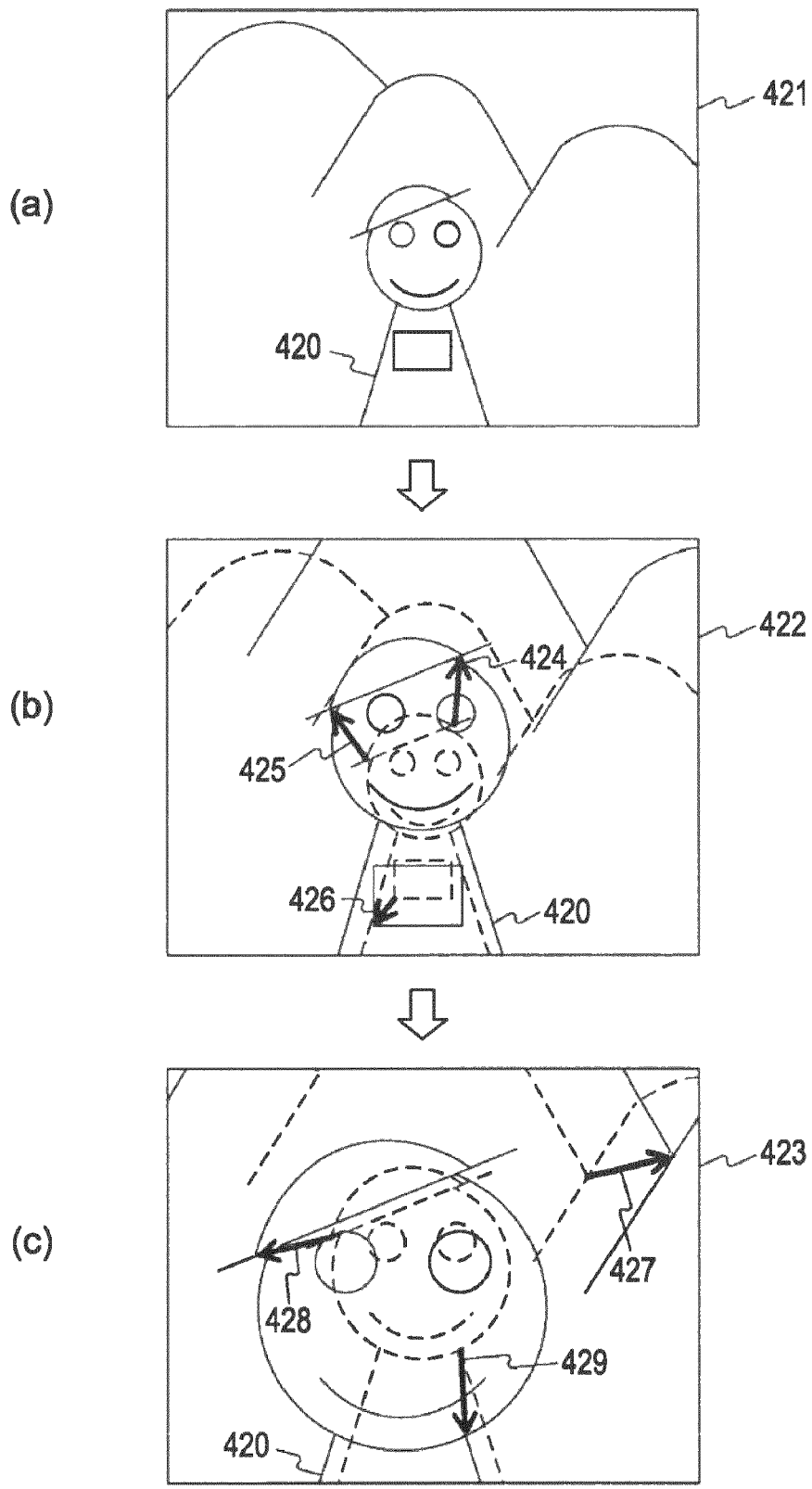
FIG. 19 is a diagram schematically illustrating the locus of a subject included in images selected by the compositing target image selecting unit according to an embodiment of the present invention.

FIG. 19 is a diagram schematically illustrating the locus of a subject included in the images 421 through 423 selected by the compositing target image selecting unit 170 according to an embodiment of the present invention. Note that an affine transformation parameter calculation example shown in FIG. 19 is the same as the affine transformation parameter calculation example shown in FIG. 16, and accordingly, description thereof will be omitted here.

Figure 20:
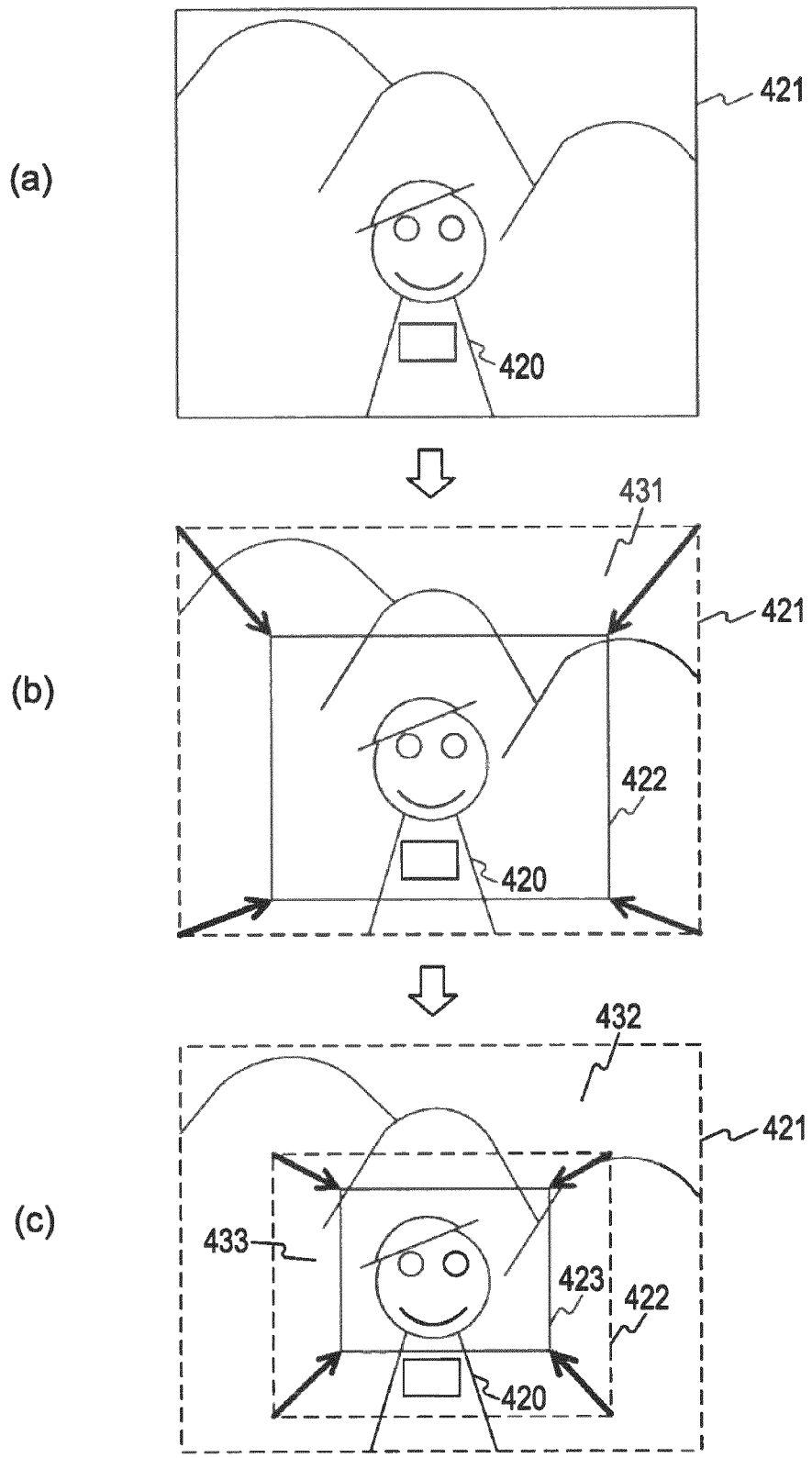
FIG. 20 is a diagram illustrating an image compositing example in the case that images are composited by the image compositing unit according to the first embodiment of the present invention.

FIG. 20 is a diagram illustrating an image compositing example in the case that images are composited by the image compositing unit 220 according to the first embodiment of the present invention. Note that an image compositing example shown in FIG. 20 is the same as the image compositing example shown in FIG. 17, and accordingly, description thereof will be omitted here.

Next, description will be made regarding a case where at the time of imaging by the camera the camera has been rotated with the optical axis as the rotation center, though the direction and zoom of the lens of the camera has not been changed.

Figure 21:
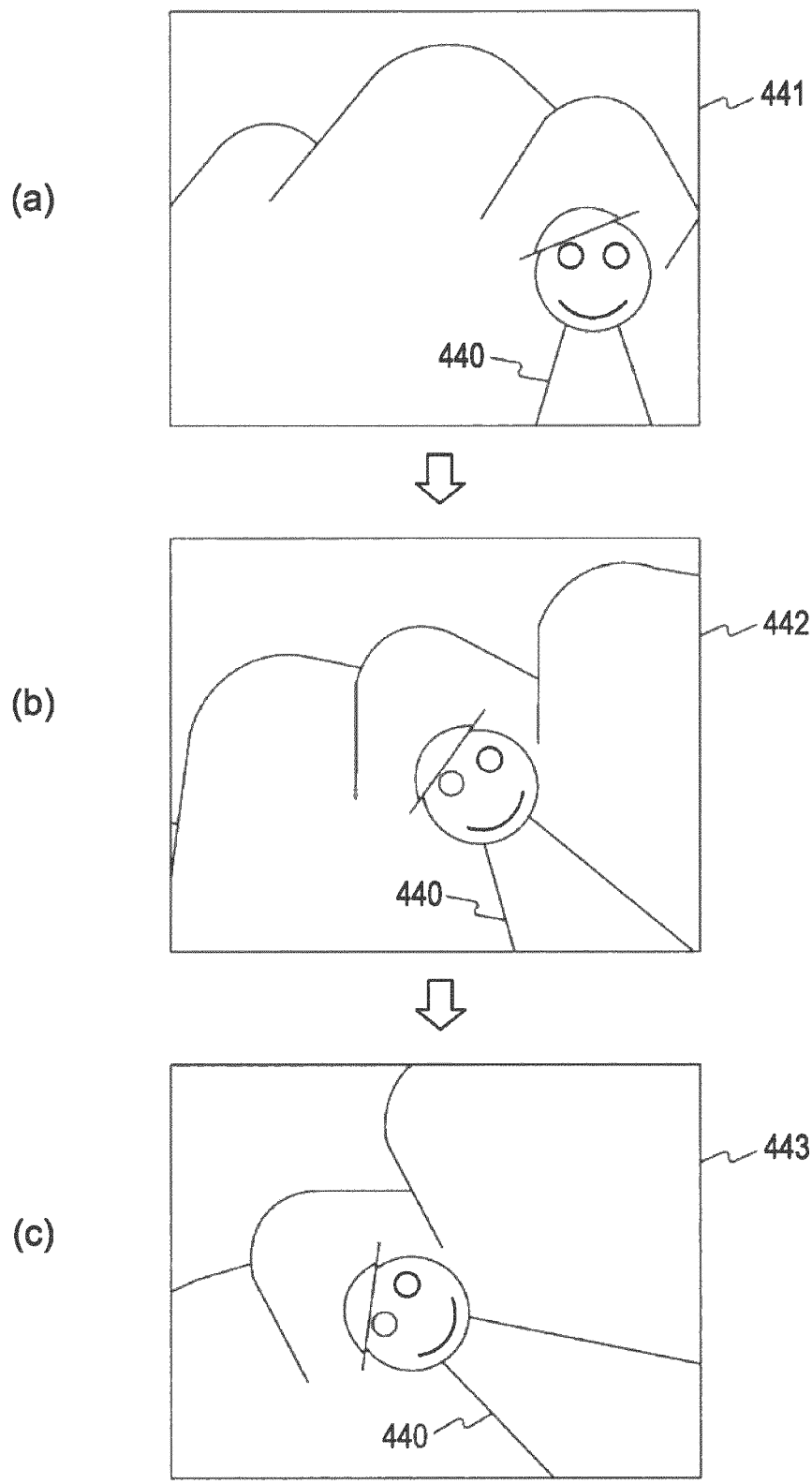
FIG. 21 is a diagram illustrating an example of the transition of a moving picture imaged by the camera.

FIG. 21 is a diagram illustrating an example of the transition of a moving picture imaged by the camera. FIG. 21 illustrates images 441 through 443 corresponding to consecutive frames included in a moving picture in the case of imaging a person 440 with a mountain as the background. This example illustrates a case where a user is performing imaging while rotating the camera with the optical axis direction as the rotation center. In this case, the person 440 included in the moving picture imaged by the camera is rotating gradually on an image making up the moving picture thereof. Note that, though the position of the camera is somewhat moved due to the rotation of the camera in some cases, with this example, description will be made without taking movement of the position of the camera into consideration.

Figure 22:
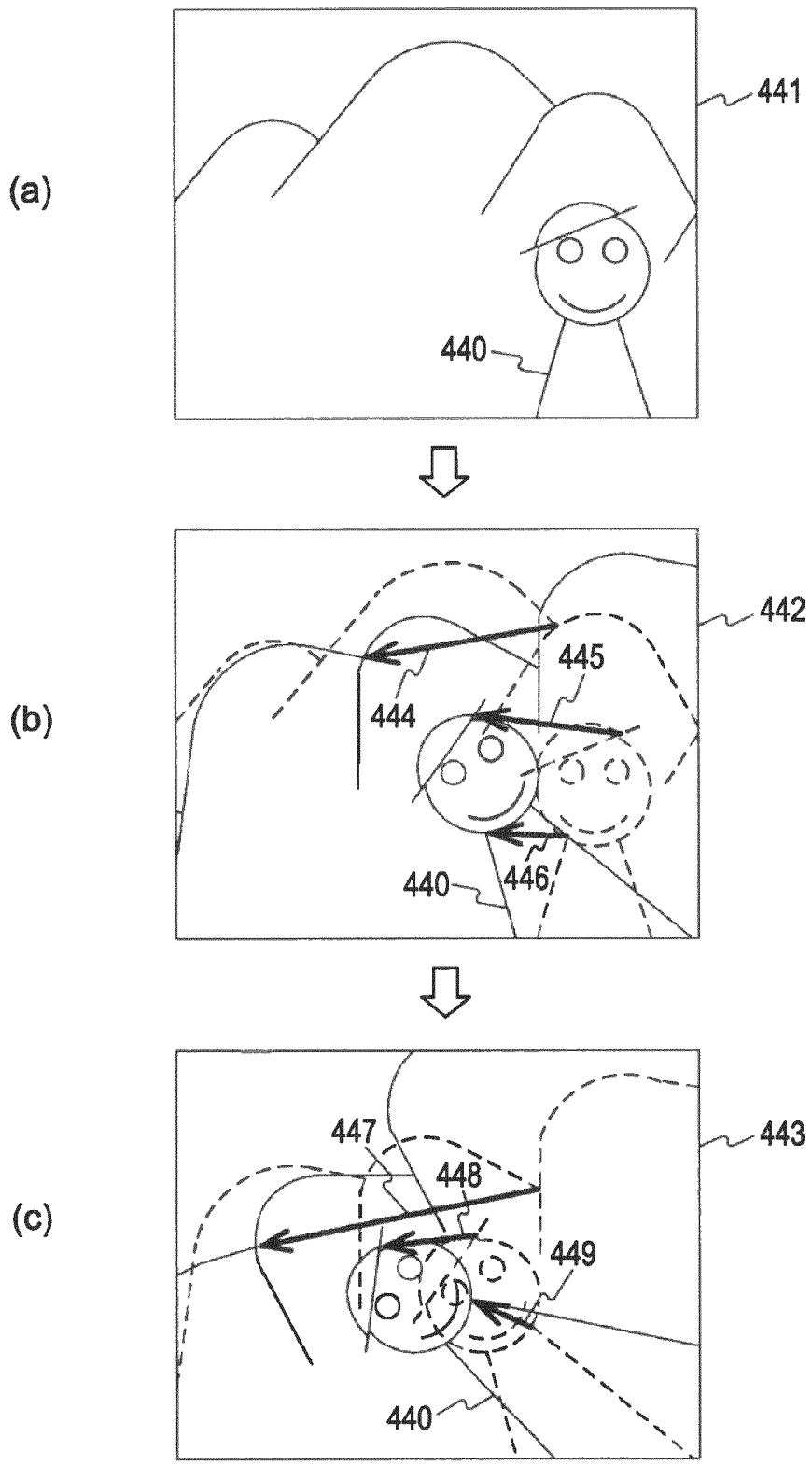
FIG. 22 is a diagram schematically illustrating the locus of a subject included in images selected by the compositing target image selecting unit according to an embodiment of the present invention.

FIG. 22 is a diagram schematically illustrating the locus of a subject included in the images 441 through 443 selected by the compositing target image selecting unit 170 according to an embodiment of the present invention. Note that an affine transformation parameter calculation example shown in FIG. 22 is the same as the affine transformation parameter calculation example shown in FIG. 16, and accordingly, description thereof will be omitted here.

FIG. 23 is a diagram illustrating an image compositing example in the case that images are composited by the image compositing unit 220 according to the first embodiment of the present invention. Note that an image compositing example shown in FIG. 23 is the same as the image compositing example shown in FIG. 17, and accordingly, description thereof will be omitted here.

Selection Example of Image Compositing Target Section

Next, description will be made in detail regarding a section selecting method to select a section used for selecting a compositing target image from a moving picture (image compositing target section), with reference to the drawings. With the first embodiment of the present invention, description will be made regarding an example wherein a section that satisfies the following conditions (1) through (4) is selected as an image compositing target section.

(1) The reliability of camera work detection is high.
(2) The zoom rate is small, i.e., change in zoom is small.
(3) Movement amount in the horizontal direction or vertical direction is equal to or greater than a certain number of pixels.
(4) The length of an image compositing target section is length within a certain range (e.g., within a range of 3 seconds to 20 seconds).

Also, with the first embodiment of the present invention, in the case that the following (a) and (b) conditions are satisfied, determination is made that the above condition (1) the reliability of camera work detection is high.

(a) Of feature points in the whole screen of an image, a value that indicates the rate of feature points that exhibit dominant motion exceeds a threshold.
(b) A change rate between frames is within a certain range. The change rate between frames is a value that indicates each component of camera work calculated by affine transformation parameters relating to between frames.

Figure 24:
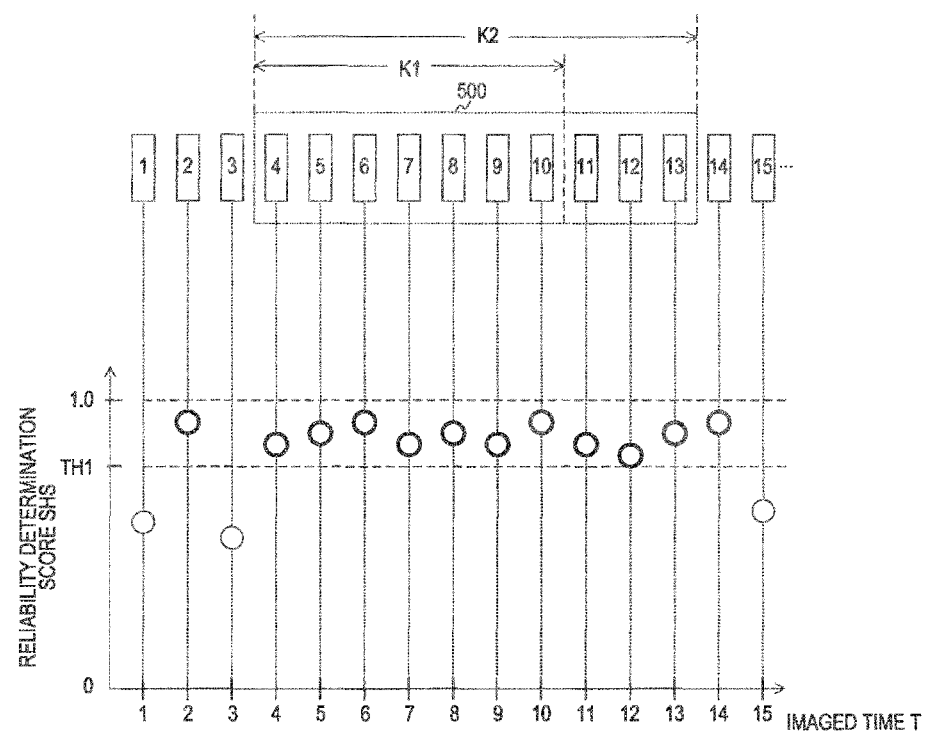
FIG. 24 is a diagram illustrating a reliability determination score calculated by the camera work detecting unit according to the first embodiment of the present invention, in a time-series manner.

FIG. 24 is a diagram illustrating a reliability determination score calculated by the camera work detecting unit 120 according to the first embodiment of the present invention, in a time-series manner. In FIG. 24, (a) schematically illustrates a frame serving as a reliability determination score calculation target using a rectangle. Note that, in (a) in FIG. 24, a frame serial number is appended to the inside of a rectangle that indicates each frame.

In FIG. 24, (b) illustrates a graph that represents a reliability determination score calculated regarding frames 1 through 15 shown in (a) in FIG. 24, for each frame. With the graph shown in (b) in FIG. 24, the horizontal axis is an axis that indicates imaging time, and the vertical axis is an axis that indicates the value of a reliability determination score calculated regarding each frame. Also, with the vertical axis, let us say that the threshold of the above condition (1) is a threshold TH1. Here, for example, a value of 0.5 through 0.8 can be set as the threshold TH1. Note that, with the horizontal axis of the graph shown in (b) in FIG. 24, each frame number corresponding to imaging point-in-time is shown. Here, a reliability determination score SHS is a value calculated by the reliability determination score calculating unit 124, and is stored in the metadata storage unit 210 in a manner correlated with each frame making up the moving picture file stored in the moving picture storage unit 200.

With this example, for the sake of explanatory convenience, as shown in (a) in FIG. 24, let us say that the certain range in the above condition (4) is a range between K1 and K2. Also, with the graph shown in (b) in FIG. 24, a reliability determination score calculated regarding each frame is represented with a white circle. Of white circles that represent a reliability determination score, a score exceeding the threshold TH1 is represented with a heavy-line circle.

As shown in (b) in FIG. 24, for example, the reliability determination score of frames 1 and 3 are below the threshold TH1, and accordingly, the frames 1 and 3 are not determined to be an image compositing target section candidate. Also, the reliability determination score of a frame 2 exceeds the threshold TH1, but the reliability scores of the adjacent frames 1 and 3 are below the threshold TH1, and accordingly, the above condition (4) is unsatisfied. Therefore, the frame 2 is not determined to be an image compositing target section candidate. On the other hand, for example, the reliability determination scores of frames 4 through 14 exceed the threshold TH1. However, the length of the frame 14 exceeds the certain range (range between K1 and K2) of the above condition (4). Therefore, of the frames 4 through 14, the frames 4 through 13 within the certain range of the above condition (4) are determined to be image compositing target section candidates 500 by the section selecting unit 160. That is to say, the section selecting unit 160 extracts consecutive frames, included within the certain range of the above condition (4), of which the reliability determination score SHS exceeds the threshold TH1, as image compositing target section candidates.

Subsequently, the section selecting unit 160 determines whether or not the change rate of each frame (each component of camera work) included in the image compositing target section candidates satisfies the following conditions (11) through (17).

$$XZth1 < XZ < XZth2 \quad (11)$$

$$YZth1 < YZ < YZth2 \quad (12)$$

$$XT < XTth \quad (13)$$

$$YT < YTth \quad (14)$$

$$XR < XRth \quad (15)$$

$$YR < YRth \quad (16)$$

$$|XR - YR| < ADRth \quad (17)$$

Here, XZ represents a zoom component in the X direction of camera work, and YZ represents a zoom component in the Y direction of camera work. Also, XT represents a translational component in the X direction of camera work, and YT represents a translational component in the Y direction of camera work. Also, XR represents a rotational component in the X direction of camera work, and YR represents a rotational component in the Y direction of camera work. Also, XZth1, XZth2, YZth1, YZth2, XTth, YTth, XRth, YRth, and ADRth represent a threshold.

For example, a value of 0.7 through 0.9 may be set as the thresholds XZth1 and YZth1. Also, for example, a value of 1.1 through 1.3 may be set as the thresholds XZth2 and YZth2. Also, for example, a value of W/20 through W/5 may be set as the threshold XTth. Note that W is a value that indicates the number of pixels in the horizontal direction of an image to be processed. Also, for example, a value of H/20 through H/5 may be set as the threshold YTth. Note that H is a value that indicates the number of pixels in the vertical direction of an image to be processed. Also, for example, 3 deg through 5 deg may be set as the thresholds XRth and YRth. Also, for example, 0.5 deg through 1.0 deg may be set as the threshold ADRth.

In the case that each component of the camera work of each frame included in the image compositing target section candidates extracted based on the reliability determination scores satisfies the conditions (11) through (17), determination is made whether or not the conditions (2) and (3) are satisfied. On the other hand, in the case that each component of the camera work of each frame included in the image compositing target section candidates does not satisfy the conditions (11) through (17), the image compositing target section candidates thereof are not determined to be image compositing target sections.

Figure 25:
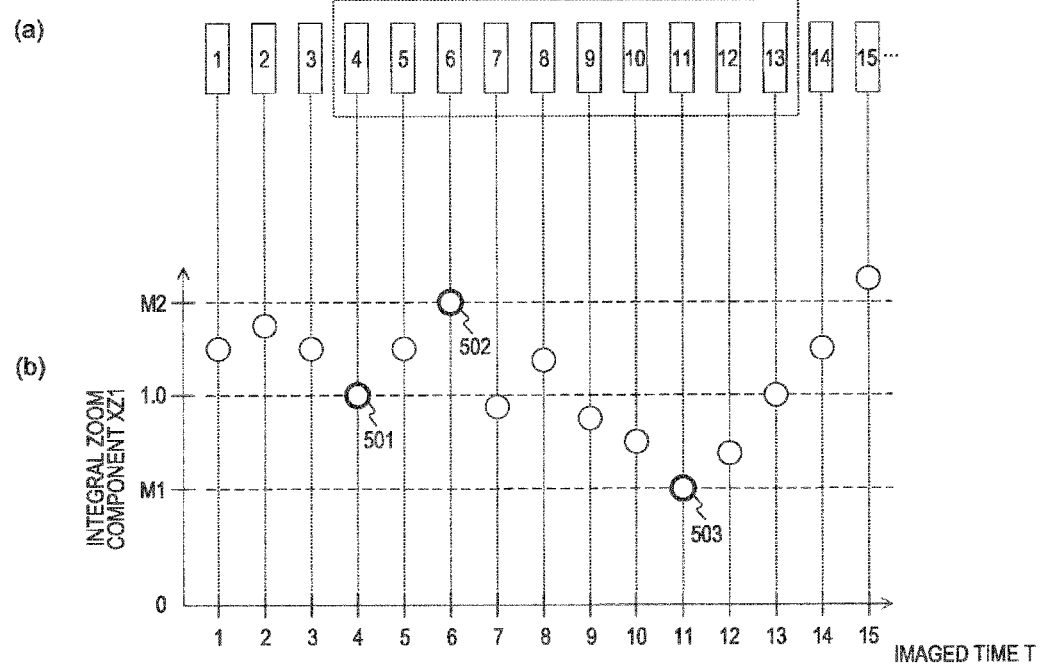
FIG. 25 is a diagram illustrating an integral zoom component calculated with an affine transformation parameter calculated by the camera work detecting unit according to the first embodiment of the present invention, in a time-series manner.

FIG. 25 is a diagram illustrating an integral zoom component calculated with affine transformation parameters calculated by the camera work detecting unit 120 according to the first embodiment of the present invention, in a time-series manner. In FIG. 25, (a) schematically illustrates a frame serving as an integral zoom component calculation target using a rectangle. Note that frames 1 through 15 shown in (a) in FIG. 25 are the same as those shown in (a) in FIG. 24.

In FIG. 25, (b) illustrates a graph that represents an integral zoom component in the horizontal direction (X direction) calculated regarding the frames 1 through 15 shown in (a) in FIG. 25 for each frame. With the graph shown in (b) in FIG. 25, the horizontal axis is an axis that indicates imaging point-in-time, and the vertical axis is an axis that indicates the value of an integral zoom component calculated regarding each frame. This integral zoom component is the value of a zoom component of an affine matrix calculated by multiplication of the affine matrix of the affine transformation parameters correlated with each frame from the reference frame to the target frame. Now, let us say that the affine transformation parameters correlated with the reference frame are the values of a unit matrix. Specifically, the value of the integral zoom component of the reference frame is 1.0, and the value of the integral zoom component of the target frame is a relative value as to the reference frame. Also, this integral zoom component is calculated regarding a zoom component in the X direction and a zoom component in the Y direction of camera work. Note that, with the example shown in FIG. 25, the integral zoom component calculated regarding the zoom components in the X direction is illustrated as an example.

With the graph shown in (b) in FIG. 25, the integral zoom component calculated regarding each frame is illustrated with a white circle. Also, of white circles that indicate the integral zoom components calculated regarding each of the frames included in the image compositing target section candidates 500, the white circle corresponding to the top frame is illustrated as an integral zoom component 501. Also, of white circles that indicate the integral zoom components calculated regarding each of the frames included in the image compositing target section candidates 500, the white circle that indicates the maximum value is illustrated as an integral zoom component 502, and the white circle that indicates the minimum value is illustrated as an integral zoom component 503. Note that the horizontal axis of the graph shown in (b) in FIG. 25 indicates each frame number according to imaging point-in-time. Also, with the vertical axis of the graph shown in (b) in FIG. 25, the value of the integral zoom component 502 that indicates the maximum value is illustrated as M2, and the value of the integral zoom component 503 that indicates the minimum value is illustrated as M1.

Now, the zoom rate used for the condition (2) is a value that indicates a ratio between the maximum value and the minimum value of the integral zoom components. This condition (2) is determined based on whether or not the zoom rate as to each frame included in the image compositing target section candidates is included in a certain range. This certain range may be, for example, a range below the threshold XZth2 such as shown in the following.

$$XZm1/XZm2 < XZth2$$

Here, XZm1 is the maximum value of the integral zoom components in the X direction calculated regarding each frame included in the image compositing target section candidates, and XZm2 is the minimum value of the integral zoom components thereof. Note that, for example, a value of 1.5 through 3.0 may be set as the threshold XZth2. Also, the zoom rate calculated regarding the zoom components in the Y direction can be determined based on whether or not the following expression is satisfied.

$$YZm1/YZm2 < YZth2$$

Here, YZm1 is the maximum value of the integral zoom components in the Y direction calculated regarding each frame included in the image compositing target section candidates, and YZm2 is the minimum value of the integral zoom components thereof. Note that, for example, a value of 1.5 through 3.0 may be set as the threshold YZth2.

In the case that the zoom rates in the X direction and in the Y direction calculated regarding each frame included in the image compositing target section candidates that satisfy the conditions (11) through (17) satisfy the condition (2), determination is made whether or not the condition (3) is satisfied. On the other hand, the zoom rates in the X direction and in the Y direction calculated regarding each frame included in the image compositing target section candidates do not satisfy the condition (2), the image compositing target section candidate thereof is not determined to be an image compositing target section.

Figure 26:
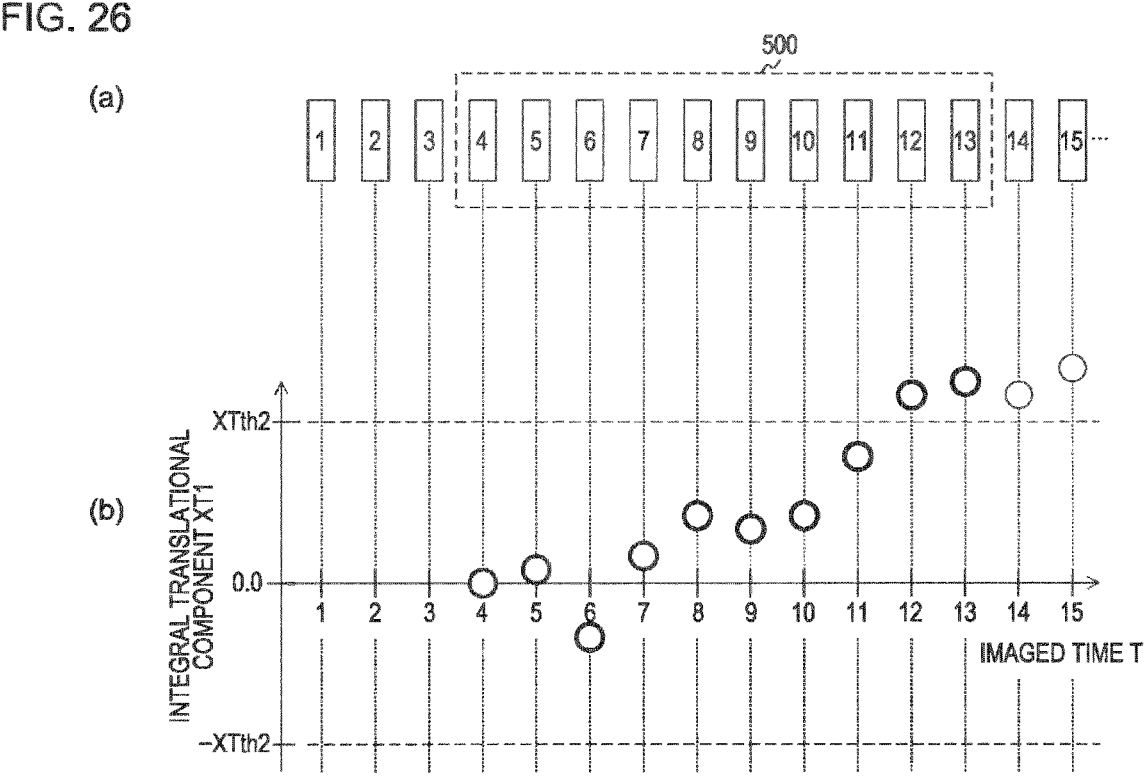
FIG. 26 is a diagram illustrating an integral translational component calculated with an affine transformation parameter calculated by the camera work detecting unit according to the first embodiment of the present invention, in a time-series manner.

FIG. 26 is a diagram illustrating an integral translational component calculated with affine transformation parameters calculated by the camera work detecting unit 120 according to the first embodiment of the present invention, in a time-series manner. In FIG. 26, (a) schematically illustrates a frame serving as an integral translational component calculation target using a rectangle. Note that the frames 1 through 15 shown in (a) in FIG. 26 are the same as those shown in (a) in FIG. 24.

In FIG. 26, (b) illustrates a graph that represents an integral translational component in the horizontal direction (X direction) calculated regarding the frames 1 through 15 shown in (a) in FIG. 26 for each frame. With the graph shown in (b) in FIG. 26, the horizontal axis is an axis that indicates imaging point-in-time, and the vertical axis is an axis that indicates the value of an integral translational component calculated regarding each frame. This integral translational component is the value of a translational component of an affine matrix calculated by multiplication of the affine matrix of the affine transformation parameters correlated with each frame from the reference frame to the target frame. Now, let us say that the affine transformation parameters correlated with the reference frame is the value of a unit matrix. Specifically, the value of the integral translational component of the reference frame is 0.0, and the value of the integral translational component of the target frame is a relative value as to the reference frame. Also, this integral translational component is calculated regarding a translational component in the X direction and a translational component in the Y direction of camera work. Note that, with the example shown in FIG. 26, the integral translational component calculated regarding the translational components in the X direction is illustrated as an example.

With the graph shown in (b) in FIG. 26, the integral translational component calculated regarding each frame is illustrated with a white circle. Also, a white circle that indicates an integral translational component calculated regarding each frame included in the image compositing target section candidates 500 is illustrated with a heavy line. Note that the horizontal axis of the graph shown in (b) in FIG. 26 indicates each frame number according to imaging point-in-time. Also, with the vertical axis of the graph shown in (b) in FIG. 26, the thresholds XTth2 and −XTth2 used for the condition (2) are indicated.

Here, the condition (3) is determined based on whether or not movement amount in the horizontal direction or vertical direction is equal to or greater than a certain number of pixels. Specifically, determination is made based on whether or not at least one of panning and tilting is relatively great. For example, such as shown in the following, determination is made based on whether or not the absolute value of the integral translational component XT1 exceeds the threshold XTth2.

$$|XT1| > XTth2$$

Here, for example, a value of 3W through 10W may be set as the threshold XTth2. Note that W is a value that indicates the number of pixels in the horizontal direction of an image. Also, with regard to the integral translational component YT1 in the Y direction as well, determination may be made based on whether or not the following expression is satisfied.

$$|YT1| > YTth2$$

Here, for example, a value of 3H through 10H may be set as the threshold YTth2. Note that H is a value that indicates the number of pixels in the vertical direction of an image.

For example, with the example shown in FIG. 26, the values of the integral translational components in the X direction calculated regarding the frames 12 and 13 included in the image compositing target section candidates 500 exceed the threshold XTth2. That is to say, with the example shown in FIG. 26, the absolute value of an integral translational component in the X direction calculated regarding each frame included in image compositing target section candidates 500 exceeds the threshold XTth2, and accordingly, determination is made that the condition (3) is satisfied. Also, even in the case that the absolute value of an integral translational component in the Y direction calculated regarding each frame included in image compositing target section candidates 500 exceeds the threshold XTth2, determination is made that the condition (3) is satisfied. Thus, the image compositing target section candidates determined to satisfy the condition (3) are selected by the section selecting unit 160 as image compositing target sections. On the other hand, in the case that neither the integral translational component in the X direction nor the integral translational component in the Y direction calculated regarding each frame included in the image compositing target section candidates thereof do not satisfy the condition (3), the image compositing target section candidates thereof are not determined to be image compositing target sections.

With the above example, determination is made whether or not the conditions (11) through (17) are satisfied regarding each frame included in the image compositing target section candidates that satisfy the conditions (1) and (4). Subsequently, determination is made whether or not the conditions (2) and (3) are satisfied regarding each frame included in the image compositing target section candidates that satisfy the conditions (11) and (17). However, these determinations may be made in a different sequence. Also, of the conditions (1) through (4), and the conditions (11) through (17), one of the determination conditions may be omitted. Also, for example, an image compositing target section may be selected using another determination condition regarding each frame included in the image compositing target section candidates.

For example, it may be set as a determination condition that a rotational rate is small, using an integral rotational component.

All of the frames included in the image compositing target section thus selected are used to create a composited image. However, for example, it can be conceived that an experience, which is not experienced by simple playback of a moving picture, may be provided to a user by creating a composited image, wherein multiple still images imaged over space of a relatively wide range at the same imaging place are joined together. That is to say, a panorama-style composited image made up of still images which is not experienced by from playback of a moving picture (e.g., such as an image in which photos are joined together) can be provided to the user. Therefore, with the first embodiment of the present invention, frames used for creation of a composited image are further selected from each frame included in the image compositing target section. Now, with the first embodiment of the present invention, an example will be described wherein an image including a face is selected preferentially at the image compositing target section, this image is selected a front-most frame, another frame is selected based on the overlaying rate with this front-most frame. Also, in the case that there are multiple images including a face, of the multiple faces, an image having the highest facial expression evaluated value (smiling face score) that indicates the degree of a smiling face may be selected as a front-most frame. Note that a blurring condition evaluated value or the like other than a facial expression evaluated value may be employed for determination.

Figure 27A:
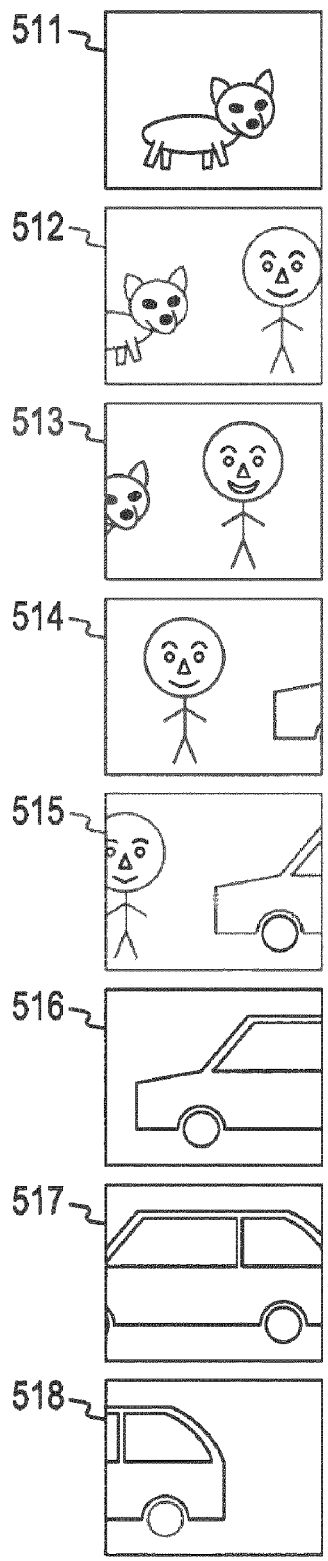
FIGS. 27A and 27B are diagrams schematically illustrating an image included in an image compositing target section selected by a section selecting unit according to the first embodiment of the present invention, in a time-series manner.
Figure 27B:
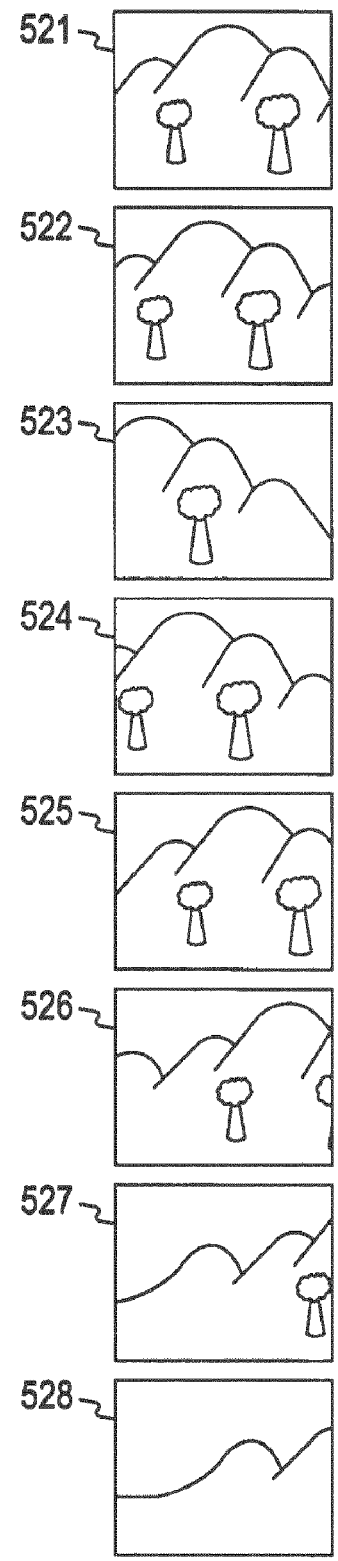

FIGS. 27A and 27B are diagrams schematically illustrating an image included in the image compositing target section selected by the section selecting unit 160 according to the first embodiment of the present invention, in a time-series manner. FIG. 27A illustrates the transition of an image in the case that a user has been shooting images while moving the direction of the lens of the camera in the horizontal direction with a stationary dog, person, and car as subjects. FIG. 27B illustrates the transition of an image in the case that a user has been shooting images while moving the direction of the lens of the camera in the horizontal direction with a tree and a mountain as subjects. Note that the images shown in FIGS. 27A through 27B are simplified for the sake of explanatory convenience, and the movement amount between consecutive two frames is illustrated greatly.

Of images 511 through 518 shown in FIG. 27A, the images 512 through 515 include a person's face. Also, let us say that of the faces included in the images 512 through 515, the facial expression evaluated value calculated regarding the face included in the image 513 is the highest value. In the case that an image included in the image compositing target section selected by the section selecting unit 160 includes a face, the compositing target image selecting unit 170 selects the image including a face as the front-most frame. Also, as shown in FIG. 27A, in the case that multiple images include a face, the image including a face having the highest value of facial expression evaluated value calculated regarding these faces is selected as the front-most frame. With the example shown in FIG. 27A, the image 513 is selected.

Also, images 521 through 528 shown in FIG. 27B do not include a person's face. Thus, in the case that an image included in the image compositing target section selected by the section selecting unit 160 does not include a face, the compositing target image selecting unit 170 selects the top image on the time axis of images included in the image compositing target section as the front-most frame. With the example shown in FIG. 27B, the image 521 corresponding to the top frame included in the image compositing target section is selected.

The front-most frame thus selected from the image compositing target section is taken as a reference frame, and another frame is selected base on this reference frame. With the first embodiment of the present invention, description will be made regarding an example wherein a frame is selected based on overlaid regions between images include in the image compositing target section.

Figure 28:
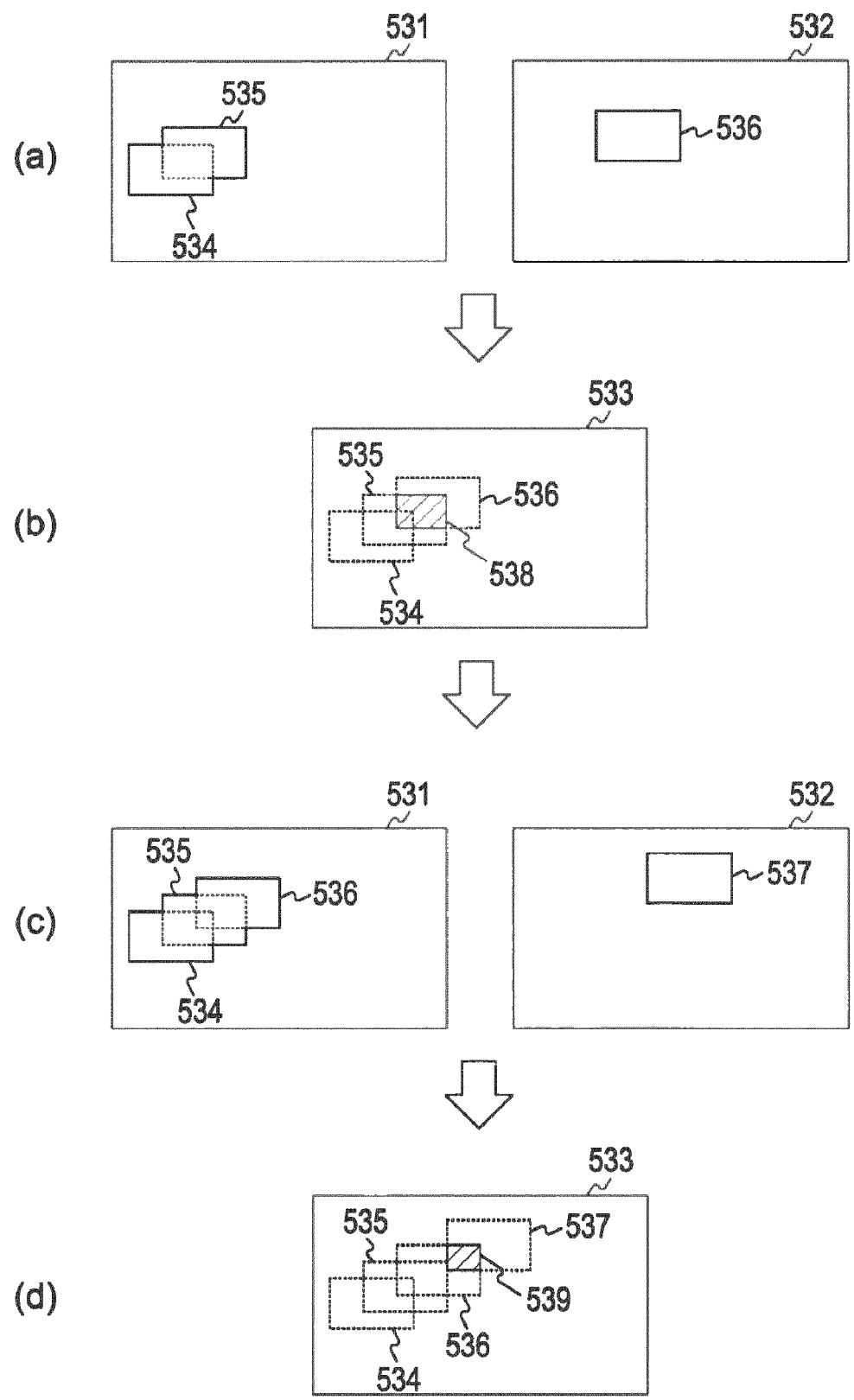
FIG. 28 is a diagram schematically illustrating a selecting method in the case that a compositing target image is selected by the compositing target image selecting unit according to the first embodiment of the present invention.

FIG. 28 is a diagram schematically illustrating a selecting method in the case that a compositing target image is selected by the compositing target image selecting unit 170 according to the first embodiment of the present invention. With this example, description will be made regarding a case where two work buffers are used to select another frame as to the front-most frame.

A first work buffer 531 and a second work buffer 532 are work buffers that represent each pixel making up an image by one bit. That it to say, in the case that an image is pasted to the first work buffer 531 and the second work buffer 532, a bit at the pasting position is set to on. Also, a selected image is pasted to the first work buffer 531 as a composited image, and one image serving as a selection determination target is subjected to affine transformation and pasted to the second work buffer 532. Subsequently, an overlaid portion between the composited image pasted to the first work buffer 531, and the image pasted to the second work buffer 532 is calculated. Now, let us say that the area of the region of the calculated overlaid portion is an area C, the area of the composited image pasted to the first work buffer 531 is an area A, and the area of the image pasted to the second work buffer 532 is an area B. In this case, a value of the area C/the area A, and a value of the area C/the area B are calculated, and of these two values, the greater value is calculated as an overlaying rate.

Subsequently, in the case that the calculated overlaying rate is below a threshold, the image thereof is selected. For example, 60% may be set as this threshold. The image wherein the calculated overlaying rate is below the threshold is selected as a compositing target image, and is also pasted to the first work buffer 531. Subsequently, the same determining process is executed regarding the next frame.

For example, let us say that a composited image between an image 534 selected as the front-most frame, and an image 535 selected next has been pasted to the first work buffer 531 shown in (a) in FIG. 28. Also, the region of the composited image created from the images 534 and 535 is illustrated with a solid line. Also, let us say that an image 536 serving as a determination target has been pasted to the second work buffer 532 shown in (a) in FIG. 28. Also, the region of the image 536 is illustrated with a solid-line rectangle. Now, the image serving as a determination target is subjected to affine transformation with the position of the front-most frame (image 534) pasted to the first work buffer 531 shown in (a) in FIG. 28 as a reference, and is then pasted to the second work buffer 532. This affine transformation is executed using the affine transformation parameters stored in the metadata storage unit 210. Note that the example shown in FIG. 28 is an example wherein of the image 536, only the position has been transformed, and the angle and size have not been transformed.

Subsequently, as shown in (b) in FIG. 28, an overlaid portion 538 between the composited image (composited image of the images 534 and 535) pasted to the first work buffer 531, and the image 536 pasted to the second work buffer 532 is calculated. Note that a work buffer range 533 shown in (b) in FIG. 28 is a range that indicates the size corresponding to the first work buffer 531 and the second work buffer 532. With this work buffer range 533, the calculated overlaid portion 538 is represented with a rectangle shaded internally, and other image portions are represented with a dotted line. Now, let us say that the area of the calculated overlaid portion 538 is an area C1, the area of the composited image (composited image of the images 534 and 535) pasted to the first work buffer 531 is an area A1, and the area of the image 536 pasted to the second work buffer 532 is an area B1. In this case, the value of the area A1 is greater than the value of the area B1, and accordingly, a value of the area C1/the area B1 is greater than a value of the area C1/the area A1. Therefore, the value of the area C1/the area B1 is calculated as an overlaid rate.

Subsequently, in the case that the calculated overlaying rate (the value of the area C1/the area B1) is below the threshold, the image 536 is selected as a compositing target image. Thus, in the case that the compositing target image has been selected, the values of a matrix are calculated wherein the affine matrixes of the affine transformation parameters from the front-most frame to the current frame are multiplied. Here, with regard to the affine transformation parameters of the front-most frame, the values of a unit matrix are used. Subsequently, the affine transformation parameters of the calculated matrix, and the frame number and face data of the selected compositing target image are recorded in the compositing target image metadata storage unit 270. Note that, with regard to the compositing target image selected as the front-most image, information that indicates the front-most frame is recorded in the compositing target image metadata storage unit 270 along with such information.

Also, in the case that the image 536 has been selected as a compositing target image, as shown in (c) in FIG. 28, the image 536 is pasted to the first work buffer 531. Specifically, the composited image of the images 534 through 536 is pasted to the first work buffer 531. Subsequently, as shown in (d) in FIG. 28, a determining process is executed regarding the next image 537 in the same way. On the other hand, in the case that the calculated overlaying rate is not below the threshold, the image 536 is not pasted to the first work buffer 531. In this case, the determining process is executed between the next image, the images 534 and 535.

Note that, with this example, a compositing target image is selected by calculating an overlaying rate sequentially using the two work buffers, but a compositing target image may be selected by calculating an overlaying rate using the affine transformation parameters alone stored in the metadata storage unit 210.

Figure 29:
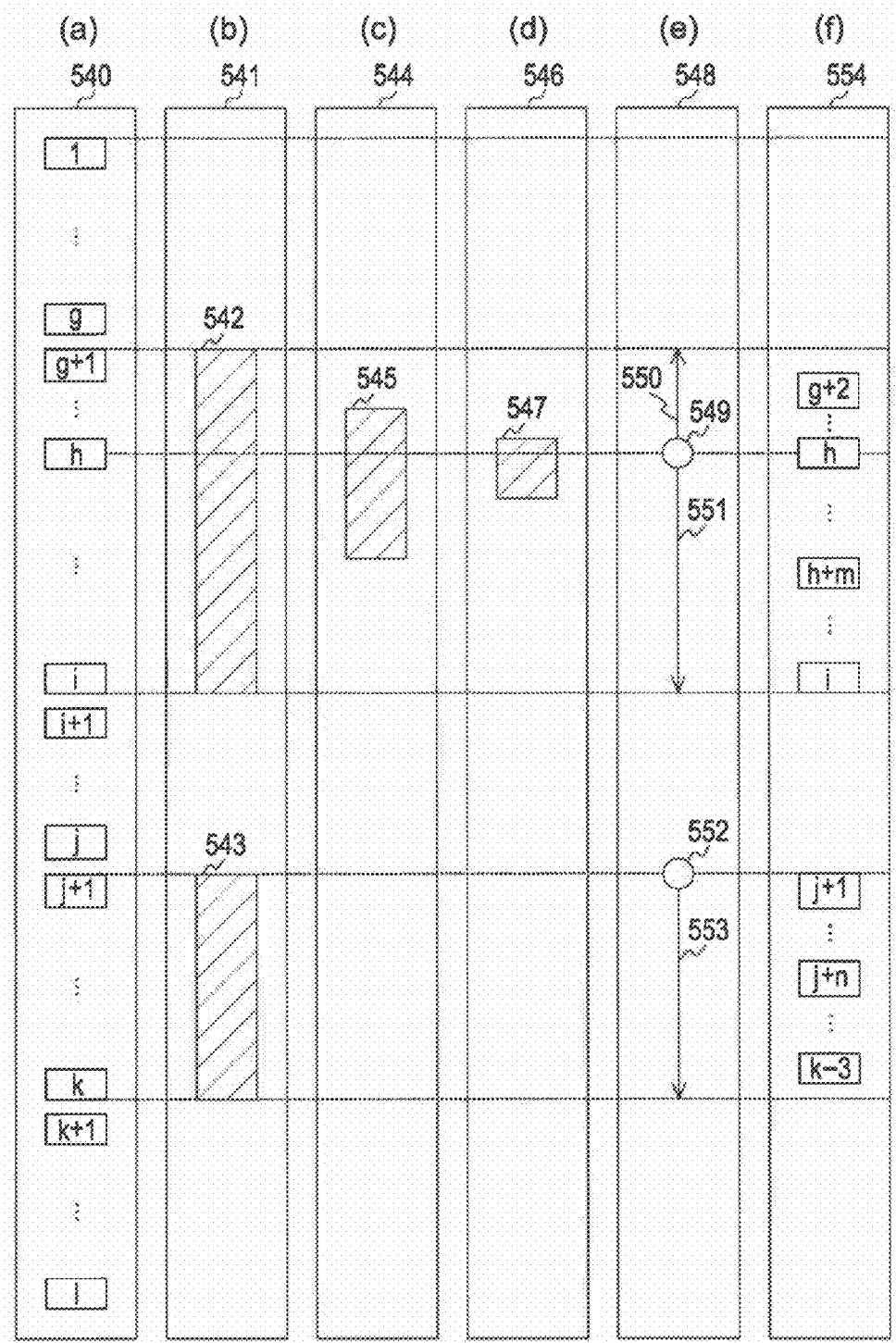
FIG. 29 is a diagram schematically illustrating a moving picture to be determined by the section selecting unit and the compositing target image selecting unit, according to the first embodiment of the present invention, in a time-series manner.

FIG. 29 is a diagram schematically illustrating a moving picture to be determined by the section selecting unit 160 and the compositing target image selecting unit 170, according to the first embodiment of the present invention, in a time-series manner. In FIG. 29, (a) schematically illustrates a frame making up a moving picture file 540 that is a moving picture file stored in the moving picture storage unit 200. In FIG. 29, (b) illustrates an image compositing target section group 541 that is a group of the image compositing target sections selected regarding the moving picture file 540. In FIG. 29, (c) illustrates a face detection section group 544 that is a group of face detection sections that indicate a section where a face has been detected regarding each frame making up the moving picture file 540. In FIG. 29, (d) illustrates a smiling face detection section group 546 that is a group of smiling face detection sections that indicate a section where a face detected regarding each frame making up the moving picture file 540 has been determined to be a smiling face. In FIG. 29, (e) illustrates the front-most frame selected at the image compositing target section, and a search direction 548 that is a direction where another frame is searched with the front-most frame as a reference frame. In FIG. 29, (f) illustrates a selection frame group 554 that is a group of frames (compositing target images) selected regarding the moving picture file 540. Note that each frame making up the moving picture file 540 is illustrated with a rectangle to which a frame number is appended internally. Also, each section is illustrated with a rectangle shaded internally. Also, in (e) in FIG. 29, the front-most frame is represented with a white circle, and the search direction from the front-most frame is represented with an arrow.

For example, let us say that the image compositing target sections 542 and 543 have been selected by the section selecting unit 160 regarding the moving picture file 540. Further, let us say that a face has been detected at the face detection section 545, of frames included in the image compositing target section 542. Also, let us say that of frames included in the face detection section 545, a facial expression evaluated value has been a certain value or more at the smiling face detection section 547, and has been determined to be a smiling face. With this example, let us say that of frames included in the smiling face detection section 547, a frame having the highest facial expression evaluated value is a frame h. In this case, the frame h is selected as the front-most frame 549 at the image compositing target section 542. Subsequently, a frame selecting process is executed toward a search direction 550 that is a front-sided search direction on the temporal axis, and a search direction 551 that is a rear-sided search direction on the temporal axis. This selecting method is the same as the selecting method shown in FIG. 28. In this case, for example, let us say that frames g+2, . . . , h, . . . , h+m, . . . , i have been selected.

Also, let us say that no face has been detected with each frame included in the image compositing target section 543. In this case, of frames included in the image compositing target section 543, the frame j+1 on the most front side on the temporal axis is selected as a front-most frame 552. Subsequently, a frame is selected toward a search direction 553 that is a search direction on the rear side on the temporal axis. This selecting method is the same as the selecting method shown in FIG. 28. In this case, for example, let us say that frames j+1, . . . , j+n, . . . , k−3 have been selected.

Thus, a single or multiple image compositing target sections are selected regarding a single moving picture file, and multiple frames are selected from the image compositing target sections thereof. A composited image is created using the multiple frames thus selected.

Thus, the identification number of the selected image compositing target section, and the selected each frame number are recorded in the compositing target image metadata storage unit 270 in a correlated manner. Simultaneously, the calculated affine transformation parameters, front-most frame information that indicates the front-most frame, and face data that is data relating to a detected face regarding a frame are recorded in the compositing target image metadata storage unit 270 in a correlated manner. A composited image can be displayed by the user operations using each piece of information stored in the compositing target image metadata storage unit 270. For example, a composited image of the frames g+2, . . . , h, . . . , h+m, . . . , i selected at the image compositing target section 542 can be displayed. Also, a composited image of frames j+1, . . . , j+n, . . . , k−3 selected at the image compositing target section 543 can be displayed.

Now, for example, in the case that a face is included in multiple frames making up a moving picture, and in the case that each facial expression evaluated value calculated regarding each face is lower than a certain value, the front-most frame may be selected using the position and size included in face detection information. For example, an image may be selected as the front-most frame wherein the position of the detected face is shifted to the center, and the size thereof is relatively great.

Image Compositing Example

Next, a compositing target image selected regarding a moving picture actually imaged by the camera, and a compositing example of the compositing target image are shown.

Figure 30:
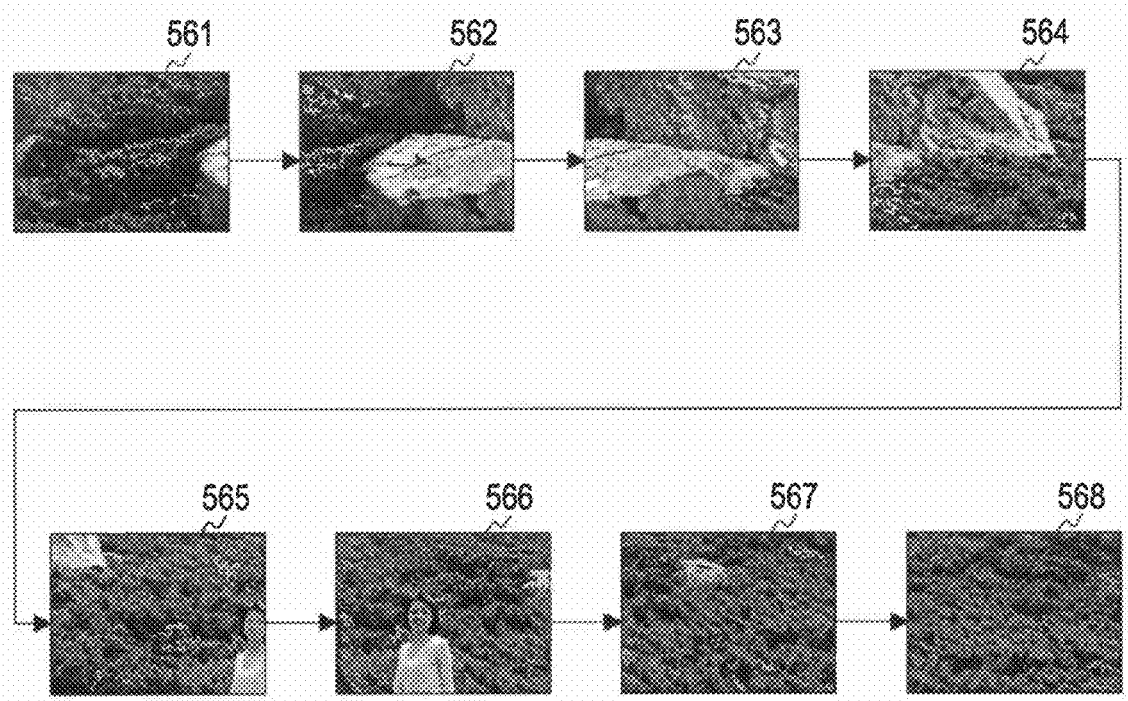
FIG. 30 is a diagram illustrating an example of a compositing target image selected regarding a moving picture imaged by the camera.

FIG. 30 is a diagram illustrating an example of a compositing target image selected regarding a moving picture imaged by the camera. FIG. 30 illustrates images 561 through 568 selected regarding a moving picture in the case that a lady standing with the slope of a mountain including rocks as the background is imaged while moving the camera. Let us say that this moving picture has been imaged in time-series along an arrow direction with the image corresponding to the frame on the front side on the temporal axis as an image 561. Also, let us say that the position of the lady serving as a subject is generally the center of the image, and an image 566 serving as a smiling face has been selected as the front-most frame.

FIGS. 31 and 32 are diagrams illustrating the transition of a composited image created by the image compositing unit 220 according to the first embodiment of the present invention. Images 571 through 578 shown in FIGS. 31 and 32 are images wherein a white frame is added to the peripheries of the images 561 through 568 shown in FIG. 30, and are the same as the images 561 through 568 except that a white frame is appended thereto.

For example, with the image 576 selected as the front-most frame as a reference, the size of a composited image to be created regarding the images 571 through 578 is calculated using the affine transformation parameters correlated with other images 561 through 575, 577, and 568. Based on the size of a composited image thus calculated, the position and size of the front-most frame is calculated. Subsequently, based on the position and size of the front-most frame, other images are subjected to affine transformation sequentially, and are composited in the image memory 230. For example, as shown in (a) through (d) in FIG. 31, and (a) in FIG. 32, of the frames selected at the same image compositing target section, the top framer through the immediately previous frame of the front-most image are composited sequentially in time series. That is to say, the images 571 through 575 are composited sequentially. Subsequently, for example, as shown in (b) and (c) in FIG. 32, of the frames selected at the same image compositing target section, the last frame through the immediately previous frame of the front-most image are composited sequentially in time series. That is to say, the images 577 and 578 are composited sequentially. Subsequently, for example, as shown in (d) in FIG. 32, the front-most image 576 selected at the same image compositing target section is composited. Thus, the images are overlaid from each of the top frame and the last frame regarding each frame selected at the same image compositing target section, and finally, the image selected as the front-most frame is overwritten thereupon. Thus, the image selected as the front-most frame is displayed on the top side, whereby a clear composited image can be created.

Thus, a metadata file stored in the compositing target image metadata storage unit 270 is used to composite partial images making up the moving picture, whereby a panorama-style composited image that represents one scene included in the moving picture thereof can be created. In this case, a white frame is added to frames that satisfy a certain condition to composite the frames without using all the consecutive frames making up the moving picture, whereby a composited image can be displayed such that photos are adhered together. In this case, an interesting image that completely differs from an image viewed at the time of common moving picture playback can be provided. Also, a panorama-style composited image can be displayed automatically regarding each scene included in the moving picture, whereby the user can readily understand whether or not the moving picture thereof is made up of what kinds of scenes. Also, an imaged scene can be displayed selectively, whereby a significant image can be provided to the user. Also, a person's smiling face image is taken as the front-most image, and based on this image another image serving as a compositing target is selected, whereby a panorama composited image can be provided such that accent is given to the person of a smiling face thereof.

An example has been shown so far wherein the image selected as the front-most frame is composited on the top in an overwrite manner, but for example, as shown in the next drawing, may be composited in an overwrite manner in the point-in-time order by the user selection.

FIG. 33 is another compositing example of a composited image created by the image compositing unit 220 according to the first embodiment of the present invention. In FIG. 33, (a) illustrates a display method selection screen 580 to select a display method for a composited image created by the image compositing unit 220 and displayed on the display unit 250. Check fields 581 and 582, a "panorama-style composited image display" button 583, and a "cancel" button 584 are provided to the display method selection screen 580.

The check field 581 is, as shown in FIGS. 31 and 32, a check field used for selecting a display method wherein the front-most frame is overlaid and composited on the top side and displayed. The check field 582 is, as shown in (b) in FIG. 33, a check field used for selecting a display method wherein each frame is composited and displayed while being overlaid in the time-series sequence. Operation input to add a check mark to these check fields is performed using a cursor 585.

The "panorama-style composited image display" button 583 is a button to be pressed at the time of displaying a composited image on the display unit 250. That is to say, after a check mark is added to one of the check fields 581 and 582, the "panorama-style composited image display" button 583 is pressed using the cursor 585, whereby images composited by the compositing method to which a check mark has been added are displayed sequentially.

The "cancel" button 584 is a button to be pressed in the case of eliminating the check mark added to one of the check fields 581 and 582.

For example, in the case that the "panorama-style composited image display" button 583 has been pressed in a state in which a check mark is added to the check field 581, as shown in FIGS. 32 and 33, the frames on both sides of the front-most frame are composited sequentially, and the front-most frame is overlaid and composited on the top side. Also, in the case that the "panorama-style composited image display" button 583 has been pressed in a state in which a check mark is added to the check field 582, as shown in (b) in FIG. 33, each frame is composited and displayed by being overlaid in the time-series sequence.

In FIG. 33, (b) illustrates the images 571 through 578 have been composited in the time-series sequence. Note that the images 571 through 578 are the same as the images 571 through 578 shown in FIGS. 31 and 32. Thus, in the case that images are composited in the time-series sequence, imaging time can be clearly understood with reference to the displayed composited image. However, for example, the next image is overwritten up to a region near a person included in the image 576 selected as the front-most frame, there is a possibility that the person thereof may be hidden. Therefore, for example, face data stored in the compositing target image metadata storage unit 270 in correlated with the image 576 is used, whereby other images can be prevented from overlaying on a certain range from the face region.

In FIG. 33, (c) schematically illustrates a case where an image overwritten within a certain range (e.g., distance L1) from a face region 586 included in the image 576 corresponding to the front-most frame. For example, as shown in (c) in FIG. 33, in the case that the images 571 through 578 are composited normally in time series, the image 577 is overwritten within the distance L1 from the face region 586 included in the image 576. Therefore, as shown in (c) in FIG. 33, the image 577 is moved in an arrow direction 587 so as to be apart the distance L1 or more from the face region 586 included in the image 576. Thus, in the case that the image overlaid on the upper side of the front-most image is moved, the images after the moved image are also moved by the same distance. That is to say, the image 578 is moved by the same distance as the image 577. Thus, for example, as shown in (c) in FIG. 33, the surroundings of a person's face included in the image 576 are seen, whereby a composited image can be further enjoyed.

Also, an arrangement may be made wherein composited images relating to a single or multiple moving pictures are created and stored beforehand, each composited image thus stored is displayed based on the user's operation. Alternatively, an arrangement may be made wherein the compositing transition of a composited image is stored sequentially for each image beforehand, such transition is displayed sequentially.

Operation Example of Image Processing Apparatus

Next, the operation of the image processing apparatus 100 according to the first embodiment of the present invention will be described with reference to the drawings.

Figure 34:
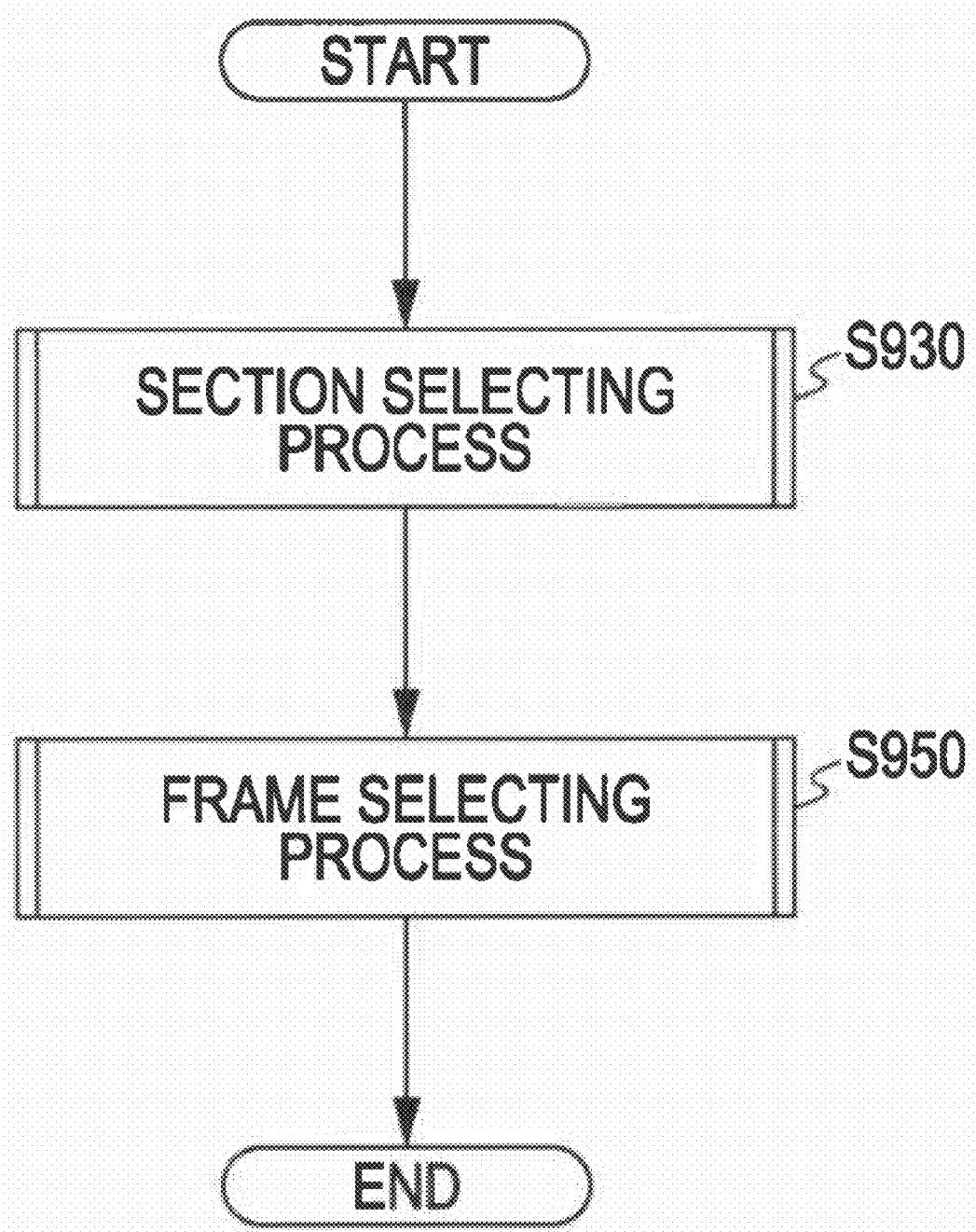
FIG. 34 is a flowchart illustrating the procedure of a compositing target image metadata recording process by the image processing apparatus according to the first embodiment of the present invention.

FIG. 34 is a flowchart illustrating the procedure of a compositing target image metadata recording process by the image processing apparatus 100 according to the first embodiment of the present invention.

First, the section selecting unit 160 executes a section extracting process (step S930). This section selecting process will be described in detail with reference to FIG. 35. Subsequently, the compositing target image selecting unit 170 executes a frame selecting process (step S950). This frame selecting process will be described in detail with reference to FIG. 36. Note that steps S930 and S950 are examples of the selecting procedure referred to in the Summary of the Invention.

Figure 35:
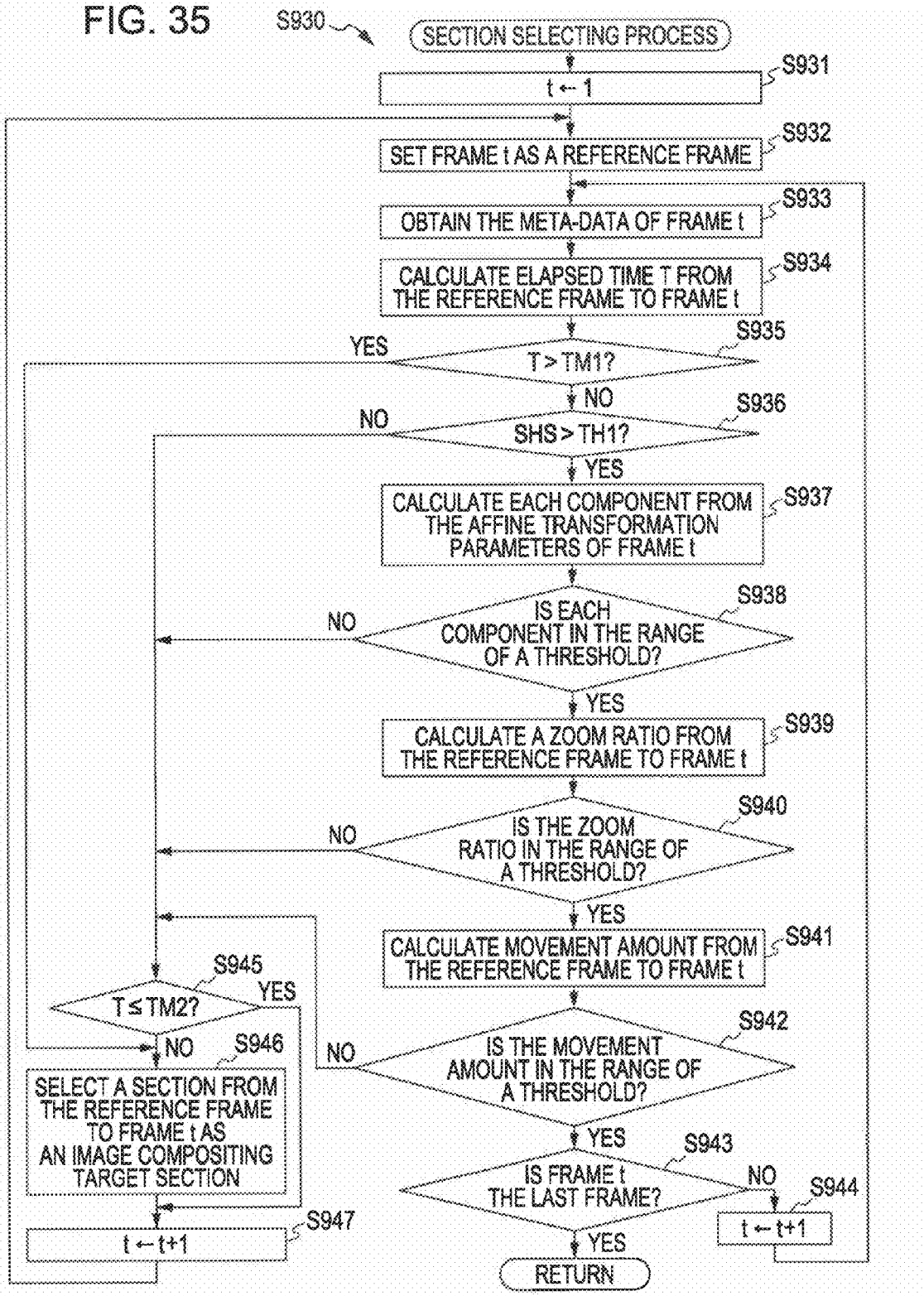
FIG. 35 is a flowchart illustrating a section extracting procedure included in the procedure of the compositing target image metadata recording process by the image processing apparatus according to the first embodiment of the present invention.

FIG. 35 is a flowchart illustrating a section extracting procedure (the procedure in step S930 shown in FIG. 34) included in the procedure of the compositing target image metadata recording process by the image processing apparatus 100 according to the first embodiment of the present invention.

First, a variable t is initialized to "1" (step S931), and a frame t making up a moving picture file is set as a reference frame (step S932). Subsequently, the affine translation parameter and reliability determination score corresponding to the frame t are obtained from a metadata file stored in the metadata storage unit 210 (step S933).

Subsequently, elapsed time T from the reference frame to the frame t is calculated (step S934), and determination is made whether or not the elapsed time T exceeds a threshold TM1 (step S935). In the case that the elapsed time T exceeds the threshold TM1 (step S935), the flow proceeds to step S946. On the other hand, in the case that the elapsed time T does not exceed the threshold TM1 (step S935), determination is made whether or not the reliability determination score SHS corresponding to the frame t exceeds the threshold TH1 (step S936). In the case that the reliability determination score SHS corresponding to the frame t exceeds the threshold TH1 (step S936), each component of the camera work is calculated from the affine transformation parameters corresponding to the frame t (step S937). Subsequently, determination is made whether or not all the values of the components of the camera work are included in the range of a threshold (step S938). In the case that all the values of the components of the camera work are included in the range of a threshold (step S938), the zoom rate corresponding to each frame from the reference frame to the frame t is calculated (step S939).

Subsequently, determination is made whether or not the calculated zoom rate is included in the range of a threshold (step S940). In the case that the calculated zoom rate is included in the range of a threshold (step S940), the movement amount corresponding to each frame from the reference frame to the frame t (integral translational component) is calculated (step S941). Subsequently, determination is made whether or not the calculated movement amount is included in the range of a threshold (step S942). In the case that the calculated movement amount is included in the range of a threshold (step S942), determination is made whether or not the frame t is the last frame, of frames making up a moving picture to be processed (step S943). In the case that the frame t is not the last frame (step S943), "1" is added to the variable t (step S944), and the flow returns to step S933, where the section selecting process is repeated. On the other hand, in the case that the frame t is the last frame (step S943), the section selecting process is ended.

Also, in the case that the reliability determination score SHS corresponding to the frame t does not exceed the threshold TH1 (step S936), or in the case that all the values of the components of the camera work are not included in the range of a threshold (step S938), the flow proceeds to step S945. Also, in the case that the calculated zoom rate is not included in the range of a threshold (step S940), or in the case that the calculated movement amount is not included in the range of a threshold (step S942), the flow proceeds to step S945.

Subsequently, determination is made whether or not the elapsed time T is below an image compositing target section range TM2 (step S945). In the case that the elapsed time T is not below the image compositing target section range TM2 (step S945), the section from the reference frame to the frame t is selected as an image compositing target section (step S946). On the other hand, in the case that the elapsed time T is below the image compositing target section range TM2 (step S945), "1" is added to the variable t (step S947), and the flow returns to step S932, where the section selecting process is repeated.

Figure 36:
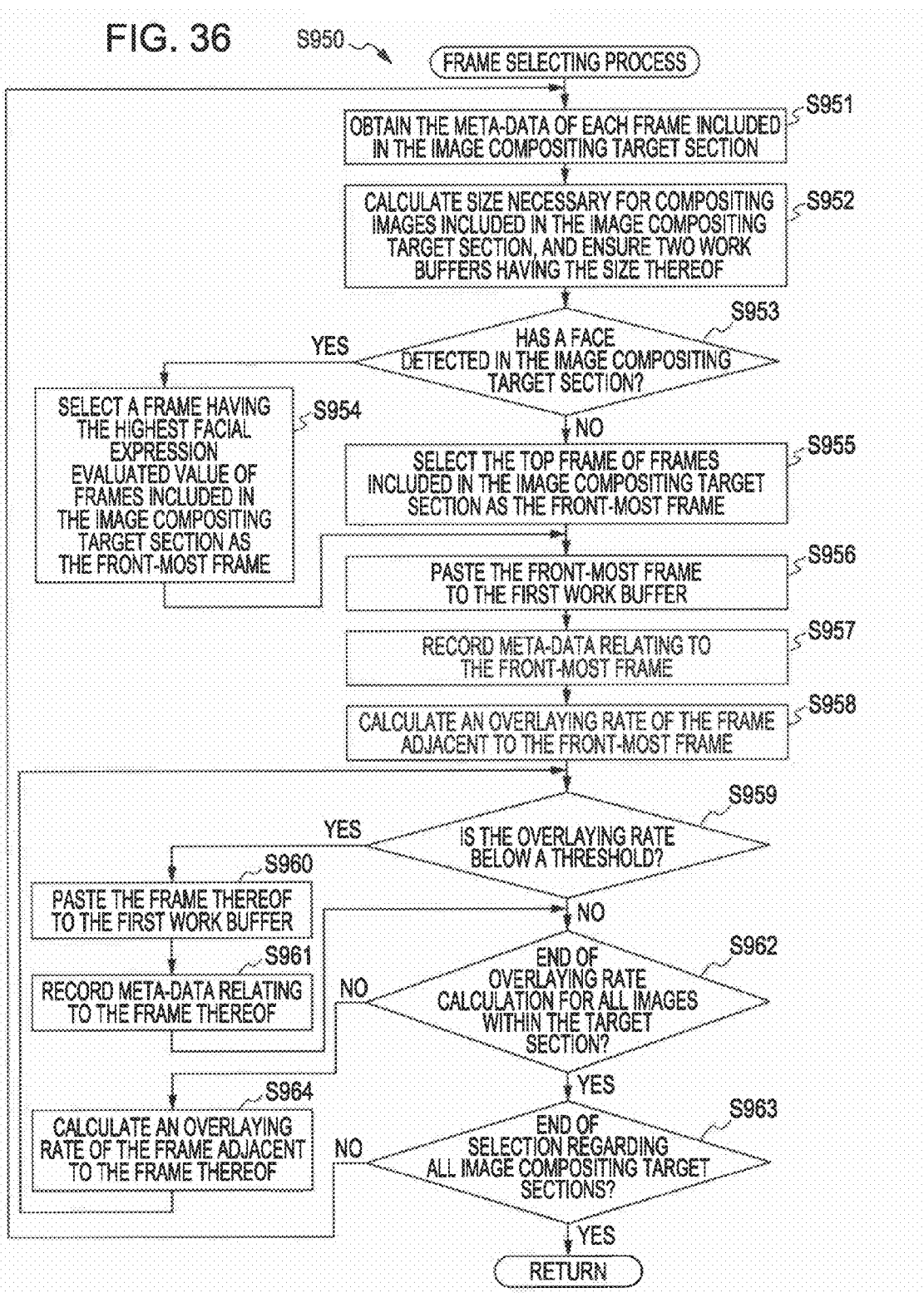
FIG. 36 is a flowchart illustrating a frame selecting procedure included in the procedure of the compositing target image metadata recording process by the image processing apparatus according to the first embodiment of the present invention.

FIG. 36 is a flowchart illustrating a frame selecting procedure (the procedure in step S950 shown in FIG. 34) included in the procedure of the compositing target image metadata recording process by the image processing apparatus 100 according to the first embodiment of the present invention.

First, the affine transformation parameters, face detection information, and facial expression evaluated value corresponding to each frame included in one of the image compositing target section selected by the section selecting unit 160 are obtained from a metadata file store in the metadata storage unit 210 (step S951). Subsequently, the size for compositing the image corresponding to each frame is calculated using the affine transformation parameters corresponding to each frame included in the obtained image compositing target section, and two work buffers having this size are secured (step S952).

Subsequently, determination is made based on the obtained face detection information whether or not a face is included in the image corresponding to each frame included in the image compositing target section serving as a selection target (step S953). In the case that a face is included in the image corresponding to each frame (step S953), the image having the highest value of the facial expression evaluated value corresponding to each image including a face is selected as the front-most frame (step S954). On the other hand, in the case that no face is included in the image corresponding to each frame (step S953), the top frame of the frames included in the image compositing target section is selected as the front-most frame (step S955).

Subsequently, the selected front-most frame is pasted to the first work buffer (step S956), and each piece of metadata relating to the selected front-most frame is recorded in the compositing target image metadata storage unit 270 (step S957). Subsequently, an overlaying rate between the selected front-most frame, and the frame adjacent to one of the directions of the front-most frame is calculated (step S958). That is to say, the frame serving as an overlaying rate calculation target is pasted to the second work buffer, and an overlaying rate as to the front-most frame pasted to the first work buffer is calculated.

Subsequently, determination is made whether or not the calculated overlaying rate is below a threshold (step S959). In the case that the calculated overlaying rate is below a threshold (step S959), the frame serving as the overlaying rate calculation target is selected, and the selected frame is pasted to the first work buffer (step S960). Subsequently, each piece of metadata relating to the selected frame is recorded in the compositing target image metadata storage unit 270 (step S961), and the flow proceeds to step S962.

On the other hand, in the case that the calculated overlaying rate is not below a threshold (step S959), determination is made whether or not calculation of an overlaying rate regarding each frame included in the image compositing target section serving as a selection target has been completed (step S962). In the case that calculation of an overlaying rate regarding each frame has not been completed (step S962), the overlaying rate of a frame adjacent to the frame of which the overlaying rate has been calculated immediately before is calculated (step S964). That is to say, the frame serving as an overlaying rate calculation target is pasted to the second work buffer, and an overlaying rate as to the composited image pasted to the first work buffer is calculated. Note that, in the case that the frame of which the overlaying rate has been calculated immediately before is the top frame or the last frame of the image compositing target section, the overlaying rate of the frame adjacent to the other direction of the front-most frame is calculated.

In the case that calculation of an overlaying rate regarding each frame included in the image compositing target section serving as a selection target has been completed (step S962), determination is made whether or not the frame selecting process has been completed regarding all of the image compositing target sections selected by the section selecting unit 160 (step S963). In the case that the frame selecting process has not been completed regarding all the image compositing target sections (step S963), the flow returns to step S951, where the frame selecting process is repeated (steps S951 through S964). On the other hand, in the case that the frame selecting process has been completed regarding all the image compositing target sections (step S963), the operation of the frame selecting process is ended.

Figure 37:
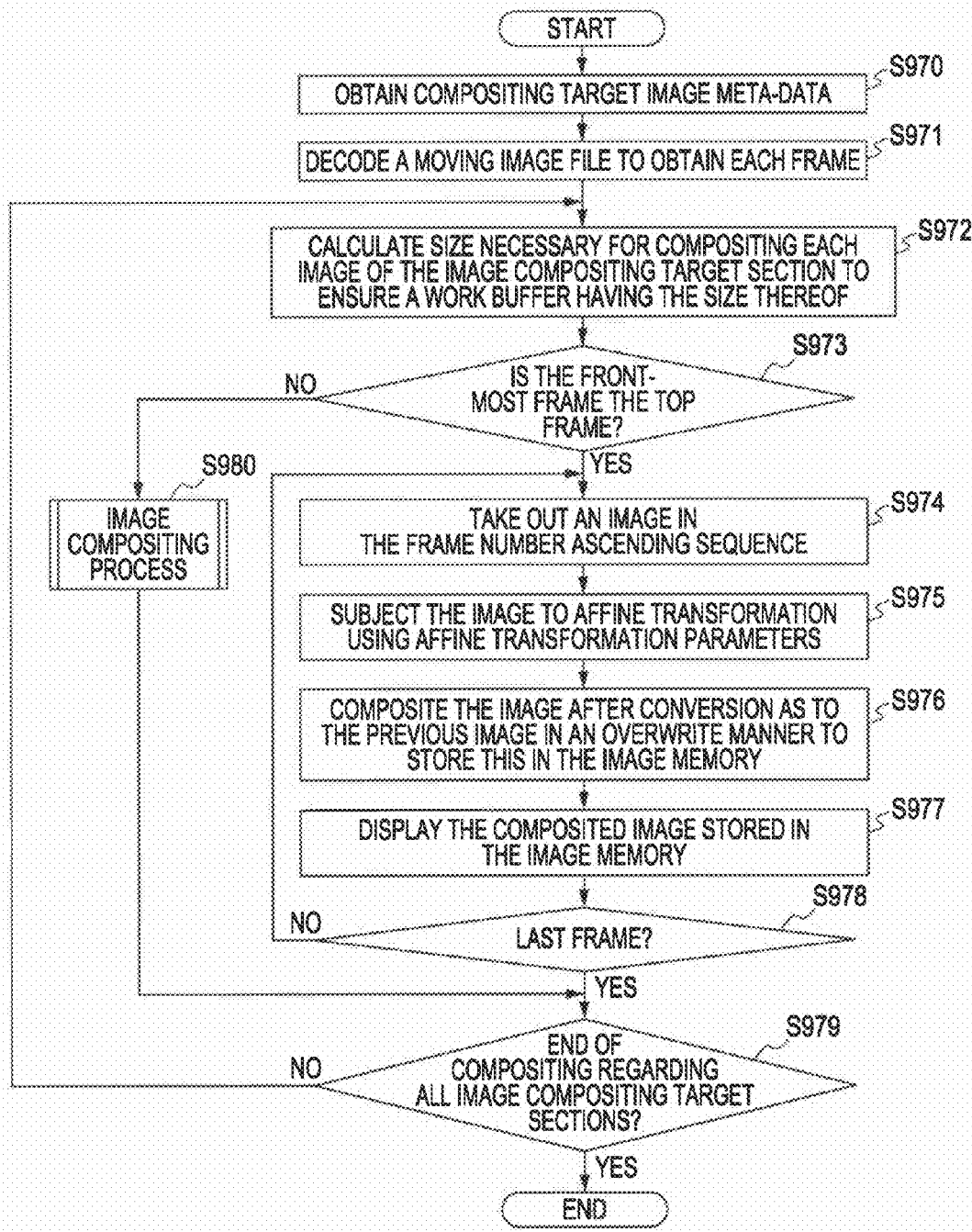
FIG. 37 is a flowchart illustrating the procedure of a composited image display process by the image processing apparatus according to the first embodiment of the present invention.

FIG. 37 is a flowchart illustrating the procedure of a composited image display process by the image processing apparatus 100 according to the first embodiment of the present invention. With this example, the front-most frame is overlaid and composited on the top side. Also, with this example, description will be made regarding an example wherein composited images relating to a moving picture file stored in the moving picture storage unit 200 are displayed sequentially.

First, the file obtaining unit 180 obtains each piece of metadata stored in the compositing target image metadata storage unit 270 (step S970). Subsequently, the file obtaining unit 180 decodes the moving picture file corresponding to each piece of metadata obtained, and obtains each frame making up the moving picture file (step S971). Subsequently, the size for compositing the image corresponding to each frame is calculated using each of affine transformation parameters included in the metadata of one of the obtained image compositing target sections serving as a compositing target, and a work buffer having this size is secured in the image memory 230 (step S972). Also, based on the size of the composited image thus calculated, the position and size of the front-most frame are calculated.

Subsequently, determination is made based on the front-most frame information included in the obtained metadata whether or not the front-most frame is the top frame at the image compositing target section (step S973). In the case that the front-most frame is the top frame at the image compositing target section (step S973), of each frame included in the obtained metadata, images are extracted in the ascending order of frame numbers (step S974).

Subsequently, the image transforming unit 190 uses the affine transformation parameters correlated with the extracted image to subject the image thereof to affine transformation (step S975). Subsequently, the image compositing unit 220 adds a white frame to the periphery of the image subjected to affine transformation, and holds the image to which the white frame has been added in the image memory 230 (step S976). That is to say, the image subjected to affine transformation to which the white frame has been added is composited as to a history image stored in the image memory 230. Note that in the case of the first image, only the image thereof is held in the image memory 230. Subsequently, the display control unit 240 controls the display unit 250 to display the composited image held at the image memory 230 (step S977). Subsequently, determination is made whether or not the image held at the image memory 230 is the last frame at the image compositing target section serving as a compositing target (step S978). In the case that the image held at the image memory 230 is the last frame (step S978), determination is made whether or not the composited image display process has been completed regarding all the image compositing target sections (step S979). In the case that the composited image display process has not been completed regarding all the image compositing target sections (step S979), the flow returns to step S972, where the composited image display process is repeated (steps S972 through 5978 and S980). On the other hand, in the case that the composited image display process has been completed regarding all the image compositing target sections (step S979), the operation of the composited image display process is ended.

Also, in the case that the front-most frame is not the top frame at the image compositing target section (step S973), an image compositing process is executed (step S980). This image compositing process will be described in detail with reference to FIG. 38.

Figure 38:
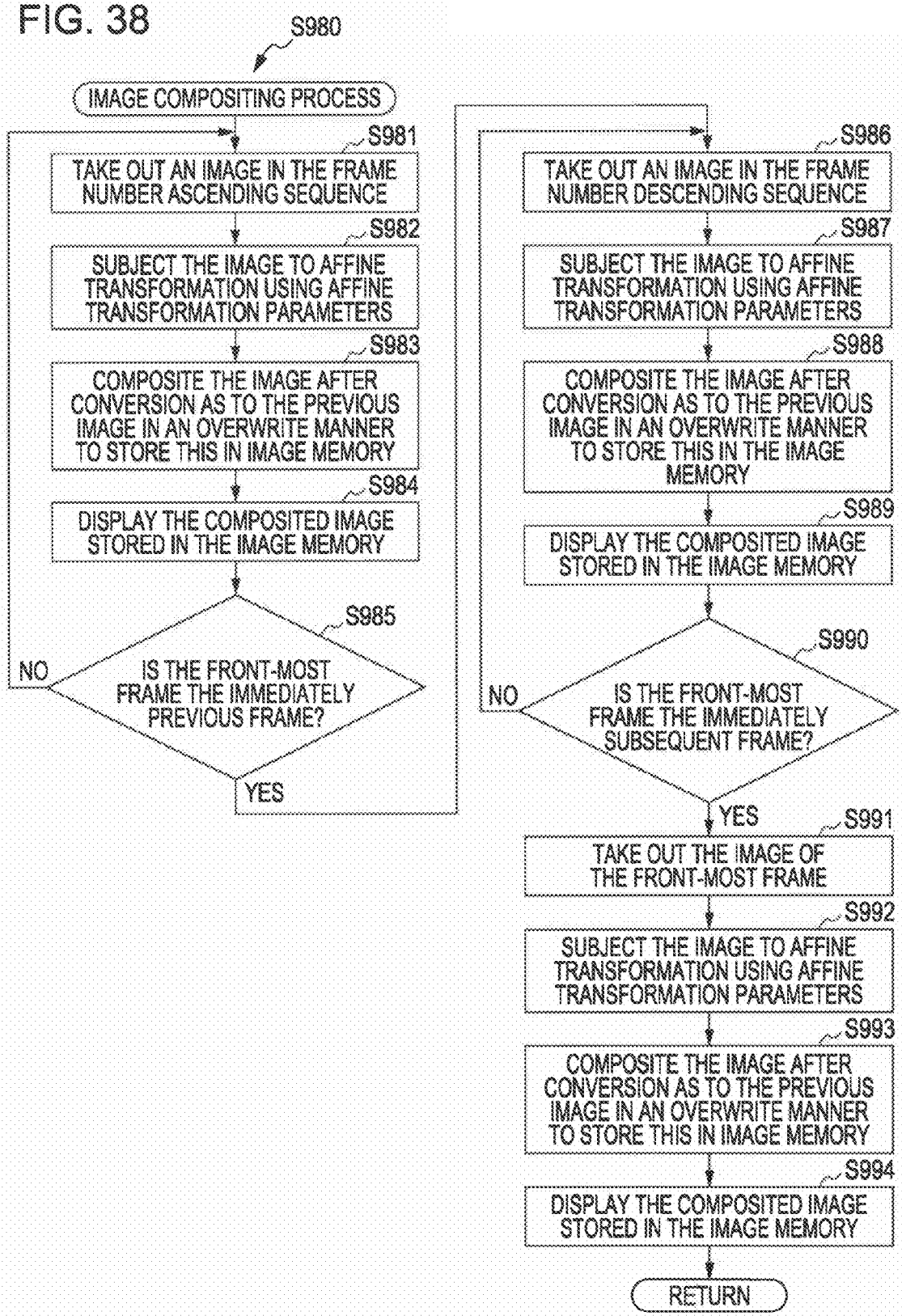
FIG. 38 is a flowchart illustrating an image compositing procedure included in the procedure of the composited image display process by the image processing apparatus according to the first embodiment of the present invention.

FIG. 38 is a flowchart illustrating an image compositing procedure (the procedure in step S980 shown in FIG. 37) included in the procedure of the composited image display process by the image processing apparatus 100 according to the first embodiment of the present invention. With this example, after image compositing is executed toward the front-most frame from the top frame at the image compositing target section, image compositing is executed toward the front-most frame from the last frame, and finally the front-most frame is composited.

First, of each frame included in the obtained metadata, images are extracted in the ascending order of frame numbers (step S981). Subsequently, the image transforming unit 190 uses the affine transformation parameters correlated with the extracted image to subject the image thereof to affine transformation (step S982). Subsequently, the image compositing unit 220 adds a white frame to the periphery of the image subjected to affine transformation, and holds the image to which the white frame has been added in the image memory 230 (step S983). That is to say, the image subjected to affine transformation to which the white frame has been added is composited as to a history image stored in the image memory 230. Note that in the case of the first image, only the image thereof is held in the image memory 230. Subsequently, the display control unit 240 controls the display unit 250 to display the composited image held at the image memory 230 (step S984). Subsequently, determination is made whether or not the image held at the image memory 230 is the frame immediately before the front-most frame at the image compositing target section serving as a compositing target (step S985). In the case that the image held at the image memory 230 is not the frame immediately before the front-most frame (step S985), the flow returns to step S981, where the image compositing process is repeated from the top frame to the frame immediately before the front-most frame (steps S981 through S984).

On the other hand, in the case that image held at the image memory 230 is the frame immediately before the front-most frame (step S985), of each frame included in the obtained metadata, images are extracted sequentially in the descending order of frame numbers (step S986). Subsequently, the image transforming unit 190 uses the affine transformation parameters correlated with the extracted image to subject the image thereof to affine transformation (step S987). Subsequently, the image compositing unit 220 adds a white frame to the periphery of the image subjected to affine transformation, and holds this image to which the white frame has been added in the image memory 230 (step S988). That is to say, the image subjected to affine transformation to which the white frame has been added is composited as to the history image held at the image memory 230. Subsequently, the display control unit 240 controls the display unit 250 to display the composited image held at the image memory 230 (step S989). Subsequently, determination is made whether or not the image held at the image memory 230 is the frame immediately before the front-most frame at the image compositing target section serving as a compositing target (step S990). In the case that the image held at the image memory 230 is not the frame immediately after the front-most frame (step S990), the flow returns to step S986, where the image compositing process is repeated from the last frame to the frame immediately after the front-most frame (steps S986 through S989).

On the other hand, in the case that the image held at the image memory 230 is the frame immediately before the front-most frame (step S990), the image of the front-most frame is extracted (step S991). Subsequently, the image transforming unit 190 uses the affine transformation parameters correlated with the extracted image of the front-most frame to subject the image of the front-most frame to affine transformation (step S992). Note that the affine transformation parameters correlated with the front-most frame is the values of a unit matrix, and accordingly, the image of the front-most frame is not transformed actually. Subsequently, the image compositing unit 220 adds a white frame to the periphery of the image of the front-most frame subjected to affine transformation, and holds the image to which the white frame has been added in the image memory 230 (step S993). That is to say, the image subjected to affine transformation to which the white frame has been added is composited as to the history image held at the image memory 230. Subsequently, the display control unit 240 controls the display unit 250 to display the composited image held at the image memory 230 (step S994).

2. Second Embodiment

Configuration Example of Image Processing Apparatus

With the first embodiment of the present invention, an example has been described wherein at the time of calculating affine transformation parameters relating to between frames, the rate of a feature point that exhibits dominant motion is calculated as a reliability determination score. Description will be made in detail below regarding an example wherein a reliability determination score is calculated using another calculating method, with reference to the drawings. Here, the functional configuration according to the second embodiment of the present invention is generally the same as that of the image processing apparatus 100 except that the camera work detecting unit 120 included in the image processing apparatus 100 shown in FIG. 1 differs. Therefore, the configuration other than the camera work detecting unit 120 will be denoted with the same reference numerals as those in the first embodiment of the present invention, and only the configuration having a different function will be described, and other description will be omitted.

Figure 39:
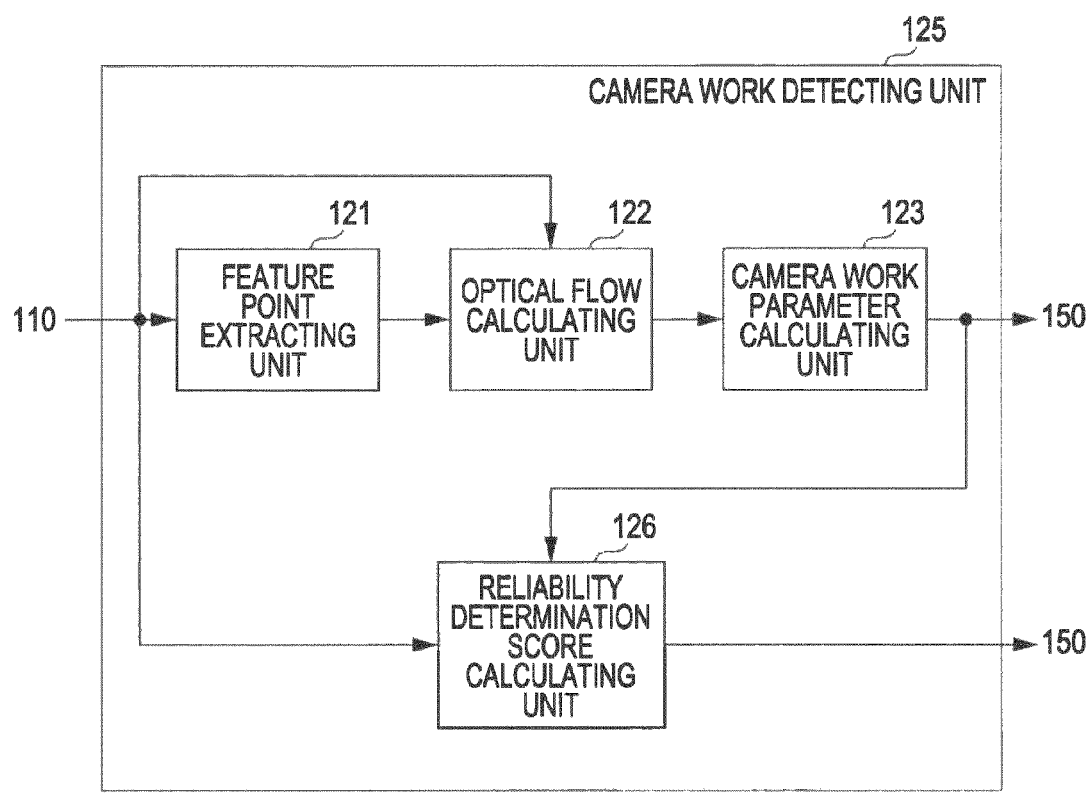
FIG. 39 is a block diagram illustrating a functional configuration example of a camera work detecting unit according to a second embodiment of the present invention.

FIG. 39 is a block diagram illustrating a functional configuration example of a camera work detecting unit 125 according to the second embodiment of the present invention. The camera work detecting unit 125 includes a feature point extracting unit 121, an optical flow calculating unit 122, a camera work parameter calculating unit 123, and a reliability determination score calculating unit 126. Here, the feature point extracting unit 121, optical flow calculating unit 122, and camera work parameter calculating unit 123 are the same as those in the camera work detecting unit 120 shown in FIG. 2. Therefore, description will be made below with the reliability determination score calculating unit 126 as the center. Also, with this example, description will be made regarding an example wherein a reliability determination score is calculated using the luminance difference value between pixels included in an overlaid region of consecutive two frames.

The reliability determination score calculating unit 126 uses the camera work parameters output from the camera work parameter calculating unit 123 to calculate a reliability determination score relating to consecutive two frames making up the moving picture output from the moving picture input unit 110, and outputs the calculated reliability determination score to the recording control unit 150. Note that reliability determination score calculation will be described in detail with reference to FIG. 40.

Reliability Determination Score Calculation Example

Figure 40:
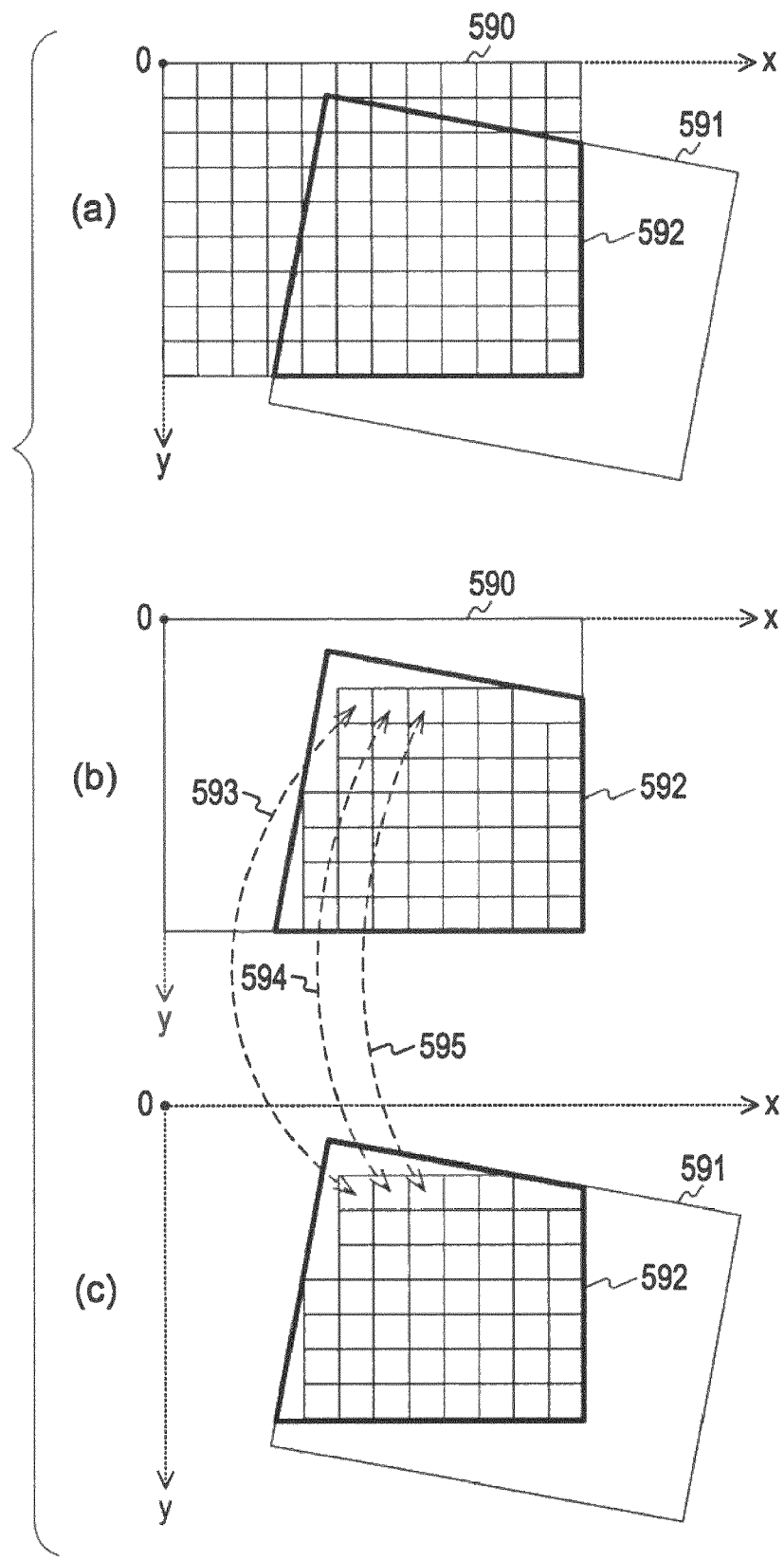
FIG. 40 is a diagram illustrating an overview of a calculating method at the time of calculating a reliability determination score by a reliability determination score calculating unit according to the second embodiment of the present invention.

FIG. 40 is a diagram illustrating an overview of a calculating method at the time of calculating a reliability determination score by the reliability determination score calculating unit 126 according to the second embodiment of the present invention. FIG. 40 illustrates a previous frame 590 and a subsequent frame on the temporal axis as consecutive two frames making up the moving picture. Also, (a) in FIG. 40 illustrates a case where the frame 591 is subjected to affine transformation with the frame 590 as a reference, and the frame 591 after affine transformation is overlaid as to the frame 590. Also, the range of an overlaid region 592 between the frames 590 and 591 is indicated with a heavy line. In FIG. 40, (b) illustrates the frame 590 shown in (a) in FIG. 40, and (c) in FIG. 40 illustrates the frame 591 shown in (a) in FIG. 40. Also, let us say that a square included in the frames 590 and 591 indicates a pixel making up each frame. Note that (b) and (c) in FIG. 40 illustrate only the pixels included in the overlaid region 592 using a square.

In the case that the reliability determination score calculating unit 126 calculates a reliability determination score, first, with regard to the consecutive two frames making up the moving picture output from the moving picture input unit 110, the subsequent frame is subjected to affine transformation with the previous frame on the temporal axis as a reference frame. This affine transformation is executed using the camera work parameters output from the camera work parameter calculating unit 123 (affine transformation parameters relating to the previous frame (reference frame) and the subsequent frame). Subsequently, the reliability determination score calculating unit 126 calculates the absolute value of the luminance difference value between pixels included in the overlaid region after affine transformation. Subsequently, the reliability determination score calculating unit 126 calculates the total value of the absolute value of the difference value calculated for each pixel, and calculates as a reliability determination score a value obtained by dividing the calculated total value by the number of pixels serving as calculation targets.

For example, as shown in (a) through (c) in FIG. 40, let us assume an x-y coordinates wherein the left upper corner of the frame 590 is taken as the origin, the side of the upper side of the frame 590 is taken as the x axis, and the side of the left side of the frame 590 is taken as the y axis. With this x-y coordinates, for example, let us say that the luminance value at the coordinates (i, j) of the overlaid region of the frame 590 is I1(i, j), and the luminance value at the coordinates (i, j) of the overlaid region of the frame 591 is I2(i, j). Also, if we say that the number of pixels used for calculation of a difference value is Pnum, a reliability determination score SHS1 can be obtained with the following expression.

$$SHS1 = \sum_{I1 \in R, I2 \in R} \frac{|I1(i, j) - I2(i, j)|}{Pnum}$$

Here, R represents the overlaid region between the frames 590 and 591. That is to say, such as arrows 593 through 595 shown in (b) and (c) in FIG. 40, of pixels included in the overlaid region between the frames 590 and 591, the absolute value of the luminance difference value of two pixels disposed in the corresponding positions is calculated sequentially. Subsequently, the reliability determination score SHS1 is calculated using the absolute values of these difference values.

Thus, the reliability determination score calculated by the reliability determination score calculating unit 126 is output to the recording control unit 150, and is recorded in the metadata storage unit 210. Specifically, the reliability determination score is recorded in the reliability determination score 217 of the metadata file 211 shown in FIG. 3B. Note that the recorded content of the reliability determination score 217 has a different numeric value from the case shown in FIG. 3B.

Also, the section selecting unit 160 uses this reliability determination score to execute selection of an image compositing target section based on whether or not the reliability determination score exceeds a threshold. For example, in the case that the reliability determination score is below a certain threshold, the reliability can be determined to be high.

Description has been made so far regarding the case wherein a reliability determination score is calculated using all the pixels included in the overlaid region of the consecutive two frames. However, for example, a reliability determination score may be calculated using information relating to a feature point serving as an affine transformation parameter calculation target by the camera work parameter calculating unit 123.

Configuration Example of Image Processing Apparatus

Figure 41:
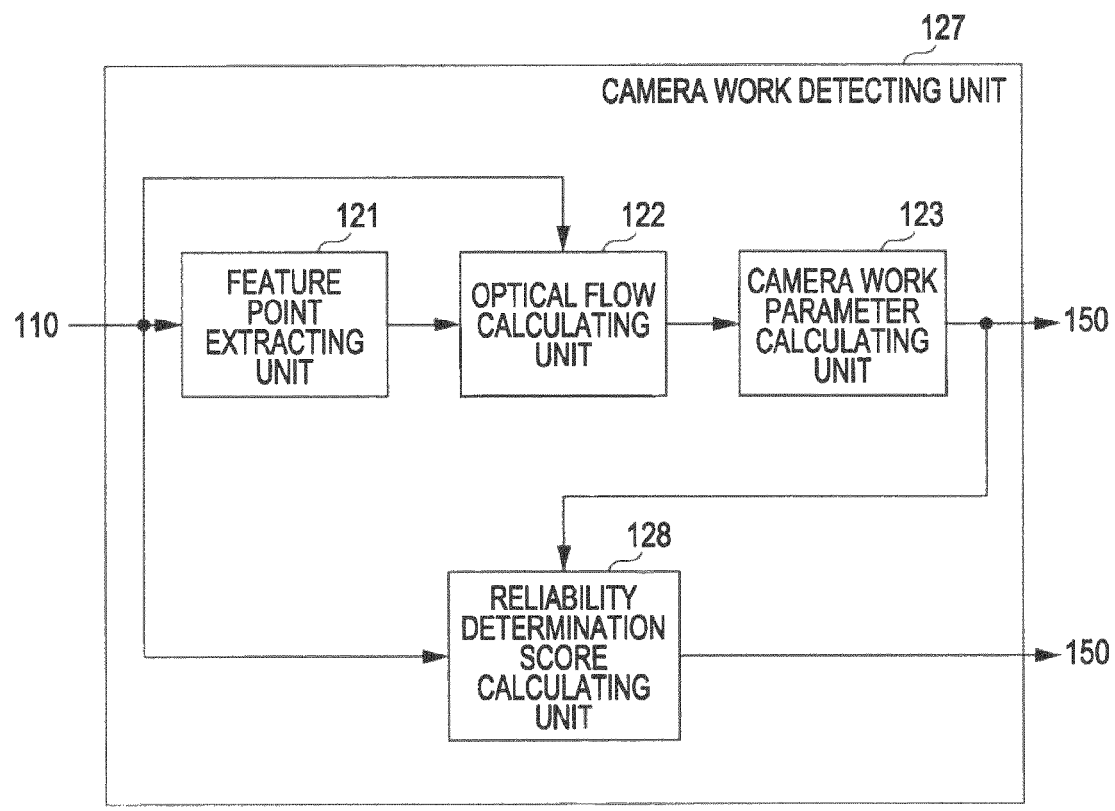
FIG. 41 is a block diagram illustrating a functional configuration example of a camera work detecting unit according to the second embodiment of the present invention.

FIG. 41 is a block diagram illustrating a functional configuration example of the camera work detecting unit 127 according to the second embodiment of the present invention. The camera work detecting unit 127 includes a feature point extracting unit 121, an optical flow calculating unit 122, a camera work parameter calculating unit 123, and a reliability determination score calculating unit 128. Here, the feature point extracting unit 121, optical flow calculating unit 122, and camera work parameter calculating unit 123 are the same as those of the camera work detecting unit 120 shown in FIG. 2. Therefore, description will be made below with the reliability determination score calculating unit 128 as the center. Also, with this example, description will be made regarding an example wherein, of pixels included in the overlaid region of the consecutive two frames, a reliability determination score is calculated using the luminance difference value of pixels disposed around a feature point that exhibits dominant motion.

The reliability determination score calculating unit 128 calculates a reliability determination score relating to the consecutive two frames making up the moving picture output from the moving picture input unit 110, and outputs the calculated reliability determination score to the recording control unit 150. With this reliability determination score calculation, the camera work parameters calculated by the camera work parameter calculating unit 123, and the feature points used for this camera work parameter calculation are used. Note that the reliability determination score calculation will be described in detail with reference to FIG. 42.

Reliability Determination Score Calculation

Figure 42:
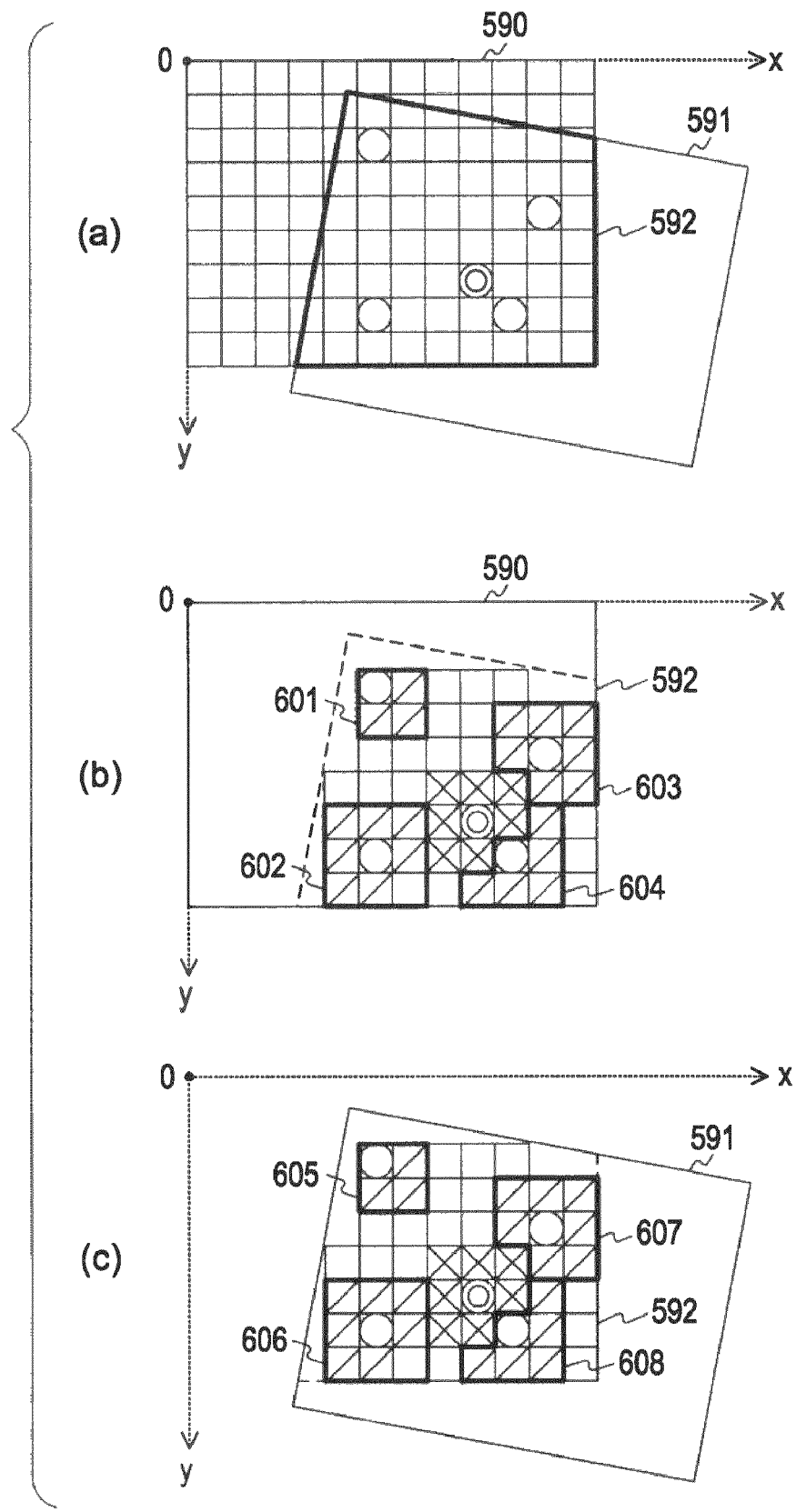
FIG. 42 is a diagram illustrating an overview of a calculating method at the time of calculating a reliability determination score by a reliability determination score calculating unit according to the second embodiment of the present invention.

FIG. 42 is a diagram illustrating an overview of a calculating method at the time of calculating a reliability determination score by the reliability determination score calculating unit 128 according to the second embodiment of the present invention. Now, the relationship between the frames 590 and 591 shown in FIG. 42, and the overlaid region 592 between the frames 590 and 591 are the same as those in FIG. 40, and accordingly, description thereof will be omitted here. Note that (b) and (c) in FIG. 42 illustrate the range of the overlaid region 592 using a dashed line. Also, with each pixel (indicated with a square) included in the overlaid region 592 shown in (a) through (c) in FIG. 42, a feature point that exhibits dominant motion is represented with a single circle within a square, and the other feature points are represented with a double circle within a square. For example, the overlaid region 592 shown in (a) through (c) in FIG. 40 includes four feature points that exhibit dominant motion, and the other single feature point. With this example, description will be made regarding an example wherein, of pixels included in the overlaid region 592, pixels (e.g., eight neighborhood pixels) around four feature points that exhibit dominant motion are used to calculate a luminance difference value. Here, of the pixels included in the overlaid region 592, pixels around the other single feature point are not used. Also, for example, in the case that the pixels around the four feature points that exhibit dominant motion, and the pixels around the other single feature point are common, priority is given to one feature point, and these pixels are not used for calculation. That is to say, with the example shown in FIG. 42, each pixel included in regions 601 through 608 is used as a reliability determination score calculation target.

In the case that the reliability determination score calculating unit 128 calculates a reliability determination score, first, of the consecutive two frames making up the moving picture output from the moving picture input unit 110, the previous frame is taken as a reference frame on the temporal axis, and the subsequent frame is subjected to affine transformation. This affine transformation is the same as the example shown in FIG. 40. Subsequently, the reliability determination score calculating unit 128 calculates, of the pixels included in the consecutive two frames, the absolute value of the luminance difference value of pixels around a feature point that exhibits dominant motion included in the overlaid region after affine transformation. Subsequently, the reliability determination score calculating unit 128 calculates the total value of the absolute value of the difference value calculated for each pixel around a feature point that exhibits dominant motion, and calculates as a reliability determination score a value obtained by dividing the calculated total value by the number of pixels serving as calculation targets.

For example, let us assume an x-y coordinates wherein the left upper corner of the frame 590 is taken as the origin, the side of the upper side of the frame 590 is taken as the x axis, and the side of the left side of the frame 590 is taken as the y axis. With this x-y coordinates, for example, let us say that the luminance value at the coordinates (i, j) of the overlaid region of the frame 590 is I11(i, j), and the luminance value at the coordinates (i, j) of the overlaid region of the frame 591 is I12(i, j). Also, if we say that the number of pixels used for calculation of a difference value is P1num, a reliability determination score SHS2 can be obtained with the following expression.

$$SHS2 = \sum_{I11 \in R1, I12 \in R1} \frac{|I11(i, j) - I12(i, j)|}{P1num}$$

Here, R1 represents the regions (e.g., eight neighborhood regions) around a feature point that exhibits dominant motion, of the overlaid region between the frames 590 and 591. Note that in the case that the pixels around a feature point that exhibits dominant motion, and the pixels around the other feature point are common, let us say that R1 is taken as a region in which such pixels are not included. That is to say, the absolute value of the luminance difference value of two pixels disposed in the corresponding positions is calculated regarding the regions 601 through 608 shown in (b) and (c) in FIG. 42. Subsequently, the absolute values of these difference values are used to calculate the reliability determination score SHS2.

Thus, the reliability determination score calculated by the reliability determination score calculating unit 128 is output to the recording control unit 150, and is recorded in the metadata storage unit 210. Specifically, the reliability determination score is recorded in the reliability determination score 217 of the metadata file 211 shown in FIG. 3B. Note that the recorded content of the reliability determination score 217 has a different numeric value from the case shown in FIG. 3B.

Also, the section selecting unit 160 uses this reliability determination score to execute selection of an image compositing target section based on whether or not the reliability determination score exceeds a threshold. For example, in the case that the reliability determination score is below a certain threshold, the reliability can be determined to be high.

An example has been described so far wherein a luminance difference value is used to calculate a reliability determination score. However, an arrangement may be made wherein, instead of a luminance difference value, for example, a difference value is calculated regarding each of G (Green), R (Red), and B (Blue), and based on this difference value a reliability determination score is calculated.

Also, for example, an arrangement may be made wherein a Gaussian filter is applied to the images corresponding to consecutive two frames to smooth the images, the smoothed images are reduced, and the pixels of the reduced images are used to calculate a reliability determination score in the same way as above.

Also, an example has been described so far wherein the images corresponding to the consecutive two frames are used to calculate a reliability determination score, but for example, camera sensor information may be used to calculate a reliability determination score. For example, in the case that a moving picture is recorded by a camera including a triaxial acceleration sensor and a triaxial gyro sensor, the sensor information output from these sensors is recorded in a manner correlated with the moving picture as camera motion information. Subsequently, the moving picture correlated with the sensor information is input to the moving picture input unit 110, and the difference value between the motion information calculated regarding each frame making up this moving picture, and the motion information specified with the sensor information is calculated. Subsequently, this difference value may be used as a reliability determination score. In this case, in the case that the reliability determination score does not exceed a threshold, reliability can be determined to be high. That is to say, a method may be employed wherein, in the case that the degree of matching between image motion estimated using the sensor information output from the camera, and image motion calculated from an image making up a moving picture is great, reliability is determined to be high.

3. Third Embodiment

Operation Example of Image Processing Apparatus

With the first embodiment of the present invention, description has been made regarding an example wherein a face or smiling face include in an image is used to select a front-most frame. With the third embodiment of the present invention, description will be made in detail regarding an example wherein face attributes or a face state other than a smiling face relating to a face is used to select a front-most frame, with reference to the drawings.

FIG. 43 is a block diagram illustrating a functional configuration example of an image processing apparatus 101 according to the third embodiment of the present invention. The image processing apparatus 101 includes a compositing target image selecting unit 171, a face attribute state determining unit 280, a reference information storage unit 281, and a metadata storage unit 290. Note that the other functional configuration is generally the same as that in the image processing apparatus 100 shown in FIG. 1, and accordingly, the same reference numerals as the reference numerals of the image processing apparatus 100 are denoted thereto, description will be made with components having a different function as the center, and other description will be omitted.

The compositing target image selecting unit 171 uses metadata stored in the metadata recording unit 290 to select a frame used to create a composited image from frames included in the image compositing target section output from the section selecting unit 160, and outputs compositing target image information relating to the selected frame (frame selection information) to the recording control unit 150. Note that the compositing target image selection will be described in detail with reference to FIGS. 45 through 48.

The face attribute state determining unit 280 uses the reference information stored in the reference information storage unit 281 to determine the attributes and state of the face detected by the face detecting unit 130, and outputs determination results to the recording control unit 150. Specifically, the face attribute state determining unit 280 calculates a correlation value that indicates correlativity between a face image extracted from an image making up the moving picture output from the moving picture input unit 110 and normalized, and various types of data stored in the reference information storage unit 281, determines the height of correlativity based on the calculated correlation value, and extracts various types of data relating to the normalized face image. Such an extracting process is executed repeatedly, and based on extracted various types of data, the facial expression and so forth of the normalized face image are determined. Thus, in order to recognize a person's face, a technique may be employed to execute template matching with a database in which a great number of face data is integrated (e.g., see Japanese Unexamined Patent Application Publication No. 2003-271933, Japanese Unexamined Patent Application Publication No. 2004-30629, etc.). For example, a smiling face database is established from a great number of smiling face sample images beforehand, this and a face image extracted partially from the image are subjected to a template matching process, whereby determination can be made whether the face is a smiling face or a non-smiling face. Similarly, determination can also be made regarding the other attributes or states. Note that determination may be made using the evaluated value shown in the first embodiment of the present invention. Also, the face attribute state determining unit 280 is an example of the determining unit referred to in the Summary of the Invention.

The reference information storage unit 281 stores reference information such as various portions of a face used for gender determination, and supplies the stored reference information to the face attribute state determining unit 280. Note that the reference information stored in the reference information storage unit 281 will be described in detail with reference to FIGS. 44A and 44B.

The metadata storage unit 290 stores various types of information output from the camera work detecting unit 120, face detecting unit 130, and face attribute state determining unit 280 in a manner correlated with a moving picture and a frame as a metadata file based on the control of the recording control unit 150. Also, the metadata storage unit 290 supplies a metadata file to the section selecting unit 160 and the compositing target image selecting unit 171. Note that the metadata file stored in the metadata storage unit 290 will be described in detail with reference to FIGS. 44A and 44B.

FIGS. 44A and 44B are diagrams schematically illustrating content stored in the reference information storage unit 281 and the metadata storage unit 290, according to the third embodiment of the present invention. FIG. 44A illustrates reference information stored in the reference information storage unit 281. This reference information is, for example, an image itself such as the eyes, mouth, or the like, i.e., a feature database serving as a person's face, a feature database relating to a specific person's face, or the like. For example, as shown in FIG. 44A, a gender database 282, an age database 283, a smiling face database 284, an eye closing database 285, and a characters database 286 are stored in the reference information storage unit 281. The gender database 282 is a database used for determining the gender of a face image, and the age database 283 is a database used for determining the age of a face image. Also, the smiling face database 284 is a database used for determining the face smiling face of a face image, and the eye closing database 285 is a database used for determining eye closing of a face image. Also, the characters database 286 is a database used for determining a person determined by the user as characters. In general, according to feature data, a great number of various types of databases can be held with relatively little storage capacity as compared to an image itself.

FIG. 44B schematically illustrates a metadata file 291 stored in the metadata storage unit 290 correlated with the moving picture file 201 stored in the moving picture storage unit 200. Note that the correspondence relation between the moving picture file 201 and the metadata file 291 is the same as the example shown in FIG. 3B, and accordingly, description thereof will be omitted here. A moving picture ID 292, a frame number 293, an affine transformation parameter 294, a reliability determination score 295, face detection information 296, gender 297, age 298, smiling face 299, eye closing 287, and characters 288 are stored in the metadata file 291 in a correlated manner. Note that the moving picture ID 292, frame number 293, affine transformation parameter 294, reliability determination score 295, and face detection information 296 are the same as those shown in FIG. 3B, and accordingly, description thereof will be omitted here.

The gender 297 is gender determined regarding face included in each frame of the image corresponding to the frame number 293, where the determination result output from the face attribute state determining unit 280 is stored. For example, in the case that no face is included in the corresponding frame, nothing is stored. For example, in the case that the face included in the corresponding frame has been determined to be a male, "1" is stored in the gender 297. On the other hand, in the case that the face included in the corresponding frame has been determined to be a female, "0" is stored in the gender 297.

The age 298 is an age determined regarding the face included in each frame of the moving picture corresponding to the frame number 293, where the determination result output from the face attribute state determining unit 280 is stored. For example, in the case that no face is included in the corresponding frame, nothing is stored. For example, in the case that the face included in the corresponding frame has been determined to be an adult, "1" is stored in the age 298. On the other hand, in the case that the face included in the corresponding frame has been determined to be a child, "0" is stored in the age 298.

The smiling face 299 is whether there is a smiling face determined regarding a face included in each frame of the moving picture corresponding to the frame number 293, where the determination result output from the face attribute state determining unit 280 is stored. For example, in the case that no face is included in the corresponding frame, nothing is stored. For example, in the case that the face included in the corresponding frame has been determined to be a smiling face, "1" is stored in the smiling face 299. On the other hand, in the case that the face included in the corresponding frame has been determined to be a non-smiling face, "0" is stored in the smiling face 299.

The eye closing 287 is whether there is an eye closed face determined regarding a face included in each frame of the moving picture corresponding to the frame number 293, where the determination result output from the face attribute state determining unit 280 is stored. For example, in the case that no face is included in the corresponding frame, nothing is stored. For example, in the case that the face included in the corresponding frame has been determined to be an eye closed face, "1" is stored in the eye closing 287. On the other hand, in the case that the face included in the corresponding frame has been determined to be a non-eye-closed face, "0" is stored in the eye closing 287.

The characters 288 is whether there is a character determined regarding a face included in each frame of the moving picture corresponding to the frame number 293, where the determination result output from the face attribute state determining unit 280 is stored. For example, in the case that no face is included in the corresponding frame, nothing is stored. For example, in the case that the face included in the corresponding frame has been determined to be Mr. A, "A" is stored in the characters 288. On the other hand, in the case that the face included in the corresponding frame has been determined to be Mr. B, "B" is stored in the characters 288.

Selection Example of Compositing Target Image

FIG. 45 is a diagram illustrating an example of a selection screen displayed on the display unit 250 according to the third embodiment of the present invention. A selection screen 610 is a selection screen wherein the user performs a selection operation to display a desired composited image. The selection screen 610 includes, for example, check fields used for selecting a gender 611, age 612, characters 613, and facial expression 614 as facial attributes. Also, the selection screen 610 includes a compositing sequence 615 used for selecting a compositing sequence, and a pull-down button 617 used for selecting an overlaying rate 616. Also, the selection screen 610 includes a "panorama-style composited image display" button 619, and a "cancel" button 620.

For example, let us say that, with the selection screen 610, a cursor 618 is used to add a check to the female field of the gender 611, to add a check to the adult field of the age 612, to add a check to the characters field of the characters 613, and to add a check to the smiling face field of the facial expression 614. Also, in the case of adding a check to the characters field of the characters 613, the names of the characters registered on the characters database 286 (e.g., Mr. A, Mr. B, and Mr. C) are displayed, a check is added to the field of a desired name from these characters. For example, a check is added to Mr. B. Also, with the selection screen 610, the cursor 618 is used to add a check to the ascending field of the compositing sequence 615. Also, the cursor 618 is used to press the pull-down button 617, whereby an overlaying rate list of "high", "middle", and "low" are displayed as shown in FIG. 45. A desired overlaying rate can be selected from this overlaying rate list. Here, for example, in the case that "high" has been selected, an overlaying rate of 60% through 70% is selected, and in the case that "middle" has been selected, an overlaying rate of 60% through 40% is selected, and in the case that "low" has been selected, an overlaying rate of 40% through 35% is selected. Note that, with this example, the user selects a desired overlaying rate from the overlaying rate list, but the user may input a desired overlaying rate directly. Note that an item that the user does not desire specifically may not be selected.

Also, in the case that the selection operations by the user regarding each of these items have been completed, the user uses the cursor 618 to press the "panorama-style composited image display" button 619. Thus, the selection information of each item selected at the time of pressing the "panorama-style composited image display" button 619 is output from the operation accepting unit 260 to the compositing target image selecting unit 171. Based on this selection information, the compositing target image selecting unit 171 executes a frame selecting process. Note that, upon the "cancel" button 620 being pressed, the selection state at each item is released.

FIG. 46 is a diagram illustrating an example of scores used for calculation of a selection determination score by the compositing target image selecting unit 171 according to the third embodiment of the present invention. The selection determination score is a value used for selecting a frame, and is calculated based on each piece of information relating to a face included in a frame. Also, in the case that multiple faces are included in one frame, scores relating to these faces are calculated for each face, and the value to which the score for each face is added is calculated as the selection determination score. Also, the selection determination score is calculated, for example, based on the item selected at the selection screen 610 shown in FIG. 45, the score shown in FIG. 46, and the attributes and state relating a face. As the attributes and state relating a face the metadata stored in the metadata storage unit 290 is used.

Specifically, an attribute value Z1 that indicates the determined face attribute, a status value J1 that indicates the determined face state are calculated, and the attribute value Z1 and the status value J1 are added, whereby the selection determination score is calculated. Here, the attribute value Z1 is, for example, a value determined with a gender 621, age 622, and whether or not there is a specific person 623, as face attributes. Also, the status value J1 is, for example, a value determined with a smiling face 624, eye closing 625, a face position within the image (distance 626 from the image center), a face size 627 within the image, as face states.

For example, with regard to the gender 621, age 622, and specific person 623, determination is made whether or not the item selected at the selection screen 610 shown in FIG. 45, and the face attribute included in the image serving as a selection determination score calculation target are matched. The score shown in FIG. 46 relating to the matched item is added to the attribute value Z1. Also, with regard to the smiling face 624, in the case that the item selected at the selection screen 610 shown in FIG. 45, and the state of a face (smiling face) included in the image serving as a selection determination score calculation target are matched, the score shown in FIG. 46 is added to the status value J1. Also, with regard to the eye closing 625, the distance 626 from the image center, and the face size 627, each score corresponding to the metadata stored in the metadata storage unit 290 is added to the status value J1. Subsequently, the calculated attribute value Z1 and status value J1 are added, whereby the selection determination score is calculated.

Also, in the case that multiple faces are included in one frame, the attribute value Z1 and the status value J1 are calculated for each face, and a value obtained by adding the attribute value Z1 and the status value J1 is calculated as the selection determination score of the image thereof. Note that, with this example, each value is added at the time of calculating each score, but for example, each score may be calculated by multiplying each value. Also, an arrangement may be made wherein the weighting coefficient corresponding to a facial attribute and state is used instead of each score shown in FIG. 46, whereby each score is calculated.

A front-most image (front-most frame) is selected using the selection determination score thus calculated. That is to say, the selection determination score is calculated regarding each image included in the image compositing target section selected by the section selecting unit 160, and of the calculated selection determination scores, an image having the highest calculated value is selected as a front-most image.

Subsequently, the other frames other than the front-most frame are selected. This selection method will be described in detail with reference to FIGS. 47A through 48B.

Figure 47A:
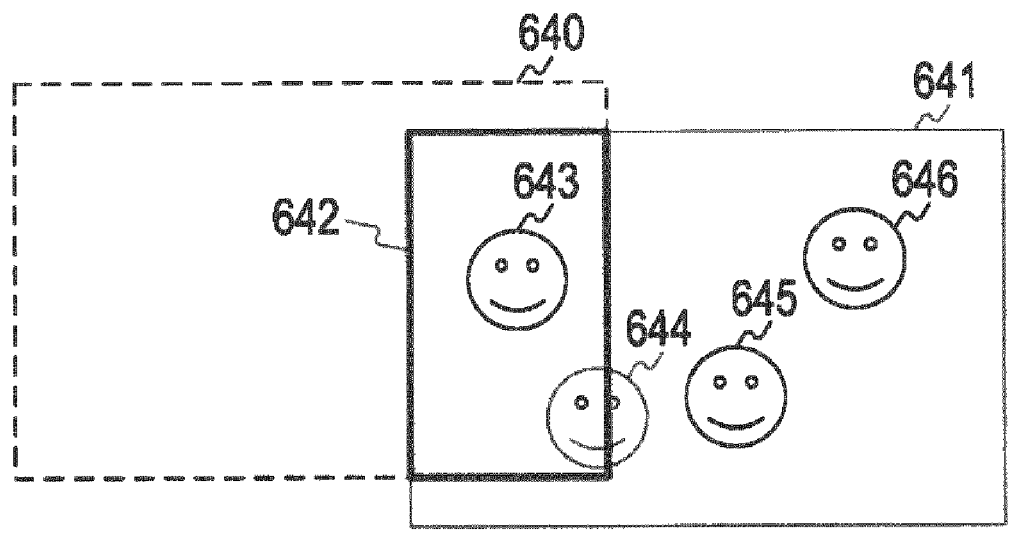
FIGS. 47A and 47B are diagrams illustrating an overview of a selecting method in the case that frame selection is executed by the compositing target image selecting unit according to the third embodiment of the present invention.
Figure 47B:
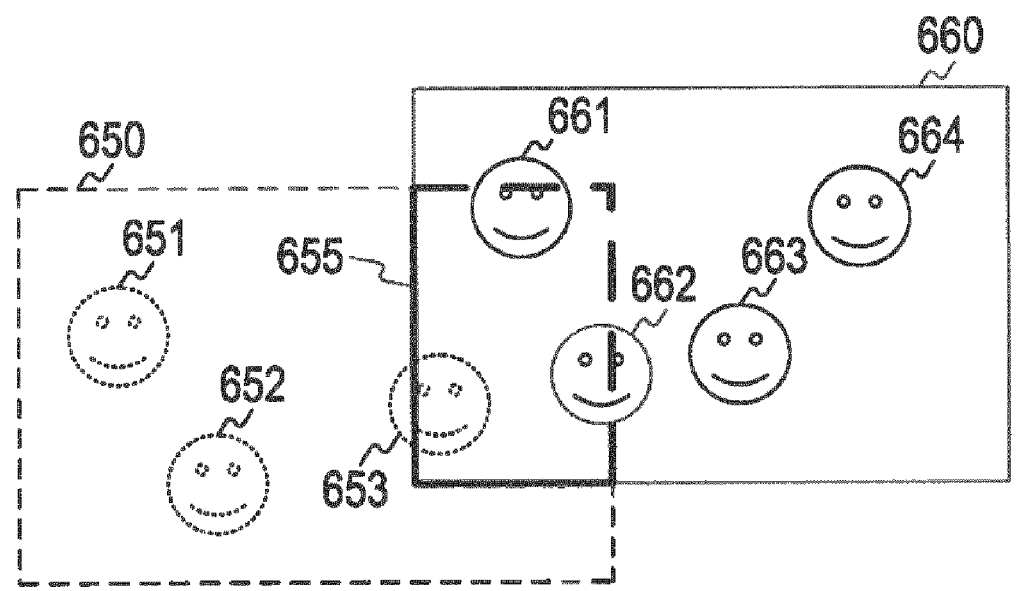

FIGS. 47A and 47B are diagrams illustrating an overview of a selecting method in the case that frame selection is executed by the compositing target image selecting unit 171 according to the third embodiment of the present invention. FIG. 47A illustrates an example in the case of calculating the selection determination score of a frame to be overlaid with the lower side of the already selected frame. For example, let us say that a frame 640 is a frame selected as the front-most frame. In the case that another frame is selected with the frame 640 as a reference frame, the scores relating to a face included in the region to be overwritten with the frame 640 are excluded. For example, let us say that in the case that faces 643 through 646 are included in a frame 641, at least a part of the image 643 and 644 is included in an overlaid region 642 as to the front-most frame 640. In this case, for example, in the case that necessity of selection is determined regarding the frame 641, determination is made whether or not the overlaid region 642 has an overlaying rate within a predetermined range. Let us say that the setting rang of this overlaying rate is the content selected at the selection screen 610 shown in FIG. 45. Subsequently, in the case that the overlaid region 642 does not have an overlaying rate within a predetermined range, the frame 641 is not selected. In the case that the overlaid region 642 has an overlaying rate within a predetermined range, the selection determination score is calculated regarding the frame 641. In this case, the selection determination score of the frame 641 is calculated using a value relating to the faces 645 and 646 not included in the overlaid region 642 of the faces 643 through 646 included in the frame 641.

FIG. 47B illustrates an example in the case of calculating the selection determination score of a frame to be overlaid with the lower side of the already selected frame. For example, a frame 660 is a frame serving as an overwrite compositing target as to a frame 650. Thus, in the case that another frame serving as an overwrite compositing target as to the frame 650 is selected with the frame 650 as a reference frame, the score relating to a face included in a region other than the region to be overwritten as to the frame 650 is added. For example, let us say that faces 651 through 653 are included in the frame 650, and at least a part of the face 653 is included in an overlaid region 655 as to the frame 660. Also, let us say that faces 661 through 664 are included in the frame 660. In this case, for example, in the case that necessity of selection is determined regarding the frame 660, determination is made whether or not the overlaid region 655 has an overlaying rate within a predetermined range. In the case that the overlaid region 655 does not have an overlaying rate within a predetermined range, the frame 660 is not selected. On the other hand, in the case that the overlaid region 655 has an overlaying rate within a predetermined range, the selection determination score is calculated regarding the frame 660. In this case, the selection determination score of the frame 660 is calculated using values relating to the faces 651, 652, and 661 through 664 not included in the overlaid region 655 of the frame 650, of the faces 651 through 653, and 663 and 664 included in the frames 650 and 660. That is to say, in the case that two images are composited, a value relating to a face included in a region serving as a display target is calculated as the selection determination score.

Figure 48A:
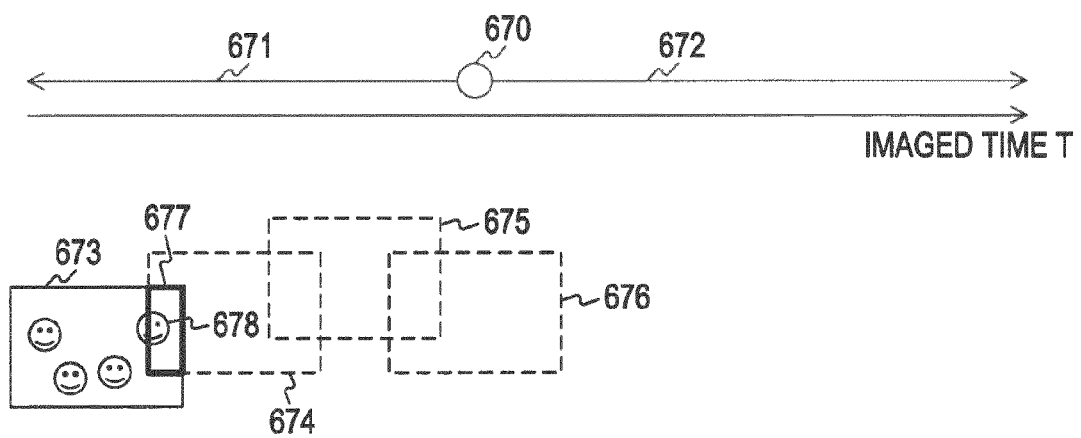
FIGS. 48A and 48B are diagrams illustrating an overview of the selecting method in the case that frame selection is executed by the compositing target image selecting unit according to the third embodiment of the present invention.
Figure 48B:
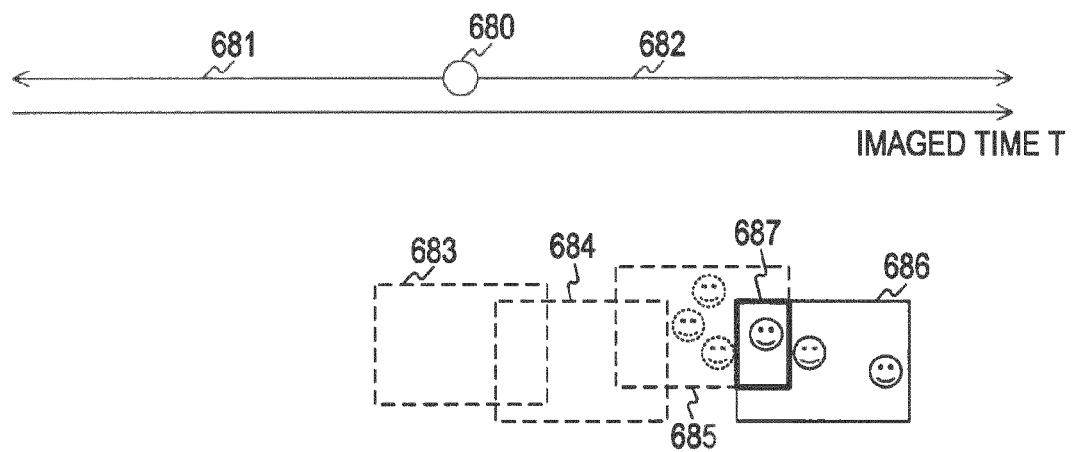

FIGS. 48A and 48B are diagrams illustrating an overview of the selecting method in the case that frame selection is executed by the compositing target image selecting unit 171 according to the third embodiment of the present invention. With the example shown in FIGS. 48A and 489, description will be made regarding a case where the overlaying sequence is specified by the user's operation beforehand. With this example, a selecting method in the case of overwrite-compositing toward a new image from an old image at imaging point-in-time (in the case of overwrite-compositing in the ascending order) is shown as an example. However, let us say that the image selected as the front-most frame is overwrite-composited on the top side.

FIG. 48A illustrates an example wherein an image is selected toward a search direction 671 with a front-most frame 670 as a reference frame. In this case, search is executed in a direction that traces back the time series from a front-most image 676, and accordingly, the already selected images are overlaid above the image serving as a selection target. Therefore, the score is calculated while taking an overlaid region into consideration, and of images included in a range of the specified overlaying rate, an image having the highest score is selected. For example, let us say that images 675 and 674 have been selected with an image 676 as a reference image corresponding to the reference frame 670. In the case that necessity of selection of the next image 673 is determined with the image 674 as a reference image, after determination of the overlaying rate of an overlaid region 677 between the images 673 and 674 is executed, the selection determination score calculated regarding a face included in the image 673 is calculated. Here, with regard to a face 678 of four faces included in the image 673, a portion thereof is included in the overlaid region 677. Therefore, in the case that the selection determination score regarding a face included in the image 673 is calculated, the selection determination score is calculated using three faces other than the face 678 included in the image 673.

FIG. 48B illustrates an example wherein an image is selected toward a search direction 682 with a front-most frame 680 as a reference frame. In this case, search is executed in the time-series direction from a front-most image 683, and accordingly, an image serving as a selection target is overlaid above already selected images. However, the front-most image 683 alone is overlaid above all the images. Therefore, with regard to the image 684, in the same way as with the case shown in FIG. 48A, the score is calculated while taking an overlaid region as to the image 683 into consideration, and of images included in a range of the specified overlaying rate, an image having the highest score is selected. On the other hand, with regard to images after the image 685, an image is selected wherein a total score between an image serving as a selection target and an image overlaid with the above image is not reduced as much as possible within a range of the specified overlaying rate, and a score on the current image is high. That is to say, an image is selected wherein a total score on the already selected composited image, and a score on the current image are the highest.

For example, let us say that the images 684 and 685 have been selected with the image 683 corresponding to the reference frame 680 as a reference image. In the case that necessity of selection of the next image 686 is determined with the image 685 as a reference image, determination of the overlaying rate of an overlaid region 687 between the images 685 and 686 is executed. Subsequently, the selection determination score calculated regarding each face included in a composited image between the images 683 through 685, and the image 686 is calculated. Here, three faces included in the image 686 become calculation targets regardless whether or not the three faces are included in the overlaid region 687.

Also, for example, in the case that overwrite compositing is executed toward an old image from a new image at the imaging point-in-time (in the case of overwrite compositing in the descending order), a selecting process is executed in the direction opposite of the case of ascending order. Note that in the case that the compositing order is not specified, search is executed in a direction that traces back the time series from the front-most image, and in a direction toward the time series from the front-most image. Thus, in the case that the compositing order is not specified, even in the case that search is executed in any direction, the selecting process in the same way as with FIG. 48A is executed. Such compositing order is used as compositing order at the time of image compositing, and accordingly, such compositing order is stored in correlated with the image compositing target section of the compositing target image metadata storage unit 270.

Note that, with the third embodiment of the present invention, description has been made regarding an example wherein a unique attribute relating to a face included in an image is taken as a facial attribute, an attribute relating to a facial state is taken as a state, and a selection determination score is calculated using each piece of information relating to such a face. However, a selection determination score may be calculated using each piece of information relating to another object. For example, a selection determination score may be calculated using each piece of information relating to various types of object, such as a pet such as a cat, or a dog, an animal, a house, a vehicle, or the like. For example, in the case of recognizing a pet individually, a pet can be readily recognized according to difference such as a color, a pattern, the shape of ears, or the like as compared to the case of recognizing a person individually. Also, a selection determination score may be calculated using a saliency map. This saliency map represents a region that a people will observe by a score for each pixel. For example, in the case that the selection determination score of an image is calculated using this saliency map, a value obtained by integrating the score for each pixel of a region other than an overlaid region may be calculated as the selection determination score of the image. Also, for example, a value obtained by adding the score calculated using the saliency map, and a score relating to an object may be calculated as a selection determination score.

Operation Example of Image Processing Apparatus

Next, the operation of the image processing apparatus 101 according to the third embodiment of the present invention will be described with reference to the drawings.

FIG. 49 is a flowchart illustrating the procedure of a frame selecting process by the image processing apparatus 101 according to the third embodiment of the present invention. This procedure is a modification of the procedure in step S950 shown in FIG. 34. Also, this example illustrates an example wherein the affine transformation parameters alone stored in the metadata storage unit 210 are used to calculate an overlaying rate. Also, this example illustrates a case where the compositing order has not specified.

First, the metadata corresponding to each frame included in one image compositing target section selected by the section selecting unit 160 is obtained from the metadata file stored in the metadata storage unit 210 (step S1001). Subsequently, the selection information of each item accepted by the operation accepting unit 260 is obtained (step S1002).

Subsequently, based on the obtained metadata, a selection determination score is calculated regarding each frame included in the image compositing target section serving as a selection target, and of the calculated selection determination scores, a frame having the highest value is selected as a front-most frame (step S1003). Also, the selected front-most frame is selected as a representative frame. Subsequently, each piece of metadata relating to the selected front-most frame is recorded in the compositing target image metadata storage unit 270 (step S1004).

Subsequently, search is executed in the descending order from the selected representative frame, frames within a range of the specified overlaying rate are extracted, and a selection determination score is calculated regarding these frames (step S1005). Of the calculated selection determination scores regarding frames within a range of the specified overlaying rate, a frame having the highest value is selected as a new representative frame (step S1006). Each piece of metadata relating to the new selected representative frame is recorded in the compositing target image metadata storage unit 270 (step S1007). Determination is made whether or not calculation of a selection determination score has been executed up to the top frame of the image compositing target section serving as a selection target (step S1008). In the case that calculation of a selection determination score has not been executed up to the top frame of the image compositing target section serving as a selection target (step S1008), the flow returns to step S1005, where a representative frame selecting process is repeated (steps S1005 through S1007).

On the other hand, in the case that calculation of a selection determination score has been executed up to the top frame of the image compositing target section serving as a selection target (step S1008), the already selected front-most frame is selected as a representative frame (step S1009). Subsequently, search is executed in the ascending order from the selected representative frame, frames within a range of the specified overlaying rate are extracted, and a selection determination score is calculated regarding these frames (step S1010). Of the calculated selection determination scores regarding the frames within a range of the specified overlaying rate, a frame having the highest value is selected as a new representative (step S1011). Each piece of metadata relating to the new selected representative frame is recorded in the compositing target image metadata storage unit 270 (step S1012). Determination is made whether or not calculation of a selection determination score has been executed up to the last frame of the image compositing target section serving as a selection target (step S1013). In the case that calculation of a selection determination score has not been executed up to the last frame of the image compositing target section serving as a selection target (step S1013), the flow returns to step S1010, where the representative frame selecting process is repeated (steps S1010 through S1012).

On the other hand, in the case that calculation of a selection determination score has been executed up to the last frame of the image compositing target section serving as a selection target (step S1013), determination is made whether or not the frame selecting process has been completed regarding all the image compositing target sections selected by the section selecting unit 160 (step S1014). In the case that the frame selecting process has not been completed regarding all the image compositing target sections (step S1014), the flow returns to step S1001, where the frame selecting process is repeated (steps S1001 through S1013). On the other hand, in the case that the frame selecting process has been completed regarding all the image compositing target sections (step S1014), the operation of the frame selecting process is ended.

Thus, the attribute and state and the like relating a face included in an image are used to select the front-most image and the compositing target image, whereby an interesting image relating to a person included in a moving picture can be provided. Also, each item such as the attribute and state and the like relating to a face can be set and displayed according to the user's preference, whereby a composited image according to the user's preference can be provided.

4. Fourth Embodiment
Configuration Example of Image Processing Apparatus

With the first embodiment of the present invention, an example has been described wherein images to which a white frame of a certain heaviness is added at the periphery are composited to create a panorama-style composited image. With a fourth embodiment of the present invention, description will be made in detail regarding an example wherein a decoration image other than a white frame of a certain heaviness is added to the periphery of an image, with reference to the drawings.

Figure 50:
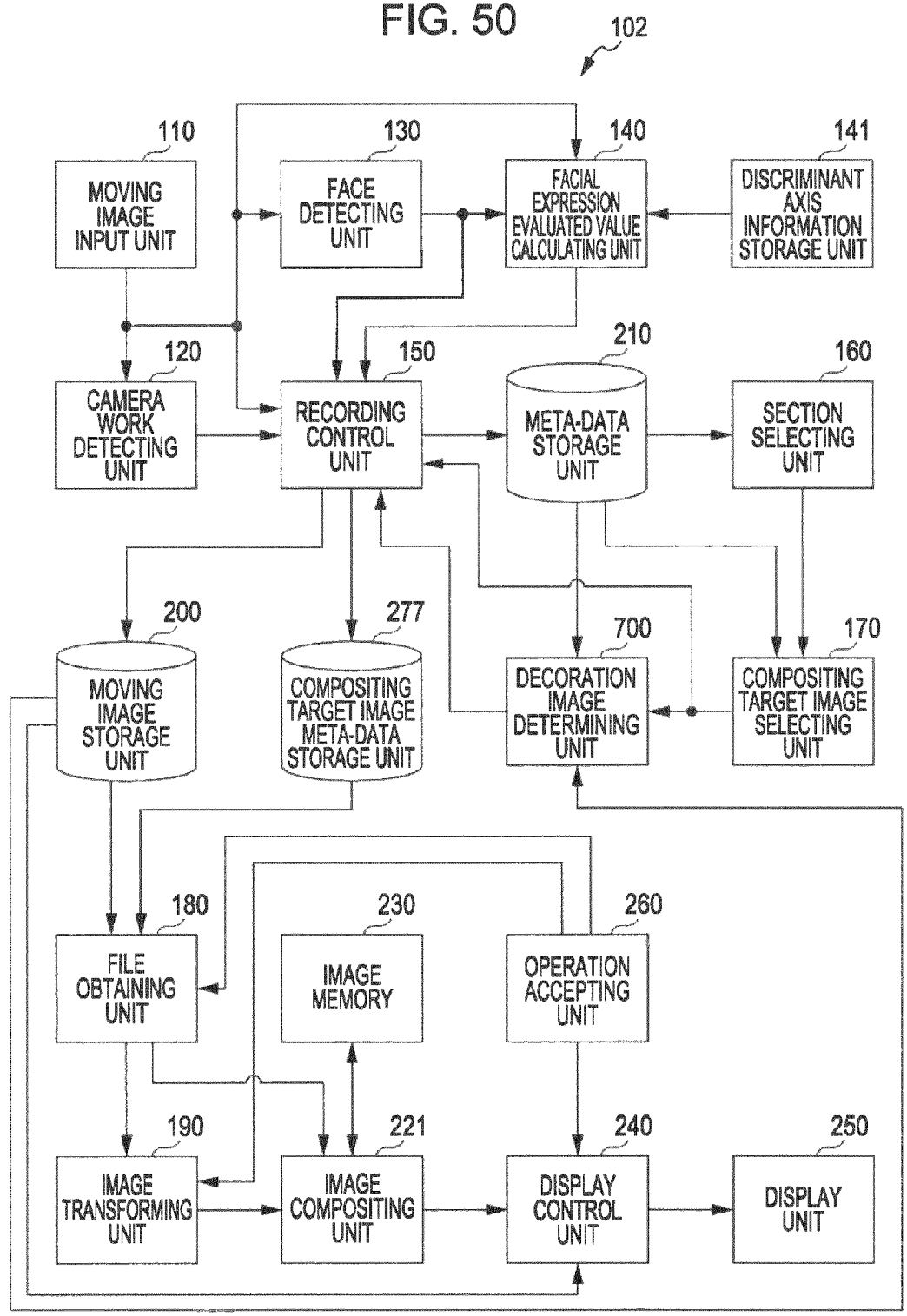
FIG. 50 is a block diagram illustrating a functional configuration example of an image processing apparatus according to a fourth embodiment of the present invention.

FIG. 50 is a block diagram illustrating a functional configuration example of an image processing apparatus 102 according to the fourth embodiment of the present invention. The image processing apparatus 102 includes an image compositing unit 221, a compositing target image metadata storage unit 277, and a decoration image determining unit 700. Note that the other functional configuration is generally the same as that in the image processing apparatus 100 shown in FIG. 1, and accordingly, the same reference numerals as the reference numerals of the image processing apparatus 100 are denoted thereto, and description will be made with components having a different function as the center, and the other description will be omitted.

The recording control unit 150 records information relating to the decoration image output from the decoration image determining unit 700 in the compositing target image metadata storage unit 277 as compositing target image metadata.

The compositing target image selecting unit 170 selects a composited image from frames included in an image compositing target section, and outputs compositing target image information relating to the selected compositing target image to the recording control unit 150 and the decoration image determining unit 700.

The decoration image determining unit 700 determines a decoration image to be added to each frame corresponding to the compositing target image information output from the compositing target image selecting unit 170, and outputs the decoration image information relating to the determined decoration image to the recording control unit 150. For example, the decoration image determining unit 700 determines a decoration image based on the metadata stored in the metadata storage unit 210. Also, the decoration image determining unit 700 determines a decoration image based on the metadata stored in the metadata storage unit 210, and each frame corresponding to the compositing target image information. Note that a decoration image determining method will be described in detail with reference to FIGS. 52A through 62.

The compositing target image metadata storage unit 277 stores the compositing target image information output from the compositing target image selecting unit 170 as a compositing target image metadata file based on the control of the signal 150. Also, the compositing target image metadata storage unit 277 stores the decoration image information output from the decoration image determining unit 700 as a compositing target image metadata file. Also, the compositing target image metadata storage unit 277 supplies the compositing target image metadata file to the file obtaining unit 180 in response to a request from the file obtaining unit 180. Note that the metadata file stored in the compositing target image metadata storage unit 277 will be described in detail with reference to FIG. 51.

In the case that an instruction operation used for displaying a composited image has been accepted by the operation accepting unit 260, the file obtaining unit 180 outputs the compositing target image metadata obtained from the compositing target image metadata storage unit 277 to the image compositing unit 221.

The image compositing unit 221 uses the image memory 230 to add a decoration image according to the content of compositing target image metadata to the images subjected to affine transformation by the image transforming unit 190, composites the images to which the decoration image has been added to create a composited image.

FIG. 51 is a diagram schematically illustrating the storage content of the compositing target image metadata storage unit 277 according to the fourth embodiment of the present invention. A moving picture ID 271, a section number 272, a frame number 273, affine transformation parameters 274, a front-most frame 275, face data 276, and decoration image data 278 are stored in the compositing target image metadata storage unit 277 in a correlated manner. The moving picture ID 271, section number 272, frame number 273, affine transformation parameters 274, front-most frame 275, and face data 276 are the same as those of an example shown in FIG. 4, description thereof will be omitted here.

The decoration image data 278 is information relating to a decoration image to be added to the compositing target image determined by the decoration image determining unit 700. As this information, for example, the position, size, pattern, color, type, and the like of a decoration image to be added to a compositing target image are stored. Based on the content of the decoration image data 278, a decoration image is added to the periphery of the corresponding frame. Note that the example shown in FIG. 51 illustrates information relating to a decoration image in an omitted manner.

Determination Example of White Frame

First, description will be made regarding an example wherein an image serving as a target to which a decoration image is added is subjected to affine transformation, overlaid above the previous composited image, and image analysis is executed using the information of an overlaid region as to the image after affine transformation, thereby determining a decoration image. With this example, a white frame will be described as a decoration image.

Figure 52A:
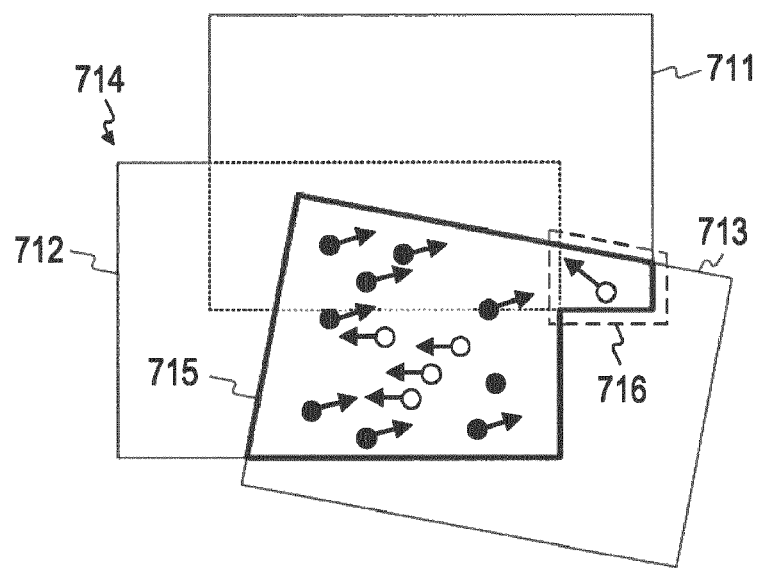
FIGS. 52A through 52C are diagrams illustrating an overview of a determining method arranged to determine the heaviness of a white frame by a decoration image determining unit according to the fourth embodiment of the present invention.
Figure 52B:
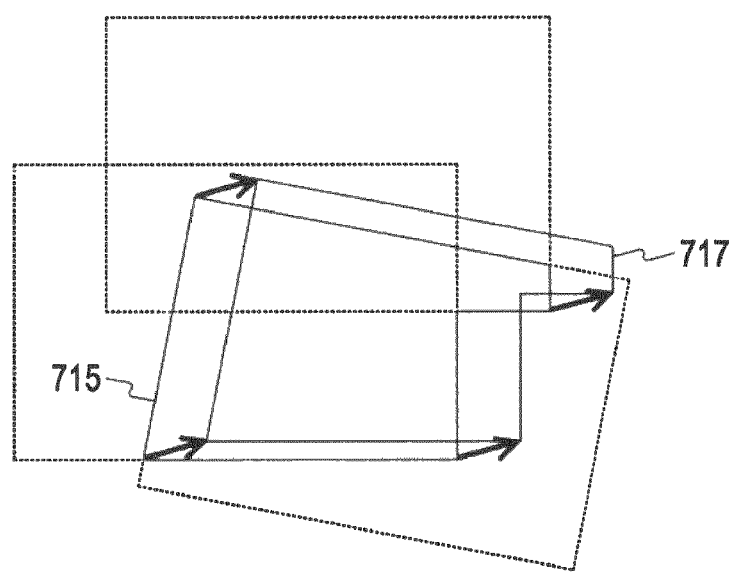
Figure 52C:
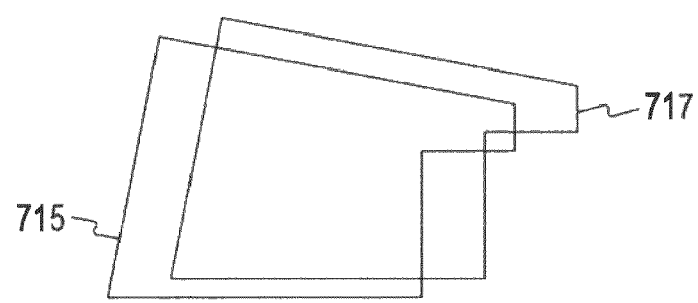

FIGS. 52A through 52C are diagrams illustrating an overview of a determining method arranged to determine the heaviness of a white frame by the decoration image determining unit 700 according to the fourth embodiment of the present invention. FIG. 52A illustrates consecutive three frames 711 through 713 in time series, of the frames selected by the compositing target image selecting unit 170. A composited image 714 indicates an image wherein the consecutive three frames 711 through 713 in time series are subjected to affine transformation, and are then composited. Also, the frame 713 is a frame adjacent to the frame 712 in time series, and indicates a state after affine transformation. The decoration image determining unit 700 obtains each of these frames from the moving picture file stored in the moving picture storage unit 200 based on information relating to the frames selected by the compositing target image selecting unit 170. Also, the decoration image determining unit 700 includes a work buffer used for holding a composited image.

As shown in FIG. 52A, a frame 714 that is the next frame after affine transformation is overlaid above the composited image 714 wherein up to the immediately previous frame of the selected frames are composited. At this time, with regard to an overlaid region 715 between the composited image 714 and the image corresponding to the frame 713, in the same way as with the method shown in the first embodiment of the present invention, a feature point is extracted from the composited image 714, and an optical flow is calculated regarding this feature point. Subsequently, camera work parameters and reliability are calculated. Thus, in the case that camera work parameters and reliability have been calculated regarding not the whole image but a local region of an overlaid region alone, the calculation results differ from the camera work parameters and reliability calculated regarding the whole image in some cases. Also, the frames selected by the compositing target image selecting unit 170 are not consecutive frames making up a moving picture, and accordingly, there is a possibility that inter-frame shift may be caused due to multiplication of multiple affine transformation parameters. Note that, of the overlaid region 715, a region 716 is an overlaid region between the frames 711 and 713, and of the overlaid region 715, the region other than the region 716 is an overlaid region between the frames 712 and 713. FIG. 52A schematically illustrates the feature points extracted from the overlaid region 715 using black circles and white circles. Also, optical flows calculated regarding these feature points are represented with arrows with feature points as the origins. Here, let us say that the feature points indicated with black circles of the overlaid region 715 are feature points that exhibit dominant motion, and the white circles are the other feature points.

FIG. 52B illustrates a case where the affine transformation parameters calculated regarding the overlaid region 715 shown in FIG. 52A are used to subject the overlaid region 715 to affine transformation. FIG. 52B uses four arrows to illustrate the transition of movement with the affine transformation parameters, and illustrates the region after the overlaid region 715 is subjected to affine transformation as an overlaid region 717 after affine transformation. Also, FIG. 52C illustrates only the overlaid region 715, and the overlaid region 717 after affine transformation.

Thus, in the case that affine transformation parameters calculated regarding consecutive frames making up a moving picture are used to composite the selected frames, there is a possibility that shift may be caused. Therefore, with this example, the heaviness of a white frame is determined based on the size of shift.

Now, as shift amount, two over-extension rates DR1 and DR2 will be calculated using the following expressions.

Over-extension rate $DR1=(1-(C/A))$

Over-extension rate $DR2=(1-(C/B))$

Here, C represents the area of a region wherein an overlaid region of target images, and a region after affine transformation of this overlaid region are composited. Also, A represents the area of the overlaid region of target images, and B represents the area of the overlaid region of target images after affine transformation. For example, with the example shown in FIG. 52C, let us say that the area of a region wherein the overlaid region 715 and the overlaid region 717 after affine transformation are composited is taken as an area C, the area of the overlaid region 715 is taken as an area A, and the area of the overlaid region 717 after affine transformation is taken as an area B. Subsequently, the two over-extension rates DR1 and DR2 are calculated.

With the two over-extension rates DR1 and DR2 thus calculated, a greater value is selected. Subsequently, let us say that this selected over-extension rate is taken as DR, the heaviness of a white frame serving as a decoration image is calculated using the following expressions.

The heaviness of a white frame $SH1$ to be added to the sides of both ends in the horizontal direction=$W\times DR$ The heaviness of a white frame $SH2$ to be added to the sides of both ends in the vertical direction=$H\times DR$ An upper limit and a lower limit may be provided to a over-extension rate so as to prevent a white frame from becoming greatly heavy as to an image serving as a providing target. As a range of an upper limit and a lower limit of a over-extension rate, for example, 0.1 through 0.03 may be set.

The heavinesses SH1 and SH2 to be added to the sides of both ends in the horizontal direction and in the vertical direction thus calculated are output to the recording control unit 150, and are recorded in the decoration image data 278 of the compositing target image metadata storage unit 277.

For example, in the case that the over-extension rate is small, shift between a target image serving as an object to which a white frame is added, a composited image to be overlaid below that image is small. Therefore, even in the case that the heaviness of a white frame to be added to the target image thereof is thinned, it can be conceived to form a natural image between the target image and the composited image. On the other hand, in the case that the over-extension rate is great, shift between the target image, and a composited image to be overlaid below that image is great. Therefore, the heaviness of a white frame to be added to the target image thereof is increased, whereby the shift thereof can be obscured. Also, according to a white frame to be added to the image, unnaturalness due to shift can be eliminated. Note that the position to which a white frame is added may be one of the outer side, inner side, and above the edge of the target image. Examples to add such a white frame are shown in FIGS. 56A through 58D.

Figure 53A:
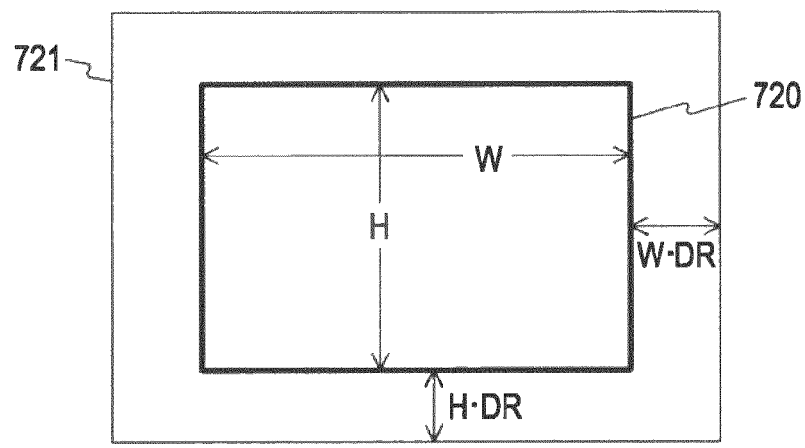
FIGS. 53A through 53C are diagrams illustrating an example of a decoration image determined by the decoration image determining unit according to the fourth embodiment of the present invention.
Figure 53B:
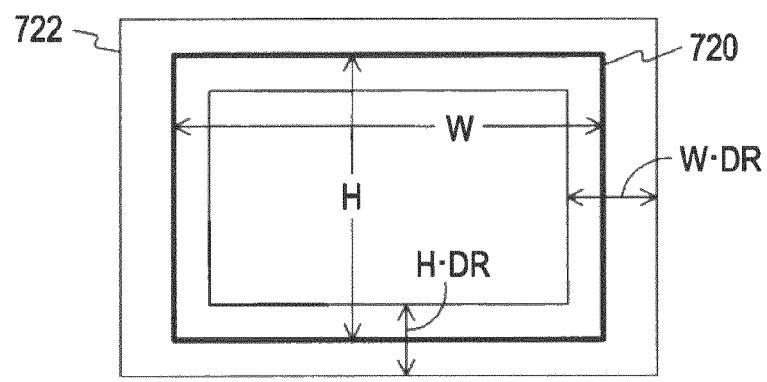
Figure 53C:
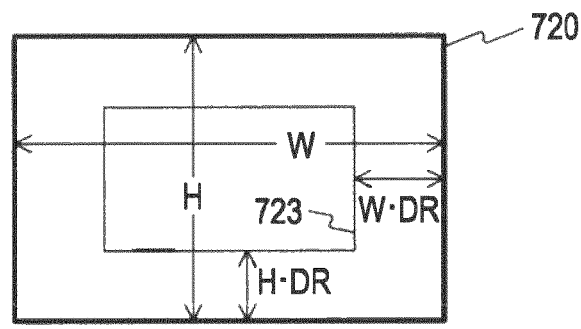

FIGS. 53A through 53C are diagrams illustrating an example of a decoration image determined by the decoration image determining unit 700 according to the fourth embodiment of the present invention. FIG. 53A illustrates an example wherein a white frame image 721 is added to the outer side of the periphery of a frame 720, FIG. 53B illustrates an example wherein a white frame image 722 is added so as to include the periphery of the frame 720, and FIG. 53C illustrates an example wherein a white frame image 723 is added to the inner side of the periphery of the frame 720. Note that in the case that a white frame image is added so as to include the periphery of an image, the white frame image may be added so as to obliquely straddle the periphery of the image. Note that FIGS. 53A through 53C enlarge white frames as to images to facilitate visualization. Also, FIGS. 53A through 53C illustrate the periphery of an image using a heavy line so as to facilitate visualization for the size of the frame 720.

Also, the heaviness of a white frame thus calculated may be determined for each image serving as a calculation target. However, in order to provide a prominent composited image, of the over-extension rates calculated regarding the same image compositing target section, a over-extension rate having the highest value may be used to unify the white frame ratio of each frame included in the section thereof. Also, for example, the average value of over-extension rates may be employed. Also, as shown in FIGS. 54A through 54C, the position to which a white frame is added may be changed according to relative positional relationship between images.

Figure 54A:
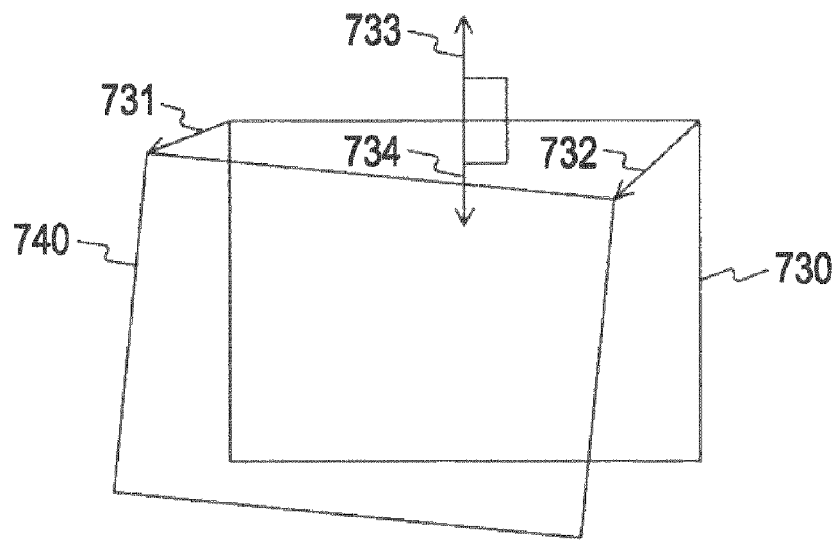
FIGS. 54A through 54C are diagrams illustrating an example of a determining method for a decoration image by the decoration image determining unit according to the fourth embodiment of the present invention.
Figure 54B:
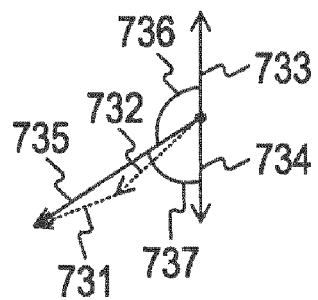
Figure 54C:
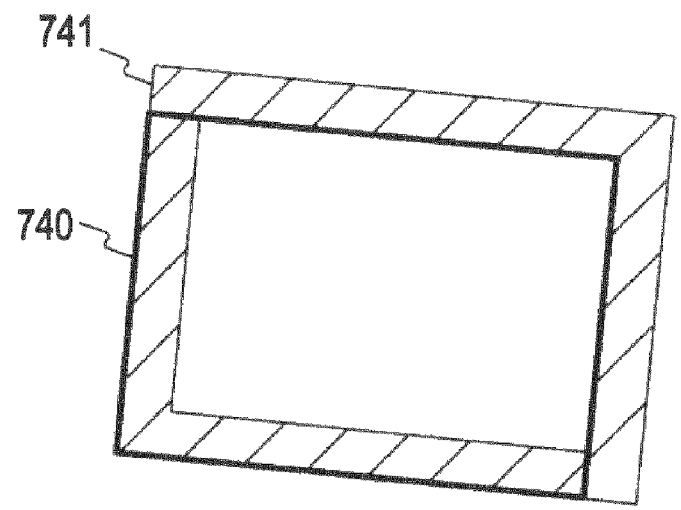

FIGS. 54A through 54C are diagrams illustrating an example of a determining method for a decoration image by the decoration image determining unit 700 according to the fourth embodiment of the present invention. FIG. 54A illustrates a case where a frame 740 is subjected to affine transformation with a frame 730 as a reference frame. With this example, description will be made regarding an example wherein the position of an image to be added to the periphery on the upper side of the frame 740 is determined. For example, movement vectors in the case that the frame 740 is subjected to affine transformation, and points at the two corners on the upper side of the frame 370 are moved, with the frame 730 as a reference frame, are illustrated with movement vectors 731 and 732. Also, normal vectors on the upper side of the frame 730 are illustrated with normal vectors 733 and 734.

FIG. 54B illustrates relationship between the movement vectors 731 and 732, and the normal vectors 733 and 734. For example, in the case that the position to which a whit frame is added is calculated regarding the upper side of the frame 740, an angle 736 formed of a vector 735 obtained by adding the movement vectors 731 and 732, and the vector 733 is calculated. Also, an angle 737 formed of the vectors 735 and 734 is calculated. Subsequently, the value of the angle 736, and the value of the angle 737 are compared. As a result of this comparison, in the case that the value of the angle 736 is smaller, a white frame is disposed in the inner side of the periphery of the frame 740. On the other hand, in the case that the value of the angle 737 is smaller, a white frame is disposed in the outer side of the periphery of the frame 740. For example, as shown in FIG. 54B, as a result of comparison between the value of the angle 736 and the value of the angle 737, the value of the angle 737 is smaller, and accordingly, a white frame to be added to the periphery on the upper side of the frame 740 is determined to be disposed on the outer side thereof. Also, with regard to the other three sides as well, the position of a white frame can be determined in the same way.

FIG. 54C illustrates a white frame image 741 serving as an example of a white frame to be added to the frame 740. Thus, the position of the white frame image can be determined according to the relative position as to the reference frame. Note that in the case that the sum of two movement vectors becomes 0, a white frame image may be determined to be disposed in either the outer side or the inner side. Also, even in the case that the sum of two movement vectors is other than 0, a white frame image may be determined not only to be disposed in either the outer side or the inner side of the periphery, but also to be disposed so as to straddle the periphery thereof. For example, the center position of a white frame image may be changed according to an angle formed of an addition vector and a normal vector. Also, as shown in FIGS. 55A and 55B, a white frame image to be disposed regarding the same side may be disposed differently at both ends of the side thereof.

Figure 55A:
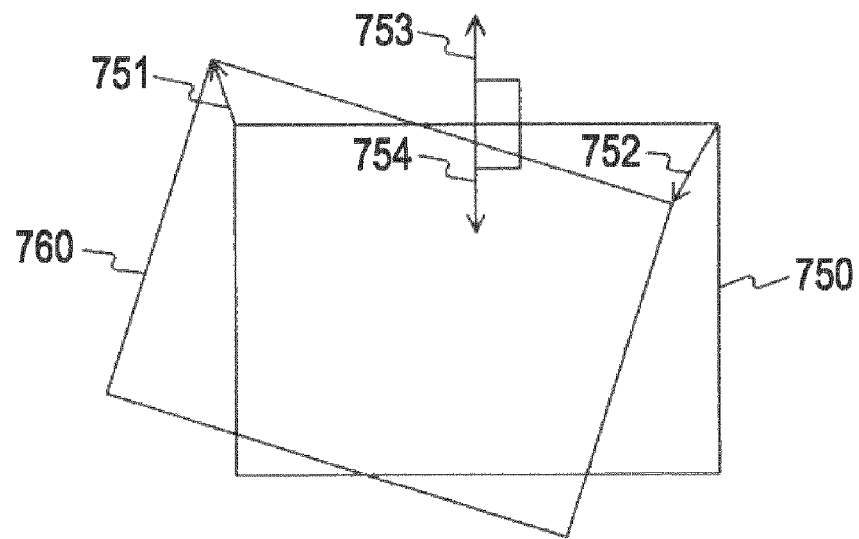
FIGS. 55A and 55B are diagrams illustrating an example of a determining method for a decoration image by the decoration image determining unit according to the fourth embodiment of the present invention.
Figure 55B:
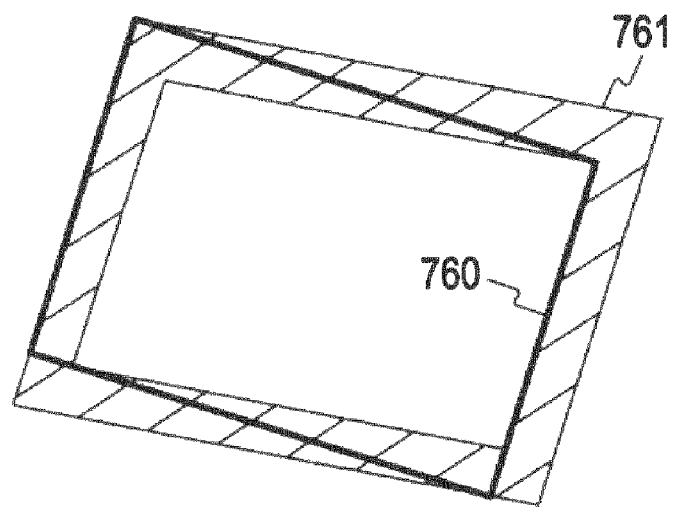

FIGS. 55A and 55B are diagrams illustrating an example of a determining method for a decoration image by the decoration image determining unit 700 according to the fourth embodiment of the present invention. FIG. 55A illustrates a case where a frame 760 is subjected to affine transformation with a frame 750 as a reference frame. For example, let us say that in the case that an angle formed of a movement vector 751, and a normal vector 753 is small, and an angle formed of a movement vector 752 and a normal vector 754 is small, around the termination of the movement vector 751 is the inner side. Also, around the termination of the movement vector 752 may be determined to be disposed in the other side. The other sides may be determined in the same way. In the case that determination is thus made, for example, a white frame image may be disposed such as shown in FIG. 55B. However, in the case that a white frame image is disposed in such a way, there is a possibility that the outer shape of the image may be changed. For example, as shown in FIG. 55B, in the case that a frame 760 is a rectangle, an image to which a white frame image has been added becomes a parallelogram in some cases. Also, for example, in the case that the target frame is a rectangle, a case is assumed wherein an image to which a white frame image has been added becomes a trapezoid, or in the case that the target frame is a parallelogram, a case is assumed wherein an image to which a white frame image has been added becomes a trapezoid.

Compositing Example of White Frame

FIGS. 56A through 56D are diagrams illustrating a compositing example in which decoration images determined by the decoration image determining unit 700 according to the fourth embodiment are composited. The image compositing unit 220 executes this decoration image compositing based on the content of decoration image data 278 of the compositing target image metadata storage unit 277. That is to say, based on the content of affine transformation parameters 274 of the compositing target image metadata storage unit 277, the image is subjected to affine transformation by the image transforming unit 190. Subsequently, based on the content of decoration image data 278 of the compositing target image metadata storage unit 277, the image compositing unit 220 executes image compositing by adding a decoration image to an image after affine transformation. With the example shown in FIGS. 56A through 56D, influence of shift in the translational direction will be described. Note that FIGS. 56A through 57D illustrate an example wherein a white frame is added as a decoration image.

Figure 56A:
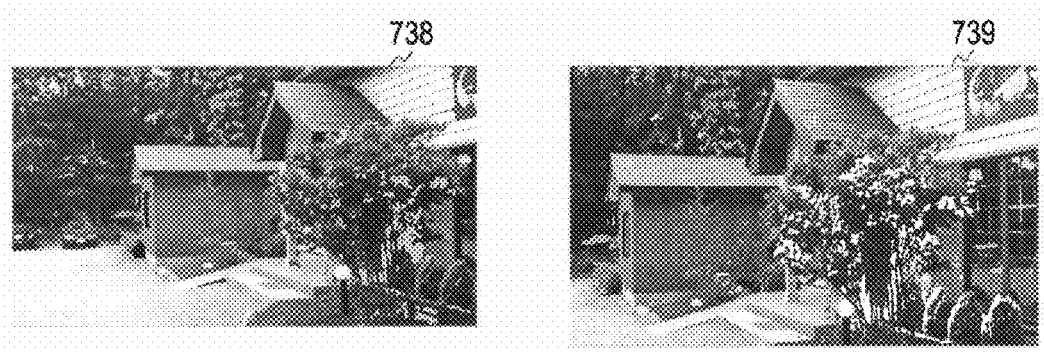
FIGS. 56A through 56D are diagrams illustrating a compositing example in which decoration images determined by the decoration image determining unit according to the fourth embodiment are composited.
Figure 56B:
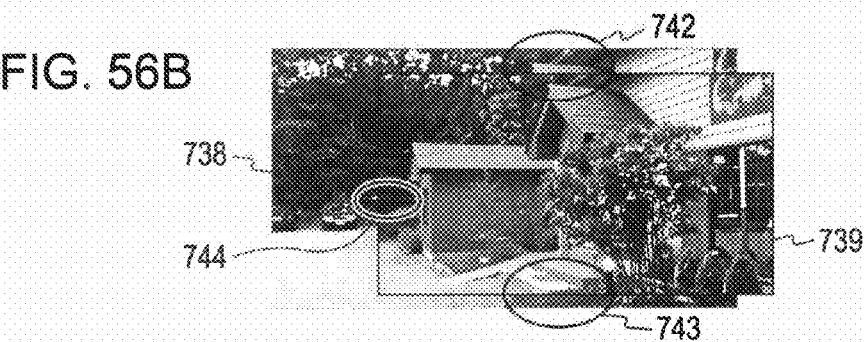
Figure 56C:
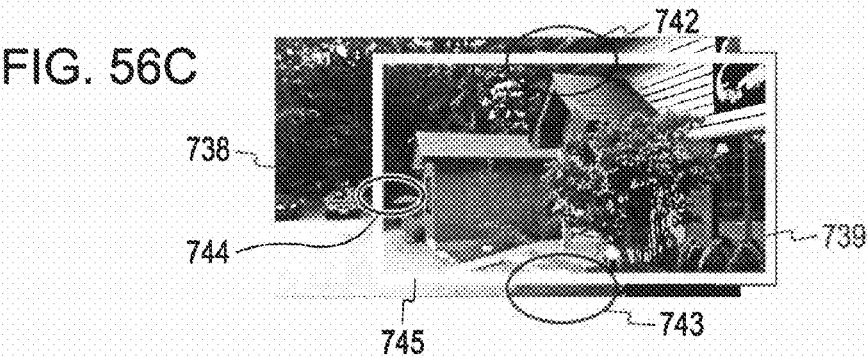
Figure 56D:
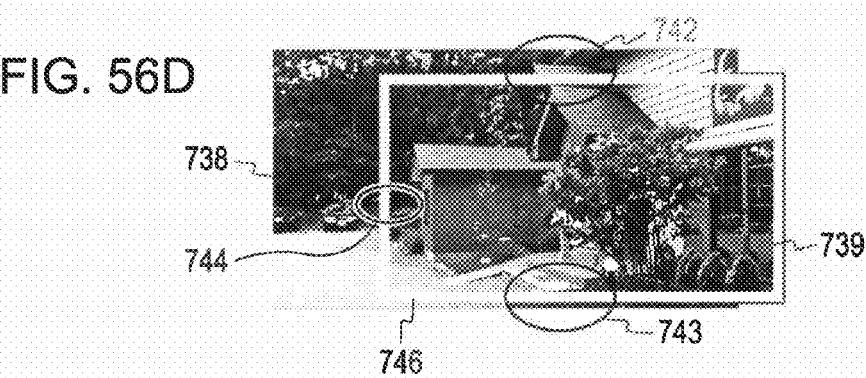

FIG. 56A illustrates compositing target images 738 and 739. FIG. 56B illustrates an example wherein the compositing target image 739 is subjected to affine transformation with the compositing target image 738 as a reference image. With the example shown in FIG. 56B, a case is illustrated wherein the compositing target image 739 is shifted to lower right. For example, with an image region surrounded with a circle 742, the portion of a roof included in the compositing target image 738 is seen excessively. Also, for example, with an image region surrounded with a circle 743, the portion of grass included in the compositing target image 738 is hidden with the compositing target image 739. Also, for example, with an image region surrounded with a circle 744, the portion of an umbrella included in the compositing target image 738 is seen excessively. Therefore, as shown in FIG. 56C, a decoration image 745 determined by the decoration image determining unit 700 is composited as to the compositing target image 739, for example, whereby an unnatural image included in the region portions surrounded with circles 742 through 744 can be hidden. On the other hand, as shown in FIG. 56D, in the case that a decoration image 746 is composited as to the compositing target image 739 in the opposite direction of the region determined by the decoration image determining unit 700, for example, an unnatural image included in the region portions surrounded with circles 742 through 744 may not be hidden.

FIGS. 57A through 57D are diagrams illustrating a compositing example in which decoration images determined by the decoration image determining unit 700 according to the fourth embodiment are composited. Note that, with the example shown in FIGS. 57A through 57D, influence of shift in the enlargement/reduction direction will be described.

Figure 57A:
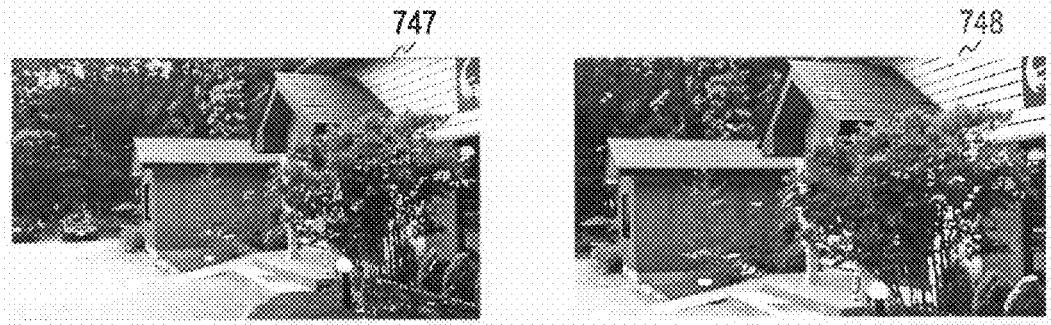
FIGS. 57A through 57D are diagrams illustrating a compositing example in which decoration images determined by the decoration image determining unit according to the fourth embodiment are composited.
Figure 57B:
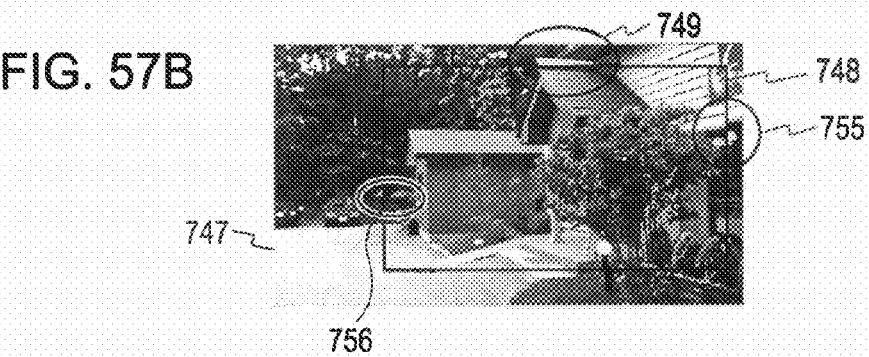
Figure 57C:
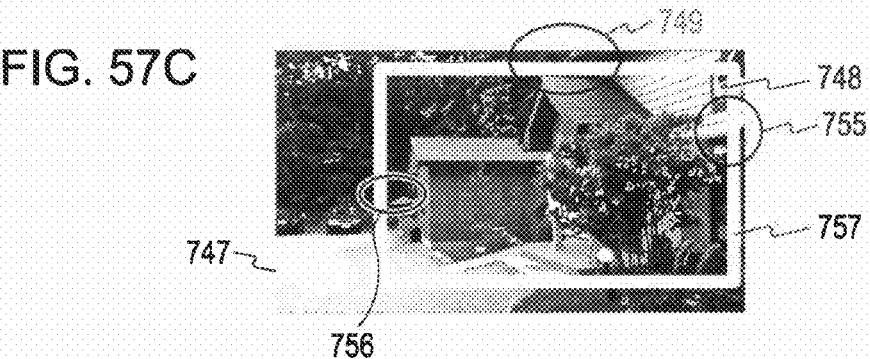
Figure 57D:
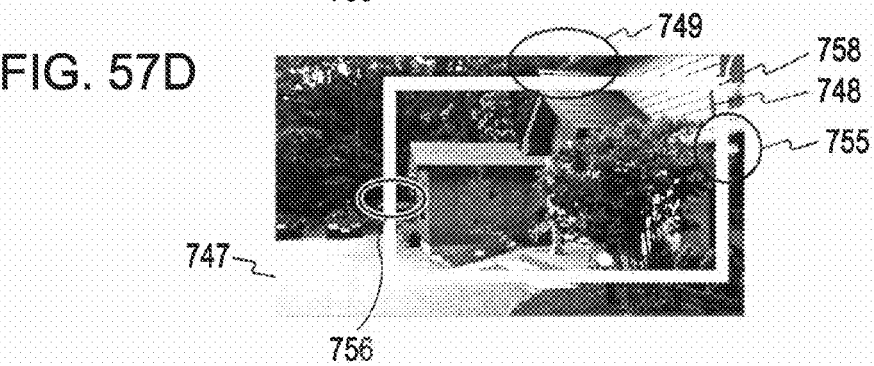

FIG. 57A illustrates compositing target images 747 and 748. FIG. 57B illustrates an example of a case where the composited image 748 is subjected to affine transformation and composited with the compositing target image 747 as a reference image. With the example shown in FIG. 57B, a case is shown wherein the compositing target image 747 is shifted in the reduction direction. For example, with an image region surrounded with a circle 749, the portion of a roof included in the compositing target image 747 is seen excessively. Also, for example, with an image region surrounded with a circle 755, the portion of an electric light included in the compositing target image 747 is seen excessively. Also, for example, with an image region surrounded with a circle 756, the portion of an umbrella included in the compositing target image 747 is seen excessively. Therefore, as shown in FIG. 57C, a decoration image 757 determined by the decoration image determining unit 700 is composited as to the compositing target image 748, for example, whereby an unnatural image included in the region portions surrounded with circles 749, 755, and 756 can be hidden. On the other hand, as shown in FIG. 57D, in the case that a decoration image 758 is composited as to the compositing target image 748 in the opposite direction of the region determined by the decoration image determining unit 700, for example, an unnatural image included in the region portions surrounded with the circles 749, 755, and 756 may not be hidden.

FIGS. 58A through 58D are diagrams illustrating a compositing example in which the decoration image determined by the decoration image determining unit 700 according to the fourth embodiment is composited. Note that, with the example shown in FIGS. 58A through 58D, influence of shift in the rotational direction will be described.

Figure 58A:
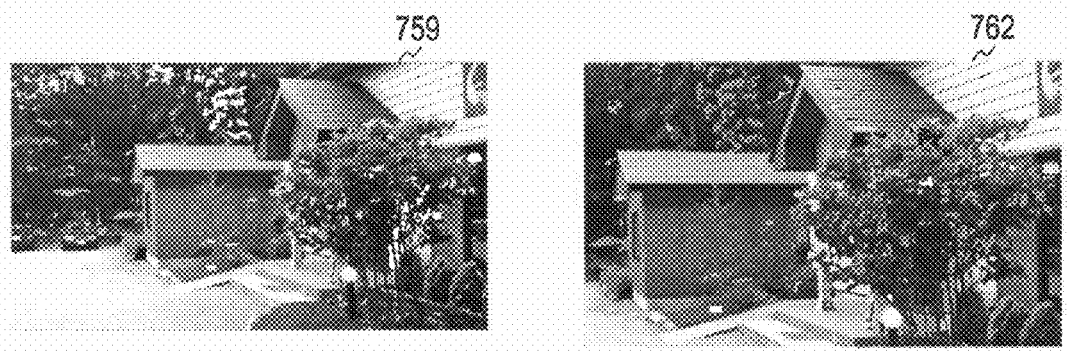
FIGS. 58A through 58D are diagrams illustrating a compositing example in which decoration images determined by the decoration image determining unit according to the fourth embodiment are composited.
Figure 58B:
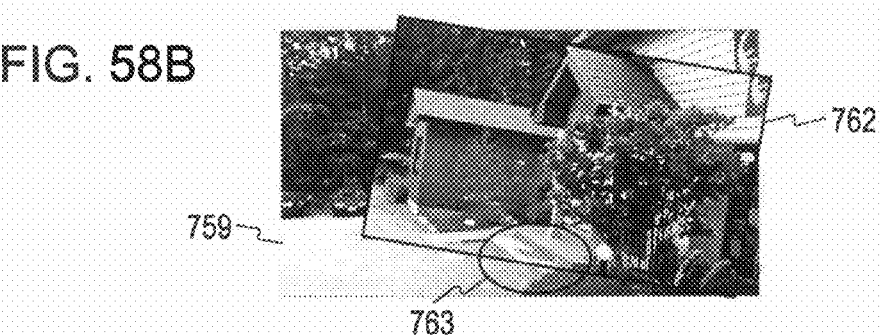
Figure 58C:
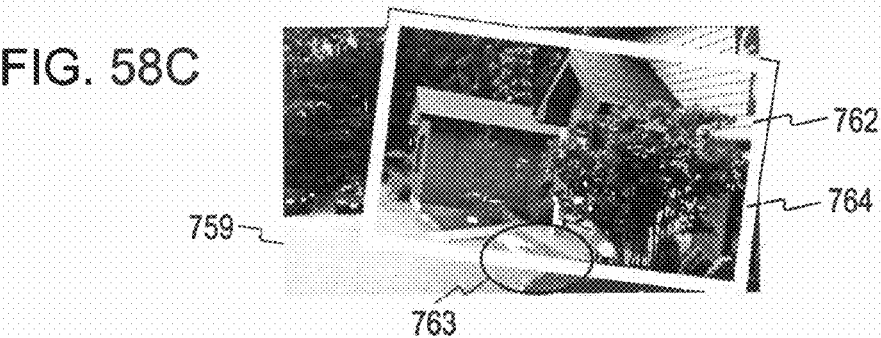
Figure 58D:
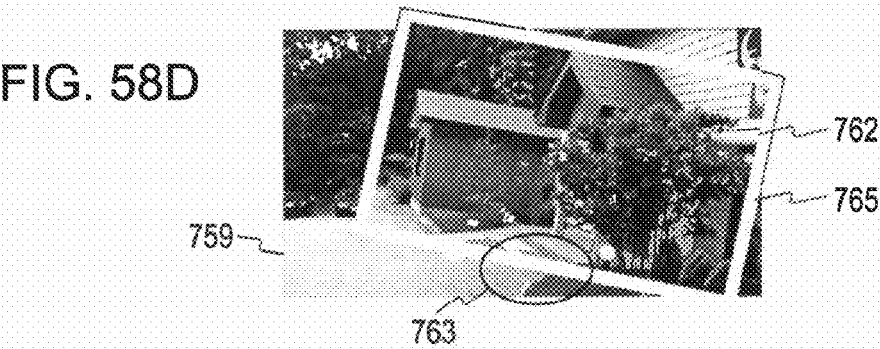

FIG. 58A illustrates compositing target images 759 and 762. FIG. 58B illustrates an example of a case where the composited image 762 is subjected to affine transformation and composited with the compositing target image 759 as a reference image. With the example shown in FIG. 58B, a case is shown wherein the compositing target image 762 is shifted in the clockwise direction. For example, with an image region surrounded with a circle 763, the portion of a stone pavement included in the compositing target image 759 is seen unnaturally. Therefore, as shown in FIG. 58C, a decoration image 764 determined by the decoration image determining unit 700 is composited as to the compositing target image 762, for example, whereby an unnatural image included in the region portion surrounded with a circle 763 can be hidden. On the other hand, as shown in FIG. 58D, in the case that a decoration image 765 is composited as to the compositing target image 762 in the opposite direction of the region determined by the decoration image determining unit 700, for example, an unnatural image included in the region portion surrounded with the circle 763 may not be hidden. Here, in the case that the compositing target is shifted simply in the rotational direction, as described in FIGS. 54A through 54C, the sum of two movement vectors becomes 0. Therefore, a white frame image may be determined not only to be disposed in either the outer side or the inner side of the periphery, but also to be disposed above the periphery thereof.

Thus, the decoration image determined by the decoration image determining unit 700 is composited as to a compositing target image, whereby a panorama-style natural composited image can be provided to the user.

Determination Example of White Frame while Considering Faces

Now, for example, in the case of compositing the compositing target images to which a decoration image has been added, there is a possibility that a face included in the composited image overlaid on the lower side may be hidden. In such a case, the position of a decoration image can be changed in a direction where the face is not hidden. Alternatively, the heaviness of a decoration image may be adjusted.

Figure 59:
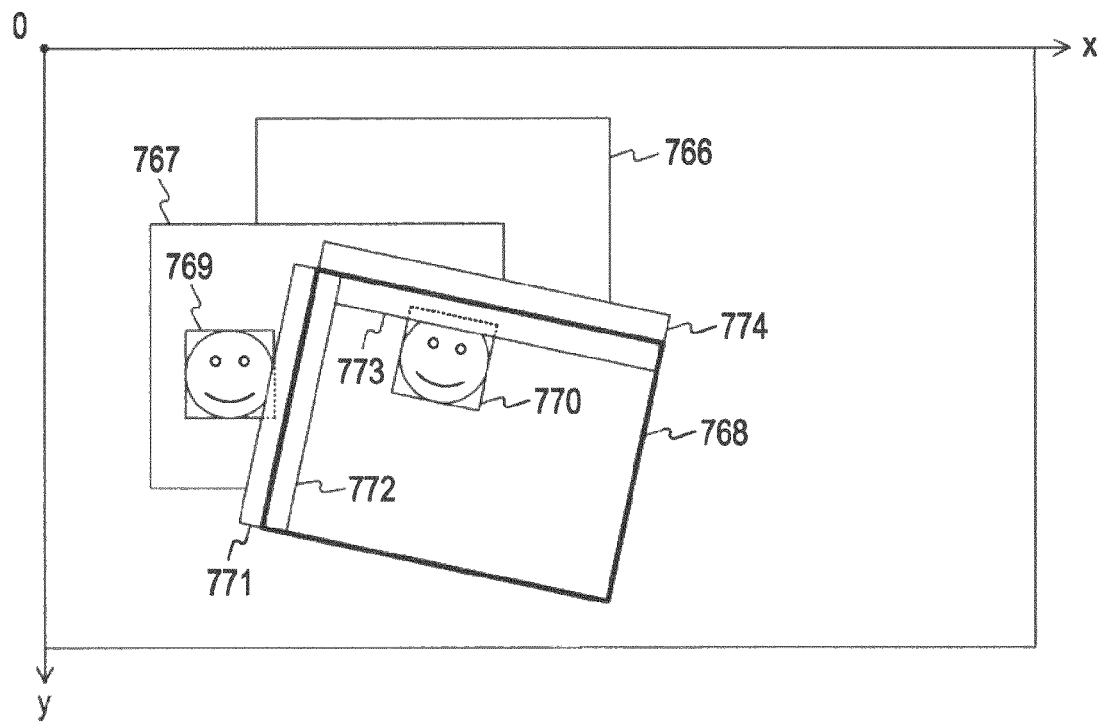
FIG. 59 is a diagram illustrating an example of a decoration image determining method by the decoration image determining unit according to the fourth embodiment, which takes faces into consideration.

FIG. 59 is a diagram illustrating an example of a decoration image determining method by the decoration image determining unit 700 according to the fourth embodiment, which takes faces into consideration. Now, an example is shown wherein the decoration images of compositing target images 766 through 768 are determined. Also, let us say that the compositing target images 767 and 768 include a face, and these regions including a face are represented with face regions 769 and 770.

For example, let us say that the compositing target images 767 and 768 are subjected to affine transformation and composited with the compositing target image 766 as a reference image. In this case, the compositing target image 768 is overwritten and composited as to the compositing target image 767, and accordingly, for example, in the case that a decoration image to be added to the compositing target image 768 is great (or in the case of being added to the outer side), there is a possibility that a face included in the face region 769 may be hidden.

Now, for example, a face region included in a compositing target image can be determined using the face data stored in face data 276 of the compositing target image metadata storage unit 277. Therefore, for example, the decoration image determining unit 700 calculates whether or not the region of a decoration image determined before a face is taken into consideration, and a face region are overlaid, and in the case that the region of the decoration image and the face region are overlaid, the position of the decoration image is changed to the opposite side of the determined position. For example, in the case that the face region 769 included in the compositing target image 767, and a decoration image 771 determined to be added to the outer side of the left end of the compositing target image 768 are overlaid, the decoration image 771 is changed to be added to the inner side, i.e., changed to be a decoration image 772. Also, for example, in the case that the face region 770 included in the compositing target image 768, and a decoration image 773 determined to be added to the inner side of the upper end of the compositing target image 768 are overlaid, the decoration image 773 is changed to be added to the outer side, i.e., changed to be a decoration image 774.

Now, for example, even if the position to be added is changed to either the inner side or the outer side of the compositing target image, the decoration image and the face image are overlaid, the heaviness of the decoration image may be changed by calculating the distance between the decoration image and the face region. Thus, even if the heaviness of the decoration image is changed, in the case that the decoration image and the face image are overlaid, for example, the position of the decoration image is changed to a position where an overlaid area is small. However, for example, in the case that a priority is given to the compositing target image to be overlaid on the upper side, and the decoration image and the face region are overlaid, the decoration may be determined to be added to the outer side of the compositing target image. Alternatively, an arrangement may be made wherein the distance between the face region and the decoration image is calculated for each side beforehand, the maximum heaviness of the decoration image not to be overlaid above a face is stored in the compositing target image metadata storage unit 277 beforehand, and the decoration image is added using these values.

Determination Example of Shadow

Description has been made so far regarding an example wherein a white frame is added to a compositing target image as a decoration image, but for example, a shadow may be added to a compositing target image as a decoration image.

Figure 60A:
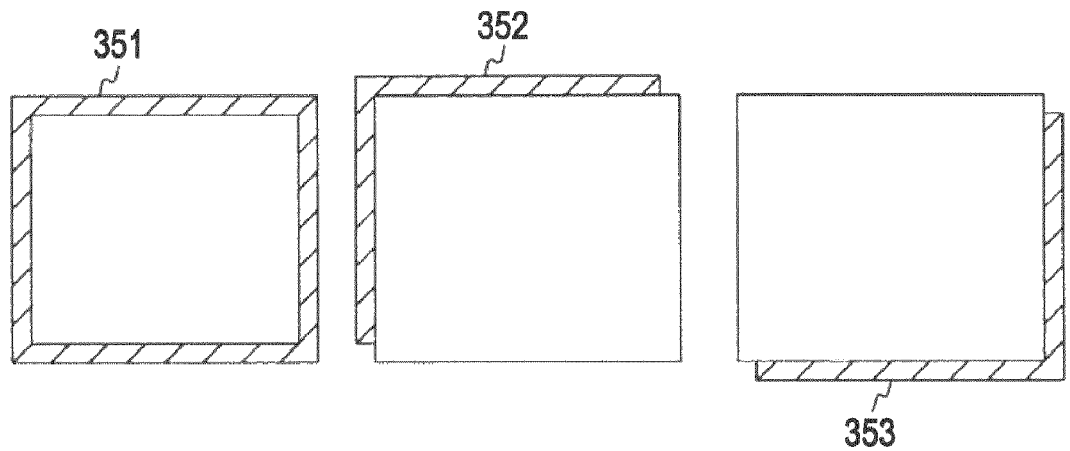
FIGS. 60A through 60C are diagrams illustrating an example of a shadow determined to be a decoration image to be added to a compositing target image by the decoration image determining unit according to the fourth embodiment.
Figure 60B:
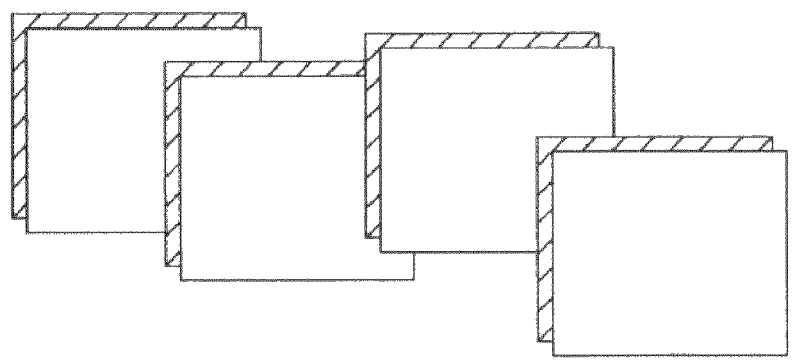
Figure 60C:
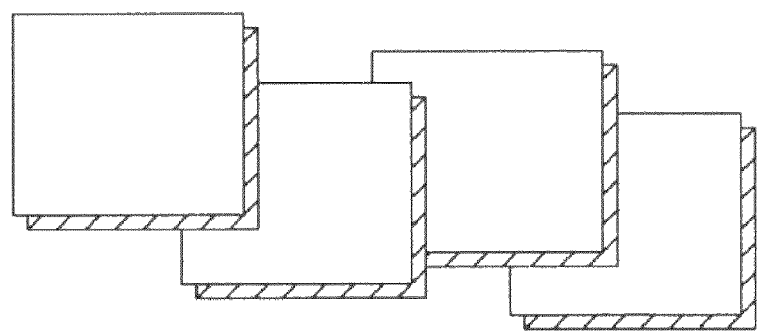

FIGS. 60A through 60C are diagrams illustrating an example of a shadow determined to be a decoration image to be added to a compositing target image by the decoration image determining unit 700 according to the fourth embodiment of the present invention. Hereinafter, a shadow to be added to a compositing target image is indicated by adding a diagonal stroke internally. FIG. 60A illustrates the basic shape of a shadow to be added to a compositing target image. For example, with regard to the direction of a shadow, such as a shadow 351, we will primarily consider a situation wherein a shadow is spreading in all directions when light is applied from directly above a compositing target image. Also, like a shadow 352 or 353, an affect can also be produced wherein light is applied from obliquely upward or obliquely downward of a compositing target image.

FIG. 60B illustrates a case where an effect is produced such that light is applied from obliquely upward of a compositing target image to create a composited image. That is to say, a composited image to which the shadow 352 has been added is composited sequentially, whereby the composited image shown in FIG. 60B can be created. Also, FIG. 60C illustrates a case where an effect is produced wherein light is applied from obliquely downward of a compositing target image to create a compositing target. That is to say, a composited image to which the shadow 353 has been added is composited sequentially, whereby the composited image shown in FIG. 60C can be created.

Now, for example, in the case that an effect is produced wherein light is applied from obliquely upward or obliquely downward of a composited image, it is desired that a direction where a shadow falls on a lower image according to the final overlaid direction of composited images as much as possible is determined to be the direction of a shadow. Also, the heaviness of a shadow may be set to a certain value, for example. Also, for example, in the same way as the case of a white frame described above, the heaviness of a shadow may be determined according to a over-extension rate.

Figure 61A:
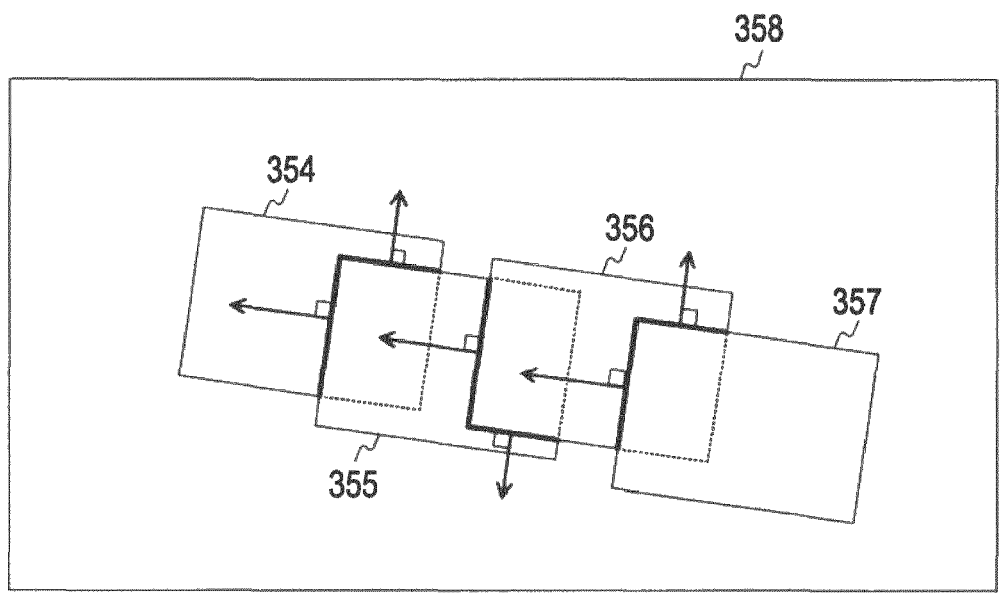
FIGS. 61A and 61B are diagrams illustrating an overview of a determining method arranged to determine the direction of a shadow by the decoration image determining unit according to the fourth embodiment.
Figure 61B:
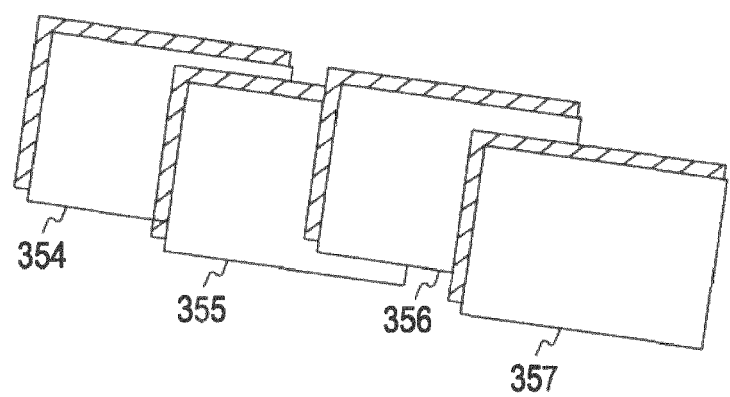

FIGS. 61A and 61B are diagrams illustrating an overview of a determining method arranged to determine the direction of a shadow by the decoration image determining unit 700 according to the fourth embodiment. FIG. 61A illustrates compositing target images 354 through 357 held at a work buffer 358. For example, let us say that the lengths of the sides of a compositing target image overwritten above another compositing target image are calculated, the outward normal vectors of the sides thereof are calculated, and the sizes of the normal vectors are taken as the lengths of overwritten portions of the sides. For example, with the compositing target images 355 through 357 shown in FIG. 61A, a side overwritten above another compositing target image is indicated with a heavy line. Also, the outward normal vector of the side thereof is indicated above a heavy line. All of the normal vectors of a compositing target image thus calculated are integrated, and the direction of a normal vector obtained by integration is determined to be the direction where a shadow is added. FIG. 61B illustrates composited images formed the compositing target images 354 through 357 to which a shadow thus determined is added. The direction of a shadow is thus determined, whereby the shadow is projected above a compositing target image, and accordingly, the effect of the shadow can be enhanced.

Note that, in addition to determination of the direction of a shadow by integration of a normal vector described above, the direction of a shadow may be selected and determined from several directions determined beforehand with reference to the direction of a normal vector. Alternatively, an arrangement may be made wherein an affine matrix obtained by multiplying the affine transformation parameters correlated with each compositing target image is used to obtain the integral translational component of camera work, and the direction of this integral translational component is taken as the direction of a shadow.

Determination Example of Shadow while Considering Faces

Now, for example, in the case that compositing target images to which a shadow has been added are composited, there is a possibility that a face included in a composited image overlaid on the lower side may be hidden. In such a case, in the same way as with the case of a white frame described above, the position of a shadow can be changed to a direction where the face is not hidden. Alternatively, the heaviness of a shadow may be adjusted. Also, in the case that a face region is covered with a shadow, the color of the shadow may be diluted. An example will be shown below wherein in the case that a face is covered with a shadow, the direction of a normal vector at the side thereof is inverted, thereby changing the direction of the shadow.

Figure 62:
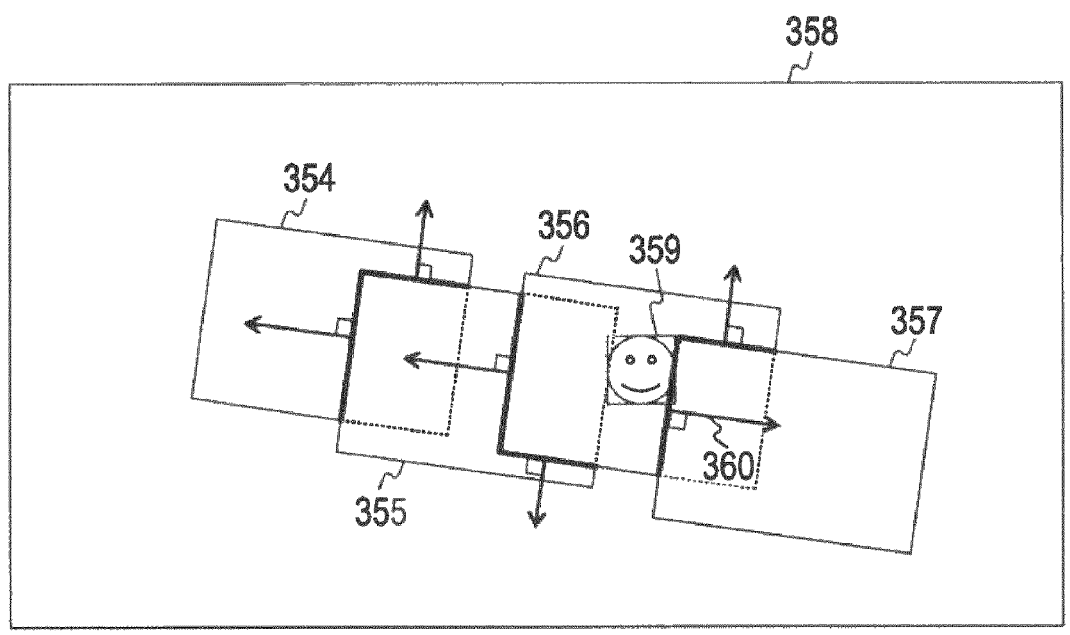
FIG. 62 is a diagram illustrating an example of a shadow determining method by the decoration image determining unit according to the fourth embodiment, which takes faces into consideration.

FIG. 62 is a diagram illustrating an example of a shadow determining method by the decoration image determining unit 700 according to the fourth embodiment, which takes faces into consideration. The example shown in FIG. 62 is the same as the case shown in FIG. 61A except that of compositing target images 354 through 357 held at the work buffer 358, a face region 359 is included in the compositing target image 356. For example, a normal vector is obtained in the same way as the case shown in FIG. 61A, but in the case that the face region is covered with a shadow, the direction of the normal vector at the side thereof is inverted. For example, with the compositing target image 357 shown in FIG. 62, of the sides overwritten above the other compositing target image 356, the side of the left edge is overlaid above the face region 359. Therefore, the direction of the normal vector at the side thereof is inverted. That is to say, the direction of the normal vector thereof is inverted such as a normal vector 360. Note that a method used for determining the direction of a shadow is the same as with the case shown in FIG. 61A except that the direction of a normal vector is inverted, and accordingly, description thereof will be omitted here.

Here, with the example shown in FIG. 62, the direction of the integral vector of a normal vector calculated after the direction of a normal vector is inverted is almost the same as with the case of not inverting the direction thereof, and accordingly, the face is hidden with a shadow. However, in the case that a face is covered with the shadows of the left sides of multiple compositing target images, the directions of the shadows are upper-right directions, whereby the face can be prevented from being hidden with the shadows. Also, for example, the density of the whole shadow may be diluted according to the direction and length of an inverted normal vector. Alternatively, the heaviness of a shadow may be thinned according to the direction and length of an inverted normal vector. Also, in the case that a face is covered with a shadow, a shadow changing method may be used wherein the density of the whole shadow is diluted by a certain rate, or the heaviness thereof is thinned by a certain rate.

Thus, in the case that there is a possibility that a face included in a composited image overlaid on the lower side may be hidden, the position of a shadow can be changed to a direction where the face is not hidden. However, as compared to a white frame, even in the case that a face is covered with a shadow, this state can be conceived as not so much worrisome. Therefore, in the case that a face region is covered with a shadow, such change or adjustment should not be executed at all, any one of those may be executed, or a combination of those may be executed.

An example has been described so far wherein either a white frame or a shadow is determined to be a decoration image, but the fourth embodiment of the present invention may also be applied to a case where a white frame is added to the periphery of a compositing target image, and also a shadow is added to the periphery of this white frame.

Also, an example has been shown so far wherein a decoration image to be added to a compositing target image is determined at the time of frame selection, but for example, a decoration image to be added to a compositing target image may be determined at the time of display of a composited image. Alternatively, a decoration image may be determined according to the user's operation. For example, whether or not there is a white frame, the position of a white frame, the heaviness of a white frame, whether or not there is a shadow, the direction of a shadow, or the like, of a compositing target image may be specified by the user's operation.

Also, an example has been described so far wherein a white frame or the heaviness and position of a shadow are determined to be a decoration image, but for example, the color or mode of a decoration image may be determined based on a over-extension rate or normal vector. Also, an example has been shown so far wherein a decoration image is determined based on the relative positional relationship between compositing target images, or the like, but for example, a decoration image may be determined based on the attributes, color, or the like of a subject included in a compositing target image. For example, in the case that a frame is added as a decoration image, the color histogram of the peripheral portion of a compositing target image is calculated, and the complementary color of a most frequent color may be determined to be the color of a frame. Thus, a frame to which a color other than white has been added is added to a compositing target image, whereby the edge of the compositing target image can be prevented from falling into obscurity. For example, like the image 576 shown in FIGS. 32 and 33, in the case that the peripheral portion of a compositing target image includes much green, a reddish color is employed as the complementary color as to green. Also, the color or mode of a frame may be determined using each piece of metadata relating to a face shown in the third embodiment of the present invention. For example, the color of a frame can be changed according to the gender or age of a person included in a compositing target image. Also, the color of a frame can be changed according to a point in time wherein a compositing target image has been imaged.

Alternatively, compositing may be executed while correcting shift at the time of displaying a composited image using the camera work parameters and reliability calculated by the method shown in FIGS. 52A through 52C. For example, the camera work parameters and reliability calculated by the method shown in FIGS. 52A through 52C are stored in the compositing target image metadata storage unit 277 beforehand. Subsequently, when displaying a compositing target image, with regard to a compositing target image having high reliability, the affine transformation parameters used for transforming a compositing target image can be corrected using the corresponding camera work parameters.

Operation Example of Image Processing Apparatus

Next, the operation of an image processing apparatus 102 according to the fourth embodiment of the present invention will be described with reference to the drawings.

Figure 63:
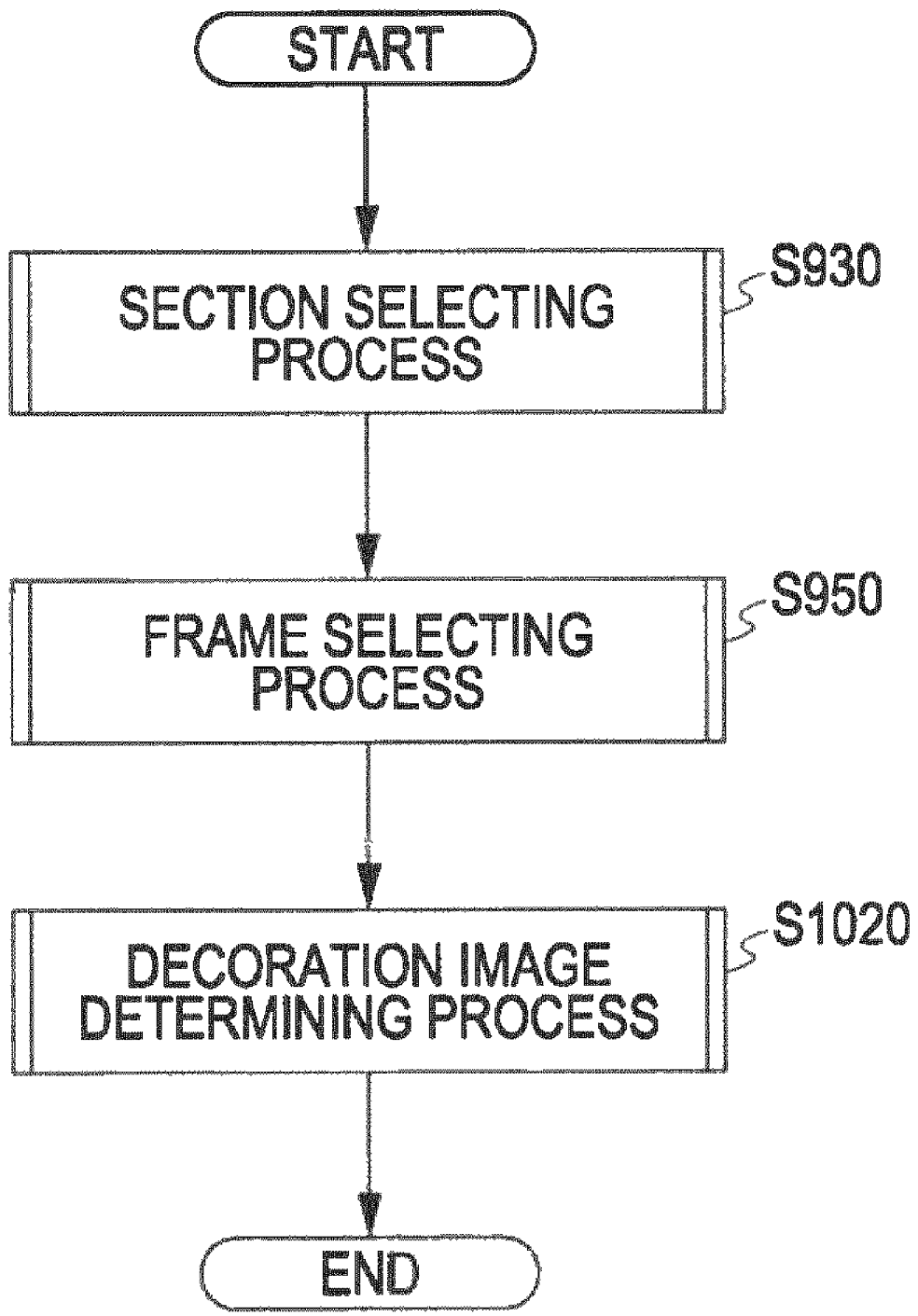
FIG. 63 is a flowchart illustrating the procedure of a compositing target image metadata recording process by the image processing apparatus according to the fourth embodiment of the present invention.

FIG. 63 is a flowchart illustrating the procedure of a compositing target image metadata recording process by the image processing apparatus 102 according to the fourth embodiment of the present invention. This procedure is a modification of the procedure shown in FIG. 34, the same procedure as the procedure shown in FIG. 34 will be denoted with the same reference numerals, and description thereof will be omitted here.

After the frame selecting process by the compositing target image selecting unit 170 is completed, the decoration image determining unit 700 executes a decoration image determining process (step S1020). This decoration image determining process will be described in detail with reference to FIG. 64.

Figure 64:
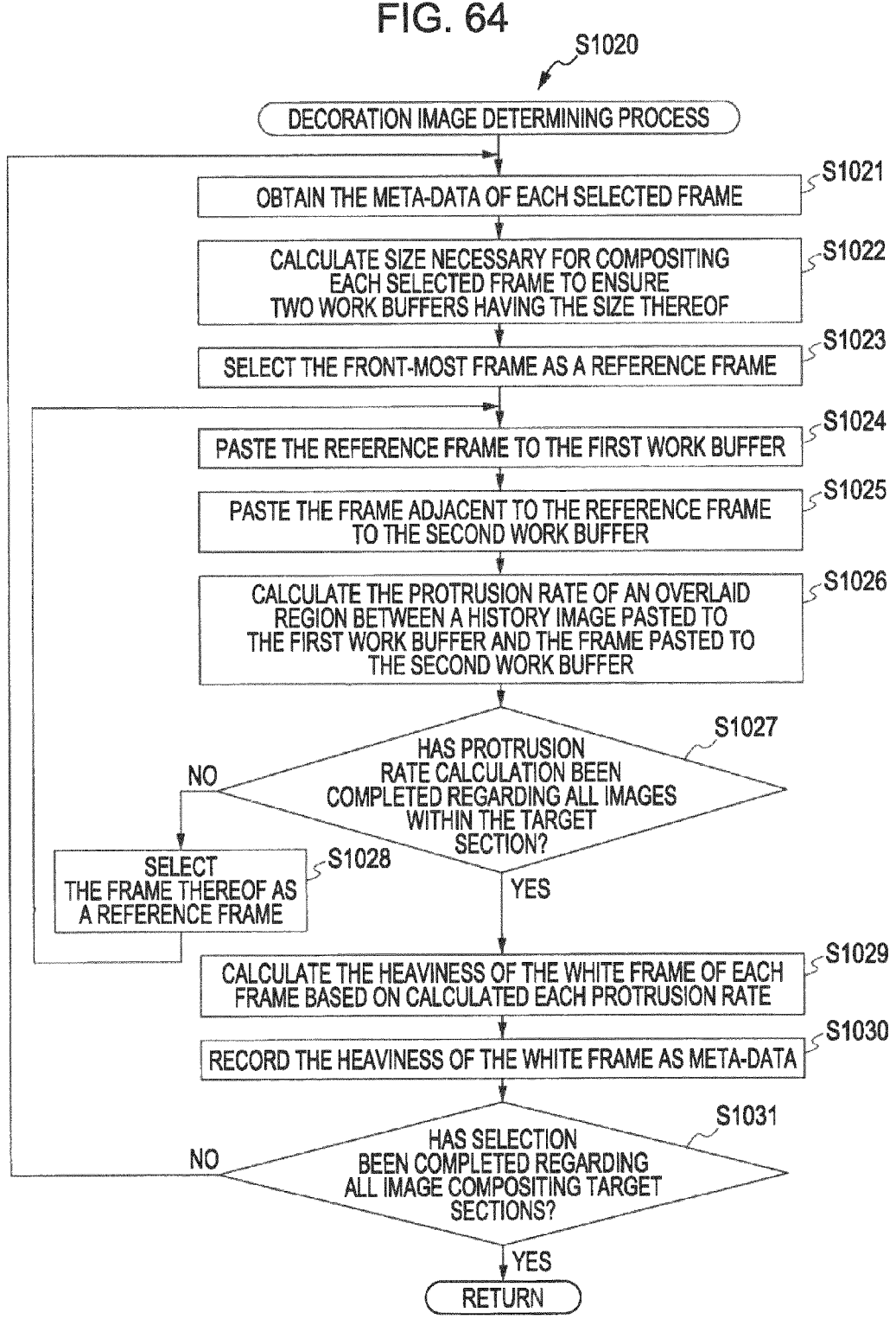
FIG. 64 is a flowchart illustrating a decoration image determining procedure included in the procedure of the compositing target image metadata recording process by the image processing apparatus according to the fourth embodiment of the present invention.

FIG. 64 is a flowchart illustrating a decoration image determining procedure (the procedure in step S1020 shown in FIG. 63) included in the procedure of the compositing target image metadata recording process by the image processing apparatus 102 according to the fourth embodiment of the present invention. With this example, an example is shown wherein a white frame is determined to be a decoration image. Also, a case is shown as an example wherein a white frame to be added to each frame included in the same image compositing target section has the same heaviness.

First, the metadata corresponding to each compositing target image included in a single image compositing target section selected by the compositing target image selecting unit 170 is obtained from a metadata file stored in the metadata storage unit 210 (step S1021). Subsequently, the size for compositing each compositing target image using the affine transformation parameters corresponding to each compositing target image included in the obtained image compositing target section is calculated, and two work buffers having this size are secured (step S1022). The two work buffers are work buffers that represent each pixel making up an image by 8 bits, and with this example, these work buffers are indicated as a first work buffer and a second work buffer.

Subsequently, of each compositing target image included in the image compositing target section serving as a selection target, the front-most frame is selected as a reference frame (step S1023). The reference frame is pasted to the first work buffer (step S1024). The frame adjacent to the reference frame is pasted to the second work buffer (step S1025). In this case, the frame pasted immediately before is eliminated, and the frame alone adjacent to the reference frame is pasted to the second work buffer. Subsequently, the over-extension rate of an overlaid region between the history image pasted to the first work buffer, and the frame to be pasted to the second work buffer is calculated (step S1026). This over-extension rate is calculated by the calculation method shown in FIGS. 52A through 52C.

Subsequently, with regard to each compositing target image included in the image compositing target section serving as a selection target, determination is made whether or not the calculation of a over-extension rate has been completed (step S1027). In the case that the calculation of a over-extension rate has not been completed regarding each compositing target image (step S1027), the frame of which the over-extension rate has been calculated immediately before is selected as a reference frame (step S1028), and the flow returns to step S1024. Subsequently, the new selected reference frame is pasted above the history image of the first work buffer (step S1024). Note that in the case that the frame of which the over-extension rate has been calculated immediately before is the top frame or last frame of the image compositing target section, a frame adjacent to the other direction of the front-most frame is selected as a reference frame.

In the case that the calculation of a over-extension rate has been completed regarding each compositing target image (step S1027), the heaviness of a white frame to be added to each compositing target image included in the image compositing target section serving as a selection target is calculated based on the over-extension rate calculated regarding each compositing target section (step S1029). Subsequently, the calculated heaviness of the white frame is recorded in the compositing target image metadata storage unit 277 (step S1030). Determination is made whether or not the decoration image determining process has been completed regarding all the image compositing target sections selected by the section selecting unit 160 (step S1031). In the case that the decoration image determining process has not been completed regarding all the image compositing target sections (step S1031), the flow returns to step S1021, where the decoration image determining process is repeated (steps S1021 through S1030). On the other hand, in the case that the decoration image determining process has been completed regarding all the image compositing target sections (step S1031), the operation of the decoration image determining process is ended.

Figure 65:
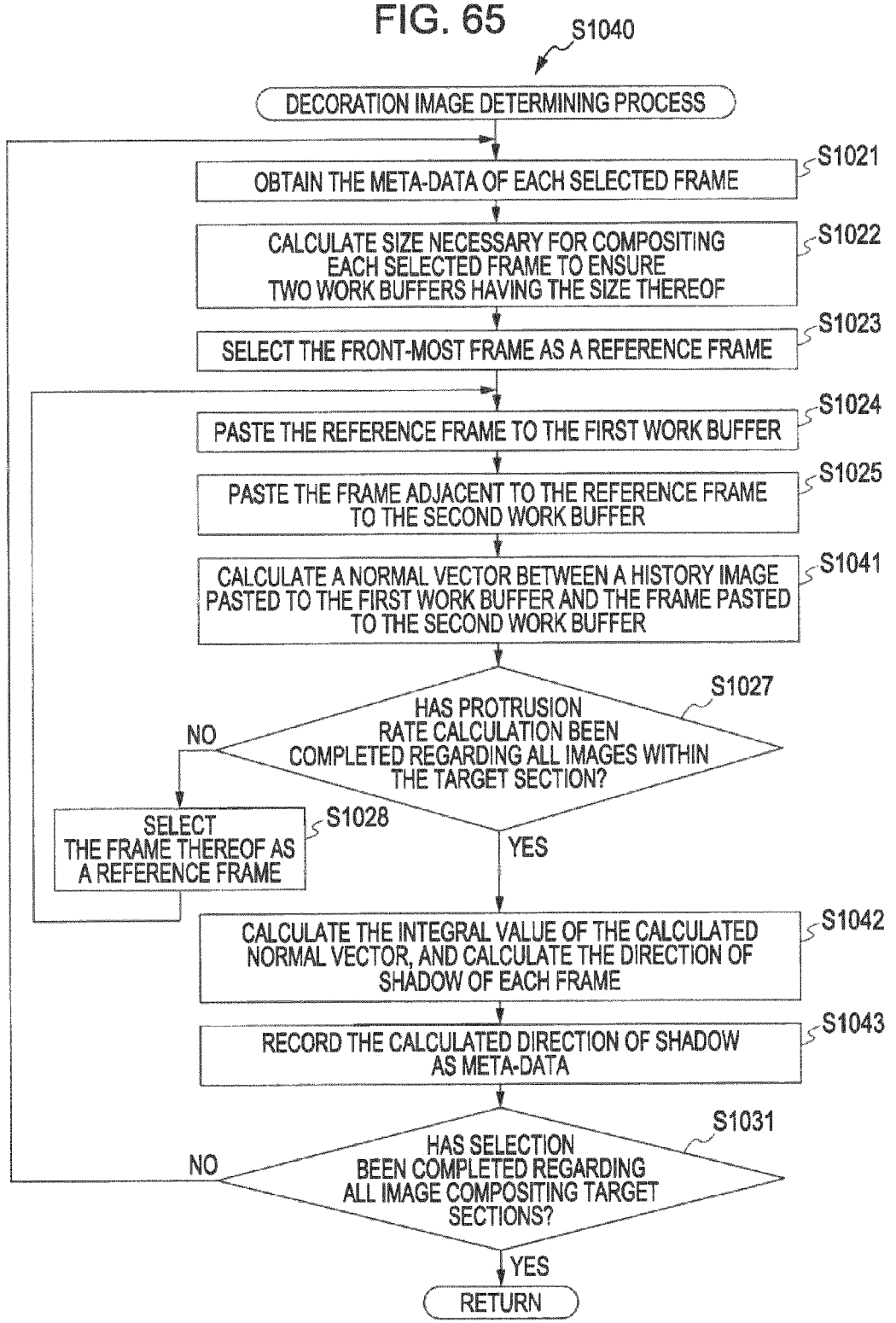
FIG. 65 is a flowchart illustrating a decoration image determining procedure included in the procedure of the compositing target image metadata recording process by the image processing apparatus according to the fourth embodiment of the present invention.

FIG. 65 is a flowchart illustrating a decoration image determining procedure (the procedure in step S1020 shown in FIG. 63) included in the procedure of the compositing target image metadata recording process by the image processing apparatus 102 according to the fourth embodiment of the present invention. This example is an example wherein a shadow is determined to be a decoration image, and is a modification of the procedure shown in FIG. 64. Therefore, only the procedure different from the procedure shown in FIG. 64 will be described, ant other description will be omitted.

After the frame adjacent to the reference frame is pasted to the second work buffer (step S1025), a normal vector between the history image pasted to the first work buffer, and the frame pasted to the second work buffer is calculated (step S1041). This normal vector is calculated by the calculation method shown in FIGS. 61A and 61B.

Also, in the case that the calculation of a normal vector has been completed regarding each compositing target image (step S1027), the integral value of the calculated normal vectors is calculated regarding each compositing target image, the direction of a normal vector obtained by integration is calculated as the direction where a shadow is added (step S1042). Subsequently, the calculated direction where a shadow is added is stored in the compositing target image metadata storage unit 277 (step S1043).

Figure 66:
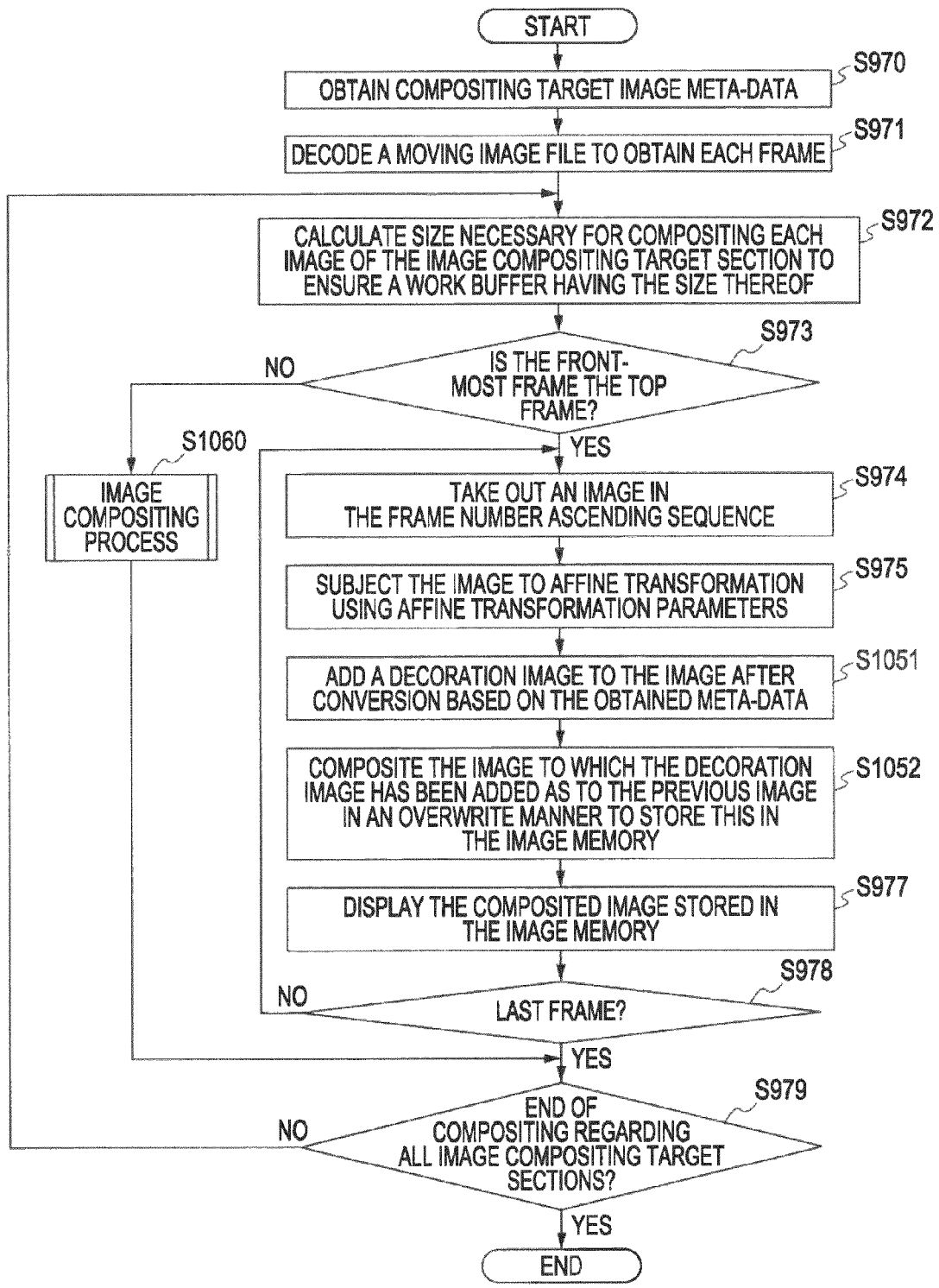
FIG. 66 is a flowchart illustrating the procedure of a composited image display process by the image processing apparatus according to the fourth embodiment of the present invention.

FIG. 66 is a flowchart illustrating the procedure of a composited image display process by the image processing apparatus 102 according to the fourth embodiment of the present invention. This procedure is a modification of the procedure shown in FIG. 37, and accordingly, the same procedure as the procedure shown in FIG. 37 will be denoted with the same reference numerals, and description thereof will be omitted here.

The image compositing unit 221 adds a decoration image to the periphery of the image subjected to affine transformation based on decoration image data included in each piece of metadata obtained (step S1051), and holds the image to which the decoration image has been added at the image memory 230 (step S1052). That is to say, the image subjected to affine transformation to which the decoration image has been added is composited as to the history image held at the image memory 230.

Also, in the case that the front-most frame is not the top frame at the image compositing target section (step S973), an image compositing process is executed (step S1060). This image compositing process will be described in detail with reference to FIG. 67.

Figure 67:
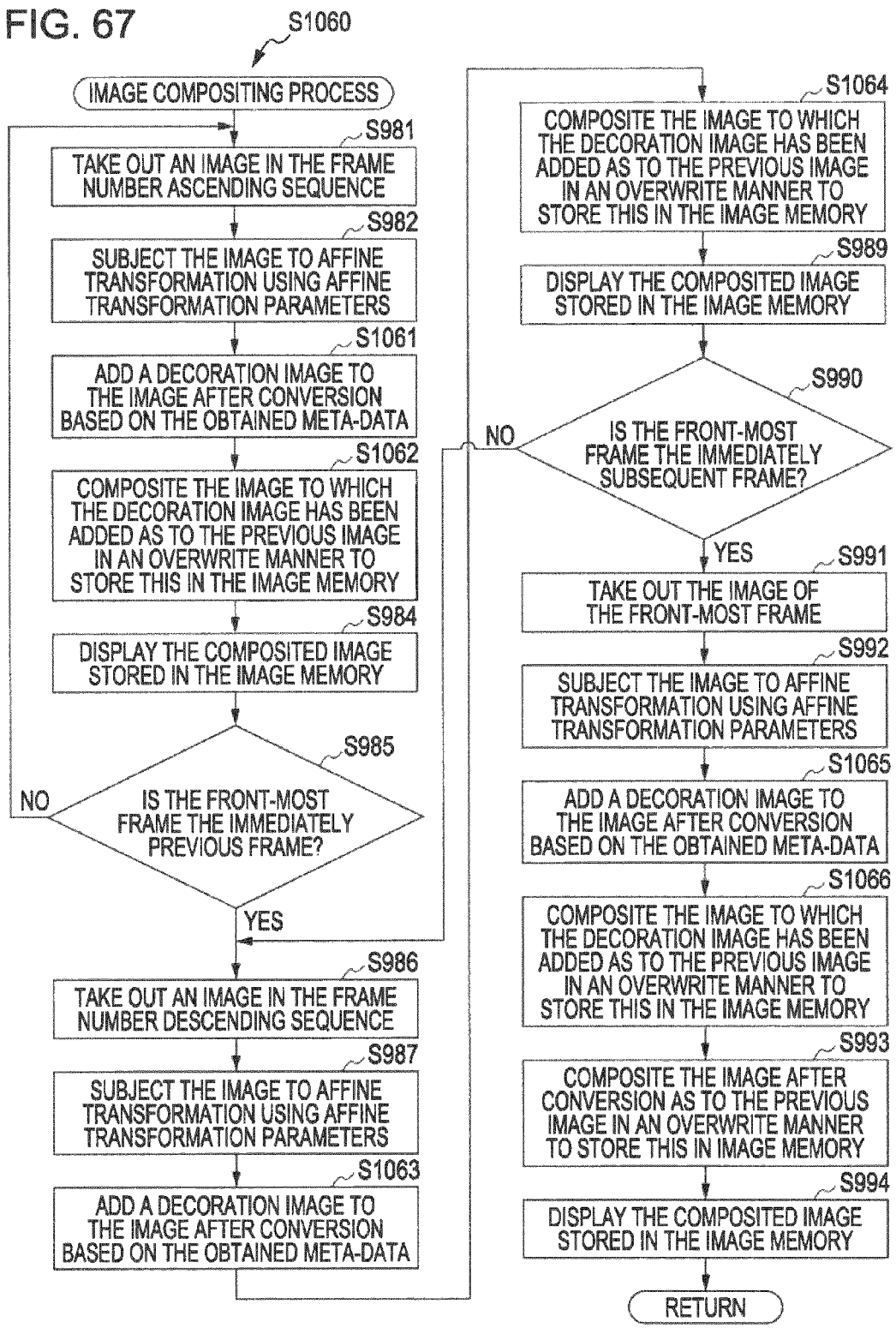
FIG. 67 is a flowchart illustrating an image compositing procedure included in the procedure of the composited image display process by the image processing apparatus according to the fourth embodiment of the present invention.

FIG. 67 is a flowchart illustrating an image compositing procedure (the procedure in step S1060 shown in FIG. 66) included in the procedure of the composited image display process by the image processing apparatus 102 according to the fourth embodiment of the present invention. This procedure is a modification of the procedure shown in FIG. 38, and accordingly, the same procedure as the procedure shown in FIG. 38 will be denoted with the same reference numerals, and description thereof will be omitted here.

The image compositing unit 221 adds a decoration image to the periphery of the image subjected to affine transformation based on decoration image data included in each piece of metadata obtained (step S1061), and holds the image to which the decoration image has been added at the image memory 230 (step S1062).

Also, the image compositing unit 221 adds a decoration image to the periphery of the image subjected to affine transformation based on decoration image data included in each piece of metadata obtained (step S1063), and holds the image to which the decoration image has been added at the image memory 230 (step S1064).

Also, the image compositing unit 221 adds a decoration image to the periphery of the image subjected to affine transformation based on decoration image data included in each piece of metadata obtained (step S1065), and holds the image to which the decoration image has been added at the image memory 230 (step S1066).

5. Fifth Embodiment

Configuration Example of Image Processing Apparatus

Next, description will be made in detail regarding a case wherein a feature point extracting process and an optical flow calculating process according to a fifth embodiment of the present invention are executed by a multi-core processor, with reference to the drawings.

Figure 68:
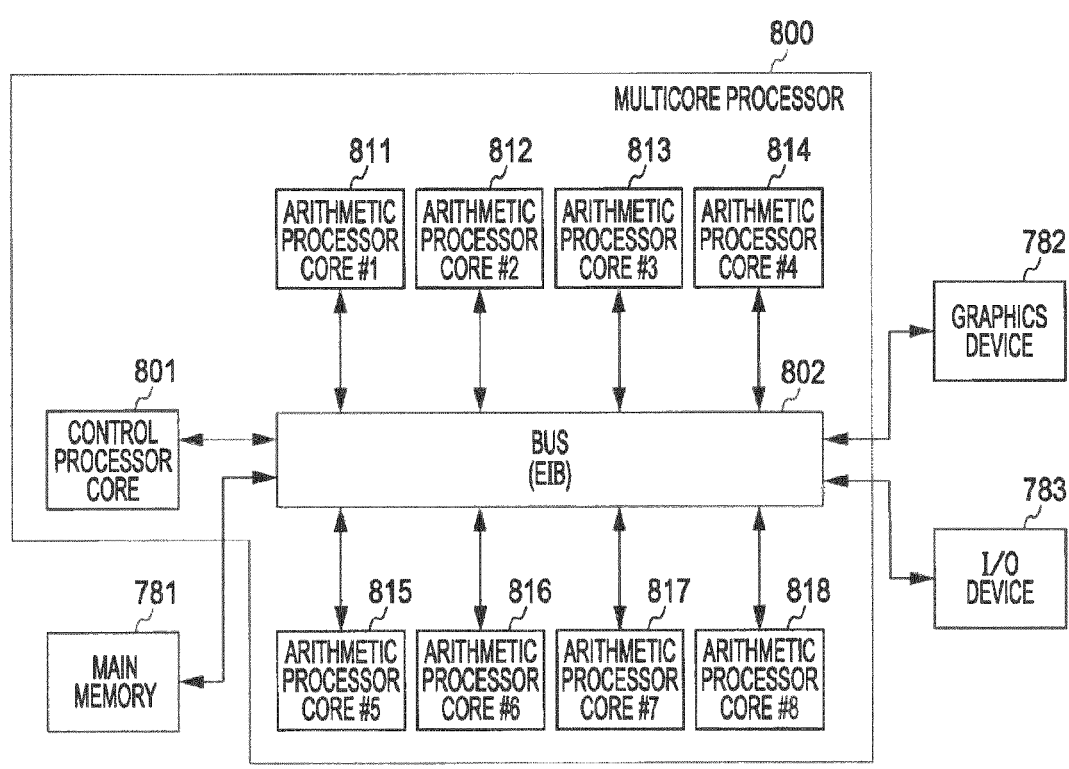
FIG. 68 is a diagram illustrating a configuration example of a multi-core processor according to a fifth embodiment of the present invention.

FIG. 68 is a diagram illustrating a configuration example of a multi-core processor 800 according to the fifth embodiment of the present invention. The multi-core processor 800 is a processor wherein different types of processor cores are implemented in a single CPU (Central Processing Unit) package. Specifically, two types of processor cores which can handle all applications are implemented in the multi-core processor 800 to maintain the processing capability of each processor core and to realize a simple configuration. The two types of processor cores are one type of cores, and the other type of cores optimized partly for a predetermined application.

The multi-core processor 800 includes a control processor core 801, arithmetic processor cores (#1) 811 through (#8) 818, and a bus 802, and is connected to main memory 781. Also, the multi-core processor 800 is connected to other devices, for example, a graphics device 782, an I/O device 783, and so forth. As the multi-core processor 800, for example, a Cell (Cell Broadband Engine) that is a microprocessor developed by the present applicant and others may be employed.

The control processor core 801 is a control processor core configured to principally execute frequent thread switching such as an operating system, or the like. Note that the control processor core 801 will be described in detail with reference to FIG. 69.

The arithmetic processor cores (#1) 811 through (#8) 818 are simple small arithmetic processor cores which excel at the process of a multimedia system. Note that the arithmetic processor cores (#1) 811 through (#8) 818 will be described in detail with reference to FIG. 70.

The bus 802 is a high-speed bus called as an element interconnect bus (EIB). Also, the bus 802 is connected to the control processor 801, and each of the arithmetic processor cores (#1) 811 through (#8) 818, and data access by each processor core is executed via the bus 802.

The main memory 781 is connected to the bus 802, and is main memory which stores various types of program to be loaded to each processor core, data for the process by each processor core, and data processed by each processor core.

The graphics device 782 is a graphics device connected to the bus 802, and the I/O device 783 is an external input/output device connected to the bus 802.

Figure 69:
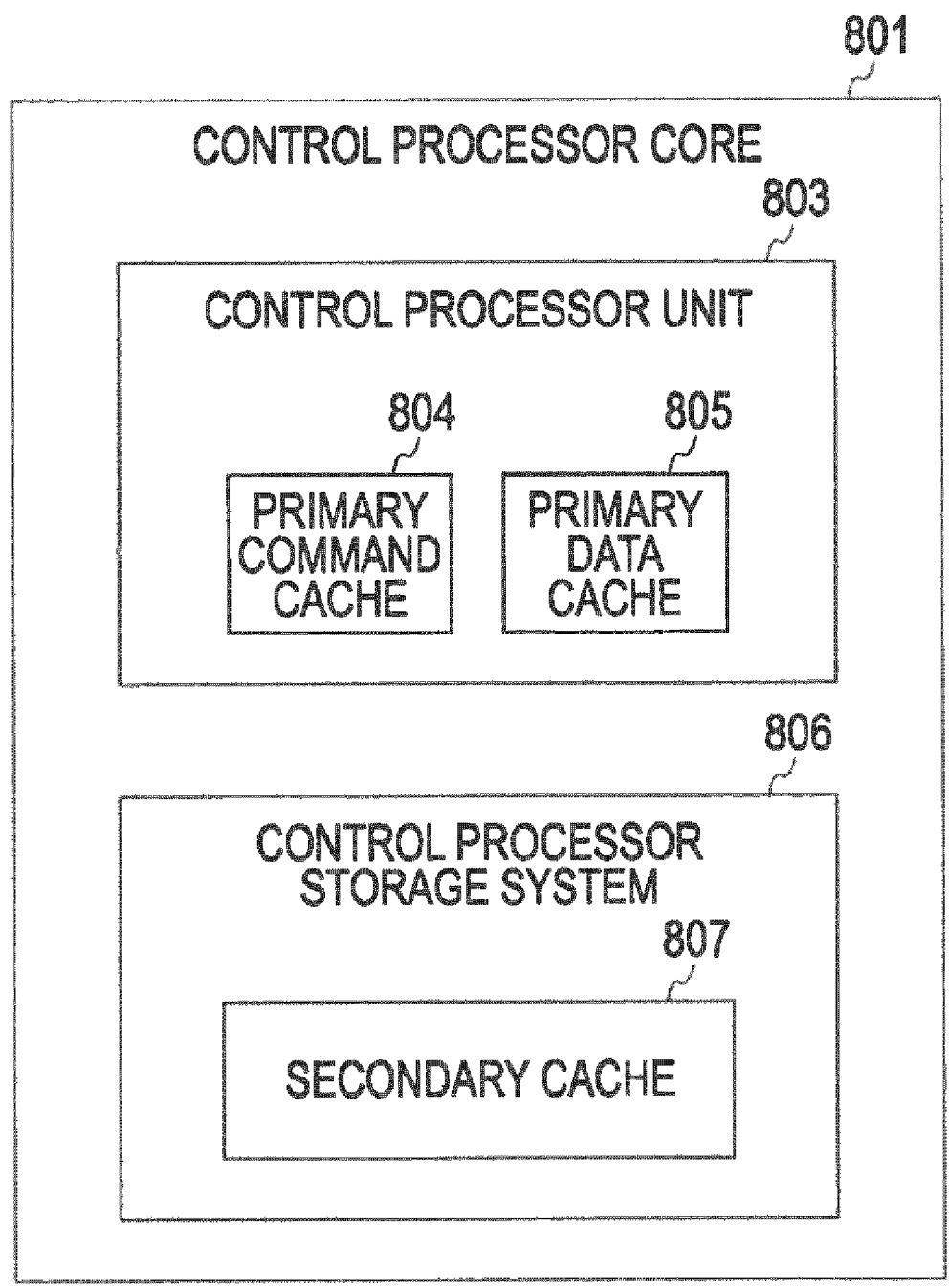
FIG. 69 is a diagram illustrating a configuration example of a control processor core according to the fifth embodiment of the present invention.

FIG. 69 is a diagram illustrating a configuration example of the control processor core 801 according to the fifth embodiment of the present invention. The control processor core 801 includes a control processor unit 803, and a control processor storage system 806.

The control processor unit 803 is a unit making up a core configured to execute the arithmetic process of the control processor core 801. Also, the control processor unit 803 includes a command set with the architecture of a microprocessor as basis. A command cache 804 and a data cache 805 are implemented in the control processor unit 803 as primary caches. The command cache 804 is, for example, a command cache of 32 KB, and the data cache 805 is, for example, a data cache of 32 KB.

The control processor storage system 806 is a unit which controls data access from the control processor unit 803 to the main memory 781. Also, with the control processor storage system 806, a secondary cache 807 of 512 KB is mounted to increase memory access speed from the control processor unit 803.

Figure 70:
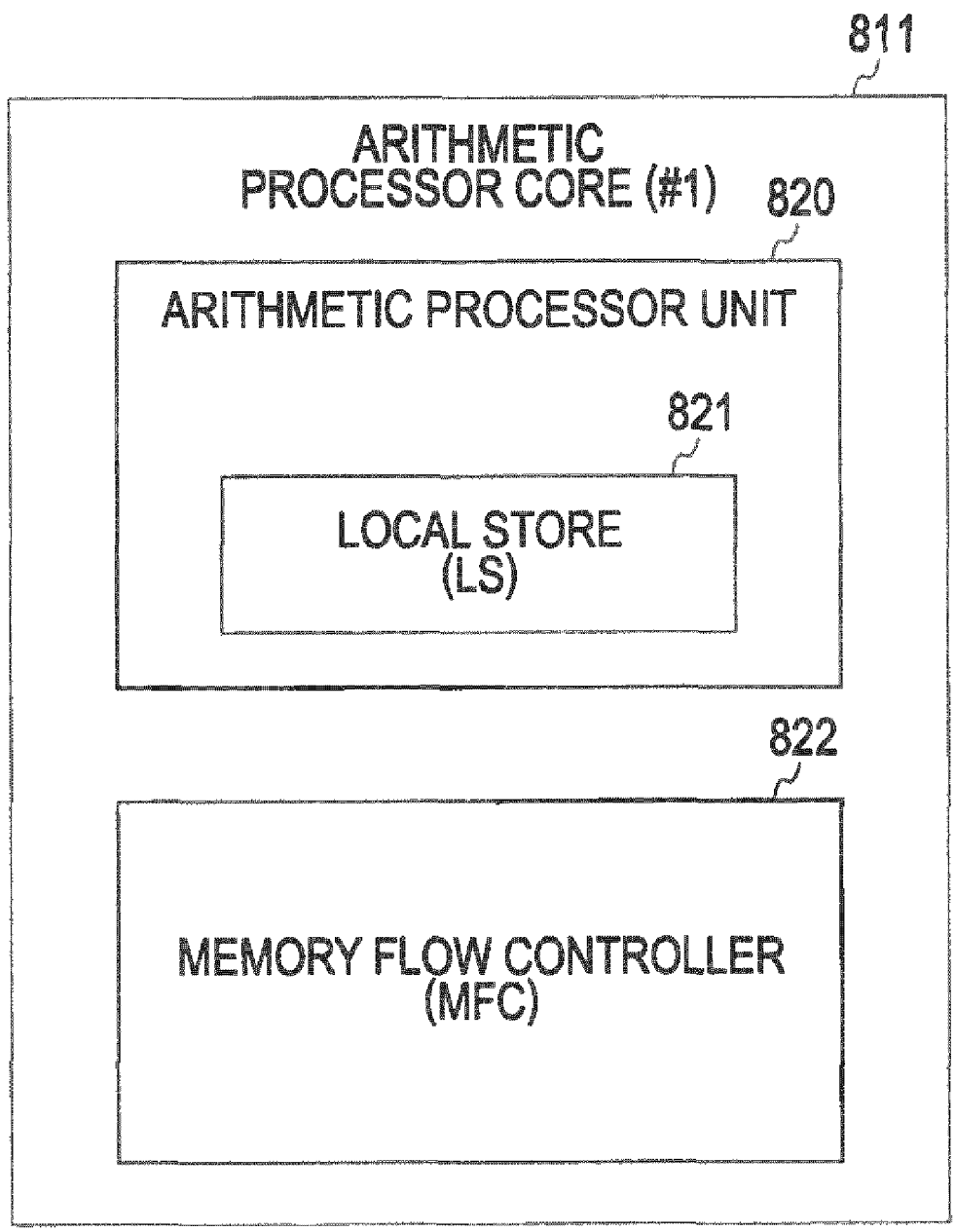
FIG. 70 is a diagram illustrating a configuration example of an arithmetic processor core according to the fifth embodiment of the present invention.

FIG. 70 is a diagram illustrating a configuration example of the arithmetic processor core (#1) 811 according to the fifth embodiment of the present invention. The arithmetic processor (#1) 811 includes an arithmetic processor unit 820 and a memory flow controller 822. Note that the arithmetic processor cores (#2) 812 through (#8) 818 have the same configuration as the arithmetic processor core (#1) 811, and accordingly, description thereof will be omitted here.

The arithmetic processor unit 820 is a unit serving as a core which executes the arithmetic process of the arithmetic processor core (#1) 811, and includes an original command set different from the control processor unit 803 of the control processor core 801. Also, a local store (LS) 821 is implemented in the arithmetic processor unit 820.

The local store 821 is the dedicated memory of the arithmetic processor unit 820, and is the unique memory that can refer to the arithmetic processor unit 820 directly. For example, memory of which the capacity is 256 KB can be employed as the local store 821. Note that the arithmetic processor unit 820 has to take advantage of the memory flow controller 822 to access the local store above the main memory 781 and the other arithmetic processor cores (arithmetic processor cores (#2) 812 through (#8) 818).

The memory flow controller 822 is a unit used to exchange data with the main memory 781 or other arithmetic processor cores or the like, and is a unit called as a memory flow controller (MFC). Here, the arithmetic processor unit 820 requests data transfer or the like as to the memory flow controller 822 via an interface called as a channel.

Various types of model have been proposed as a programming model of the multi-core processor 800 described above. A model has been familiar as the most fundamental model of this programming model wherein a main program is executed over the control processor core 801, and a sub program is executed over the arithmetic processor cores (#1) 811 through (#8) 818. With the fifth embodiment of the present invention, the computation method of the multi-core processor 800 using this model will be described in detail with reference to the drawings.

Figure 71:
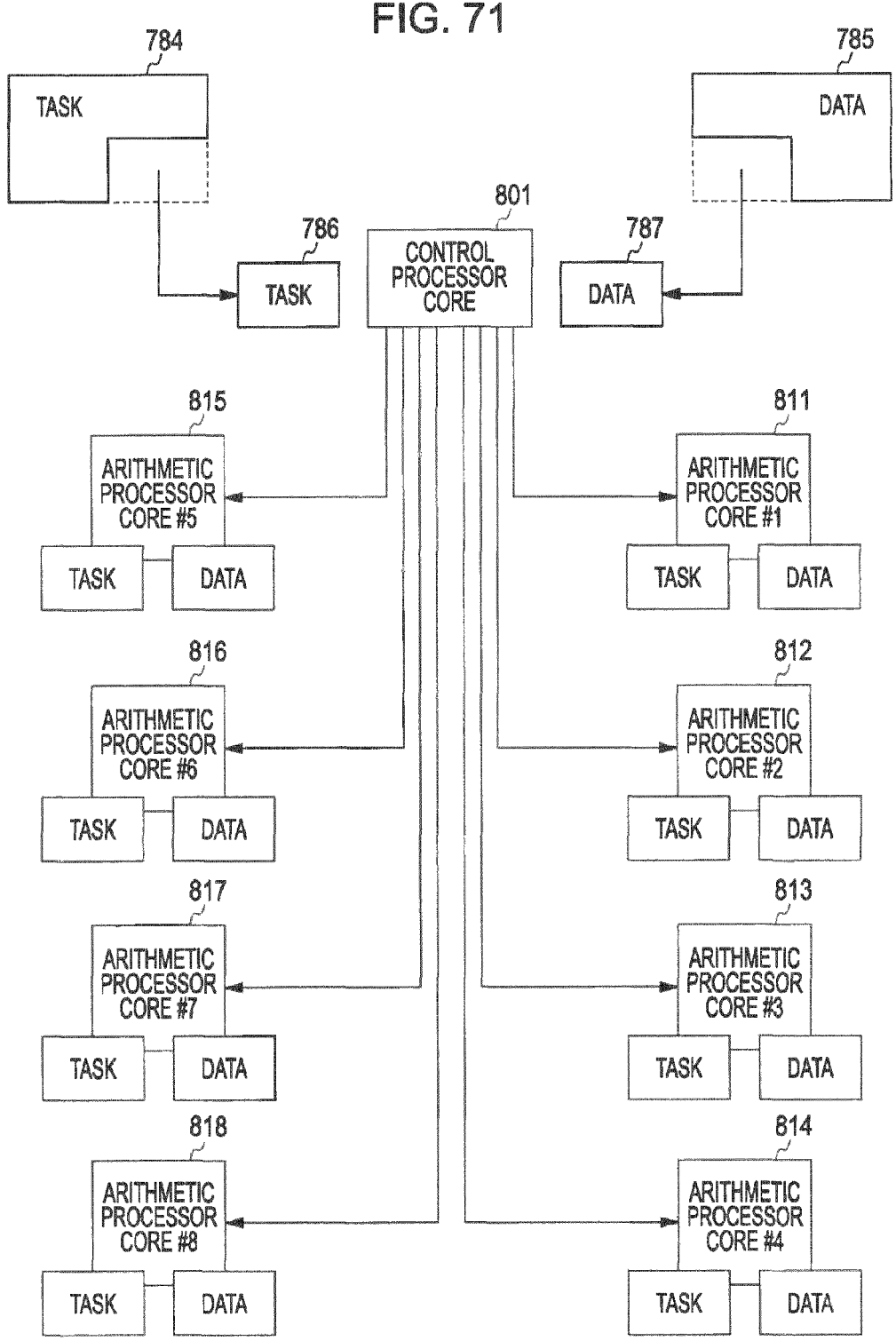
FIG. 71 is a diagram schematically illustrating a computation method of the multi-core processor according to the fifth embodiment of the present invention.

FIG. 71 is a diagram schematically illustrating the computation method of the multi-core processor 800 according to the fifth embodiment of the present invention. With this example, an example is shown wherein in the case that the control processor core 801 executes a task 784 using data 785, the control processor core 801 controls each arithmetic processor core to use data 787 (a portion of the data 785) for the process of a task 786 that is a portion of the task 784 to execute the task 786.

As shown in FIG. 71, in the case that the control processor core 801 uses the data 785 to execute the task 784, the control processor core 801 controls each arithmetic processor core to use the data 787 (a portion of the data 785) for the process of a task 786 that is a portion of the task 784 to execute the task 786. With the fifth embodiment of the present invention, a computation process is executed by each arithmetic processor core for each frame making up a moving picture.

As shown in FIG. 71, the multi-core processor 800 executes a computation, whereby the arithmetic processor cores (#1) 811 through (#8) 818 are used in parallel, and many computations can be executed in comparatively little time. Also, a single instruction/multiple data (SIMD) computation is executed over the arithmetic processor cores (#1) 811 through (#8) 818, whereby relatively many computations can be executed with a still smaller number of commands. Note that SIMD computation will be described in detail with reference to FIGS. 75 through 78.

Figure 72:
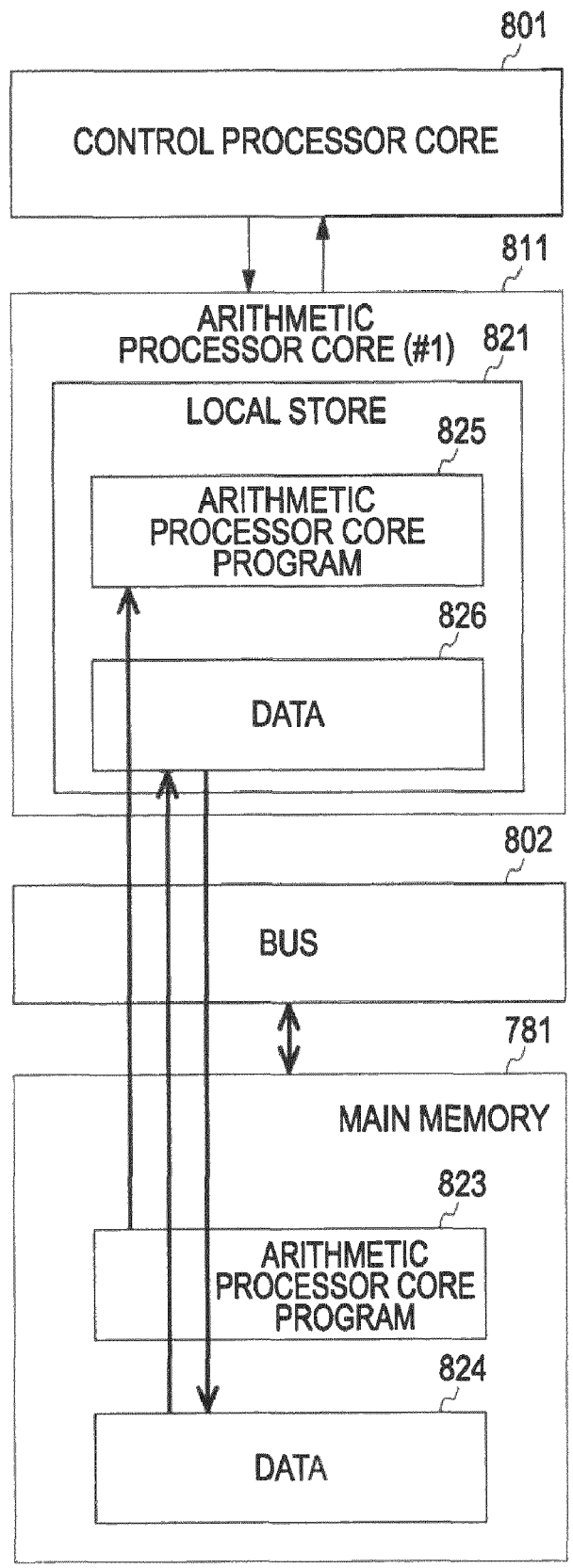
FIG. 72 is a diagram schematically illustrating the flows of a program and data in the case that a computation is executed by the multi-core processor according to the fifth embodiment of the present invention.

FIG. 72 is a diagram schematically illustrating the flows of a program and data in the case that a computation is executed by the multi-core processor 800 according to the fifth embodiment of the present invention. Now, description will be made regarding the arithmetic processor core (#1) 811 of the arithmetic processor cores (#1) 811 through (#8) 818 as an example, but a computation can also be executed similarly regarding the arithmetic processor cores (#2) 812 through (#8) 818.

First, the control processor core 801 transmits to the arithmetic processor core (#1) 811 an instruction to load an arithmetic processor core program 823 stored in the main memory 781 to the local store 821 of the arithmetic processor core (#1) 811. Thus, the arithmetic processor core (#1) 811 loads the arithmetic processor core program 823 stored in the main memory 781 to the local store 821.

Subsequently, the control processor core 801 instructs the arithmetic processor core (#1) 811 to execute the arithmetic processor core program 825 stored in the local store 821.

The arithmetic processor core (#1) 811 transfers data 824 for the execution process of the arithmetic processor core program 825 stored in the local store 821 from the main memory 781 to the local store 821.

The arithmetic processor core (#1) 811 processes the data 826 transferred from the main memory 781 based on the arithmetic processor core program 825 stored in the local store 821, and executes a process according to a condition to store the processing results in the local store 821.

The arithmetic processor core (#1) 811 transfers the processing results executed based on the arithmetic processor core program 825 stored in the local store 821 from the local store 821 to the main memory 781.

The arithmetic processor core (#1) 811 informs the control processor core 801 of end of the computation.

Next, SIMD computation executed using the multi-sore processor 800 will be described in detail with reference to the drawings. Here, SIMD computation is a computation method wherein a process as to a plurality of data is executed with a single command.

In FIG. 73, (a) is a diagram schematically illustrating an overview of a computation method arranged to execute a process as to a plurality of data by each corresponding command. The computation method shown in (a) in FIG. 73 is a common computation method, and is referred to as, for example, a scalar computation. For example, the processing results of data "C1" are obtained with a command used for adding data "A1" and data "B1". Also, with regard to the other three computations as well, similarly, a command to add data "A2", "A3", and "A4", and data "B2", "B3", and "B4" on the same row respectively is executed regarding each of the computations. According to this command, the value of each row is added, and the processing results thereof are obtained as data "C2", "C3", and "C4". Thus, with a scalar computation, a command has to be executed regarding each process as to a plurality of data.

In FIG. 73, (b) is a diagram schematically illustrating an overview of SIMD computation that is a computation method arranged to execute a process as to a plurality of data by a single command. Now, data integrated for SIMD computation (each piece of data surrounded with dotted lines 827 and 828) is referred to as vector data in some cases. Also, SIMD computation executed using such vector data is referred to as a vector computation in some cases.

For example, according to a single command to add vector data surrounded with a dotted line 827, and vector data surrounded with a dotted line 828, the processing results (data surrounded with a dotted line 829) of "C1", "C2", "C3", and "C4" are obtained. Here, vector data surrounded with the dotted line 827 is "A1", "A2", "A3", and "A4", and vector data surrounded with the dotted line 828 is "B1", "B2", "B3", and "B4". Thus, with SIMD computation, a process as to a plurality of data can be executed by a single command, and accordingly, the computation can be executed rapidly. Also, the control processor core 801 of the multi-core processor 800 executes a command relating to these SIMD computations, and the arithmetic processor cores (#1) 811 through (#8) 818 execute a parallel process regarding the computations of a plurality of data as to such a command.

On the other hand, for example, a process to add between data "A1" and "B1", a process to subtract between data "A2" and "B2", a process to multiply between data "A3" and "B3", and a process to divide between data "A4" and "B4" are not realized by SIMD computation. That is to say, in the case that a different process is executed as to each of a plurality of data, a process by SIMD computation is not realized.

Next, a specific computation method of SIMD computation in the case of executing a feature point extracting process and an optical flow calculating process will be described in detail with reference to the drawings.

Figure 74:
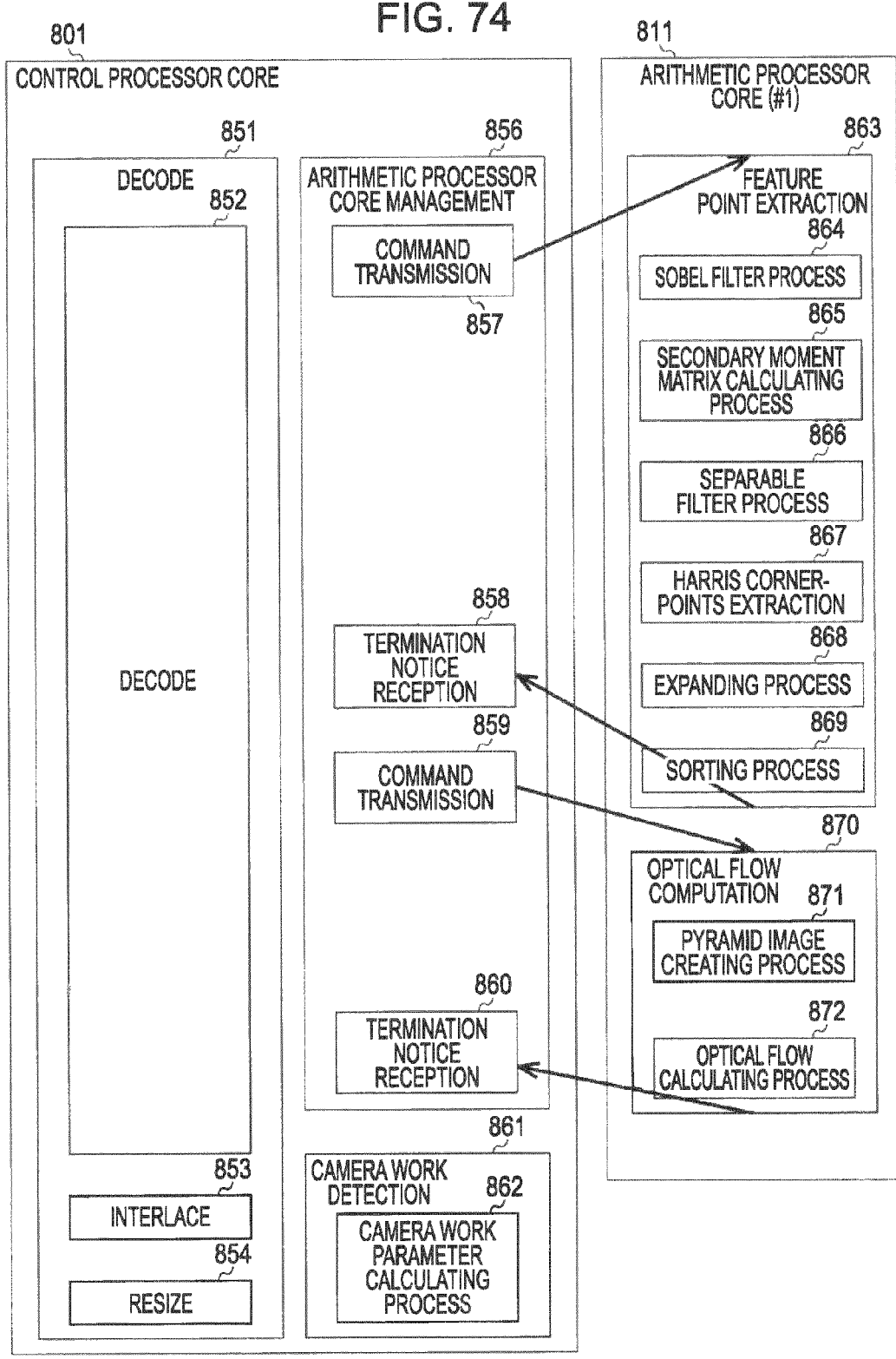
FIG. 74 is a diagram illustrating a configuration example of a program executed by the control processor core or arithmetic processor core, according to the fifth embodiment of the present invention.

FIG. 74 is a diagram illustrating a configuration example of a program executed by the control processor core 801 or the arithmetic processor core (#1) 811, according to the fifth embodiment of the present invention. Here, the arithmetic processor core (#1) 811 alone will be illustrated, the same process will also be executed regarding the arithmetic processor core (#2) 812 through (#8) 818.

The control processor core 801 executes decode 852, interlace 853, and resize 854 as decode 851. The decode 852 is a process to decode a moving picture file. The interlace 853 is a process to remove the interlace of each frame decoded. The resize 854 is a process to reduce each frame of which the interlace has been removed.

Also, the control processor core 801 executes command transmissions 857 and 859, and termination notice receptions 858 and 860 as arithmetic processor core management 856. The command transmissions 857 and 859 are processes to transmit an execution command of SIMD computation as to the arithmetic processor cores (#1) 811 through (#8) 818. Also, the termination notice receptions 858 and 860 are processes to receive the termination notice of SIMD computation from the arithmetic processor cores (#1) 811 through (#8) 818 as to the above command. Further, the control processor core 801 executes a camera work parameter calculating process 862 as camera work detection 861. The camera work parameter calculating process 862 is a process to calculate affine transformation parameters for each frame based on the optical flow calculated with SIMD computation by the arithmetic processor cores (#1) 811 through (#8) 818.

The arithmetic processor core (#1) 811 executes a Sobel filter process 864, a second moment matrix process 865 as a feature point extracting process 863. Also, the arithmetic processor core (#1) 811 executes a separable filter process 866, a Harris corner-points extracting (Calc Harris) process 867, a dilation process 868, and a sorting process 869.

The Sobel filter process 864 is a process to calculate a value dx in the X direction obtained by using a P2 filter (x direction), and a value dy in the y direction obtained by using a filter in the Y direction. Note that the calculation of the value dx in the X direction will be described in detail with reference to FIGS. 75 through 78.

The second moment matrix process 865 is a process to calculate each value of $dx^2$, $dy^2$, $dx \cdot dy$ using the dx and dy calculated by the Sobel filter process 864.

The separable filter process 866 is a process to apply a Gaussian filter (blurring process) to the images of the value of $dx^2$, $dy^2$, $dx \cdot dy$ calculated by the second moment filter process 865.

The Harris corner-points extracting process 867 is a process to use each value of the $dx^2$, $dy^2$, $dx \cdot dy$ subjected to a blurring process by the separable filter process 866 to calculate the score of a Harris corner. The score S of this Harris corner is calculated, for example, by the following expression.

$$S=(dx^2 \times dy^2 - dx \cdot dy \times dx \cdot dy)/(dx^2+dy^2+\epsilon)$$

The dilation process 868 is a process to execute a blurring process as to an image made up of the score of a Harris corner calculated by the Harris corner-points extracting process 867.

The sorting process 869 is a process to sort pixels in the descending order of the score of a Harris corner calculated by the Harris corner-points extracting process 867, pick up pixels by a predetermined number of pixels from a pixel having the highest score, and extract this picked-up pixels as feature points.

The arithmetic processor core (#1) 811 executes a pyramid image creating process 871 as an optical flow computing process 870, and executes an optical flow calculating process 872.

The pyramid image creating process 871 is a process to sequentially create an image reduced through a predetermined number of stages from the image size at the time of imaging by the camera, and the created image is referred to as a multi-resolution image.

The optical flow calculating process 872 is a process to calculate an optical flow regarding the smallest image of the multi-resolution images created by the pyramid image creating process 871, and use this calculation result to calculate an optical flow again regarding a image having one-rank up resolution of the smallest image. Such a series of processes are executed repeatedly until the image to be processed reaches the largest image.

Thus, for example, the feature point extracting process, and the optical flow calculating process are executed in parallel with SIMD computation using the multi-core processor 800, whereby processing results can be obtained. Here, for example, the feature point extracting process is a feature point extracting process executed by the feature point extracting unit 121 shown in FIG. 2 and others, and the optical flow calculating process is an optical flow calculating process executed by the optical flow calculating unit 122. Note that the feature point extracting process, and the optical flow calculating process shown in FIG. 74 and others are an example, another process made up of various types of filter process and a threshold process and the like as to an image making up a moving picture may be used to execute SIMD computation by the multi-core processor 800.

FIG. 75 is a diagram schematically illustrating a data structure and a processing flow in the case that image data stored in the main memory 781 according to the fifth embodiment of the present invention is subjected to a filtering process using the Sobel filter 830. This image data is image data corresponding to a single frame making up a moving picture imaged by the camera. Note that the image data stored in the main memory 781 shown in FIG. 75 is illustrated in a simplified manner with the number of horizontal pixels as 32 pixels. Also, the Sobel filter 830 is a 3×3 edge extracting filter. As shown in FIG. 75, the image data stored in the main memory 781 is subjected to a filtering process using the Sobel filter 830, and the results of this filtering process are output. With this example, description will be made regarding an example wherein SIMD computation is used to obtain the results of four filters at once.

Figure 76:
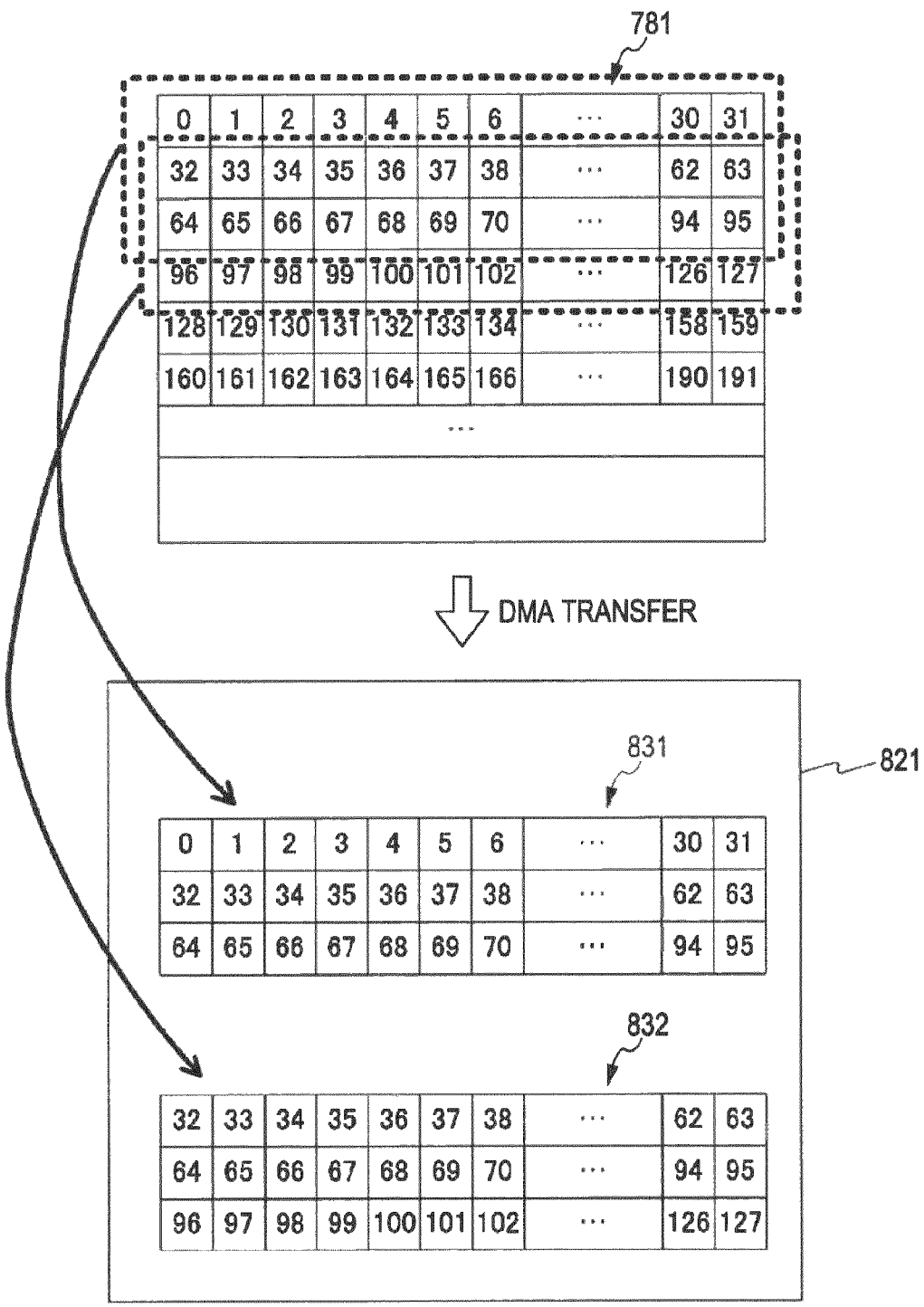
FIG. 76 is a diagram schematically illustrating a data flow in the case that the Sobel filter is used to execute SIMD computation regarding image data stored in the main memory according to the fifth embodiment of the present invention.

FIG. 76 is a diagram schematically illustrating a data flow in the case that the Sobel filter 830 is used to execute SIMD computation regarding image data stored in the main memory 781 according to the fifth embodiment of the present invention. First, a predetermined number of rows including the first row of the image data stored in the main memory 781 are DMA (Direct Memory Access)-transferred to a first buffer 831 provided to the local store 821 of an arithmetic processor core. Also, a predetermined number of rows wherein each row DMA-transferred to the first buffer 831 is shifted downward by one are DMA-transferred to a second buffer 832. Here, the predetermined number of rows is, for example, three rows. Thus, the double buffers are used, whereby delay due to DMA transfer can be covered.

Figure 77:
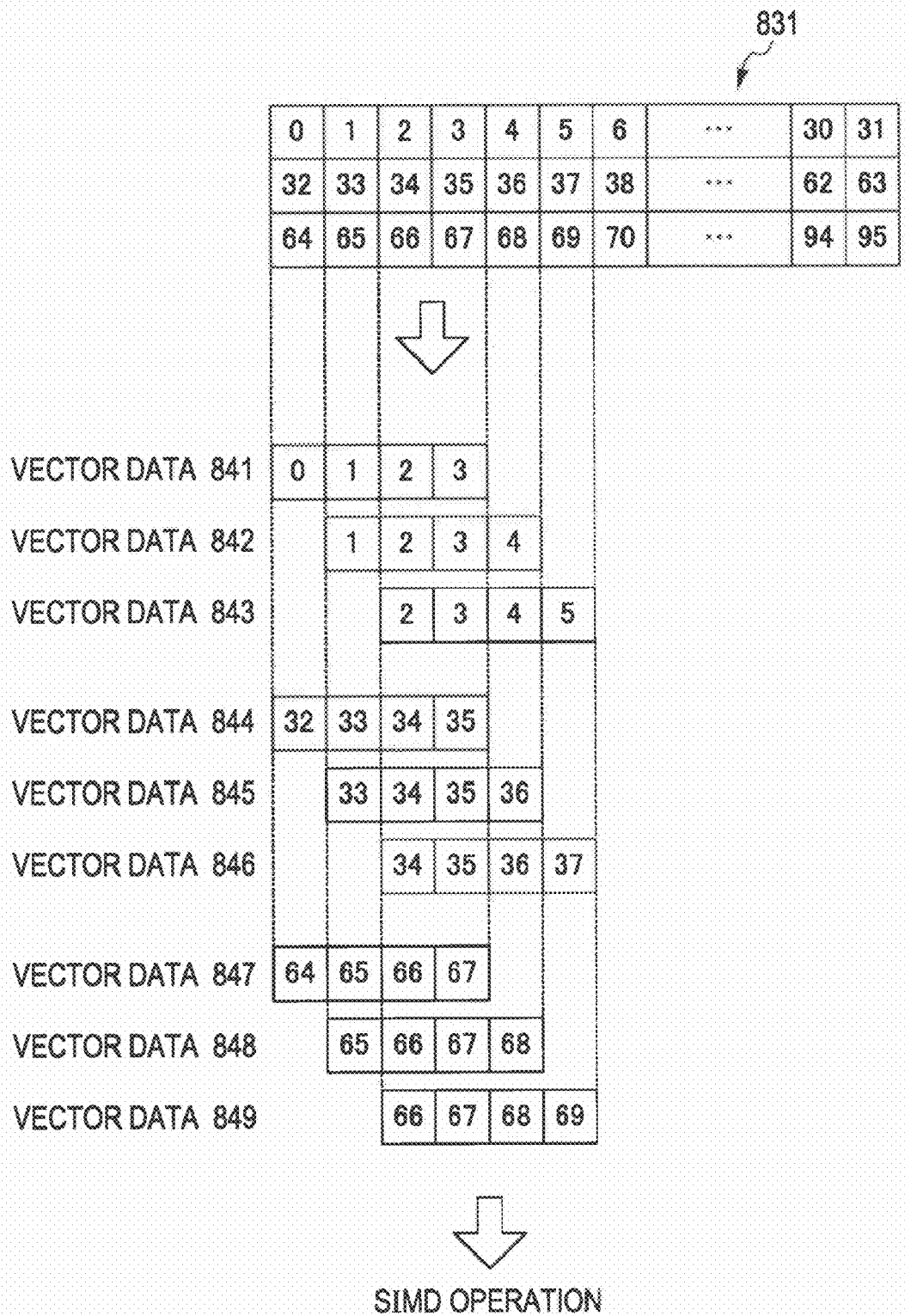
FIG. 77 is a diagram schematically illustrating a vector creating method arranged to create nine vectors from the image data stored in a first buffer in the case that the filtering process is executed using the Sobel filter according to the fifth embodiment of the present invention.

FIG. 77 is a diagram schematically illustrating a vector creating method arranged to create nine vectors from the image data stored in the first buffer 831 in the case that the filtering process is executed using the Sobel filter 830 according to the fifth embodiment of the present invention. As shown in FIG. 76, after DMA transfer is executed, nine vectors are created from the image data stored in the first buffer 831. Specifically, with the first row of the image data stored in the first buffer 831, vector data 841 is created with four pieces of data from the left corner, and according to four pieces of data obtained by shifting the above four pieces to the right side by one, vector data 842 is created. Similarly, according to four pieces of data obtained by shifting the above four pieces to the right side by one, vector data 843 is created. Also, with the second and third rows, similarly, vector data 844 through 849 are created with four pieces of data.

FIG. 78 is a diagram schematically illustrating a vector computing method arranged to use SIMD computation to execute a vector computation regarding vector data 841 through 849 in the case that the filtering process is executed using the Sobel filter 830 according to the fifth embodiment of the present invention. Specifically, SIMD computation is executed sequentially regarding the vector data 841 through 843, whereby a vector A is obtained. With this SIMD computation, first, SIMD computation of −1×vector data 841 is executed. Next, SIMD computation of 0×vector data 841 is executed and SIMD computation of 1×vector data 843 is executed. Here, with regard to 0×vector data 842, the computation result has been determined to be 0, and accordingly, this computation may be omitted. Also, with regard to 1×vector data 843, the computation result has been determined to be the same value as the vector data 843, and accordingly this computation may be omitted.

Subsequently, an addition process between the computation result of −1×vector data 841, and the computation result of 0×vector data 842 is executed with SIMD computation. Subsequently, an addition process between the result of the above addition process and the computation result of 1×vector data 843 is executed with SIMD computation. Here, for example, the computation of a data structure serving as vector data 1×vector data 2+vector data 3 can be realized with SIMD computation. Therefore, with regard to the computation of the vector A, SIMD computation regarding, for example, 0×vector data 842, and 1×vector data 843 will be omitted. Subsequently, −1×vector data 841+vector data 843 may be executed with a one-time SIMD computation.

Also, similarly, SIMD computation is executed regarding the vector data 844 through 846 to obtain a vector B, SIMD computation is executed regarding the vector data 847 through 849 to obtain a vector C.

Subsequently, SIMD computation is executed regarding the obtained vectors A through C to obtain a vector D. Thus, SIMD computation is executed, whereby the results equivalent to the number of vector elements (four pieces of data in this example) can be obtained at the same time.

After the vector D is calculated, with the image data stored in the first buffer 831 shown in FIG. 76, the same process is executed repeatedly while shifting the position of data to be extracted to the right side by one, whereby calculation of the vector D regarding each piece of the image data is executed sequentially. Subsequently, in the case that the process up to the right edge of the image data stored in the first buffer 831 shown in FIG. 76 has been completed, the processing results are DMA-transferred to the main memory 781.

Subsequently, of the image data stored in the main memory 781, a predetermined number of rows wherein each row DMA-transferred to the second buffer 832 is shifted downward by one are DMA-transferred to the first buffer 831. The above process is executed repeatedly regarding the image data stored in the second buffer 832 along with this transfer. Subsequently, the same process is executed repeatedly until the row to be processed reaches the lower edge row of the rows of the image data stored in the main memory 781.

Similarly, the most processes of the feature point extraction and optical flow calculation are executed with SIMD computation, whereby increase in speed can be realized.

Figure 79:
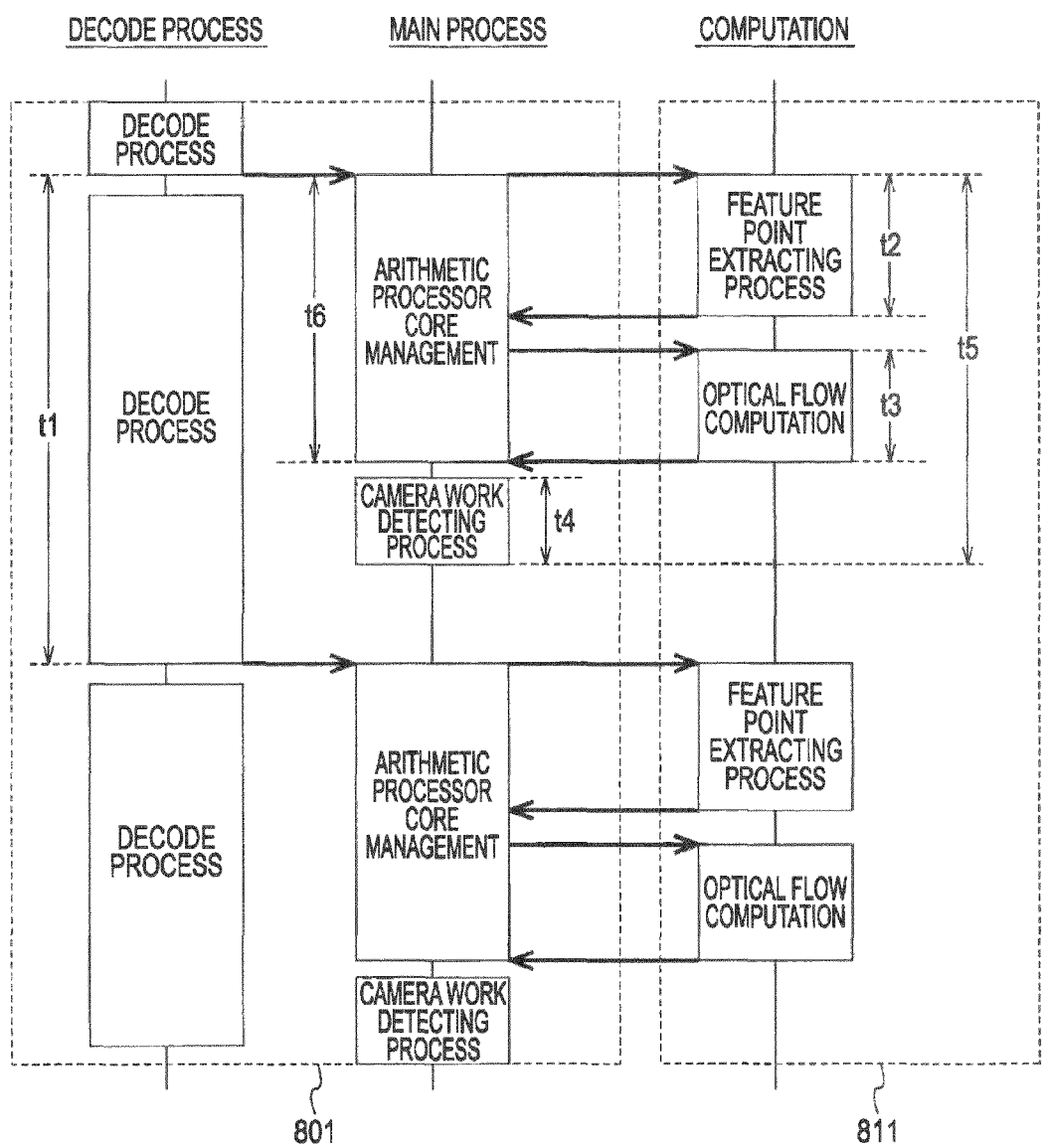
FIG. 79 is a diagram schematically illustrating the flow of a camera work parameter calculating process according to the fifth embodiment of the present invention in a time-series manner.

FIG. 79 is a diagram schematically illustrating the flow of a camera work parameter calculating process according to the fifth embodiment of the present invention in a time-series manner. As described above, for example, SIMD computation is executed using the multi-core processor 800, whereby decoding and analyzing processes regarding a moving picture can be executed in parallel. Therefore, the analyzing time of one frame making up a moving picture can be reduced as compared to the decode time.

For example, in FIG. 79, t1 represents time for the decoding process of one frame making up a moving picture by the control processor core 801. Also, t2 represents time for the feature point extracting process of one frame making up a moving picture by the arithmetic processor core (#1) 811 through (#8) 818. Also, t3 represents time for the optical flow calculating process of one frame making up a moving picture by the arithmetic processor core (#1) 811 through (#8) 818. Also, t4 represents time for the camera work detecting process of one frame making up a moving picture by the control processor core 801. Note that t5 represents time for the camera work detecting process regarding one frame making up a moving picture by the control processor core 801 and the arithmetic processor core (#1) 811 through (#8) 818. Also, t6 represents time for a process to manage the arithmetic processor core (#1) 811 through (#8) 818 by the control processor 801. For example, an arrangement may be made wherein t1 is set to 25.0 ms, t2 is set to 7.9 ms, t3 is set to 6.7 ms, t4 is set to 1.2 ms, and t5 is set to 15.8 ms.

Next, description will be made in detail regarding a case where a moving picture content using a metadata file according to the fifth embodiment of the present invention is played, with reference to the drawings.

Figure 80:
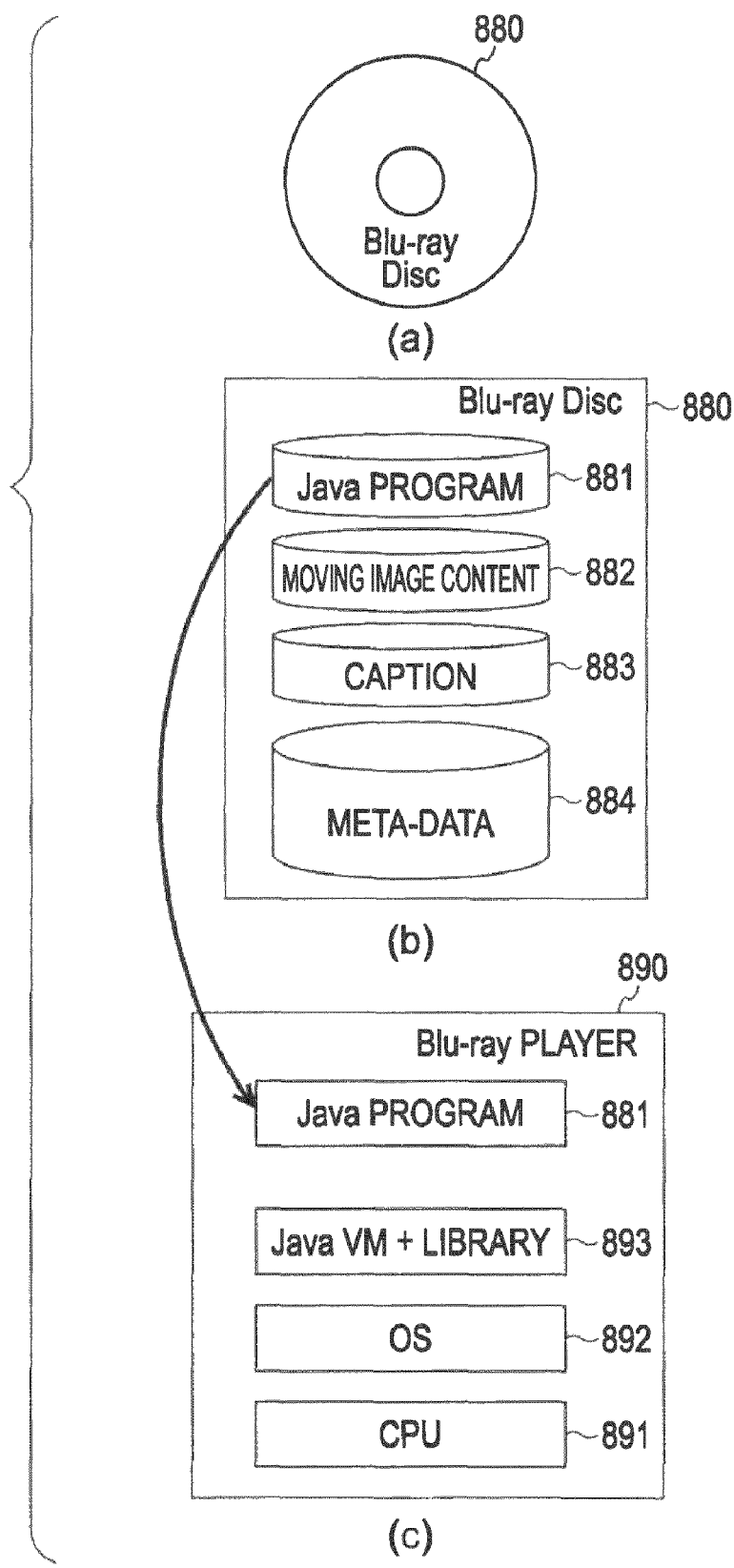
FIG. 80 is a diagram schematically illustrating a Blu-ray Disc which is an example of a recording medium, data recorded in the Blu-ray Disc, and the internal configuration of a Blu-ray player capable of playing the Blu-ray Disc.

In FIG. 80, (a) is a top view schematically illustrating a Blu-ray Disc (registered trademark) 880 which is an example of a recording medium, and (b) in FIG. 80 a diagram schematically illustrating data 881 through data 884 recorded in the Blu-ray Disc 880. For example, a moving picture content 882, a caption 883, metadata 884, and a Java (registered trademark) program 881 are recorded in the Blu-ray Disc 880. For example, the moving picture content 882 is a moving picture imaged by a camera or the like, the caption 883 is the caption of the moving picture content 882, and the metadata 884 is metadata obtained by analyzing the moving picture content 882 (e.g., each piece of information shown in FIGS. 3, 4, etc.). Also, the Java program 881 is a Java program according to moving picture playback with each embodiment of the present invention.

In FIG. 80, (c) is a diagram schematically illustrating the internal configuration of a Blu-ray player capable of playing the Blu-ray Disc 880. Here, with the Blu-ray player 890 capable of playing a Blu-ray Disc, a CPU 891, an OS 892, a Java VM (Java virtual machine), and a library 893 are implemented as default, and accordingly, a Java program can be executed. Therefore, the Blu-ray Disc 880 is mounted on the Blu-ray player 890, whereby the Blu-ray player 890 can load and execute the Java program 881. Thus, in the case that the Blu-ray player 890 plays the moving picture content 882, the metadata 884 is used to execute display of a panorama image corresponding to a moving picture according to each embodiment of the present invention, search of a moving picture from multiple moving pictures, or the like. That is to say, moving picture playback according to each embodiment of the present invention can be realized with all the Blu-ray players without using a dedicated PC software or the like.

As described above, according to the embodiments of the present invention, an atmosphere at an imaging place, a situation of the place thereof, and so forth can be propagated accurately, and the imaging space at the imaging place thereof can be recognized. Also, the moving picture thereof can be made to seem more fun, and interest relating the moving picture can be raised. For example, it is said that most users are satisfied with one-time imaging of a moving picture, as compared to a photo, and do not view the imaged moving picture repeatedly. Therefore, with the embodiments of the present invention, a prominent image is selected from a moving picture, and a composited image is created from this image, whereby a chance to view a scene imaged by the moving picture again can be readily provided. For example, multiple images may be composited in a panorama manner to create one composited image such that multiple paper photos are overlaid.

Also, with the embodiments of the present invention, description has been made with the image processing apparatus which displays a composited image on the display unit as an example, but the embodiments of the present invention may be applied to an image processing apparatus in which an image output unit which outputs image information used for displaying a composited image on another image display apparatus. Further, the embodiments of the present invention may be applied to a moving picture player capable of playing a moving picture, an imaging apparatus such as a digital video camera or the like capable of playing an imaged moving picture, a photo frame capable of displaying an image based on image data, or the like.

Also, with the embodiments of the present invention, description has been made with the image processing apparatus as an example, but the embodiments of the present invention may be applied to a moving picture player or the like capable of playing a moving picture. Also, with the embodiments of the present invention, description has been made regarding a moving picture imaged by the camera, but the embodiments of the present invention may also be applied to, for example, a moving picture or the like wherein, in the case that a moving picture imaged by the camera is edited, a moving picture after editing or animation or the like are partially composited.

Note that the embodiments of the present invention illustrate an example used to realize the present invention, as described above, have corresponding relationship as to each of invention specification components in the Summary of the Invention. However, the present invention is not restricted to the above embodiments, and various changes can be made without departing from the essence and spirit of the present invention.

Also, the procedures described in the embodiments of the present invention may be regarded as a method including such a series of procedures, or may be regarded as a program used for causing a computer to execute such a series of procedures, or may be regarded a recording medium configured to store the program thereof. For example, a CD (Compact Disc), MD (MiniDisc), DVD (Digital Versatile Disk), a memory card, a Blu-ray Disc (registered trademark), or the like may be employed as the recording medium thereof.

The present application contains subject matter related to that disclosed in Japanese Priority Patent Application JP 2008-275141 filed in the Japan Patent Office on Oct. 27, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    a calculating unit configured to calculate motion information relating to between two images that make up an imaged moving picture; and
    a selecting unit configured to select compositing target images serving as compositing targets from a plurality of images that make up said imaged moving picture based on reliability that indicates the likelihood of said calculated motion information,
    wherein said selecting unit includes
        a section selecting unit configured to select a section used for selecting said compositing target images from a plurality of images that make up said imaged moving picture based on said reliability, and
        an image selecting unit configured to select said compositing target images from a plurality of images included in said selected section based on relative position relationship of images included in said selected section; and
    wherein, in the case that said selected compositing target images are taken as reference images, and a target image that is another image included in said selected section, and said reference images have been each converted with said motion information, said image selecting unit selects a new compositing target image based on an overlaying rate between said target image and said reference images, the overlaying rate being determined by dividing an area of an overlapping region of a compositing image that includes the target image and said reference images with one of an area of the target image and an area of the reference images.

2. The image processing apparatus according to claim 1, further comprising:
   a determining unit configured to determine the attributes of a target included in said image;
   wherein said image selecting unit selects said compositing target images based on said determined attributes.

3. The image processing apparatus according to claim 2, wherein said image selecting unit calculates an evaluated value based on said determined attributes for each of targets included in said image, and selects said compositing target images based on the evaluated value calculated for each of said targets.

4. The image processing apparatus according to claim 3, wherein said image selecting unit takes said selected compositing target images as reference images, and selects a new compositing target image based on said evaluated value calculated for each of targets included in a target image that is another image included in said selected section, and said evaluated value calculated for each of targets included in said reference images.

5. The image processing apparatus according to claim 1, wherein said section selecting unit selects a section including an image of a certain range as said section.

6. The image processing apparatus according to claim 1, further comprising:
   a reliability determination score calculating unit configured to calculate a reliability determination score that indicates a score used for determining said reliability based on said calculated motion information;
   wherein said motion information includes components relating to enlargement/reduction, translational movement, and rotation;
   and wherein said section selecting unit selects said section based on said calculated reliability determination score, said translational component, said rotational component, and said enlargement/reduction component that relate to said motion information.

7. The image processing apparatus according to claim 6, said calculating unit comprising:
   a feature point extracting unit configured to extract, based on pixels included in a first image that makes up said imaged moving picture, a feature point of said first image;
   a motion amount calculating unit configured to calculate the motion amount of a second image that is an image following said first image that makes up said imaged moving picture as to said first image based on each of said extracted feature points; and
   a motion information calculating unit configured to calculate said motion information based on said calculated motion amount;
   wherein said reliability determination score calculating unit calculates a value that indicates the rate of a feature point that exhibits dominant motion at the time of calculating said motion information by said motion information calculating unit, of said extracted feature points, as said reliability determination score.

8. The image processing apparatus according to claim 6, wherein, with a first image that makes up said imaged moving picture as a reference, in the case that a second image that is an image following said first image that makes up said imaged moving picture is converted based on said motion information, said reliability determination score calculating unit calculates the luminance difference value of pixels at an overlaid region of said first image and said second image, and calculates said reliability determination score based on the difference value thereof.

9. The image processing apparatus according to claim 8, said calculating unit comprising:
   a feature point extracting unit configured to extract a feature point of said first image based on each of pixels included in said first image;
   a motion amount calculating unit configured to calculate the motion amount of said second image as to said first image based on each of said extracted feature points; and
   a motion information calculating unit configured to calculate said motion information based on said calculated motion amount;
   wherein said reliability determination score calculating unit calculates, of said feature points extracted in said overlaid region, the luminance difference value of pixels around a feature point that exhibits dominant motion at the time of calculating said motion information by said motion information calculating unit, and calculates said reliability determination score based on the difference value thereof.

10. An image processing method, implemented on an image processing apparatus, comprising the steps of:
    calculating, at a calculating unit of the image processing apparatus, motion information relating to between two images that make up an imaged moving picture; and
    selecting of compositing target images serving as compositing targets from a plurality of images that make up said imaged moving picture based on reliability that indicates the likelihood of said calculated motion information;
    selecting a section used for selecting said compositing target images from a plurality of images that make up said imaged moving picture based on said reliability; and
    selecting said compositing target images from a plurality of images included in said selected section based on relative position relationship of images included in said selected section,
    wherein, in the case that said selected compositing target images are taken as reference images, and a target image that is another image included in said selected section, and said reference images have been each converted with said motion information, selecting a new compositing target image based on an overlaying rate between said target image and said reference images, the overlaying rate being determined by dividing an area of an overlapping region of a compositing image that includes the target image and said reference images with one of an area of the target image and an area of the reference images.

11. A non-transitory computer readable storage medium storing a program that causes a computer to execute:
    calculating of motion information relating to between two images that make up an imaged moving picture; and
    selecting of compositing target images serving as compositing targets from a plurality of images that make up said imaged moving picture based on reliability that indicates the likelihood of said calculated motion information;

selecting a section used for selecting said compositing target images from a plurality of images that make up said imaged moving picture based on said reliability; and selecting said compositing target images from a plurality of images included in said selected section based on relative position relationship of images included in said selected section, wherein, in the case that said selected compositing target images are taken as reference images, and a target image that is another image included in said selected section, and said reference images have been each converted with said motion information, selecting a new compositing target image based on an overlaying rate between said target image and said reference images, the overlaying rate being determined by dividing an area of an overlapping region of a compositing image that includes the target image and said reference images with one of an area of the target image and an area of the reference images.

* * * * *